US011824228B2

(12) United States Patent
Shayan et al.

(10) Patent No.: US 11,824,228 B2
(45) Date of Patent: Nov. 21, 2023

(54) COMPRESSION SYSTEMS FOR BATTERIES

(71) Applicant: Sion Power Corporation, Tucson, AZ (US)

(72) Inventors: Homa Shayan, Tucson, AZ (US); Jared M. Jennings, Tucson, AZ (US); Mark Niedzwiecki, Tucson, AZ (US); Daniel G. Milobar, Tucson, AZ (US); Ryan Michael Niccum, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 14 days.

(21) Appl. No.: 16/952,187

(22) Filed: Nov. 19, 2020

(65) Prior Publication Data

US 2021/0151840 A1  May 20, 2021

Related U.S. Application Data

(60) Provisional application No. 62/951,086, filed on Dec. 20, 2019, provisional application No. 62/937,761, filed on Nov. 19, 2019.

(51) Int. Cl.
*H01M 50/578* (2021.01)
*H01M 4/38* (2006.01)
(Continued)

(52) U.S. Cl.
CPC ......... *H01M 50/578* (2021.01); *H01M 4/382* (2013.01); *H01M 4/405* (2013.01); *H01M 10/0468* (2013.01); *H01M 10/658* (2015.04)

(58) Field of Classification Search
CPC .. H01M 50/233; H01M 50/20; H01M 50/242; H01M 50/204; H01M 50/207;
(Continued)

(56) References Cited

U.S. PATENT DOCUMENTS

| 1,956,243 A | 4/1934 | McEachron et al. |
| 4,063,005 A | 12/1977 | Mamantov et al. |

(Continued)

FOREIGN PATENT DOCUMENTS

| CA | 2332452 A1 | 11/1999 |
| CA | 2532270 A1 | 11/1999 |

(Continued)

OTHER PUBLICATIONS

[No Author Listed], 250-300° F. (120-150° C.) Cure Epoxy Resin System. Technical Data Sheet. Mitsubishi Chemical Carbon fiber and Composites. 2018. 5 pages.
(Continued)

*Primary Examiner* — Matthew T Martin
*Assistant Examiner* — Bartholomew A Hornsby
(74) *Attorney, Agent, or Firm* — Wolf, Greenfield & Sacks, P.C.

(57) ABSTRACT

Batteries including electrochemical cells, associated components, and arrangements thereof are generally described. In some aspects, batteries with housings that undergo relatively little expansion and contraction even in cases where electrochemical cells in the battery undergo a relatively high degree of expansion and contraction during charging and discharging are provided. Batteries configured to apply relatively high magnitudes and uniform force to electrochemical cells in the battery, while in some cases having high energy densities and a relatively low pack burden, are also provided. In certain aspects, arrangements of electrochemical cells and associated components are generally described. In some aspects, thermally conductive solid articles that can be used for aligning components of the battery are described. In some aspects, thermally insulating and compressible components for battery packs are generally described.

21 Claims, 73 Drawing Sheets

(51) Int. Cl.
*H01M 4/40* (2006.01)
*H01M 10/04* (2006.01)
*H01M 10/658* (2014.01)

(58) Field of Classification Search
CPC ............. H01M 50/209; H01M 50/211; H01M 50/236; H01M 10/0468; H01M 10/052; H01M 10/64; H01M 10/647; H01M 10/6555
See application file for complete search history.

(56) References Cited

U.S. PATENT DOCUMENTS

| | | |
|---|---|---|
| 4,384,029 A | 5/1983 | Kordesch et al. |
| 4,410,609 A | 10/1983 | Peled et al. |
| 4,477,545 A | 10/1984 | Akridge et al. |
| 4,664,991 A | 5/1987 | Perichaud et al. |
| 4,683,178 A | 7/1987 | Stadnick et al. |
| 4,739,018 A | 4/1988 | Armand et al. |
| 4,833,048 A | 5/1989 | Dejonghe et al. |
| 4,917,974 A | 4/1990 | De Jonghe et al. |
| 5,090,296 A | 2/1992 | Todd |
| 5,114,804 A | 5/1992 | Stiles et al. |
| 5,162,175 A | 11/1992 | Visco et al. |
| 5,194,341 A | 3/1993 | Bagley et al. |
| 5,324,599 A | 6/1994 | Oyama et al. |
| 5,441,831 A | 8/1995 | Okamoto et al. |
| 5,510,209 A | 4/1996 | Abraham et al. |
| 5,514,155 A | 5/1996 | Daneshvar |
| 5,516,598 A | 5/1996 | Visco et al. |
| 5,529,860 A | 6/1996 | Skotheim et al. |
| 5,582,623 A | 12/1996 | Chu |
| 5,601,942 A | 2/1997 | Fedele |
| 5,601,947 A | 2/1997 | Skotheim et al. |
| 5,648,187 A | 7/1997 | Skotheim |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,800,939 A | 9/1998 | Mishina et al. |
| 5,834,135 A | 11/1998 | Pendalwar et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,030,720 A | 2/2000 | Chu et al. |
| 6,117,583 A | 9/2000 | Nilsson et al. |
| 6,117,590 A | 9/2000 | Skotheim et al. |
| 6,120,930 A | 9/2000 | Rouillard et al. |
| 6,143,216 A | 11/2000 | Loch et al. |
| 6,153,337 A | 11/2000 | Carlson et al. |
| 6,165,645 A | 12/2000 | Nishimura et al. |
| 6,201,100 B1 | 3/2001 | Gorkovenko et al. |
| 6,203,947 B1 | 3/2001 | Peled et al. |
| 6,238,819 B1 | 5/2001 | Cahill et al. |
| 6,238,821 B1 | 5/2001 | Mukherjee et al. |
| 6,245,455 B1 | 6/2001 | Kohno et al. |
| 6,306,545 B1 | 10/2001 | Carlson et al. |
| 6,365,032 B1 | 4/2002 | Shiepe et al. |
| 6,391,069 B1 | 5/2002 | Gozdz et al. |
| 6,413,667 B1 | 7/2002 | Gozdz |
| 6,468,692 B1 | 10/2002 | Nemoto et al. |
| 6,558,438 B1 | 5/2003 | Satoh et al. |
| 6,585,869 B2 | 7/2003 | Shiepe et al. |
| 6,682,853 B2 | 1/2004 | Kimijima et al. |
| 6,689,177 B2 | 2/2004 | Sugiyama et al. |
| 6,733,924 B1 | 5/2004 | Skotheim et al. |
| 6,797,428 B1 | 9/2004 | Skotheim et al. |
| 6,806,001 B1 | 10/2004 | Benczur-Uermoessy et al. |
| 6,819,082 B2 | 11/2004 | Yang |
| 6,844,110 B2 | 1/2005 | Enomoto et al. |
| 6,936,381 B2 | 8/2005 | Skotheim et al. |
| 6,951,699 B2 | 10/2005 | Yata et al. |
| 7,087,344 B2 | 8/2006 | Kaneta |
| 7,235,330 B1 | 6/2007 | Fujimoto et al. |
| 7,244,530 B2 | 7/2007 | Hambitzer et al. |
| 7,247,408 B2 | 7/2007 | Skotheim et al. |
| 7,252,689 B2 | 8/2007 | Fujino et al. |
| 7,354,675 B2 | 4/2008 | Molter |
| 7,642,001 B2 | 1/2010 | Yata et al. |
| 7,688,075 B2 | 3/2010 | Kelley et al. |
| 7,691,530 B2 | 4/2010 | Kim et al. |
| 7,736,800 B2 | 6/2010 | Lee |
| 7,749,655 B2 | 7/2010 | Doh et al. |
| 7,771,870 B2 | 8/2010 | Affinito et al. |
| 7,785,730 B2 | 8/2010 | Affinito et al. |
| 7,842,418 B2 | 11/2010 | Miyahisa et al. |
| 7,939,198 B2 | 5/2011 | Mukherjee et al. |
| 8,066,913 B2 | 11/2011 | Kikuya et al. |
| 8,076,024 B2 | 12/2011 | Affinito et al. |
| 8,084,102 B2 | 12/2011 | Affinito |
| 8,087,309 B2 | 1/2012 | Kelley et al. |
| 8,105,717 B2 | 1/2012 | Skotheim et al. |
| 8,129,048 B2 | 3/2012 | Hirakawa et al. |
| 8,158,278 B2 | 4/2012 | Tsutsumi et al. |
| 8,163,409 B2 | 4/2012 | Fujikawa et al. |
| 8,197,971 B2 | 6/2012 | Skotheim et al. |
| 8,264,205 B2 | 9/2012 | Kopera |
| 8,322,406 B2 | 12/2012 | Du et al. |
| 8,338,034 B2 | 12/2012 | Affinito et al. |
| 8,415,054 B2 | 4/2013 | Skotheim et al. |
| 8,415,071 B2 | 4/2013 | Tanaka et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,916,284 B2 | 12/2014 | Jang et al. |
| 8,936,870 B2 | 1/2015 | Affinito et al. |
| 8,968,928 B2 | 3/2015 | Wang et al. |
| 9,005,311 B2 | 4/2015 | Safont-Sempere et al. |
| 9,005,809 B2 | 4/2015 | Wilkening et al. |
| 9,012,049 B2 | 4/2015 | Fetzer et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,118,085 B2 | 8/2015 | Ikeda |
| 9,177,689 B2 | 11/2015 | Paulsen et al. |
| 9,209,428 B2 | 12/2015 | Jung et al. |
| 9,214,678 B2 | 12/2015 | Mikhaylik |
| 9,219,268 B2 | 12/2015 | Guen et al. |
| 9,287,540 B2 | 3/2016 | Huang |
| 9,287,551 B2 | 3/2016 | Kang et al. |
| 9,306,197 B2 | 4/2016 | Byun et al. |
| 9,306,252 B2 | 4/2016 | Kristofek et al. |
| 9,391,344 B2 | 7/2016 | Kwon et al. |
| 9,397,342 B2 | 7/2016 | Skotheim et al. |
| 9,399,404 B2 | 7/2016 | Ose et al. |
| 9,419,274 B2 | 8/2016 | Wilkening et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,653,735 B2 | 5/2017 | Skotheim et al. |
| 9,653,750 B2 | 5/2017 | Laramie et al. |
| 9,673,474 B2 | 6/2017 | Nakaishi |
| 9,680,178 B2 | 6/2017 | Deponte et al. |
| 9,711,784 B2 | 7/2017 | Kelley et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,780,404 B2 | 10/2017 | Scordilis-Kelley et al. |
| 9,825,328 B2 | 11/2017 | Du et al. |
| 9,853,271 B2 | 12/2017 | Iwase et al. |
| 9,853,287 B2 | 12/2017 | Mikhaylik et al. |
| 9,947,963 B2 | 4/2018 | Du et al. |
| 9,994,959 B2 | 6/2018 | Laramie et al. |
| 9,994,960 B2 | 6/2018 | Laramie et al. |
| 10,020,479 B2 | 7/2018 | Mikhaylik et al. |

(56) References Cited

U.S. PATENT DOCUMENTS

| | | | |
|---|---|---|---|
| 10,020,512 | B2 | 7/2018 | Gronwald et al. |
| 10,050,308 | B2 | 8/2018 | Liao et al. |
| 10,069,135 | B2 | 9/2018 | Fleischmann et al. |
| 10,069,146 | B2 | 9/2018 | Skotheim et al. |
| 10,122,043 | B2 | 11/2018 | Du et al. |
| 10,193,181 | B2 | 1/2019 | Niwa et al. |
| 10,243,202 | B2 | 3/2019 | Fleischmann et al. |
| 10,312,545 | B2 | 6/2019 | Scordilis-Kelley et al. |
| 10,319,988 | B2 | 6/2019 | Kelley et al. |
| 10,320,027 | B2 | 6/2019 | Scordilis-Kelley et al. |
| 10,320,031 | B2 | 6/2019 | Mikhaylik et al. |
| 10,333,134 | B2 | 6/2019 | Mikhaylik et al. |
| 10,333,149 | B2 | 6/2019 | Affinito et al. |
| 10,388,987 | B2 | 8/2019 | Du et al. |
| 10,461,333 | B2 | 10/2019 | Mikhaylik et al. |
| 10,461,372 | B2 | 10/2019 | Laramie et al. |
| 10,490,796 | B2 | 11/2019 | Laramie et al. |
| 10,535,902 | B2 | 1/2020 | Laramie et al. |
| 10,541,448 | B2 | 1/2020 | Mikhaylik et al. |
| 10,553,893 | B2 | 2/2020 | Laramie et al. |
| 10,573,869 | B2 | 2/2020 | Mikhaylik et al. |
| 10,608,278 | B2 | 3/2020 | Liao et al. |
| 10,629,947 | B2 | 4/2020 | Affinito et al. |
| 10,629,954 | B2 | 4/2020 | Mikhaylik et al. |
| 10,720,648 | B2 | 7/2020 | Quero-Mieres et al. |
| 10,847,833 | B2 | 11/2020 | Bunte et al. |
| 10,862,105 | B2 | 12/2020 | Gronwald et al. |
| 10,868,306 | B2 | 12/2020 | Mudalige et al. |
| 10,879,527 | B2 | 12/2020 | Laramie et al. |
| 11,223,063 | B2 | 1/2022 | Zhao et al. |
| 2001/0000485 | A1 | 4/2001 | Ying et al. |
| 2001/0005561 | A1 | 6/2001 | Yamada et al. |
| 2001/0041294 | A1 | 11/2001 | Chu et al. |
| 2002/0012846 | A1 | 1/2002 | Skotheim et al. |
| 2002/0055040 | A1 | 5/2002 | Mukherjee et al. |
| 2002/0192557 | A1 | 12/2002 | Choi et al. |
| 2003/0069489 | A1 | 4/2003 | Abreu |
| 2003/0113624 | A1 | 6/2003 | Kim et al. |
| 2003/0124416 | A1 | 7/2003 | Kaneta |
| 2004/0081887 | A1 | 4/2004 | Sugiyama et al. |
| 2005/0042515 | A1 | 2/2005 | Hwang et al. |
| 2005/0130041 | A1 | 6/2005 | Fensore, III |
| 2005/0175903 | A1 | 8/2005 | Kim et al. |
| 2005/0196672 | A1 | 9/2005 | Mukherjee et al. |
| 2006/0024579 | A1 | 2/2006 | Kolosnitsyn et al. |
| 2006/0115579 | A1 | 6/2006 | Mukherjee et al. |
| 2006/0115719 | A1 | 6/2006 | Jeon et al. |
| 2006/0115735 | A1 | 6/2006 | Yasuda et al. |
| 2006/0222954 | A1 | 10/2006 | Skotheim et al. |
| 2006/0234117 | A1 | 10/2006 | Fujikawa et al. |
| 2006/0238203 | A1 | 10/2006 | Kelley et al. |
| 2007/0141449 | A1 | 6/2007 | Kim |
| 2007/0221265 | A1 | 9/2007 | Affinito et al. |
| 2007/0224502 | A1 | 9/2007 | Affinito et al. |
| 2008/0187663 | A1 | 8/2008 | Affinito |
| 2008/0213672 | A1 | 9/2008 | Skotheim et al. |
| 2008/0318128 | A1 | 12/2008 | Simoneau et al. |
| 2009/0035646 | A1 | 2/2009 | Mikhaylik et al. |
| 2009/0055110 | A1 | 2/2009 | Kelley et al. |
| 2009/0077794 | A1 | 3/2009 | Hirakawa et al. |
| 2009/0200986 | A1 | 8/2009 | Kopera |
| 2010/0035128 | A1* | 2/2010 | Scordilis-Kelley ......................... H01M 10/0468 429/231.95 |
| 2010/0099023 | A1 | 4/2010 | Kuroda et al. |
| 2010/0129699 | A1 | 5/2010 | Mikhaylik et al. |
| 2010/0136404 | A1 | 6/2010 | Hermann et al. |
| 2010/0143823 | A1 | 6/2010 | Tanaka et al. |
| 2010/0239914 | A1 | 9/2010 | Mikhaylik et al. |
| 2010/0285360 | A1 | 11/2010 | Kozinsky et al. |
| 2010/0291442 | A1 | 11/2010 | Wang et al. |
| 2010/0294049 | A1 | 11/2010 | Kelley et al. |
| 2011/0006738 | A1 | 1/2011 | Mikhaylik et al. |
| 2011/0008531 | A1 | 1/2011 | Mikhaylik et al. |
| 2011/0014524 | A1 | 1/2011 | Skotheim et al. |
| 2011/0059361 | A1 | 3/2011 | Wilkening et al. |
| 2011/0068001 | A1 | 3/2011 | Affinito et al. |
| 2011/0070491 | A1 | 3/2011 | Campbell et al. |
| 2011/0070494 | A1 | 3/2011 | Campbell et al. |
| 2011/0076560 | A1 | 3/2011 | Scordilis-Kelley et al. |
| 2011/0159376 | A1 | 6/2011 | Skotheim et al. |
| 2011/0165471 | A9 | 7/2011 | Skotheim et al. |
| 2011/0177398 | A1 | 7/2011 | Affinito et al. |
| 2011/0206992 | A1 | 8/2011 | Campbell et al. |
| 2011/0250485 | A1 | 10/2011 | Tsukuda |
| 2011/0256450 | A1 | 10/2011 | Campbell et al. |
| 2011/0293982 | A1 | 12/2011 | Martz et al. |
| 2012/0044660 | A1 | 2/2012 | Rappoport et al. |
| 2012/0048729 | A1 | 3/2012 | Mikhaylik et al. |
| 2012/0052339 | A1 | 3/2012 | Mikhaylik et al. |
| 2012/0070746 | A1 | 3/2012 | Mikhaylik et al. |
| 2012/0082872 | A1 | 4/2012 | Schmidt et al. |
| 2012/0082901 | A1 | 4/2012 | Schmidt et al. |
| 2013/0017441 | A1 | 1/2013 | Affinito et al. |
| 2013/0034755 | A1 | 2/2013 | Kim |
| 2013/0095380 | A1 | 4/2013 | Affinito et al. |
| 2013/0216915 | A1 | 8/2013 | Affinito et al. |
| 2013/0224601 | A1 | 8/2013 | Burnside et al. |
| 2013/0252103 | A1 | 9/2013 | Mikhaylik |
| 2013/0316072 | A1 | 11/2013 | Scordilis-Kelley et al. |
| 2013/0323564 | A1 | 12/2013 | Beyerle, II et al. |
| 2014/0091748 | A1 | 4/2014 | Hermann |
| 2014/0123477 | A1 | 5/2014 | Safont Sempere et al. |
| 2014/0141308 | A1 | 5/2014 | Christian et al. |
| 2014/0193713 | A1 | 7/2014 | Kumaresan et al. |
| 2014/0193723 | A1 | 7/2014 | Kumaresan et al. |
| 2014/0255780 | A1 | 9/2014 | Mikhaylik et al. |
| 2014/0272565 | A1 | 9/2014 | Gronwald et al. |
| 2014/0272594 | A1 | 9/2014 | Safont Sempere et al. |
| 2014/0272595 | A1 | 9/2014 | Cristadoro et al. |
| 2014/0272597 | A1 | 9/2014 | Mikhaylik et al. |
| 2015/0010804 | A1 | 1/2015 | Laramie et al. |
| 2015/0044517 | A1 | 2/2015 | Mikhaylik et al. |
| 2015/0129332 | A1 | 5/2015 | Seto et al. |
| 2015/0162586 | A1 | 6/2015 | Fleischmann et al. |
| 2015/0180084 | A1 | 6/2015 | Scordilis-Kelley et al. |
| 2015/0188194 | A1 | 7/2015 | Mikhaylik et al. |
| 2015/0236322 | A1 | 8/2015 | Laramie et al. |
| 2015/0287986 | A1 | 10/2015 | Affinito et al. |
| 2016/0072132 | A1 | 3/2016 | Liao et al. |
| 2016/0118638 | A1 | 4/2016 | Gronwald et al. |
| 2016/0118651 | A1 | 4/2016 | Kovalev et al. |
| 2016/0126541 | A1 | 5/2016 | Goto et al. |
| 2016/0218398 | A1 | 7/2016 | Yonehara et al. |
| 2017/0141385 | A1 | 5/2017 | Scordilis-Kelley et al. |
| 2017/0141402 | A1 | 5/2017 | Affinito et al. |
| 2017/0276202 | A1 | 9/2017 | Friedrich |
| 2018/0006303 | A1 | 1/2018 | Mikhaylik et al. |
| 2018/0048018 | A1 | 2/2018 | Scordilis-Kelley et al. |
| 2018/0062225 | A1 | 3/2018 | You et al. |
| 2018/0151856 | A1* | 5/2018 | Fischer ............... H01M 10/058 |
| 2018/0230610 | A1 | 8/2018 | Laramie et al. |
| 2018/0254516 | A1 | 9/2018 | Han et al. |
| 2018/0261820 | A1 | 9/2018 | Liao et al. |
| 2018/0269520 | A1 | 9/2018 | Scordilis-Kelley et al. |
| 2018/0277850 | A1* | 9/2018 | Quero-Mieres ....... H01M 4/622 |
| 2018/0301697 | A1 | 10/2018 | Affinito et al. |
| 2018/0351148 | A1 | 12/2018 | Schneider et al. |
| 2018/0351158 | A1 | 12/2018 | Liao et al. |
| 2018/0375155 | A1 | 12/2018 | Liao et al. |
| 2019/0006699 | A1 | 1/2019 | Jones et al. |
| 2019/0088958 | A1 | 3/2019 | Viner et al. |
| 2019/0207178 | A1* | 7/2019 | Cao ..................... H01M 50/291 |
| 2019/0229323 | A1 | 7/2019 | Mikhaylik et al. |
| 2019/0267632 | A1 | 8/2019 | Affinito et al. |
| 2019/0348672 | A1 | 11/2019 | Wang et al. |
| 2019/0386334 | A1 | 12/2019 | Scordilis-Kelley et al. |
| 2020/0044460 | A1 | 2/2020 | Mikhaylik et al. |
| 2020/0091547 | A1 | 3/2020 | Scordilis-Kelley et al. |
| 2020/0099108 | A1 | 3/2020 | Laramie et al. |
| 2020/0119324 | A1 | 4/2020 | Laramie et al. |
| 2020/0185764 | A1 | 6/2020 | Liao et al. |
| 2020/0194822 | A1 | 6/2020 | Laramie et al. |
| 2020/0220146 | A1 | 7/2020 | Laramie et al. |

(56) References Cited

U.S. PATENT DOCUMENTS

| | | |
|---|---|---|
| 2020/0220149 A1 | 7/2020 | Laramie et al. |
| 2020/0220197 A1 | 7/2020 | Laramie et al. |
| 2020/0220205 A1 | 7/2020 | Affinito et al. |
| 2020/0227785 A1 | 7/2020 | Mikhaylik et al. |
| 2020/0243824 A1 | 7/2020 | Wang et al. |
| 2020/0259341 A1 | 8/2020 | Mikhaylik et al. |
| 2020/0313225 A1 | 10/2020 | Scordilis-Kelley et al. |
| 2020/0350631 A1 | 11/2020 | Mikhaylik et al. |
| 2020/0373551 A1 | 11/2020 | Milobar et al. |
| 2020/0373578 A1 | 11/2020 | Wang et al. |
| 2020/0373579 A1 | 11/2020 | Lee et al. |
| 2020/0395585 A1 | 12/2020 | Laramie et al. |
| 2020/0411916 A1 | 12/2020 | Nam et al. |
| 2021/0151815 A1 | 5/2021 | Milobar et al. |
| 2021/0151816 A1 | 5/2021 | Shayan et al. |
| 2021/0151817 A1 | 5/2021 | Jennings et al. |
| 2021/0151830 A1 | 5/2021 | Shayan et al. |
| 2021/0151839 A1 | 5/2021 | Niedzwiecki et al. |
| 2021/0151841 A1 | 5/2021 | Johnson et al. |
| 2021/0305646 A1 | 9/2021 | Kubota et al. |

FOREIGN PATENT DOCUMENTS

| | | |
|---|---|---|
| CA | 2310697 A1 | 12/2000 |
| CA | 2404507 A1 | 10/2001 |
| CN | 1121264 A | 4/1996 |
| CN | 1430304 A | 7/2003 |
| CN | 1874027 A | 12/2006 |
| CN | 110148690 A | 8/2019 |
| CN | 110265591 A | 9/2019 |
| CN | 106133944 B | 11/2019 |
| DE | 102013020860 A1 | 6/2015 |
| EP | 0 700 109 A1 | 3/1996 |
| EP | 1 144 730 B1 | 9/2002 |
| EP | 1 171 387 B1 | 11/2005 |
| EP | 0 700 109 B1 | 10/2006 |
| EP | 1 717 879 A1 | 11/2006 |
| EP | 1 059 681 B1 | 1/2007 |
| EP | 1 194 976 B1 | 2/2007 |
| EP | 1 768 202 A1 | 3/2007 |
| EP | 0 851 522 B1 | 9/2009 |
| EP | 1 137 091 B1 | 5/2011 |
| EP | 1 137 093 B1 | 5/2011 |
| EP | 1 083 618 B1 | 4/2013 |
| EP | 2 104 163 B1 | 6/2014 |
| EP | 2 471 140 B1 | 2/2015 |
| EP | 3 051 621 A1 | 8/2016 |
| EP | 2 713 432 B1 | 8/2017 |
| EP | 2 144 312 B1 | 9/2017 |
| JP | S58-164169 A | 9/1983 |
| JP | H04-294071 A | 10/1992 |
| JP | H06-124700 A | 5/1994 |
| JP | H10-55823 A | 2/1998 |
| JP | H10-214638 A | 8/1998 |
| JP | WO 99/05743 A1 | 2/1999 |
| JP | H11-121045 A | 4/1999 |
| JP | WO 99/33125 A1 | 7/1999 |
| JP | H11-219731 A | 8/1999 |
| JP | 2000-268866 A | 9/2000 |
| JP | 2000-268873 A | 9/2000 |
| JP | 2001-093577 A | 4/2001 |
| JP | 2001-143757 A | 5/2001 |
| JP | WO 01/39302 A1 | 5/2001 |
| JP | 3261688 B2 | 3/2002 |
| JP | 2003-297431 A | 10/2003 |
| JP | 2003-303579 A | 10/2003 |
| JP | 2004-213902 A | 7/2004 |
| JP | 2004-319489 A | 11/2004 |
| JP | 2005-056701 A | 3/2005 |
| JP | 2005-063848 A | 3/2005 |
| JP | 2005-353452 A | 12/2005 |
| JP | 2006-310033 A | 11/2006 |
| JP | 2006-310281 A | 11/2006 |
| JP | 2006-313737 A | 11/2006 |
| JP | 2006-318892 A | 11/2006 |
| JP | WO 2007/075867 A2 | 7/2007 |
| JP | WO 2007/097172 A1 | 8/2007 |
| JP | 2007-257850 A | 10/2007 |
| JP | 2009-076260 A | 4/2009 |
| JP | 2009-104902 A | 5/2009 |
| WO | WO 99/26055 A1 | 9/1995 |
| WO | WO 99/33130 A1 | 7/1999 |
| WO | WO 01/31722 A1 | 5/2001 |
| WO | WO 2009/017726 A1 | 2/2009 |
| WO | WO 2009/042071 A2 | 4/2009 |
| WO | WO 2009/054987 A1 | 4/2009 |
| WO | WO 2009/089018 A2 | 7/2009 |
| WO | WO 2010/016881 A1 | 2/2010 |
| WO | WO 2012/174393 A1 | 12/2012 |
| WO | WO 2014/026793 A1 | 2/2014 |
| WO | WO 2018/170413 A1 | 9/2018 |
| WO | WO 2020/139802 A2 | 7/2020 |
| WO | WO 2020/237015 A1 | 11/2020 |
| WO | WO 2020/257414 A1 | 12/2020 |

OTHER PUBLICATIONS

[No Author Listed], Cellasto, A cellular polyurethane elastomer. Technical Data Sheet. BASF Polyurethanes GmbH. 6 pages.

[No Author Listed], Cellasto, A microcellular polyurethane elastomer. Technical Data Sheet. BASF the Chemical Company. 2011. 12 pages.

[No Author Listed], Material Technology for Lithium Secondary Battery (I). Korea Institute of Science and Technology Information. 2004:p. 33.

Affinito et al., Increasing Li—S Battery Cycle Life, and Improving Safety, through Application of a Variety of Coating Techniques. Soc Vac Coat 54$^{th}$ Ann. 2011:589-92.

Chen et al., Recent advances in lithium-sulfur batteries. Journal of Power Sources. 2014;267:770-83. Epub Jun. 19, 2014.

Gireaud et al., Lithium metal stripping/plating mechanism studies: A metallurgical approach. Electrochemistry Communications. 2006;8:1639-49.

Hirai et al., Influence of electrolyte on lithium cycling efficiency with pressurized electrode stack. J. Electrochem. Soc. 1994;141:611-14.

Huggins, Lithium alloy negative electrodes. Journal of Power Sources. 1999;81-82:13-19.

Kim, Recent Developments in Anode Materials for Li Secondary Batteries. Journal of the Korean Electrochemical Society. 2008;11(3):211-22.

Psoma et al., Comparative Assessment of Different Sacrificial Materials for Releasing SU-8 Structures. Rev. Adv. Mater. Sci. 2005;10:149-55.

Yang et al., Small particle size multiphase Li-alloy anodes for lithium-ion-batteries. Solid State Ionics. 1996;90:281-7.

International Search Report and Written Opinion for International Application No. PCT/US2020/061162 dated May 3, 2021.

[No Author Listed], What is Carbon Fiber? Element 6 Composites. Apr. 6, 2018:7 pages.

Liu et al., Laminar Metal Foam: A Soft and Highly Thermally Conductive Thermal Interface Material with a Reliable Joint for Semiconductor Packaging. ACS Appl Mater Interfaces. Mar. 23, 2021;13(13):15791-801.

\* cited by examiner

COMPRESSION SYSTEMS FOR BATTERIES

RELATED APPLICATIONS

This application claims priority under 35 U.S.C. § 119(e) to U.S. Provisional Patent Application Ser. No. 62/937,761, filed Nov. 19, 2019, and entitled "Batteries, and Associated Systems and Methods," and U.S. Provisional Application Ser. No. 62/951,086, filed Dec. 20, 2019, and entitled "Batteries, and Associated Systems and Methods," each of which is incorporated herein by reference in its entirety for all purposes.

TECHNICAL FIELD

Batteries including electrochemical cells, associated components, and arrangements thereof are generally described.

BACKGROUND

Batteries typically include cells that undergo electrochemical reactions to produce electric current. Heat may be produced during cycling of the cell, which may affect the performance of the battery. Applying a force to at least a portion of an electrochemical cell (e.g., during cycling of the cell) can improve the performance of the electrochemical cell. Certain embodiments of the present disclosure are directed to inventive articles, systems, and methods relating to the handling of compressive force and heat transfer in batteries.

SUMMARY

Batteries including electrochemical cells, associated components, and arrangements thereof are generally described. In some aspects, batteries with housings that undergo relatively little expansion and contraction even in cases where electrochemical cells in the battery undergo a relatively high degree of expansion and contraction during charging and discharging are provided. Batteries configured to apply relatively high magnitudes and uniform force to electrochemical cells in the battery, while in some cases having high energy densities and a relatively low pack burden, are also provided. In certain aspects, arrangements of electrochemical cells and associated components are generally described. In some aspects, thermally conductive solid articles that can be used for aligning components of the battery are described. In some aspects, thermally insulating and compressible components for battery packs are generally described. The subject matter of the present invention involves, in some cases, interrelated products, alternative solutions to a particular problem, and/or a plurality of different uses of one or more systems and/or articles.

In one aspect, batteries are described. In some embodiments, the battery comprises a stack comprising a first electrochemical cell and a second electrochemical cell, wherein the first electrochemical cell comprises a first electrochemical active region having a largest lateral dimension, and the second electrochemical cell comprises a second electrochemical active region having a largest lateral dimension; and a housing at least partially enclosing the stack, the housing comprising a solid plate covering at least a portion of an end of the stack; wherein the housing is configured to apply, via the solid plate and tension in a solid housing component coupled to the solid plate, during at least one period of time during charge and/or discharge of the first electrochemical cell and/or the second electrochemical cell, an anisotropic force with a component normal to a first electrode active surface of the first electrochemical cell and/or a second electrode active surface of the second electrochemical cell defining a pressure of at least 10 kgf/cm$^2$, the solid housing component comprises a metal, metal alloy, composite, polymeric material, or combination thereof, and a ratio of the largest lateral dimension of the solid plate to the largest lateral dimension of the first electrochemical active region and/or a ratio of the largest lateral dimension of the solid plate to the largest lateral dimension of the second electrochemical active region is less than or equal to 1.5.

In another aspect, batteries are described. In some embodiments, the battery comprises a stack comprising a first electrochemical cell and a second electrochemical cell, wherein the first electrochemical cell comprises a first electrochemical active region having a largest lateral dimension, and the second electrochemical cell comprises a second electrochemical active region having a largest lateral dimension; and a housing at least partially enclosing the stack, the housing comprising a solid plate covering at least a portion of an end of the stack, wherein the housing has a largest lateral pressure applying dimension; wherein the housing is configured to apply, via the solid plate and tension in a solid housing component coupled to the solid plate, during at least one period of time during charge and/or discharge of the first electrochemical cell and/or the second electrochemical cell, an anisotropic force with a component normal to a first electrode active surface of the first electrochemical cell and/or a second electrode active surface of the second electrochemical cell defining a pressure of at least 10 kgf/cm$^2$, the solid housing component comprises a metal, metal alloy, composite, polymeric material, or combination thereof, and a ratio of the largest lateral pressure-applying dimension to the largest lateral dimension of the first electrochemical active region and/or a ratio of the largest lateral pressure-applying dimension of the solid plate to the largest lateral dimension of the second electrochemical active region is less than or equal to 1.6.

In another aspect, batteries are described. In some embodiments, the battery comprises a stack comprising a first electrochemical cell and a second electrochemical cell, the stack having a first end and a second end; a housing at least partially enclosing the stack, the housing comprising a solid plate covering at least a portion of the first end of the stack, wherein the housing is configured to apply, via the solid plate and tension in a solid housing component coupled to the solid plate, during at least one period of time during charge and/or discharge of the first electrochemical cell and/or the second electrochemical cell, an anisotropic force with a component normal to a first electrode active surface of the first electrochemical cell and/or a second electrode active surface of the second electrochemical cell defining a pressure of at least 10 kgf/cm$^2$, the solid housing component comprises a metal, metal alloy, composite, polymeric material, or combination thereof, and no auxiliary fastener spanning from the solid plate toward the second end of the stack along a side of the stack is in tension during application of the anisotropic force.

In another aspect, methods are described. In some embodiments, the method comprises at least partially charging and/or discharging electrochemical cells in a battery, such that the electrochemical cells undergo a cumulative expansion during the charging and/or discharging of at least 10%, and an expansion of the battery during the charging and/or discharging is less than or equal to 0.75%.

In some embodiments, the method comprises at least partially charging and/or discharging electrochemical cells in a battery, such that the electrochemical cells undergo a cumulative expansion during the charging and/or discharging; wherein a ratio of the cumulative expansion of the electrochemical cells to an expansion of the battery is greater than or equal to the total number of electrochemical cells in the battery.

In some embodiments, the method comprises at least partially charging and/or discharging electrochemical cells in a battery, such that the electrochemical cells undergo a cumulative expansion during the charging and/or discharging of greater than 1 mm, and an expansion of the battery during the charging and/or discharging is less than or equal to 1 mm.

In another aspect, batteries are described. In some embodiments, the battery comprises a housing at least partially enclosing: a first electrochemical cell; and a second electrochemical cell; wherein: the housing has a volume of less than or equal to 15000 cm$^3$, the battery has a specific energy of greater than or equal to 250 Wh/kg and a volumetric density of greater than or equal to 230 Wh/L, and the housing is configured to apply, during at least one period of time during charge and/or discharge of the first electrochemical cell and/or the second electrochemical cell, an anisotropic force with a component normal to the first electrode active surface and the second electrode active surface defining a pressure of at least 10 kgf/cm$^2$. In some embodiments, the battery has a specific energy of greater than or equal to 280 Wh/kg and a volumetric density of greater than or equal to 230 Wh/L.

In some embodiments, the battery comprises a housing at least partially enclosing: a first electrochemical cell; and a second electrochemical cell; wherein: the housing comprises a solid plate comprising layers comprising carbon fiber, one or more of the layers having a tensile modulus of at least 120 GPa and a flexural modulus of at least 120 GPa at 25° C., and the housing is configured to apply, during at least one period of time during charge and/or discharge of the first electrochemical cell and/or the second electrochemical cell, an anisotropic force with a component normal to the first electrode active surface and the second electrode active surface defining a pressure of at least 10 kgf/cm$^2$.

In another aspect, a multicomponent stack is described. In some embodiments, the multicomponent stack comprises the following in the order listed: a first electrochemical cell, a first thermally conductive solid article portion, a thermally insulating compressible solid article portion, a second thermally conductive solid article portion; and a second electrochemical cell.

In another aspect, a stack of electrochemical cells is described. In some embodiments, the stack of electrochemical cells comprises a first electrochemical cell, a second electrochemical cell, a thermally insulating compressible solid article portion between the first electrochemical cell and the second electrochemical cell, and a thermally conductive solid article portion between the first electrochemical cell and the thermally insulating compressible solid article portion.

In another aspect, batteries are described. In some embodiments, the battery comprises a first thermally conductive solid article portion comprising a first alignment feature; a first electrochemical cell coupled to a non-planarity of the first thermally conductive solid article portion, the first electrochemical cell comprising a first electrochemical active region; a second thermally conductive solid article portion comprising a second alignment feature; and a second electrochemical cell coupled to a non-planarity of the second thermally conductive solid article portion, the second electrochemical cell comprising a second electrochemical active region; wherein the first alignment feature and the second alignment feature are located such that when the first alignment feature is substantially aligned with the second alignment feature, the first electrochemical active region and the second electrochemical active region are substantially aligned.

In another aspect, a method is described. In some embodiments, the method comprises substantially aligning a first feature of a first thermally conductive solid article portion with a second feature of a second thermally conductive solid article portion, such that a first electrochemical active region of a first electrochemical cell is substantially aligned with a second electrochemical active region of a second electrochemical cell; wherein the first electrochemical cell is coupled to a non-planarity of the first thermally conductive solid article portion, and the second electrochemical cell is coupled to a non-planarity of the second thermally conductive solid article portion.

In another aspect, batteries are described. In some embodiments, the battery comprises a first electrochemical cell; a second electrochemical cell; and a thermally insulating compressible solid article portion between the first electrochemical cell and the second electrochemical cell; wherein the thermally insulating compressible solid article portion has an effective thermal conductivity of less than or equal to 0.5 W m$^{-1}$ K$^{-1}$ in a thickness direction at a temperature of 25° C., and a compression set less than or equal to 15% as determined by a constant force measurement. In some embodiments, the thermally insulating compressible solid article portion has an effective thermal conductivity of less than or equal to 0.5 W m$^{-1}$ K$^{-1}$ in a thickness direction at a temperature of 25° C., and a compression set less than or equal to 10%.

In another aspect, batteries are described. In some embodiments, the battery comprises a first electrochemical cell; a second electrochemical cell; and a thermally insulating compressible solid article portion between the first electrochemical cell and the second electrochemical cell; wherein the thermally insulating compressible solid article portion has an effective thermal conductivity of less than or equal to 0.5 W m$^{-1}$ K$^{-1}$ in a thickness direction at a temperature of 25° C., and a compression set less than or equal to 15% as determined by a constant displacement measurement. In some embodiments, the thermally insulating compressible solid article portion has an effective thermal conductivity of less than or equal to 0.5 W m$^{-1}$ K$^{-1}$ in a thickness direction at a temperature of 25° C., and a compression set less than or equal to 10%.

In another aspect, batteries are described. In some embodiments, the battery comprises a first electrochemical cell; a second electrochemical cell; and a thermally insulating compressible solid article portion between the first electrochemical cell and the second electrochemical cell; wherein the thermally insulating compressible solid article portion has an effective thermal conductivity of less than or equal to 0.5 W m$^{-1}$ K$^{-1}$ in a thickness direction at a temperature of 25° C. and a resilience of at least 60%, and wherein: at a compressive stress of 12 kgf/cm$^2$, the percent compression of the thermally insulating compressible solid article portion is at least 30%, and at a compressive stress of 40 kgf/cm$^2$, the percent compression of the thermally insulating compressible solid article portion is at least 80%.

In another aspect, batteries are described. In some embodiments, the battery comprises a stack comprising a first electrochemical cell and a second electrochemical cell, the stack having a first end, a second end, and a side; and a housing at least partially enclosing the stack, the housing comprising a first solid housing component covering at least a portion of the first end of the stack and having a portion along at least some of the side of the stack; a second solid housing component covering at least a portion of the second end of the stack and having a portion along at least some of the side of the stack; and a point of attachment between the first solid housing component and the second solid housing component at a region of overlap between the first solid housing component and the second solid housing component along the side of the stack; wherein the housing is configured to apply, during at least one period of time during charge and/or discharge of the first electrochemical cell and/or the second electrochemical cell, an anisotropic force with a component normal to a first electrode active surface of the first electrochemical cell and/or a second electrode active surface of the second electrochemical cell defining a pressure of at least 10 kgf/cm$^2$.

In another aspect, batteries are described. In some embodiments, the battery comprises a stack comprising a first electrochemical cell and a second electrochemical cell, the stack having a first end, and a second end; and a housing at least partially enclosing the stack, the housing comprising a first solid plate covering at least a portion of the first end of the stack; a second solid plate covering at least a portion of the second end of stack, and a solid housing component; wherein mechanically interlocking features of the discrete solid housing component and a lateral edge of the first solid plate establish a first joint, mechanically interlocking features of the discrete solid housing component and a lateral edge of the second solid plate establish a second joint, and the housing is configured to apply, during at least one period of time during charge and/or discharge of the first electrochemical cell and/or the second electrochemical cell, an anisotropic force with a component normal to a first electrode active surface of the first electrochemical cell and/or a second electrode active surface of the second electrochemical cell defining a pressure of at least 10 kgf/cm$^2$.

In another aspect, batteries are described. In some embodiments, the battery comprises a stack comprising a first electrochemical cell and a second electrochemical cell, the stack having a first end, a second end, and a side; and a housing at least partially enclosing the stack, the housing comprising a first solid housing component covering at least a portion of the first end of the stack and having a portion along at least some of the side of the stack; and a second solid housing component covering at least a portion of the second end of the stack and having a portion along at least some of the side of the stack; wherein: the first solid housing component and the second solid housing component are mechanically joined by at least one additional solid housing component along the side of the stack and overlapping the first solid housing component and/or the second housing component, and the housing is configured to apply, during at least one period of time during charge and/or discharge of the first electrochemical cell and/or the second electrochemical cell, an anisotropic force with a component normal to a first electrode active surface of the first electrochemical cell and/or a second electrode active surface of the second electrochemical cell defining a pressure of at least 10 kgf/cm$^2$.

In another aspect, methods are described. In some embodiments, the method comprises applying an external anisotropic force to a stack comprising a first electrochemical cell and a second electrochemical cell, the anisotropic force having a component normal to a first electrode active surface of the first electrochemical cell and/or a second electrode active surface of the second electrochemical cell defining a pressure of at least 10 kgf/cm$^2$, wherein a housing at least partially encloses the stack; attaching a first solid housing component of the housing to a second solid housing component during at least a portion of the step of applying the external anisotropic force; and removing the applied external anisotropic force while maintaining, via tension in the attached first solid housing component and the second solid housing component, an anisotropic force having a component normal to the first electrode active surface and/or the second electrode active surface defining a pressure of at least 10 kgf/cm$^2$.

In another aspect, methods are described. In some embodiments, the method comprises applying an external anisotropic force to a stack comprising a first electrochemical cell and a second electrochemical cell, the anisotropic force having a component normal to a first electrode active surface of the first electrochemical cell and/or a second electrode active surface of the second electrochemical cell defining a pressure of at least 10 kgf/cm$^2$, wherein a housing at least partially encloses the stack; attaching a solid housing component of the housing to a first solid plate covering at least a portion of a first end of the stack during at least a portion of the step of applying the external anisotropic force, wherein the solid housing component is attached to a second solid plate covering at least a portion of a second end of the stack during at least a portion of the step of applying the external anisotropic force; and removing the applied external anisotropic force while maintaining, via tension in the attached solid housing component, an anisotropic force having a component normal to the first electrode active surface and/or the second electrode active surface defining a pressure of at least 10 kgf/cm$^2$.

In another aspect, methods are described. In some embodiments, the method comprises applying an external anisotropic force to a stack comprising a first electrochemical cell and a second electrochemical cell, the anisotropic force having a component normal to a first electrode active surface of the first electrochemical cell and/or a second electrode active surface of the second electrochemical cell defining a pressure of at least 10 kgf/cm$^2$, wherein a housing at least partially encloses the stack; attaching a first solid housing component of the housing to a second discrete solid housing component during at least a portion of the step of applying the external anisotropic force by attaching the first solid housing component to one or more additional solid housing components that are attached to the second solid housing component; removing the applied external anisotropic force while maintaining, via tension in at least one of the first solid housing component, the second solid housing component, or the one or more additional solid housing components, an anisotropic force having a component normal to the first electrode active surface and/or the second electrode active surface defining a pressure of at least 10 kgf/cm$^2$.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
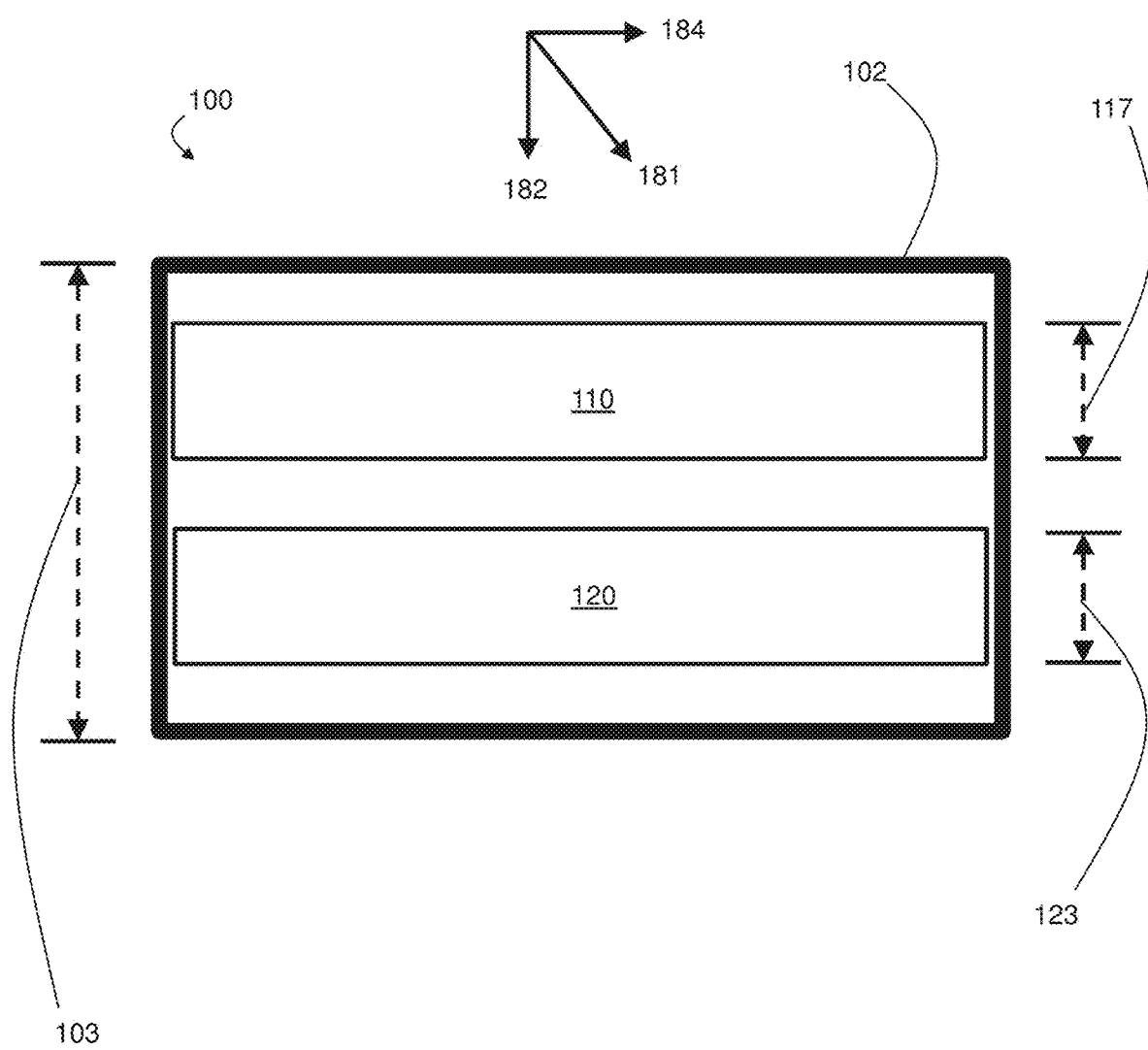
FIGS. 1A-1B show cross-sectional schematic diagrams of exemplary batteries comprising electrochemical cells and an optional housing, according to some embodiments.

Batteries including electrochemical cells, associated components, and arrangements thereof are generally described. In some aspects, batteries with housings that undergo relatively little expansion and contraction even in cases where electrochemical cells in the battery undergo a relatively high degree of expansion and contraction during charging and discharging are provided. Batteries configured to apply relatively high magnitudes and uniform force to electrochemical cells in the battery, while in some cases having high energy densities and a relatively low pack burden, are also provided. In certain aspects, arrangements of electrochemical cells and associated components are generally described. In some aspects, thermally conductive solid articles that can be used for aligning components of the battery are described. In some aspects, thermally insulating and compressible components for battery packs are generally described. The present disclosure describes multiple inventive aspects relating to battery components and arrangements thereof, application of force to multiple electrochemical cells in battery packs, and thermal management. These inventive aspects can, alone or in combination, lead to the manufacture of batteries with unexpected properties such as unexpectedly high energy densities and durability.

In some cases, it may be beneficial to apply force to electrochemical cells in a battery. For example, in some cases applying an anisotropic force with a component normal to at least one of the electrochemical cells can improve performance during charging and/or discharging by reducing problems such as dendrite formation and surface roughening of the electrode while improving current density. One such example is the case where at least one of the electrochemical cells of the battery comprises lithium metal or a lithium metal alloy as an electrode active material. Lithium metal may undergo dendrite growth, for example, which can in certain cases lead to failure of the electrochemical cell and safety hazards. Application of relatively high magnitudes of anisotropic force to electrodes comprising lithium metal may mitigate lithium dendrite formation and other deleterious phenomena. However, it has been realized in the context of the present disclosure that numerous challenges may emerge when applying force within batteries comprising multiple electrochemical cells (e.g., comprising lithium and/or lithium alloy as an electrode active material). For example, application of a relatively uniform force such that each of the electrochemical cells experiences a relatively similar pressure distribution can be important for performance and durability, and managing pressure on multiple cells must be accomplished simultaneously. Further, certain types of electrochemical cells may undergo relatively large dimensional changes during cycling. As one example, an electrode comprising lithium and/or lithium metal alloy may expand significantly due to lithium deposition during charging and contract significantly upon lithium ion release during discharging. Such dimensional changes of the electrochemical cells may lead to uneven pressure distributions and problematic battery pack dimensional changes.

The present disclosure provides methods, articles, and devices that can, in some cases, be used to mitigate such dimensional changes of the overall battery (e.g., the housing) even in situations where electrochemical cells may expand and contract. For example, relatively high magnitudes of force (e.g., defining a pressure of greater than or equal to 10 kgf/cm$^2$ and up to 40 kgf/cm$^2$) may be applied. For example, it has been realized that relatively high magnitudes of force may be applied relatively uniformly using certain housing components (e.g., solid plates) having relatively high stiffness while being lightweight (e.g., certain types of carbon fiber having certain weaves and thicknesses). Further, certain articles in the battery may compensate for dimensional changes of the electrochemical cells (e.g., thermally insulating compressible solid article portions such as microcellular elastomeric foams). It has been discovered that certain types of components can have suitable mechanical properties for use in batteries under compressive force (e.g., relatively low compression set, relatively high resilience) while being thermally insulating. Some such thermally insulating compressible solid article portions may then be capable of serving multiple roles: compensating for dimensional changes in electrochemical cells and mitigating heat transfer between electrochemical cells. It has also been discovered that aligning components (e.g., electrochemical active regions of the electrochemical cells) of the battery can lead to improved performance and durability (e.g., by increasing the uniformity of the pressure distribution experienced by the electrochemical active regions). Certain aspects of the present disclosure are related to thermally conductive solid article portions that can be used to align electrochemical active regions of the battery while also performing other functions, such as facilitating heat transfer away from the electrochemical cells (e.g., laterally). The use of articles capable of alignment and thermal transfer may reduce the number of components needed for the battery, which may reduce complexity, pack burden, and/or costs. Certain aspects also relate to unconventional arrangements of components that can simultaneously mitigate multiple potentially deleterious phenomena associated with batteries comprising multiple electrochemical cells, while using relatively few components, which may allow for relatively high energy densities while also allowing for good durability. For example, certain arrangements of electrochemical cells, thermally conductive solid article portions, and thermally insulating compressible solid article portions may promote unexpectedly efficient heat transfer away from the electrochemical cells while also facilitating compensation for applied forces and cell breathing and facilitating relatively uniform pressure distributions (e.g., within ±2.5 kgf/cm$^2$ or within ±2 kgf/cm$^2$ across an electrochemical active region).

In one aspect, batteries are generally described. The battery may include, in some embodiments, one or more rechargeable electrochemical cells. In some embodiments, the battery comprises one or more rechargeable lithium-ion electrochemical cells.

Figure 1B:
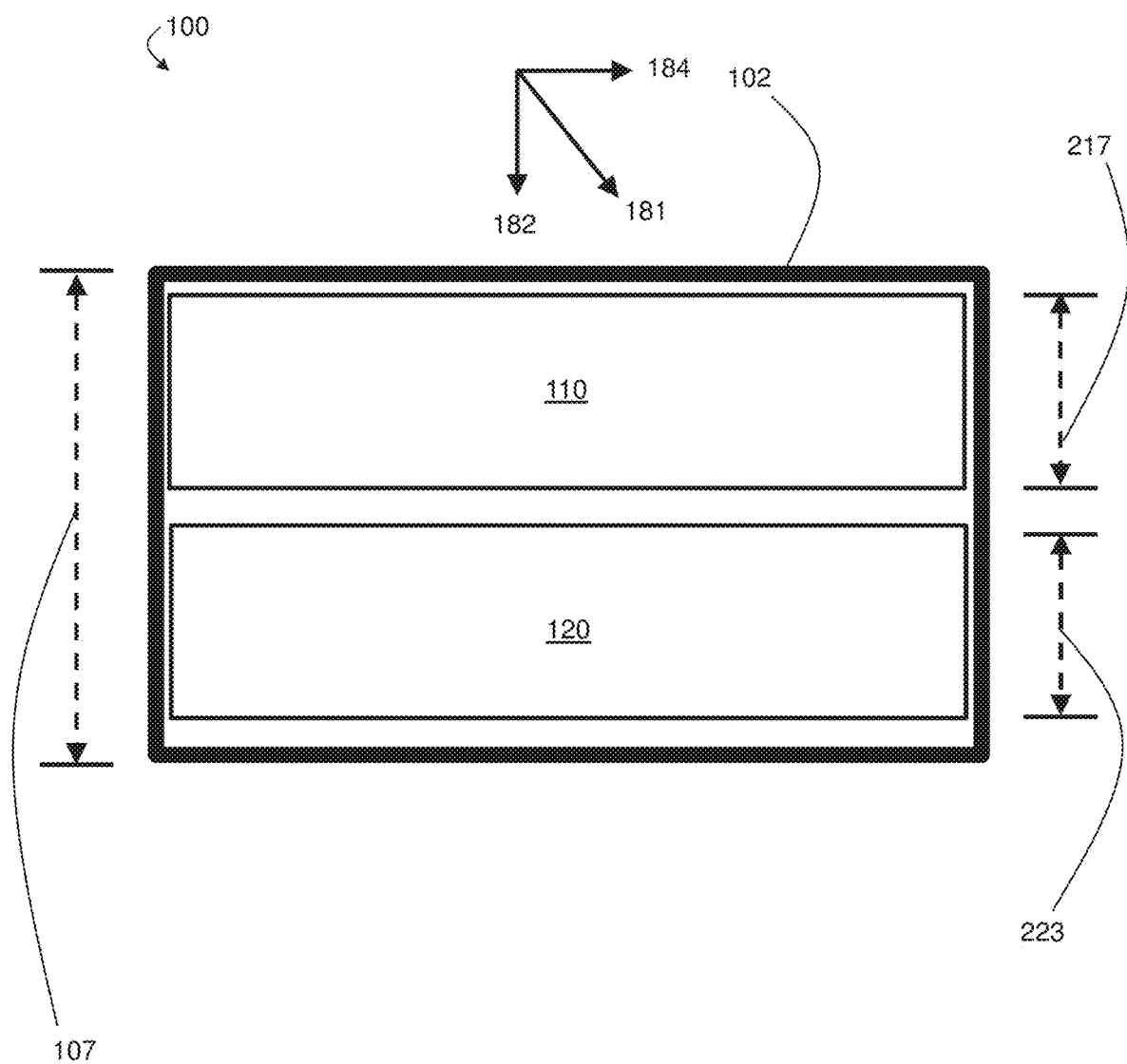

FIGS. 1A-1B are cross-sectional schematic diagrams of a non-limiting embodiment of battery 100. The battery may comprise one or more electrochemical cells as well as one or more other components (e.g., articles stacked with the electrochemical cells, housings, electrical and thermal management equipment, etc.). In some embodiments, the battery comprises multiple electrochemical cells, including a first electrochemical cell and a second electrochemical cell. For example, battery 100 in FIGS. 1A-1B comprises first electrochemical cell 110 and second electrochemical cell 120 at least partially enclosed by optional housing 102. The battery may have any of a variety of suitable configurations including, but not limited to, a stacked configuration, a folded configuration, or a wound configuration. In some embodiments, at least one electrochemical cell of the battery (e.g., first electrochemical cell, second electrochemical cell) comprises lithium and/or a lithium metal alloy as an electrode active material.

Figure 2:
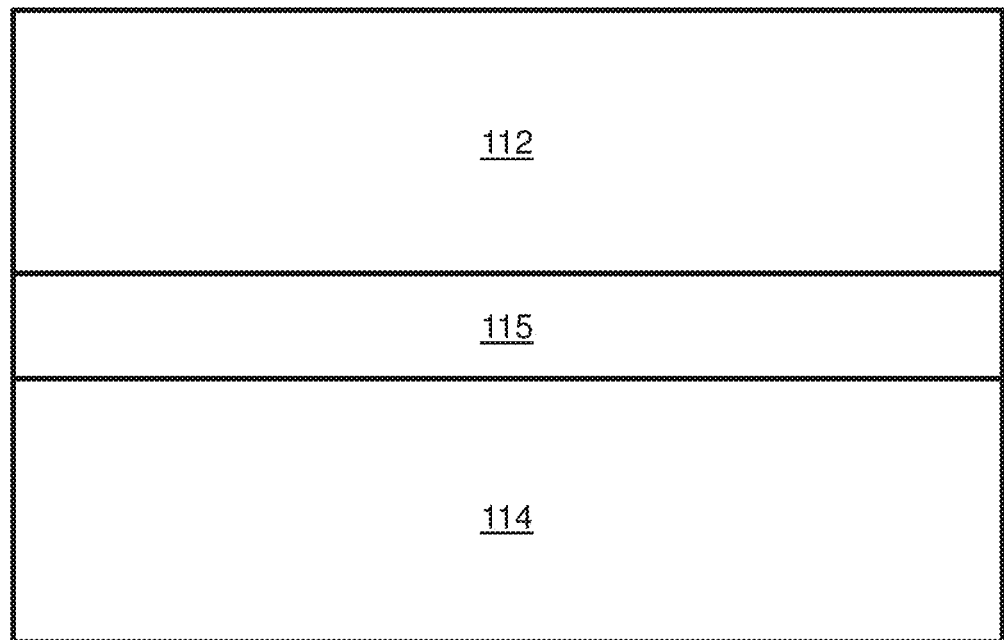
FIG. 2 shows a cross-sectional schematic diagram of an exemplary electrochemical cell, according to some embodiments.

In some embodiments, electrochemical cells in the battery (e.g., the first electrochemical cell, the second electrochemical cell) comprise at least one anode. FIG. 2 shows a schematic diagram of one exemplary embodiment of first electrochemical cell 110 comprising anode 112. In some cases, the anode comprises an anode active material. As used herein, an "anode active material" refers to any electrochemically active species associated with an anode. In some embodiments, the anode comprises lithium metal and/or a lithium metal alloy as an anode active material. For example, referring again to FIG. 2, anode 112 comprises lithium metal and/or a lithium metal alloy as an anode active material in some embodiments. An electrode such as an anode can comprise, in accordance with certain embodiments, lithium metal and/or a lithium metal alloy as an electrode active material during at least a portion of or during all of a charging and/or discharging process of the electrochemical cell. In certain cases, the anode is or comprises vapor-deposited lithium (e.g., a vapor-deposited lithium film). Additional suitable anode active materials are described in more detail below. Certain embodiments described herein may be directed to systems, devices, and methods that may allow for improved performance (e.g., magnitude and uniformity of applied force, thermal management, alignment of electrochemical active regions to promote uniformity of lithium deposition during charging) of electrochemical devices comprising certain anodes, such as lithium metal-containing anodes.

In some embodiments, electrochemical cells in the battery (e.g., the first electrochemical cell, the second electrochemical cell) comprise at least one cathode. For example, referring again to FIG. 2, first electrochemical cell 110 comprises cathode 114. The cathode can comprise a cathode active material. As used herein, a "cathode active material" refers to any electrochemically active species associated with a cathode. In certain cases, the cathode active material may be or comprise a lithium intercalation compound (e.g., a metal oxide lithium intercalation compound). As one non-limiting example, in some embodiments, cathode 114 in FIG. 2 comprises a nickel-cobalt-manganese lithium intercalation compound. Suitable cathode materials are described in more detail below.

As used herein, "cathode" refers to the electrode in which an electrode active material is oxidized during charging and reduced during discharging, and "anode" refers to the electrode in which an electrode active material is reduced during charging and oxidized during discharging.

In some embodiments, electrochemical cells in the battery (e.g., the first electrochemical cell, the second electrochemical cell) comprise a separator between the anode and the cathode. FIG. 2 shows exemplary separator 115 between anode 112 and cathode 114, according to certain embodiments. The separator may be a solid electronically non-conductive or insulative material that separates or insulates the anode and the cathode from each other, preventing short circuiting, and that permits the transport of ions between the anode and the cathode. In some embodiments, the separator is porous and may be permeable to an electrolyte.

It should be understood that while in some embodiments the first electrochemical cell and the second electrochemical cell have the same types of components (e.g., same anode active material, same cathode active material, same type of separator), in other embodiments the first electrochemical cell has one or more different components than the second electrochemical cell (e.g., a different anode active material, a different cathode active material, a different type of separator). In some embodiments, the first electrochemical cell and the second electrochemical cell are identical in composition and/or dimensions.

Figure 3A:
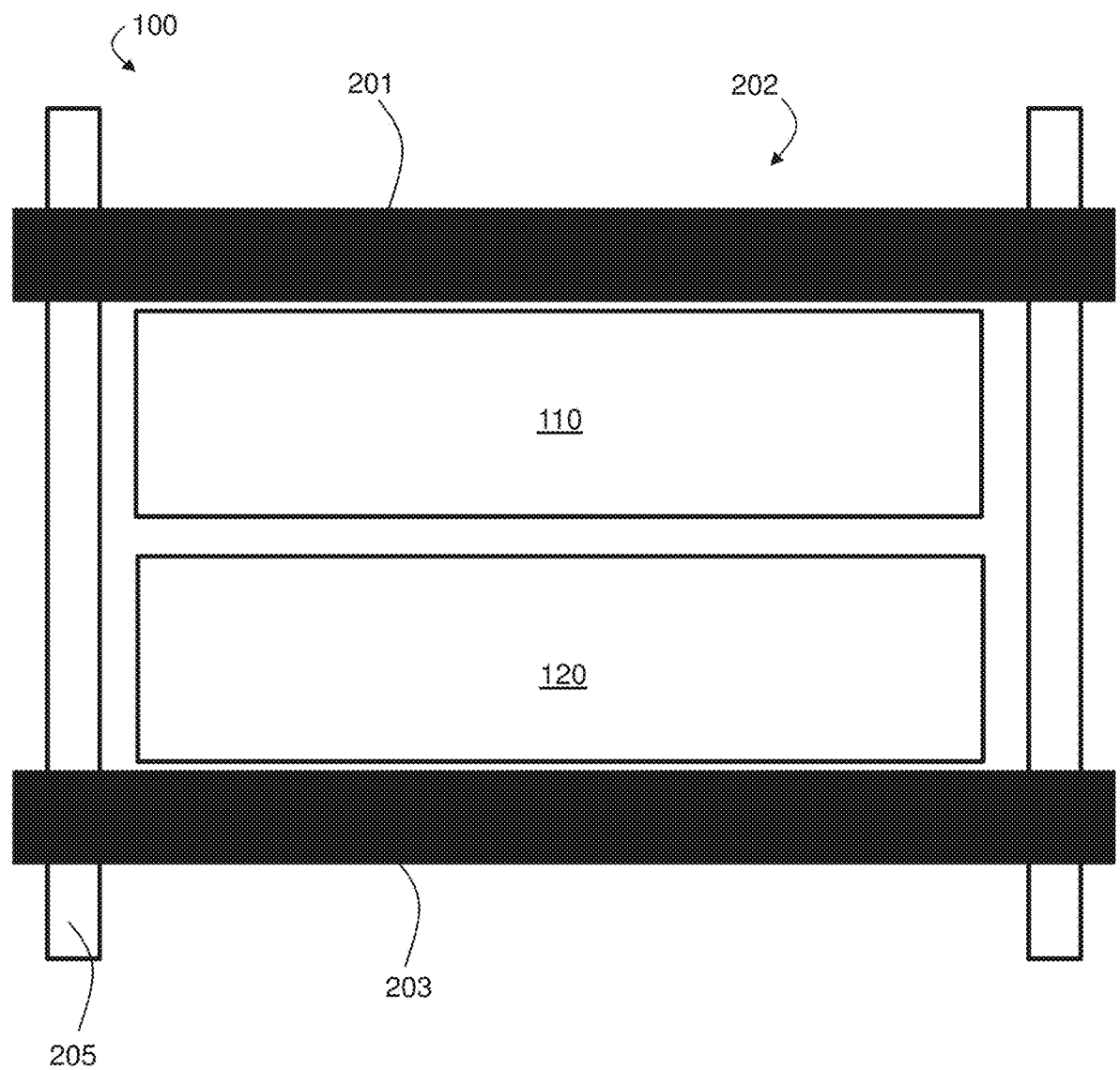
FIG. 3A shows a cross-sectional schematic diagram of an exemplary battery and solid plates, according to some embodiments.

In some embodiments, the battery comprises a housing. The housing may at least partially enclose other components of the battery. For example, the housing may at least partially enclose the first electrochemical cell and the second electrochemical cell. FIG. 1A shows optional housing 102 at least partially enclosing first electrochemical cell 110 and second electrochemical cell 120, according to certain embodiments. The housing may comprise rigid components. As one example, the housing may comprise one or more solid plates. The solid plate may, for example, be an endplate. FIG. 3A shows a cross-sectional schematic diagram of exemplary battery 100 comprising housing 202, housing 202 comprising first solid plate 201 and second solid plate 203. Further details of certain solid plates that may be used in the battery are described below. In certain cases, the housing does not comprise a solid plate. For example, in some cases, the solid surface and other components of a containment structure configured to house the electrochemical device are part of a unitary structure.

Some embodiments are related to applying, during at least one period of time during charge and/or discharge of the electrochemical cells (e.g., first electrochemical cell, second electrochemical cell), an anisotropic force with a component normal to an electrode active surface of at least one electrochemical cell of the battery. As mentioned above, application of such a force may reduce potentially deleterious phenomena associated with certain types of electrochemical cells (e.g., cells comprising lithium metal as an electrode active material) and improve utilization. For example, in some cases, applying an anisotropic force with a component normal to an active surface of an electrode of the electrochemical device can reduce problems (such as surface roughening of the electrode and dendrite formation) while improving current density. Application of such forces to multiple electrochemical cells of a battery pack may present certain challenges, including uniformity of pressure distribution for each electrochemical cell, which can be important for both performance and durability. Certain aspects described herein may, in some cases, address and overcome such challenges.

FIG. 1A depicts a schematic cross-sectional illustration of a force that may be applied to the first electrochemical cell and the second electrochemical cell in the direction of arrow 181. Arrow 182 illustrates the component of force 181 that is normal to an active surface of first electrochemical cell 110, according to certain embodiments.

In some embodiments, the housing of the battery is configured to apply, during at least one period of time during charge and/or discharge of the first electrochemical cell and/or the second electrochemical cell, an anisotropic force having a relatively high magnitude component normal to electrode active surfaces of at least one (or all) of the electrochemical cells in the battery. For example, in some embodiments where the battery comprises a first electrochemical cell having a first electrode active surface and a second electrochemical cell having a second electrode active surface, the housing of the battery is configured to apply, during at least one period of time during charge and/or discharge of the first electrochemical cell and/or the second electrochemical cell, an anisotropic force having a relatively high magnitude component normal to the first electrode active surface and the second electrode active surface. The housing may be configured to apply such a force in a variety of ways. For example, in some embodiments, the housing comprises two solid articles (e.g., a first solid plate and a second solid plate as shown in FIG. 3A, where housing 202 comprises first solid plate 201 and second solid plate 203). An object (e.g., a machine screw, a nut, a spring, etc.) may be used to apply the force by applying pressure to the ends (or regions near the ends) of the housing. In the case of a machine screw, for example, the electrochemical cells and other components of the battery may be compressed between the plates (e.g., a first solid plate and a second solid plate) upon rotating the screw. As another example, in some embodiments, one or more wedges may be displaced between the housing and a fixed surface (e.g., a tabletop, etc.). The force may be applied by driving the wedge between the housing (e.g., between a solid plate of a containment structure of the housing) and the adjacent fixed surface through the application of force on the wedge (e.g., by turning a machine screw).

Some embodiments comprise applying an anisotropic force with a component normal to a first electrode active surface of the first electrochemical cell and/or a second electrode active surface of the second electrochemical cell defining a pressure of at least 10 kgf/cm$^2$, at least 12 kgf/cm$^2$, at least 20 kgf/cm$^2$, at least 25 kgf/cm$^2$, or more. In some such cases, the housing is configured to apply such anisotropic forces. While high magnitudes of anisotropic force with a component normal to an electroactive surface can improve performance, too high of a magnitude of force may cause problems such as damage to certain components of the battery (e.g., the thermally insulating compressible solid article portion described below). It has been unexpectedly observed, however, that there are ranges of magnitudes of anisotropic force that can be applied that can, in some cases, achieve desirable performance of the battery while avoiding such damage. For example, some embodiments comprise applying (e.g., via the housing) during at least one period of time during charge and/or discharge of the first electrochemical cell and/or the second electrochemical cell, an anisotropic force with a component normal to a first electrode active surface of the first electrochemical cell and/or a second electrode active surface of the second electrochemical cell defining a pressure of less than or equal to 40 kgf/cm$^2$, less than or equal to 35 kgf/cm$^2$, less than or equal to 30 kgf/cm$^2$, or less. Combinations of these ranges (e.g., at least 10 kgf/cm$^2$ and less than or equal to 40 kgf/cm$^2$, or at least 12 kgf/cm$^2$ and less than or equal to 30 kgf/cm$^2$) are possible.

Some embodiments comprise applying a first anisotropic force with a component normal to a first electrode active surface of the first electrochemical cell and/or a second electrode active surface of the second electrochemical cell defining a pressure having a first magnitude of at least 10 kgf/cm$^2$ (e.g., at least 12 kgf/cm$^2$), and then also during a charge and/or discharge of the battery, applying a second anisotropic force with a component normal to a first electrode active surface of the first electrochemical cell and/or a second electrode active surface of the second electrochemical cell defining a pressure having a second magnitude that is at least 10 kgf/cm$^2$, at least 12 kgf/cm$^2$, or higher and less than or equal to 40 kgf/cm$^2$, less than or equal to 30 kgf/cm$^2$, or less. In some embodiments, the second magnitude of pressure is greater than the first magnitude by a factor of at least 1.2, at least 1.5, at least 2, at least 2.5, and/or up to 3, or up to 4. The second magnitude may be higher than the first magnitude, for example, in some embodiments where the first magnitude of force is applied via the housing (e.g., a rigid housing) and during a charging and/or discharge process, expansion of one or more components of the battery (e.g., one or more electrochemical cells) causes the force experienced by the electrochemical cells to increase. In some embodiments, the first magnitude occurs when the electrochemical cells are at a state of charge (SOC) of less than or equal to 10%, less than or equal to 5%, less than or equal to 2%, less than or equal to 1%, or 0%. In some embodiments, the second magnitude occurs when the electrochemical cells are at a state of charge of greater than or equal to 50%, greater than or equal to 75%, greater than or equal to 90%, greater than or equal to 95%, greater than or equal to 99%, or 100%. Combinations of these ranges are possible. For example, in some embodiments, the first magnitude occurs when the electrochemical cells are at a state of charge of less than or equal to 10% and the second magnitude (e.g., that defines a pressure that is greater than that of the first magnitude by a factor of at least 1.2 and up to 4) occurs when the electrochemical cells are at a state of charge of greater than or equal to 50%. In one exemplary embodiment, the magnitude of anisotropic force defines a pressure of 12 kgf/cm$^2$ at a 0% SOC and 30 kgf/cm$^2$ at a 100% SOC.

As mentioned above, in some embodiments, the battery comprises one or more solid plates. In some such cases, the housing is configured to apply the anisotropic force via a solid plate. The solid plates may be, for example, endplates configured to apply an anisotropic force to the electrochemical cells (e.g., first electrochemical cell, second electrochemical cell). For example, in FIG. 3A, first solid plate 201 and second solid plate 203 are endplates. It should be understood that the surfaces of a solid plate do not necessarily need to be flat. For example, one of the sides of the solid plate may comprise a surface that is curved (e.g., contoured, convex) in the absence of an applied force. In some embodiments, the solid plate (e.g., an aluminum solid plate) is convex with respect to the electrochemical cells in the absence of an applied force, and under at least one magnitude of applied force the end plate may become less convex (e.g., become flat).

The housing may comprise any suitable solid material. In some embodiments, a solid plate is or comprises a metal, metal alloy, composite material, or a combination thereof. In some cases, the metal that the solid plate is or comprises is a transition metal. For example, in some embodiments, the solid article is or comprises Ti, Cr, Mn, Fe, Co, Ni, Cu, or a combination thereof. In some embodiments, the solid plate is or comprises a non-transition metal. For example, in some embodiments, the solid article is or comprises Al, Zn, or combinations thereof. Exemplary metal alloys that the solid plate can be or comprise include alloys of aluminum, alloys of iron (e.g., stainless steel), or combinations thereof. Exemplary composite materials that the solid plate can be or comprise include, but are not limited to, reinforced polymeric, metallic, or ceramic materials (e.g., fiber-reinforced composite materials), carbon-containing composites, or combinations thereof.

In some embodiments, a solid plate (e.g., solid plate 201) of the housing comprises carbon fiber. Carbon fiber may be present in the solid plate in a relatively high amount (e.g., greater than or equal to 50 wt %, greater than or equal to 75 wt %, greater than or equal to 90 wt %, greater than or equal to 95 wt %, greater than or equal to 99 wt %, 100 wt %). Carbon fiber can, in some cases, afford relatively high stiffness and/or strength while having a relatively low mass (e.g., by having a relatively low mass density). It is been discovered, in the context of the present disclosure, that certain types of carbon fiber solid plates can allow for the application of relatively high magnitudes of anisotropic force to the electrochemical cells of the battery with relatively uniform distributions across multiple of the electrochemical cells without burdening the battery with too much mass. In some embodiments, the carbon fiber comprises unidirectional carbon fiber. In other words, in some embodiments, at least one layer (or all layers) of the carbon fiber material of the solid plate is unidirectional within the layer. While relatively thin and/or twill weave carbon fiber materials are known, it has been discovered herein that unidirectional carbon fiber laminates may afford relatively beneficial properties (e.g., high stiffness and/or strength, low deflection under load). In some embodiments, the housing comprises a solid plate comprising carbon fiber, the solid plate having a thickness of at least 5 mm, at least 8 mm, at least 10 mm, and/or up to 12 mm, up to 15 mm, up to 20 mm, or more.

Figure 3B:
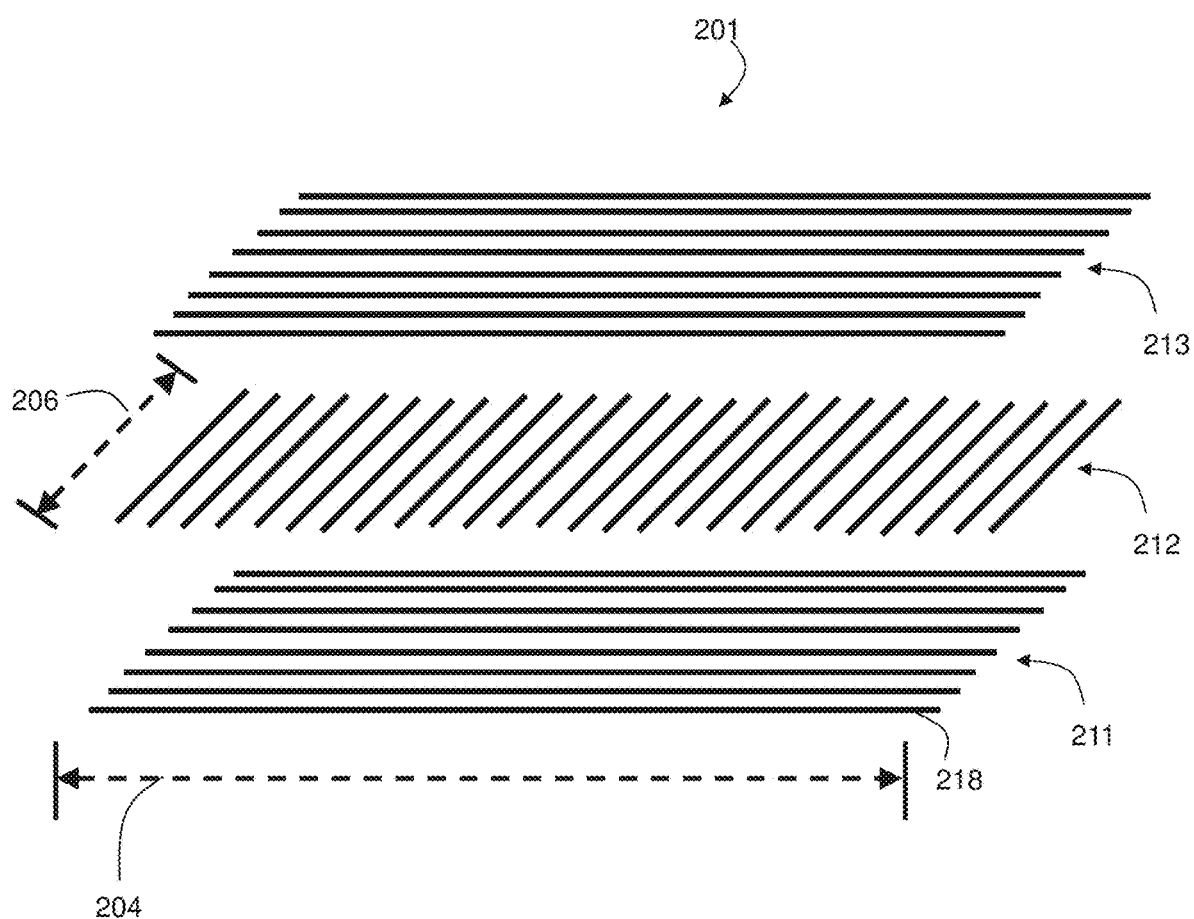
FIGS. 3B-3D show exploded view schematic diagrams of solid plates comprising layers of carbon fiber, according to some embodiments.
Figure 3C:
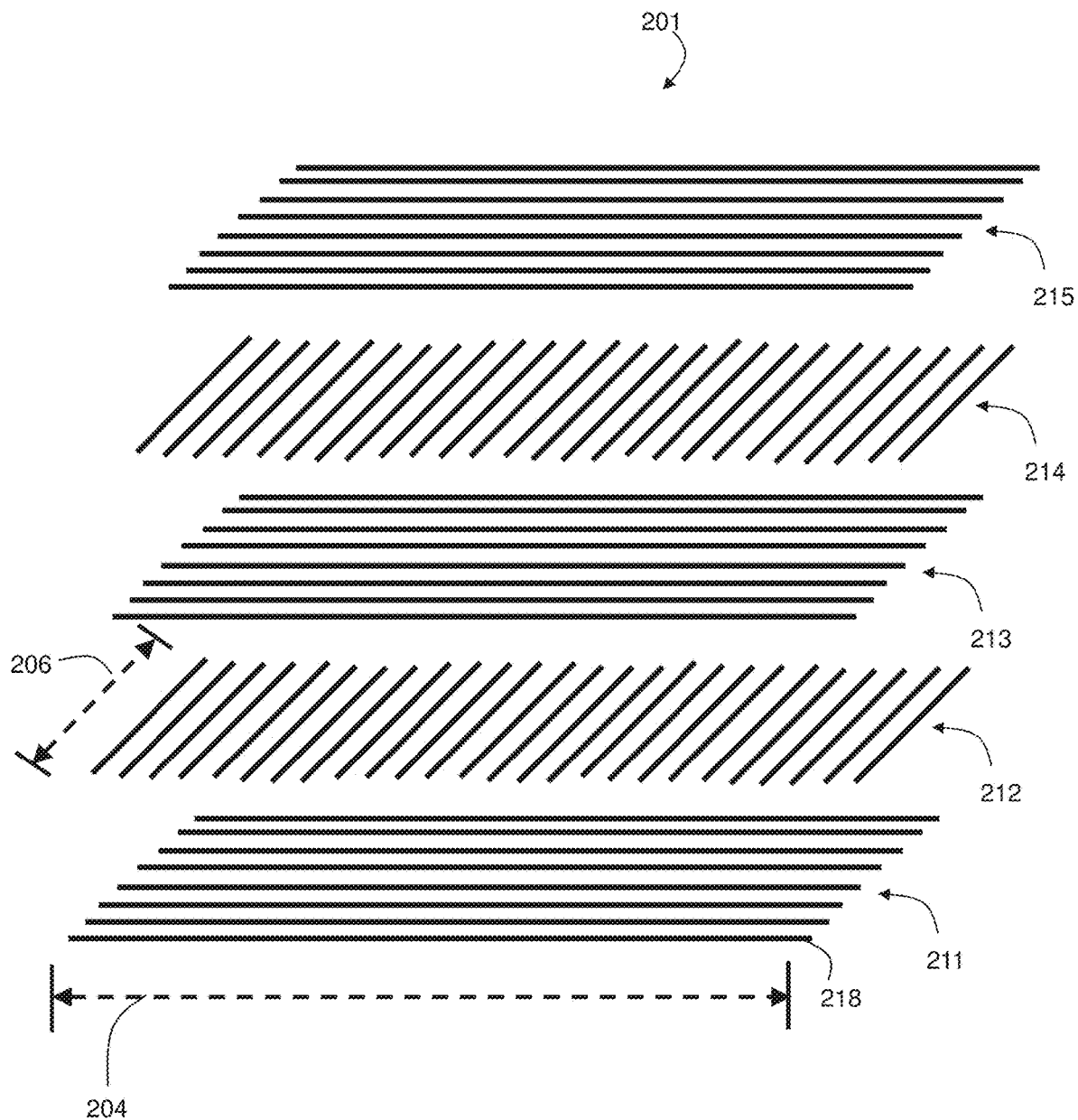
Figure 3D:
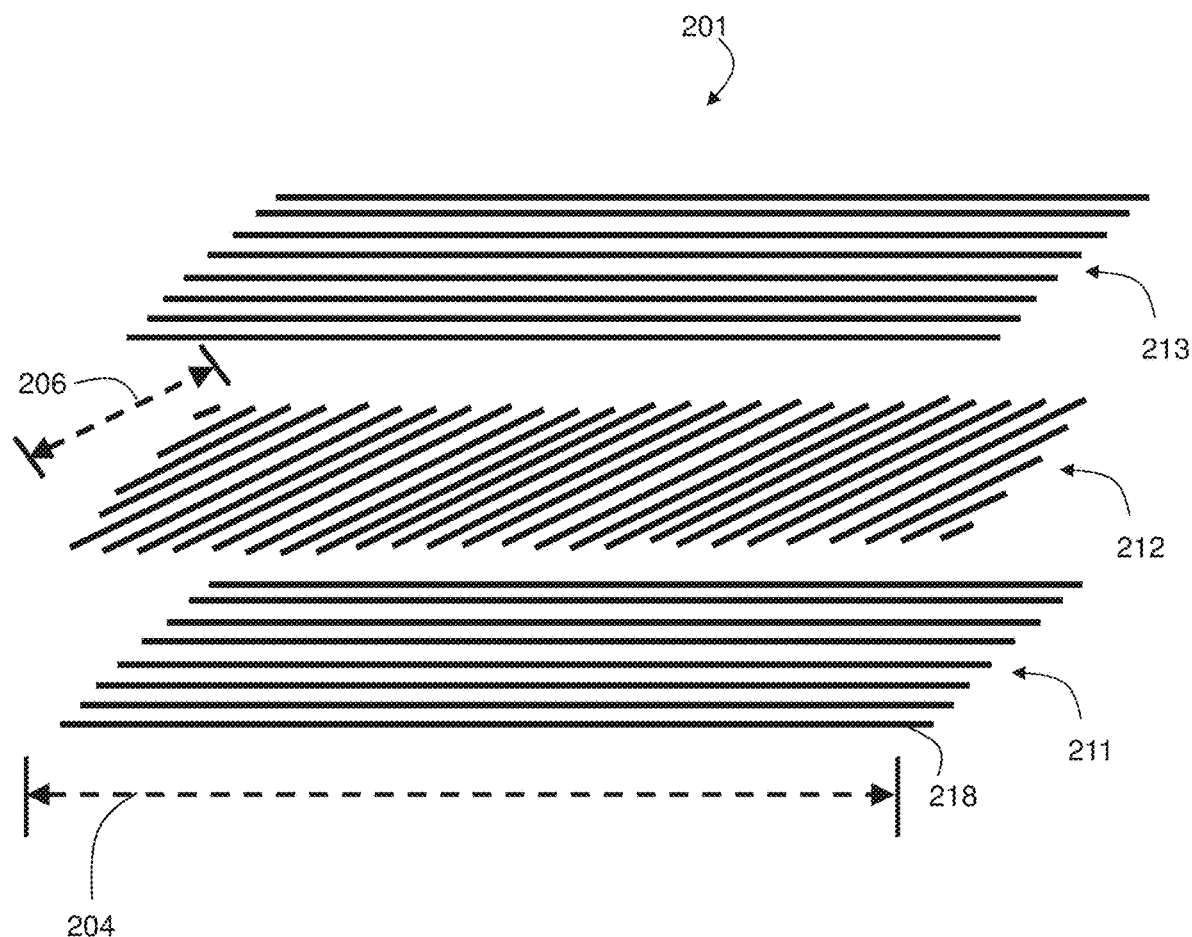
Figure 3E:
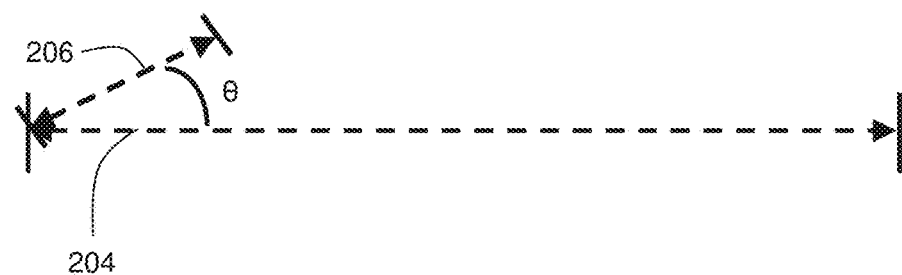
FIG. 3E shows an angle between the orientation of carbon fibers within layers of carbon fiber, according to some embodiments.

In some embodiments, the solid plate comprises multiple layers of carbon fiber (e.g., unidirectional carbon fiber). In some such embodiments, the solid plate of the housing comprises a first layer comprising carbon fibers substantially parallel to a first direction in the plane of the first layer and a second layer comprising carbon fibers substantially parallel to a second direction in the plane of the second layer. In some embodiments, two lines in a plane can be substantially parallel if, for example, the maximum angle defined by the two lines is less than or equal to 10°, less than or equal to 5°, less than or equal to 2°, or less than or equal to 1°. The angle between the first direction and the second direction may be an angle θ. In embodiments in which such a layer orientation pattern is repeated, the pattern can be represented as "[0°/θ]." In some embodiments, θ is greater than or equal to (i.e., more positive than)−90°, greater than or equal to −75°, greater than or equal to −60°, greater than or equal to −45°, greater than or equal to −30°, greater than or equal to −15°, or greater, and/or less than or equal to 90°, less than or equal to 75°, less than or equal to 60°, less than or equal to 45°, less than or equal to 30°, less than or equal to 15°, or less. Combinations of these ranges (e.g., θ greater than or equal to −90° and less than or equal to 90°) are possible. In some embodiments, θ has a non-zero value. In some embodiments, the solid plate comprises a third layer comprising carbon fibers substantially parallel to the first direction. In embodiments in which such a layer orientation pattern is repeated, the pattern can be represented as "[0°/θ/0°]." FIG. 3D shows one such embodiment, where first solid plate 201 comprises first layer 211 comprising carbon fibers 218 substantially parallel to first direction 204, second layer 212 comprising carbon fibers 218 substantially parallel to second direction 206, and third layer 213 comprising carbon fibers 218 substantially parallel to first direction 204. FIG. 3E shows angle θ between first direction 204 and second direction 206 for the embodiment illustrated in FIG. 3D. For example, the solid plate of the housing may comprise, in order: a first layer comprising carbon fibers substantially parallel to a first direction in the plane of the first layer, a second layer comprising carbon fibers substantially parallel to a second direction in the plane of the second layer substantially perpendicular (e.g., within 10°, within 5°, within 2°, within 1° of perpendicular) to the first direction, and a third layer comprising carbon fibers substantially parallel to the first direction. Put a different way, in some embodiments θ is within 10°, within 5°, within 2°, within 1° of 90°. Each of the individual layers may have a unidirectional weave. FIG. 3B depicts one such example, where first solid plate 201 comprises first layer 211 comprising carbon fibers 218 substantially parallel to first direction 204, second layer 212 comprising carbon fibers 218 substantially parallel to second direction 206, which is substantially perpendicular to first direction 204, and third layer 213 comprising carbon fibers 218 substantially parallel to first direction 204, according to some embodiments. It is been observed that, in some cases, carbon fiber materials having such a "[0°/90°/0°]" orientation of layers may have higher strength and/or stiffness than other types of carbon fiber materials. While FIG. 3B shows an embodiment of solid plate 201 comprising three layers, more layers are possible. In some embodiments, the solid plate further comprises, in order, a fourth layer comprising carbon fibers substantially parallel to the second direction and a fifth layer comprising carbon fibers parallel to the first direction. FIG. 3C shows one such embodiment, where first solid plate 201 comprises first layer 211 comprising carbon fibers 218 substantially parallel to first direction 204, second layer 212 comprising carbon fibers 218 substantially parallel to second direction 206, which is substantially perpendicular to first direction 204, third layer 213 comprising carbon fibers 218 substantially parallel to first direction 204, fourth layer 214 comprising carbon fibers 218 substantially parallel to second direction 206, and fifth layer 215 comprising carbon fibers 218 substantially parallel to first direction 204. In some embodiments, the solid plate of the housing comprises at least 1, at least 2, at least 3, at least 5, at least 10, at least 15, and/or up to 20, up to 25, up to 50, up to 60, up to 75, or more layers of carbon fiber (e.g., layered carbon fiber with oriented fibers) as described herein. Some or all of these layers (e.g., oriented layers) may have certain mechanical properties described below (e.g., modulus).

Figure 3F:
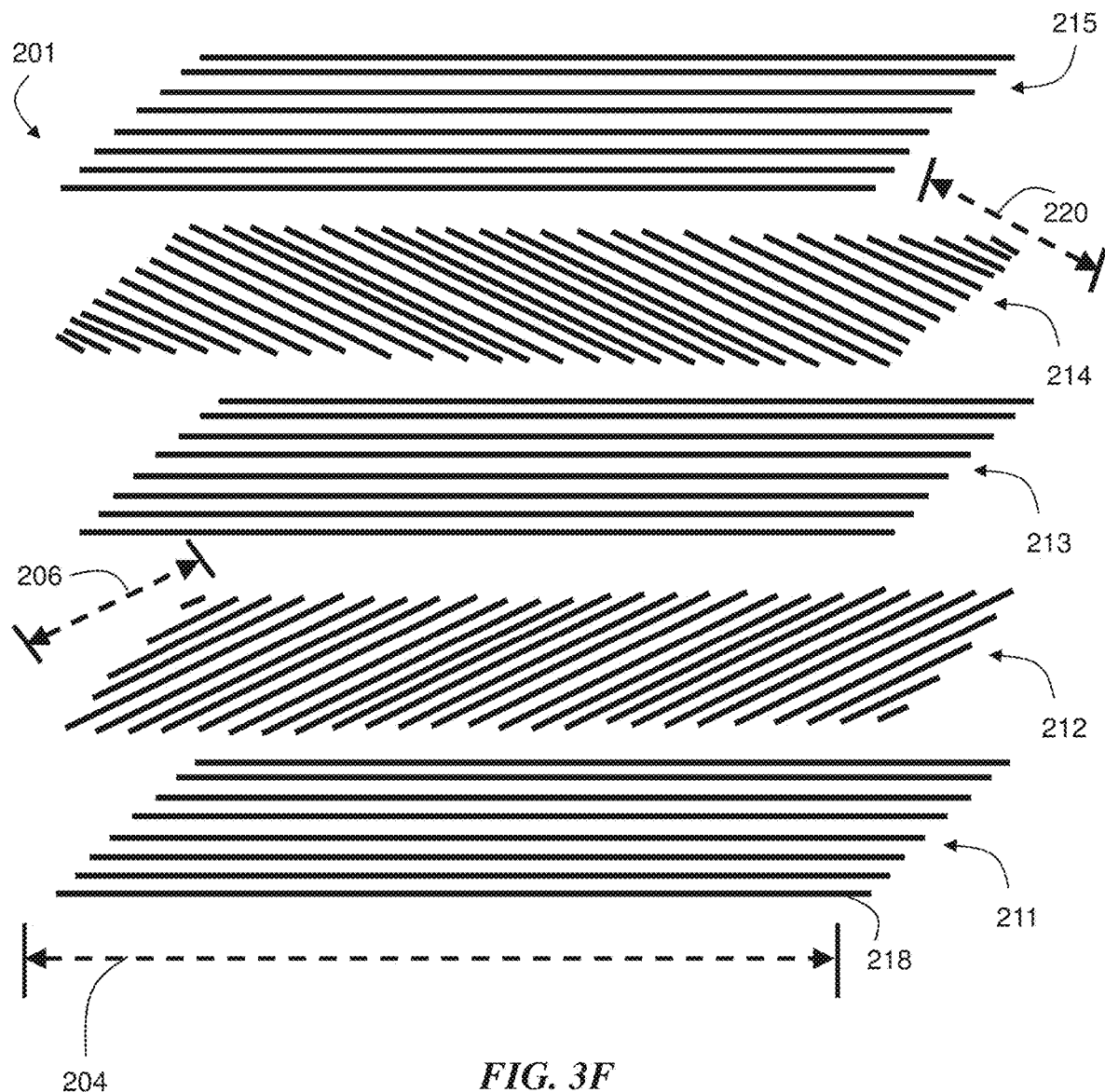
FIG. 3F shows an exploded view schematic diagram of a solid plate comprising layers of carbon fiber, according to some embodiments.
Figure 3G:
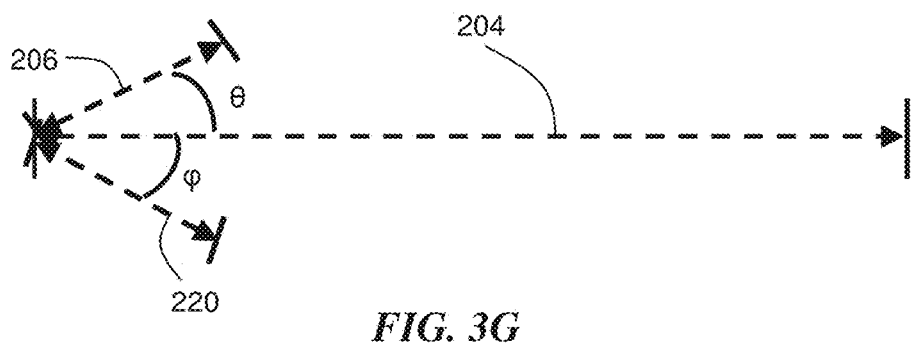
FIG. 3G shows angles between the orientation of carbon fibers within layers of carbon fiber, according to some embodiments.

In some embodiments, the multiple layers of carbon fiber comprise, in order: a first layer comprising carbon fibers substantially parallel to a first direction in the plane of the first layer, a second layer comprising carbon fibers substantially parallel (e.g. within 10°, within 5°, within 2°, within 1° of parallel) to a second direction in the plane of the second layer, a third layer comprising carbon fibers substantially parallel to the first direction in the plane of the third layer, a fourth layer comprising carbon fibers substantially parallel (e.g. within 10°, within 5°, within 2°, within 1° of parallel) to a third direction in the fourth layer, and a fifth layer comprising carbon fibers substantially parallel to the first direction in the plane of the fifth layer. The angle between the first direction and the second direction may be an angle θ, and the angle between the first direction and the third direction may be an angle φ. In embodiments in which such a layer orientation pattern is repeated, the pattern can be represented as "[0°/θ/0°/φ/0°]." It should be understood that when notation of this form is used, the direction of each layer may be within 10° (i.e., +/−10°) of the direction denoted by the angle value in the notation. For example, a layer orientation having repeating units in which the first layer is at 0°, the second layer is at θ, the third layer is at 5°, the fourth layer is at φ, and the fifth layer is at −10° would be considered to have a "[0°/θ/0°/φ/0°]" layer orientation pattern because each layer is within 10° of the value indicated by the notation. Each of the individual layers may have a unidirectional weave. In some embodiments, θ is greater than or equal to (i.e., more positive than)−90°, greater than or equal to −75°, greater than or equal to −60°, greater than or equal to −45°, greater than or equal to −30°, greater than or equal to −15°, or greater, and/or less than or equal to 90°, less than or equal to 75°, less than or equal to 60°, less than or equal to 45°, less than or equal to 30°, less than or equal to 15°, or less. Combinations of these ranges (e.g., θ greater than or equal to −90° and less than or equal to 90°) are possible. In some embodiments, y is greater than or equal to −90°, greater than or equal to −75°, greater than or equal to −60°, greater than or equal to −45°, greater than or equal to −30°, greater than or equal to −15°, or greater, and/or less than or equal to 90°, less than or equal to 75°, less than or equal to 60°, less than or equal to 45°, less than or equal to 30°, less than or equal to 15°, or less. Combinations of the ranges (e.g., φ greater than or equal to −90° and less than or equal to 90°) are possible. In some embodiments, φ has a nonzero value. In some embodiments, the value of φ is equal to the negative value of θ (e.g., θ equals 30° and φ equals −30°, or θ equals 60° and φ equals)−60°. FIG. 3F shows one such embodiment, where first solid plate 201 comprises first layer 211 comprising carbon fibers 218 substantially parallel to first direction 204, second layer 212 comprising carbon fibers 218 substantially parallel to second direction 206, third layer 213 comprising carbon fibers 218 substantially parallel to first direction 204, fourth layer 214 comprising carbon fibers 218 substantially parallel to third direction 220, and fifth layer 215 comprising carbon fibers 218 substantially parallel to first direction 204. FIG. 3F shows angle θ between first direction 204 and second direction 206 and angle φ between first direction 204 and third direction 220 for the embodiment illustrated in FIG. 3G.

The multiple layers of carbon fiber may include repeating units of the patterns of layer orientations described above (e.g., repeating units of [0°/θ], [0°/θ/0°], [0°/θ/0°/φ/0°], etc.). It has been observed that some patterns of unidirectional carbon fiber layers, with certain orientations (e.g., where θ equals 30° and φ equals −30°, denoted as "[0°/30°/0°/−30°/0°]") can afford properties that are beneficial in some scenarios. For example, it has been observed that solid articles such as solid plates having some such patterns of unidirectional carbon fiber layers demonstrate less deflection under applied load than otherwise identical solid articles such as solid plates lacking such patterns (e.g., solid plates in which the carbon fibers of each layer are all substantially parallel).

In some embodiments, the solid plate comprises carbon fiber having a relatively high modulus. For example, in some embodiments the solid plate comprises layers comprising carbon fiber, and one or more of the layers has a relatively high tensile modulus and a relatively high flexural modulus. In some embodiments, the solid plate comprises layers comprising carbon fiber, one or more of the layers having a tensile modulus of at least 120 GPa, at least 150 GPa, at least 200 GPa, at least 300 GPa, at least 500 GPa or greater, and a flexural modulus of at least 120 GPa at least 150 GPa, at least 200 GPa, at least 300 GPa, at least 500 GPa or greater at room temperature (25° C.). In some embodiments, the solid plate comprises layers comprising carbon fiber, one or more of the layers having a tensile modulus of less than or equal to 650 GPa, less than or equal to 600 GPa, less than or equal to 550 GPa or less, and a flexural modulus of less than or equal to 650 GPa, less than or equal to 600 GPa, less than or equal to 550 GPa or less at room temperature (25° C.). Combinations of the ranges (e.g., a tensile modulus of at least 120 GPa and less than or equal to 650 GPa and a flexural modulus of at least 120 GPa and less than or equal to 650 GPa) are possible. The tensile modulus of a layer can be measured using ASTM D3039, and the flexural modulus can be measured using ASTM D790. In certain instances, the solid plate has a relatively large number of layers satisfying the modulus ranges above. For example, in some embodiments, the solid plate comprises at least 1, at least 2, at least 3, at least 5, at least 10, at least 15, and/or up to 20, up to 25, up to 50, up to 60, up to 75, or more layers comprising carbon fiber having a tensile modulus of at least 120 GPa, at least 150 GPa, at least 200 GPa, at least 300 GPa, at least 500 GPa or greater, and a flexural modulus of at least 120 GPa at least 150 GPa, at least 200 GPa, at least 300 GPa, at least 500 GPa or greater at room temperature (25° C.). In some embodiments, the solid plate comprises at least 1, at least 2, at least 3, at least 5, at least 10, at least 15, and/or up to 20, up to 25, up to 50, up to 60, up to 75, or more layers comprising carbon fiber having a tensile modulus of less than or equal to 650 GPa, less than or equal to 600 GPa, less than or equal to 550 GPa or less, and a flexural modulus of less than or equal to 650 GPa, less than or equal to 600 GPa, less than or equal to 550 GPa or less at room temperature (25° C.).

The housing may comprise couplings that can be used to connect components of the housing and/or apply the anisotropic force. The housing may comprise, for example, couplings proximate to the ends of the housing (e.g., proximate to the ends of the solid plates). FIG. 3A shows coupling 205 connecting first solid plate 201 and second solid plate 203, according to certain embodiments. In some embodiments, the housing of the battery has more than one coupling. In certain cases, the housing includes at least 2 couplings, at least 4 couplings, and/or up to 8 couplings or more. In some embodiments, the coupling comprises a fastener. The fastener may span from one end of the housing to another. As one example, coupling 205 in FIG. 3A may be a fastener spanning from first solid plate 201 to second plate 203 of housing 202. Exemplary fasteners include, but are not limited to, a rod (e.g., a threaded rod, a rod with interlocking features), a bolt, a screw (e.g., a machine screw), a nail, a rivet, a tie, a clip (e.g., a side clip, a circlip), a band, or combinations thereof. In some cases, applying a force comprises causing relative motion between one portion of the coupling (e.g., a nut) and a fastener of the coupling (e.g., by tightening a nut at an interface between the fastener and the solid plate or, in cases where the fastener comprises a machine screw, by turning the machine screw).

Some embodiments may comprise at least partially charging and/or discharging electrochemical cells in a battery, such that the electrochemical cells undergo a cumulative expansion during the charging and/or discharging. The cumulative expansion of the electrochemical cells refers to the sum of the changes in thicknesses of the electrochemical cells themselves, not counting any other components of the battery (e.g., foams, sensors, plates, etc.). For example, referring to FIGS. 1A-1B, during the process of at least partially charging and/or discharging battery 100, first electrochemical cell 110 and second electrochemical cell 120 may expand (e.g., in thickness). Such an expansion may occur due, for example, to the deposition of lithium metal on an anode when lithium metal is used as an anode active material. In some embodiments, the electrochemical cells undergo the cumulative expansion during charging. During the expansion, first electrochemical cell 110 may expand from thickness 117 in FIG. 1A to thickness 217 in FIG. 1B, and second electrochemical cell 120 may expand from thickness 123 in FIG. 1A to thickness 223 in FIG. 1B, according to certain embodiments. The difference between the sum of thickness 117 and thickness 123 and the sum of thickness 217 and thickness 223 would then be the cumulative expansion of first electrochemical cell 110 and second electrochemical cell 120. Meanwhile, in some, but not necessarily all embodiments, the battery as a whole also undergoes an expansion during the charging and/or discharging. For example, battery 100 may expand from thickness 103 in FIG. 1A to thickness 107 in FIG. 1B, according to certain embodiments. In some embodiments, the electrochemical cells of the battery may undergo a cumulative expansion that is relatively large, while an expansion of the battery is relatively small. It has been discovered that certain inventive aspects of the present disclosure, such as the application of relatively high magnitudes of force to multiple electrochemical cells, the use of strong and/or stiff housings (e.g., comprising certain carbon fiber plates), and the use of compressible components such as the thermally insulating compressible solid article portions described below, may afford such a small (or no) expansion of the battery even when the electrochemical cells expand to a relatively large extent.

In some embodiments, the electrochemical cells of the battery undergo a cumulative expansion during the charging and/or discharging of at least 10%, at least 15%, at least 20%, and/or up to 30% or more, while an expansion of the battery during the charging and/or discharging is less than or equal to 0.75%, less than or equal to 0.5%, less than or equal to 0.1%, and/or as low as 0.05%. In some embodiments, the electrochemical cells undergo a cumulative expansion during the charging and/or discharging, wherein a ratio of the cumulative expansion of the electrochemical cells to an expansion of the battery is greater than or equal to the total number of electrochemical cells in the battery. For example a battery comprising 12 electrochemical cells may undergo a cumulative expansion of 13 mm, and the battery may undergo an expansion of 0.9 mm, and therefore the ratio of the cumulative expansion of the electrochemical cells to the expansion of the battery is 13 divided by 0.9=14.4, which is greater than the number of electrochemical cells in the battery (12). In some embodiments, the electrochemical cells undergo a cumulative expansion during the charging and/or discharging of greater than 1 mm, greater than or equal to 1.2 mm, greater than or equal to 1.5 mm, greater than or equal to 2 mm, greater than or equal to 5 mm, greater than or equal to 10 mm, greater than or equal to 12 mm, and/or up to 20 mm, up to 30 mm, or more, and an expansion of the battery during the charging and/or discharging is less than or equal to 1 mm, less than or equal to 0.75 mm, less than or equal to 0.5 mm, and/or as low as 0.2 mm, as low as 0.1 mm, or less. It should be understood that in some embodiments, the cumulative expansion of the electrochemical cells may be in any of the above-mentioned ranges, while the battery does not expand at all. For example, in some embodiments, one or more components of the battery (e.g., a compressible component such as a thermally insulating compressible solid article portion) may absorb the expansion by compressing to an equal extent. In some embodiments, during the cumulative expansion of the electrochemical cells, each electrochemical cell expands by at least 1 mm. In some embodiments, the cumulative expansion of the electrochemical cells is at least 12 mm.

In some embodiments, the battery has a relatively small volume. It is been discovered that certain aspects described herein, alone or in combination, such as the solid plates comprising carbon fiber, the thermally insulating compressible solid article portions, and the thermally conductive solid article portions, can allow for relatively high magnitudes of force and/or relatively high energy densities for the battery, even with a relatively small volume. In some embodiments, the battery has a volume of less than or equal to 15000 $cm^3$, less than or equal to 13500 $cm^3$, less than or equal to 12000 $cm^3$, less than or equal to 10000 $cm^3$, less than or equal to 8000 $cm^3$, less than or equal to 6750 $cm^3$, less than or equal to 6000 $cm^3$, less than or equal to 5000 $cm^3$, and/or as low as 4000 $cm^3$, or lower. As described in more detail below, certain configurations of the housing may provide for an ability to enclose a relatively large amount of electrochemical cell volume and/or apply relatively high force while having a relatively small housing volume.

In some embodiments, the battery has a relatively high energy density, as described above. In some embodiments, the battery has a specific energy of greater than or equal to 250 Wh/kg. In some embodiments, the battery has a specific energy of greater than or equal to 280 Wh/kg, greater than or equal to 290 Wh/kg, greater than or equal to 300 Wh/kg, and/or up to 320 Wh/kg, up to 350 Wh/kg, or more. In some embodiments, the battery has a volumetric density of greater than or equal to 230 Wh/L, greater than or equal to 250 Wh/L, greater than or equal to 280 Wh/L, and/or up to 300 Wh/L, or higher.

The battery may, surprisingly, have a relatively high energy density and/or apply a relatively high magnitude of force while having a relatively low pack burden (defined as one minus the mass of the electrochemical cells of the battery divided by the total mass of the battery). Expressed as an equation, pack burden=1−(mass of the electrochemical cells/mass of the battery). In some embodiments, the battery has a pack burden of less than or equal to 50%, less than or equal to 45%, less than or equal to 40%, less than or equal to 35%, less than or equal to 30%, and/or as low as 25%, as low as 20%, or lower.

In some embodiments, the battery includes components configured such that the battery (or portions of the battery) has a relatively low volume for a given size of electrochemical cells, compared to other configurations. Having a relatively low housing volume while having relatively large electrochemical active regions of cells may afford relatively large volumetric energy densities. Relatively large volumetric energy densities may be advantageous in certain applications where limited space for batteries is available, but where a large amount of stored energy may be desired, such as certain battery-powered vehicles. It has been realized that certain existing housings configured to apply anisotropic forces may have arrangements or operate under mechanisms that require relatively large spatial profiles. For example, housings configured to apply anisotropic forces to electrochemical cells via solid plates generally include fasteners spanning between solid plates. Tension in the fasteners may contribute some or all of the force applied to the cells within the housings. The battery in FIG. 3A is one such example. However, while such configurations may be useful for certain applications, the use of fasteners for applying tension when applying force via solid plates generally requires a relatively large lateral extension of pressure-applying components of the housing past lateral dimensions of electrochemical active regions of the electrochemical cells. Such "overhang" of housing components with respect to the cells may contribute to a large volume of the overall housing and battery. Certain embodiments herein are directed to application of force to electrochemical cells (e.g., the first electrochemical cell, the second electrochemical cell) with relatively low lateral extension of solid plates and/or pressure-applying components.

Figure 4:
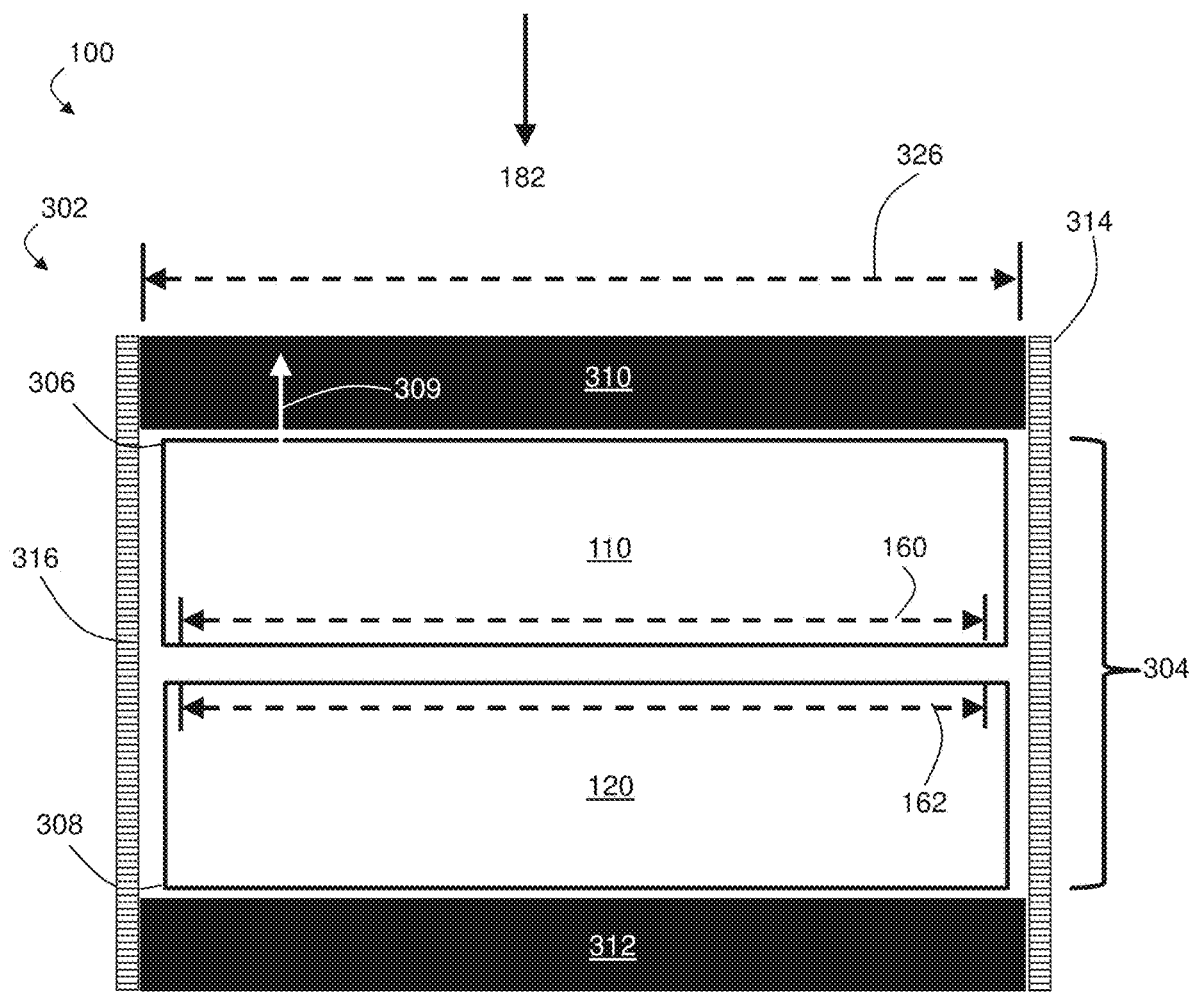
FIG. 4 shows a cross-sectional schematic diagram of an exemplary battery comprising a stack comprising electrochemical cells, and a housing that comprises a solid plate and a solid housing component, according to some embodiments.

In some embodiments, the battery comprises a stack comprising electrochemical cells (e.g., the first electrochemical cell, the second electrochemical cell). It should be understood that the stack may be a multicomponent stack comprising non-cell components such as thermally insulating compressible solid article portions, thermally conductive solid article portions, and/or sensors. The stack may be at least partially enclosed by a housing comprising a solid plate. The solid plate may cover at least a portion (e.g., at least 10%, at least 25%, at least 50%, at least 75%, at least 90%, at least 95%, or all) of an end of the stack. A portion of a surface (e.g., an end of a stack) of an object is considered covered by a second object in this context if there exists a line perpendicular to and extending out of the portion of the surface and away from a bulk of the object that intersects any of the second object. Those of ordinary skill in the art will appreciate that any stack of components (e.g., cells) includes two ends: the first end corresponds to the external surface of the first component (e.g., first cell) that faces away from the bulk of the stack, and the second end corresponds to the external surface of the last component (e.g., last cell) that faces away from the bulk of the stack. In the schematic cross-sectional illustration in FIG. 4, battery 100 comprises housing 302 comprising solid plate 310, where housing 302 at least partially encloses stack 304 comprising first electrochemical cell 110 and second electrochemical cell 120, in accordance with some embodiments. Stack 304 has first end 306 corresponding to the external surface of first electrochemical cell 110 that faces away from the bulk of stack 304, and stack 304 also has second end 308 corresponding to the external surface of second electrochemical cell 120 that faces away from the bulk of stack 304, according to certain embodiments. In FIG. 4, solid plate 310 covers at least a portion of first end 306 of stack 304, because line 309 perpendicular to and extending out of first end 306 and away from the bulk of stack 304 intersects plate 310.

In some embodiments, the housing of the battery further comprises a solid housing component coupled to the solid plate. In some embodiments, the solid housing component is a discrete object separate from the solid plate rather than part of a unitary object with the solid plate (though in some embodiments the solid housing component and the solid plate are part of a unitary solid object). The solid housing component (e.g., discrete solid housing component) may contribute, at least in part, to application of anisotropic force by the housing (e.g., to an electrochemical cell in the stack). For example, in some embodiments, the housing is configured to apply, via the solid plate and tension in the solid housing component coupled to the solid plate, during at least one period of time during charge and/or discharge of the first electrochemical cell and/or the second electrochemical cell, an anisotropic force with a component normal to a first electrode active surface of the first electrochemical cell and/or a second electrode active surface of the second electrochemical cell. As noted above, the anisotropic force may define a pressure of at least 10 kgf/cm$^2$, at least 12 kgf/cm$^2$, at least 20 kgf/cm$^2$, at least 25 kgf/cm$^2$ and/or up to 30 kgf/cm$^2$, up to 35 kgf/cm$^2$, up to 40 kgf/cm$^2$, or more. The solid housing component (e.g., discrete solid housing component) may contribute to force application by being coupled to a first solid plate (covering at least a portion of a first end of the stack) and a second component of the housing covering at least a portion of a second end of the stack (e.g., a second solid plate or a part of a frame). For example, referring again to FIG. 4, housing 302 comprises solid housing component 314 coupled to first solid plate 310 and second solid plate 312 (which covers second end 308 of stack 304). Tension in solid housing component 314 may contribute force causing first solid plate and/or second solid plate 312 to compress stack 304, thereby applying an anisotropic force in direction of arrow 182 having component 182 normal to a first electrode active surface of first electrochemical cell 110 and/or a second electrode active surface of second electrochemical cell 120.

Figure 5A:
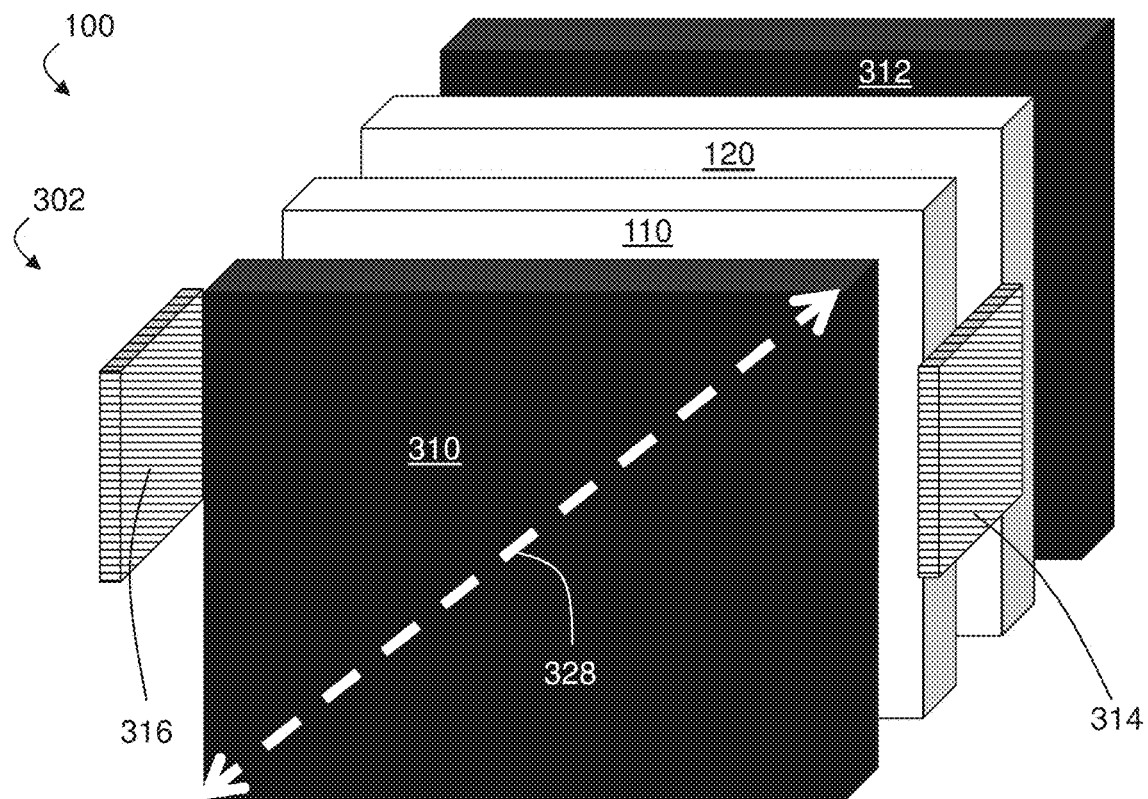
FIG. 5A shows an exploded perspective schematic diagram of an exemplary battery comprising a stack comprising electrochemical cells, and a housing that comprises a solid plate and a solid housing component, according to some embodiments.
Figure 5B:
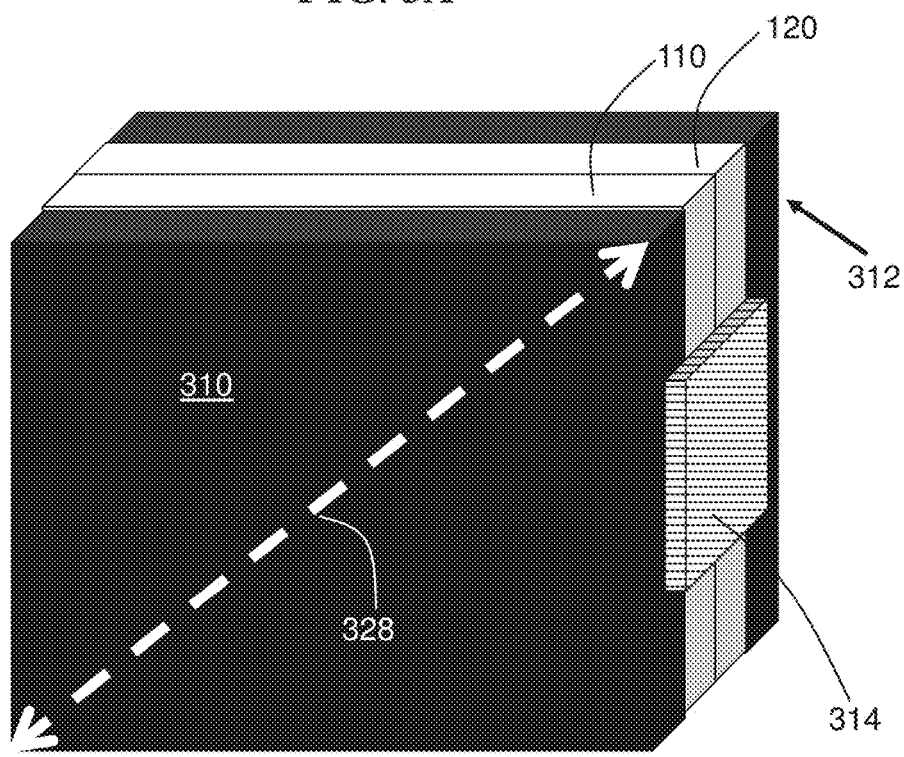
FIG. 5B shows a perspective schematic diagram of an exemplary battery comprising a stack comprising electrochemical cells, and a housing that comprises a solid plate and a solid housing component, according to some embodiments.

The solid plate may have a largest lateral dimension that is relatively small with respect to an electrochemical active region of one or more of the electrochemical cells in the battery. Electrochemical active regions of electrochemical cells are described in more detail below in connection with FIG. 18. Having a relatively small lateral profile of the solid plate may stand in contrast to solid plates in certain existing housings having larger lateral profiles (e.g., due to lateral space needed for load-applying fasteners to pass through the solid plate). Certain embodiments of this disclosure are directed to various techniques and configurations that can make inclusion of solid plates having relatively small lateral profiles practical (e.g., via certain configurations of solid housing components). Small solid plates (relative to the electrochemical cells) may afford overall batteries having relatively small volumes, which can be advantageous in some applications. A lateral dimension of a solid plate refers to a dimension parallel to an exterior lateral surface of the solid plate (as opposed to a thickness of the solid plate). FIG. 4 shows lateral dimension 326 of solid plate 310 as an illustrative example. FIG. 4 also shows first electrochemical active region 160 of first electrochemical cell 110 and second electrochemical active region 162 of second electrochemical cell 120, according to some embodiments. FIGS. 5A-5B show exploded view (FIG. 5A) and perspective (FIG. 5B) schematic illustrations of battery 100 including housing 302 at least partially enclosing first electrochemical cell 110 and second electrochemical cell 120, in accordance with some embodiments. In FIGS. 5A-5B, housing 302 comprises solid plate 310 having largest lateral dimension 328, as illustrated by the dashed line with arrows. Solid plate 310 may be a first solid plate, and housing 302 may further comprise second solid plate 312 coupled to first solid plate via solid housing component 314.

In some embodiments in which the stack comprises a first electrochemical cell comprising a first electrochemical active region and a second electrochemical cell comprising a second electrochemical active region, a ratio of the largest lateral dimension of the solid plate to the largest lateral dimension of the first electrochemical active region and/or a ratio of the largest lateral dimension of the solid plate to the largest lateral dimension of the second electrochemical active region is less than or equal to 1.5, less than or equal to 1.4, less than or equal to 1.3, less than or equal to 1.2, less than or equal to 1.1, less than or equal to 1.05, less than or equal to 1.02, less than or equal to 1.01, and/or as low as 1.005, as low as 1.001, or as low as 1.

The housing of the battery may have a largest lateral pressure-applying dimension. A lateral pressure-applying dimension refers to a dimension of the housing parallel with the lateral exterior surfaces of components of the stack and the solid plate that corresponds to components of the housing under tension such that they participate in the application of pressure to the electrochemical cells of the stack via the anisotropic force discussed above.

Figure 5C:
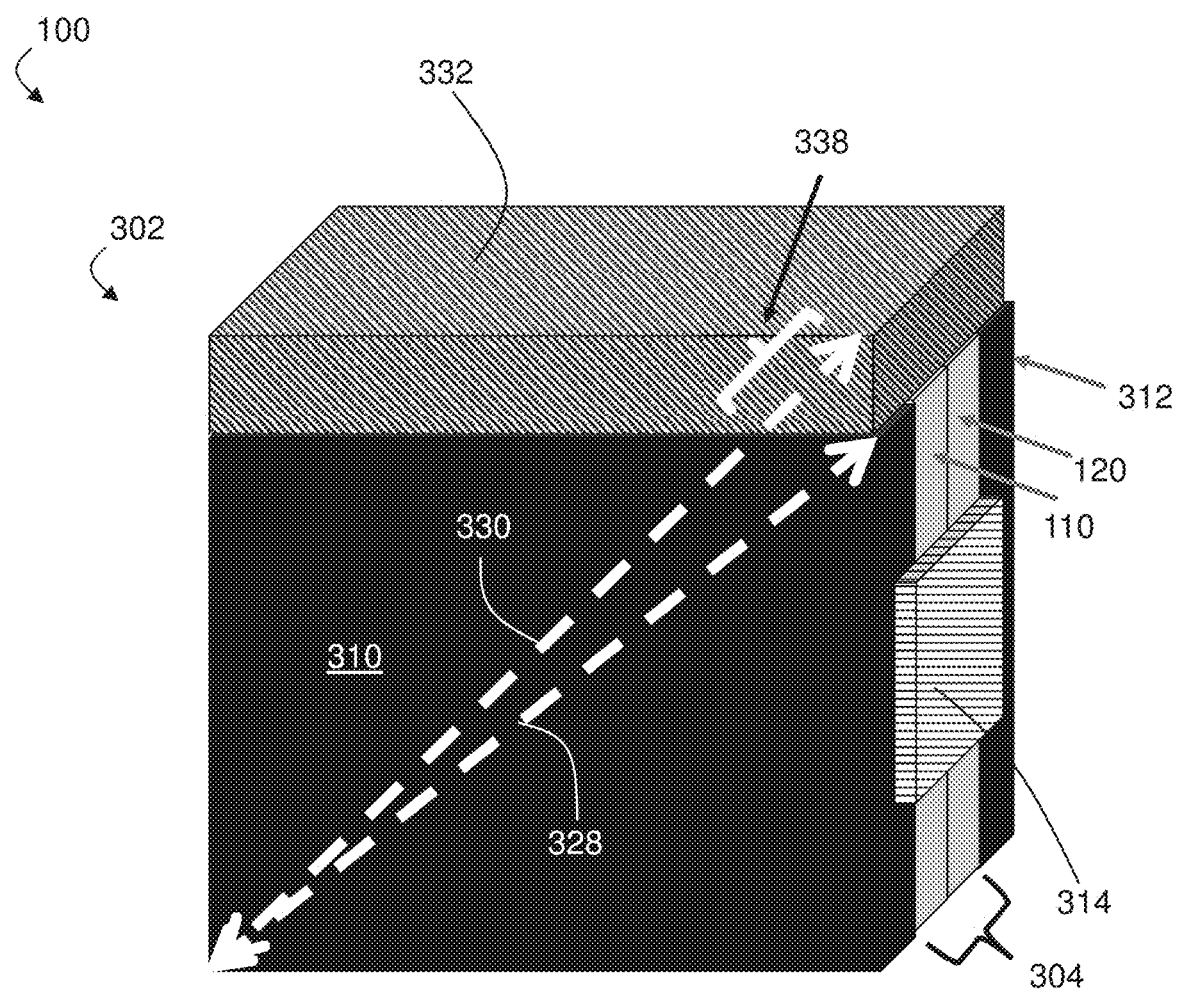
FIG. 5C shows a perspective schematic diagram of an exemplary battery comprising a stack comprising electrochemical cells, and a housing that comprises a solid plate, a solid housing component, and an electronics component, according to some embodiments.

FIG. 5C illustrates the concept of a lateral pressure-applying dimension of a housing. Battery 100 comprises housing 302 comprising solid plate 310, solid housing component 314, and electronics component 332 coupled to solid plate 310 and positioned along a side of stack 304. Housing 302 has largest lateral pressure-applying dimension 328 between far corners of solid plate 310. (While this matches the largest lateral dimension of solid plate 310 in the pictured embodiment, such an occurrence is not necessary, as in other embodiments parts beyond the solid plate may be pressure-applying and contribute to a largest lateral pressure-applying dimension). All components of housing 302 within largest lateral pressure-applying dimension 302 are under tension during application of force by the housing to first electrochemical cell 110 and/or second electrochemical cell 120. Housing 302 also has an overall largest lateral dimension 330 from a corner of solid plate 310 to a far corner of electronics component 332. However, because in this embodiment housing 302 is configured to apply the anisotropic force via solid plate 310 and tension in solid housing component 314, electronics component 332 is not under tension and consequently does not substantially contribute to the application of pressure to first electrochemical cell 110 and/or second electrochemical cell 120. Electronics component 332 would therefore not be considered part of a lateral pressure-applying dimension of housing 302. As a result, part 338 of overall largest lateral dimension 330 is not pressure-applying, and overall largest lateral dimension 330 is larger than the largest lateral pressure-applying dimension 328 of housing 302.

The housing may have a largest lateral pressure-applying dimension that is relatively small with respect to an electrochemical active region of one or more of the electrochemical cells in the battery. Having a relatively small lateral pressure-applying profile of the housing may stand in contrast to certain existing pressure-applying housings having larger lateral pressure-applying profiles (e.g., due to lateral space needed for load-applying fasteners to pass through one or more components of the housing such as a solid plate). Certain embodiments of this disclosure are directed to various techniques and configurations that can make housings having relatively small lateral pressure-applying profiles practical (e.g., via certain configurations of solid housing components). Small pressure-applying regions of housings (relative to the electrochemical cells) may afford overall batteries having relatively small volumes, which can be advantageous in some applications.

In some embodiments in which the stack comprises a first electrochemical cell comprising a first electrochemical active region and a second electrochemical cell comprising a second electrochemical active region, a ratio of the largest lateral pressure-applying dimension to the largest lateral dimension of the first electrochemical active region and/or a ratio of the largest lateral pressure-applying dimension of the solid plate to the largest lateral dimension of the second electrochemical active region is less than or equal to 1.6, less than or equal to 1.5, less than or equal to 1.4, less than or equal to 1.3, less than or equal to 1.2, less than or equal to 1.1, less than or equal to 1.05, less than or equal to 1.02, less than or equal to 1.01, and/or as low as 1.005, as low as 1.001, or as low as 1. In some embodiments, at least 90%, at least 95%, at least 99%, or all of the first electrochemical active region of the first electrochemical cell and/or the second electrochemical active region of the second electrochemical cell is covered by a portion of the housing within the largest lateral pressure-applying dimension of the housing.

The solid housing component may couple (or contribute to coupling of) the solid plate covering at least a portion of a first end of the stack to a component of the housing covering at least a portion of second end of the stack. Such a coupling via the solid housing component (e.g., solid housing component 314) may contribute to the anisotropic force applied by the housing. In some embodiments, the solid housing component spans from the solid plate to the second end of the stack. For example, in FIG. 4, solid housing component 314 spans from first solid plate to second end 308 of stack 304. It should be understood that an object spanning from a first element to a second element may extend past some or all of either the first element of the second element, provided that it reach at least a portion of each the two elements in the direction of the spanning. For example, in FIG. 4, solid housing component 314, which reaches all of but does not extend past solid plate 310 and extends past second end 308, is considered to span from solid plate 310 to second end 308. In some embodiments in which the housing comprises a first solid plate covering at least a portion of the first end of the stack and a second solid plate covering at least a portion of the second end of the stack (e.g., as shown in FIG. 4), the solid housing component spans from the first solid plate to the second solid plate.

Solid housing components may join two or more parts of the housing via any of a variety of coupling techniques. The solid housing components may be part of the underlying structure of the housing. For example, in some embodiments, the housing comprises a frame at least partially enclosing the stack, and a solid housing component is a part of the frame (e.g., a side of the frame joining two ends of the frame). The housing may have a single solid housing component, or the housing may comprise multiple solid housing components. In some embodiments, the housing comprises a first solid housing component along a first side of the stack and a second solid housing component on along a second (e.g., opposite) side of the stack. Housing 302 in FIG. 4 shows one such embodiment, where first solid housing component 314 and optional second solid housing component 316 are along opposite sides of stack 304.

In some embodiments, no auxiliary fastener spanning from the solid plate toward the second end of the stack along a side of the stack is in tension during application of the anisotropic force. An auxiliary fastener in this context is a fastener that is not part of the underlying housing structure. For example, in FIG. 3A, where housing 202 comprises first solid plate 201 coupled to second solid plate 203 via a fastener in the form of rod 205, rod 205 is not part of the underlying structure of housing 202 and is therefore considered an auxiliary fastener. In contrast, in FIG. 4, housing 302 comprises first solid plate 310 and second solid plate 312 coupled via solid housing component 314, which is part of an underlying structure of housing 302 and is therefore not considered an auxiliary fastener. A housing in which no auxiliary fastener spans from the solid plate toward the second end of the stack along a side of the stack is in tension during application of the anisotropic force may still be able to apply the anisotropic force to the electrochemical cells of the stack even without tension from an auxiliary fastener at least because of the presence of a solid housing component in tension coupled to the solid plate, as described above and below. By not requiring an auxiliary fastener in tension for application of the anisotropic force, the housing may require less lateral extension ("overhang") of pressure-applying components such as solid plates compared to housings that employ auxiliary fasteners in tension for force application. As discussed, less lateral extension beyond electrochemical active areas of the electrochemical cell may contribute to lower overall housing and battery volumes (and higher volumetric energy density). In some embodiments, no auxiliary fastener spans from the solid plate to the second end of the stack. For example, in FIG. 4, no auxiliary fastener spans from solid plate 310 to second end 308 of stack 304, in accordance with some embodiments. In some embodiments, no auxiliary fastener passes through a thickness of the solid plate. It should be understood that while in some embodiments no auxiliary fastener spans from the solid plate to the second end of the stack (or passes through a thickness of the solid plate), other fasteners may be present in the housing. For example, in some embodiments, fasteners couple the solid housing component to the solid plate or a solid portion adjacent to the solid plate, as described in more detail below.

The solid housing component may be made of any of a variety of materials, depending on desired properties of the solid housing component and/or the overall battery. The solid housing component may be made of any of the materials described above for the solid plate. In some embodiments, the solid housing component comprises a metal (e.g., aluminum, titanium, etc.), metal alloy (e.g., stainless steel), composite, polymeric material (e.g., a rigid plastic), or combination thereof. For example, some (e.g., at least 50 wt %, at least 75 wt %, at least 90 wt %, at least 95 wt %, at least 99 wt %) or all of the solid housing component may be metal, metal alloy, polymeric material, composite, or a combination thereof. In some embodiments, the solid housing component comprises a composite material. Exemplary composite materials that the solid housing component can be or comprise include, but are not limited to, reinforced polymeric, metallic, or ceramic materials (e.g., fiber-reinforced composite materials), carbon-containing composites, or combinations thereof. For example, in some embodiments, the solid housing component comprises carbon fiber. As described above in the context of the solid plate, the solid housing component may comprise multiple layers of carbon fiber (e.g., unidirectional carbon fiber weaves, optionally with binder). In some embodiments, the solid housing component comprises multiple layers of carbon fiber (e.g., unidirectional carbon fiber) having any of the orientation patterns described above (e.g., a "[0°/90°/0°]" pattern, a "[0°/30°/0°/−30/0°]" pattern, etc.). In some embodiments, the solid housing component comprises a woven fabric. For example, the solid housing component may comprise multiple layers of woven fabric (e.g., woven carbon fibers). It has been observed that carbon fiber composite solid housing components may afford sufficient strength and rigidity for contributing to application of anisotropic force to cells in the stack while being relatively light-weight, which may promote desirable specific energy densities for certain applications. In some embodiments where a housing comprises a solid plate and a solid housing component coupled to the solid plate, the solid plate and the solid housing component have the same composition. For example, both may be made of the same metal or metal alloy (e.g., aluminum), polymeric material, composite (e.g., carbon fiber composite), or combination thereof. However, in some embodiments the solid plate and the solid housing component are made of different compositions (e.g., different types of materials or the same materials in different relative amounts).

In some embodiments, the solid housing component comprises a material (e.g., a composite comprising carbon fiber) having a relatively high modulus. In some embodiments, the solid housing component has a relatively high tensile modulus and a relatively high flexural modulus. In some embodiments, some or all of the solid housing component has a tensile modulus of at least 1 GPa, at least 5 GPa, at least 10 GPa, at least 20 GPa, at least 50 GPa, at least 75 GPa, at least 100 GPa, 120 GPa, at least 150 GPa, at least 200 GPa, at least 300 GPa, at least 500 GPa and/or up to 550 GPa, up to 600 GPa, up to 650 GPa, or greater, and a flexural modulus of at least 120 GPa at least 150 GPa, at least 200 GPa, at least 300 GPa, at least 500 GPa and/or up to 550 GPa, up to 600 GPa, up to 650 GPa, or greater at room temperature (25° C.). For example, in some embodiments the solid housing component comprises layers comprising a material (e.g., a composite comprising carbon fiber), and one or more of the layers has a relatively high tensile modulus and a relatively high flexural modulus. In some embodiments, the solid housing component comprises layers comprising a material (e.g., a composite comprising carbon fiber), one or more of the layers having a tensile modulus of at least 120 GPa, at least 150 GPa, at least 200 GPa, at least 300 GPa, at least 500 GPa or greater, and a flexural modulus of at least 120 GPa at least 150 GPa, at least 200 GPa, at least 300 GPa, at least 500 GPa or greater at room temperature (25° C.). In some embodiments, the solid housing component comprises layers comprising a material (e.g., a composite comprising carbon fiber), one or more of the layers having a tensile modulus of less than or equal to 650 GPa, less than or equal to 600 GPa, less than or equal to 550 GPa or less, and a flexural modulus of less than or equal to 650 GPa, less than or equal to 600 GPa, less than or equal to 550 GPa or less at room temperature (25° C.). Combinations of the ranges (e.g., a tensile modulus of at least 120 GPa and less than or equal to 650 GPa and a flexural modulus of at least 120 GPa and less than or equal to 650 GPa) are possible. In certain instances, the solid housing component has a relatively large number of layers satisfying the modulus ranges above. For example, in some embodiments, the solid housing component comprises at least 1, at least 2, at least 3, at least 5, at least 10, at least 15, and/or up to 20, up to 25, up to 50, up to 60, up to 75, or more layers comprising a material (e.g., a composite comprising carbon fiber) having a tensile modulus of at least 120 GPa, at least 150 GPa, at least 200 GPa, at least 300 GPa, at least 500 GPa or greater, and a flexural modulus of at least 120 GPa at least 150 GPa, at least 200 GPa, at least 300 GPa, at least 500 GPa or greater at room temperature (25° C.). In some embodiments, the solid housing component comprises at least 1, at least 2, at least 3, at least 5, at least 10, at least 15, and/or up to 20, up to 25, up to 50, up to 60, up to 75, or more layers comprising a material (e.g., a composite comprising carbon fiber) having a tensile modulus of less than or equal to 650 GPa, less than or equal to 600 GPa, less than or equal to 550 GPa or less, and a flexural modulus of less than or equal to 650 GPa, less than or equal to 600 GPa, less than or equal to 550 GPa or less at room temperature (25° C.).

In some embodiments, a substantial portion of the housing comprises a material (e.g., a composite comprising carbon fiber) having a relatively high modulus. In some embodiments, a material having a flexural and/or tensile modulus of at least 120 GPa, at least 150 GPa, at least 200 GPa, at least 300 GPa, at least 500 GPa, and/or up to 550 GPa, up to 600 GPa, up to 650 GPa, or higher is present in the housing in an amount of at least 50 wt %, at least 75 wt %, at least 90 wt %, at least 95 wt %, or more. Some embodiments where the housing comprises a material having a relatively high modulus may be advantageous because they facilitate batteries with a relatively small lateral profile, a relatively high volumetric energy density, and/or adequate resistance to deformation (e.g., upon application of force). In some embodiments where the housing comprises a solid plate and a solid housing component, each comprising a composite material having a relatively high modulus, such as a composite comprising carbon fiber, it can be beneficial to have some housing components with planarity parallel to a first plane and other housing components with planarity not parallel to that first plane. For example, in some embodiments it may be advantageous for a solid plate of the housing to have multiple layers of unidirectional carbon fiber having planarity parallel to a plane of the solid plate, as well as a solid housing component (e.g., a frame component spanning from the solid plate to a second end of the stack) having multiple layers of unidirectional carbon fiber with planarity nonparallel to (e.g., substantially perpendicular to) the plane of the solid plate.

While in some embodiments the solid housing component has a relatively high modulus, such a property is not necessary in all embodiments. In some embodiments, the solid housing component has a tensile strength sufficient to avoid observable deflection and/or failure when the housing applies the anisotropic force to the electrochemical cells. In some embodiments, the solid housing component has a tensile strength in at least one dimension of at least 10 MPa, at least 20 MPa, at least 50 MPa, at least 100 MPa, at least 200 MPa, at least 500 MPa, at least 1 GPa, at least 2 GPa, at least 5 GPa, and/or up to 10 GPa, up to 20 GPa, up to 50 GPa, up to 100 GPa, up to 120 GPa, or higher.

In some embodiments, components of the housing of the battery are reinforced by local increases in thickness and/or the attachment of mechanical doublers. In some embodiments, local increases in thickness and/or the attachment of mechanical doublers provide additional support for portions of the housing (e.g., solid housing components along a side of the stack) that are pressure-applying or are otherwise mechanically loaded under at least some configurations of the housing. In some embodiments, local increases in thickness and/or the attachment of mechanical doublers facilitate a reduction in the largest lateral pressure applying dimension of the housing and/or increase the gravimetric and/or volumetric energy density of the battery. A local increase in thickness or a mechanical doubler may have an area of less than 100%, less than or equal to 90%, less than or equal to 75%, less than or equal to 50%, less than or equal to 25%, less than or equal to 10%, less than or equal to 5%, or less of a corresponding solid housing component. Further, a thickness of the solid housing component at a local increase in thickness and/or a combined thickness of a solid housing component and a mechanical doubler may be greater than an average thickness of the solid housing component by a factor of greater than or equal to 1.05, greater than or equal to 1.1, greater than or equal to 1.25, greater than or equal to 1.5, greater than or equal to 2, and/or up to 3, up to 5, or greater. FIGS. 7D-7E introduce an exemplary embodiment of battery 100, where mechanical doubler 315 is attached to solid housing component 314. FIG. 7D presents an exploded perspective schematic diagram of the battery, while FIG. 7E presents a perspective schematic diagram of the battery. Note that while any feature appearing in FIGS. 7D-7E may appear in some embodiments, some embodiments can include fewer than all pictured features while still accomplishing any of a variety of the advantages and performances described above.

The solid housing component may have any of a variety of lengths while maintaining rigidity. In some embodiments, such a rigidity even at relatively long lengths (unlike traditional auxiliary fasteners) affords an ability for the ratio of the distance between a solid plate and the second end of the stack to the largest lateral dimension of the housing to be relatively large if desired. In turn, such a large ratio may allow for a relatively large number (e.g., at least 6, at least 12, or more) of electrochemical cells to be included in the stack of the battery. Such an ability for relatively long housing components spanning the stack stands in contrast to traditional auxiliary fasteners such as rods or bolts with nuts. Tension in long fasteners may produce bending moments that result in deleterious deflection. Solid housing components (e.g., comprising composites comprising carbon fiber) may not appreciably deflect under such tension. In some embodiments, the ratio of the distance between a solid plate and the second end of the stack to the largest lateral dimension of the battery is less than or equal to 20, less than or equal to 10, less than or equal to 5, less than or equal to 2, less than or equal to 1.5, less than or equal to 1, less than or equal to 0.5, less than or equal to 0.2, less than or equal to 0.1, or less. In some embodiments, the ratio of the distance between a solid plate and the second end of the stack to the largest lateral dimension of the battery is greater than or equal to 0.01, greater than or equal to 0.1, greater than or equal to 0.5, greater than or equal 1, greater than or equal to 2, greater than or equal to 5, or greater. Combinations of the above ranges are possible: for instance, in some embodiments, the ratio of the distance between a solid plate and the second end of the stack to the largest lateral dimension of the battery is greater than or equal to 0.01 and less than or equal to 20.

In some embodiments, housings with any given ratio of the distance between a solid plate and the second end of the stack to the largest lateral dimension of the housing can be reconfigured to have a new ratio of the distance between the solid plate and the second end of the stack to largest lateral dimension of the battery by modifying and/or adjusting one or more solid housing components of the housing. For a given collection of geometries, a variety of solid housing components for spanning along a side of the stack of the battery can be interchanged to accommodate a variety of ratios of the distance between a solid plate and the second end of the stack to the largest lateral pressure-applying dimension, in some embodiments. In some embodiments, the ability to reconfigure the length of the housing without the adjustment of auxiliary fasteners can facilitate a reduction in the largest lateral pressure applying dimension of the battery. In some embodiments, the ability to reconfigure the length of the housing in such a way advantageously reduces the number of parts of the housing.

In some embodiments, the housing comprises a lateral base portion proximate to and/or along a lateral edge of the solid plate. In some embodiments, the lateral base portion is part of the solid plate. However, in some embodiments, the lateral base portion is part of a solid housing component coupled to the solid plate. In some embodiments, batteries can be mounted to an external surface using fasteners (e.g., auxiliary fasteners). In some embodiments, the lateral base portion is configured for mounting the battery to an external surface. For batteries that lack a lateral base portion, additional portions of the solid plate may be required to mount the battery to an external surface, and these may increase the lateral profile of the battery. Therefore, inclusion of a lateral base portion may be advantageous for reducing the maximum lateral pressure-applying dimension of the housing and/or increasing the battery's volumetric energy density. For example, battery 100 in FIGS. 7D-7E includes lateral base portion 319 of housing 302, which may be mounted to an external surface via fasteners 317.

In some embodiments, a relatively large percentage of the stack of the battery is covered by the housing of the battery. This may, in some cases, be advantageous because it can afford substantial protection to the battery (e.g., from impact during handling and/or use). In some embodiments, the housing covers at least 30%, at least 50%, at least 70%, at least 90%, at least 95%, at least 99%, or 100% of an external surface area of the stack.

The solid housing component may couple to the solid plate of the housing in any of a variety of suitable ways. It has been realized that certain coupling techniques may establish coupling while maintaining relatively small lateral profiles for the housing. In some embodiments, mechanically interlocking features of the solid housing component and a lateral edge of the solid plate establish a joint. Any of a variety of suitable joints may be employed via the interlocking features. For example, any of a variety of woodworking joints may be suitable. It should be understood that woodworking joints refer to the geometries and balances of forces associated with the joints, and it is not required that any part of two components joined with a woodworking joint actually be made of wood. Examples of types of joints that may be established by interlocking features of the solid housing component and a lateral edge of the solid plate include, but are not limited to, box joints, dovetail joints, splice joints (e.g. tabled splice joints), and Knapp joints.

In some embodiments, a joint between the solid housing components and the solid plate of the housing is formed at least in part between a projection of the solid housing component (or solid plate) and a recess of the solid plate (or solid housing component). Some such embodiments may involve the solid housing comprising a projection, the solid plate comprising a recess, and the solid housing component and the solid plate being configured to form a joint at least in part via coupling of the projection and the recess. For example, referring to FIGS. 6A-6C, exemplary battery 100 may be configured such that first solid housing component 314 has first projection 340 and optional second projection 342, while optional second solid housing component 316 has third projection 344 and fourth projection 346. First projection 340 of first solid housing component 314 is configured to couple, at least in part, with first recess 350 of solid plate 310 to form a joint, while optional second projection 342 of first solid housing component 314 is configured to couple, at least in part, with optional second recess 352 of optional second solid plate 312 to form a joint. Third projection 344 of optional second solid housing component 316 is configured to couple, at least in part, with optional third recess 354 of solid plate 310 to form a joint, while the fourth projection 346 of optional second solid housing component 316 is configured to couple, at least in part, with optional fourth recess 356 of optional second solid plate 312 to form a joint. A housing of this type may, in some embodiments, decrease a largest lateral pressure-applying dimension of the housing relative to a housing comprising, for example, auxiliary fasteners coupling solid plates. Additionally, use of mechanically interlocking features (e.g., for woodworking joints) for coupling may require a lower part count than housings that employ auxiliary fasteners (e.g., nuts and bolts) for coupling. In some embodiments, the solid housing component and the solid plate are configured to be joined via a dovetail joint (e.g., via tapered projects and/or recesses in the solid housing component and solid plate). For example, the solid housing component may comprise male dovetail features at an end of the solid housing component, and the solid plate may comprise a female dovetail feature (e.g., proximate to a lateral edge of the solid plate). The male and female features may mate to form a joint.

Figure 6A:
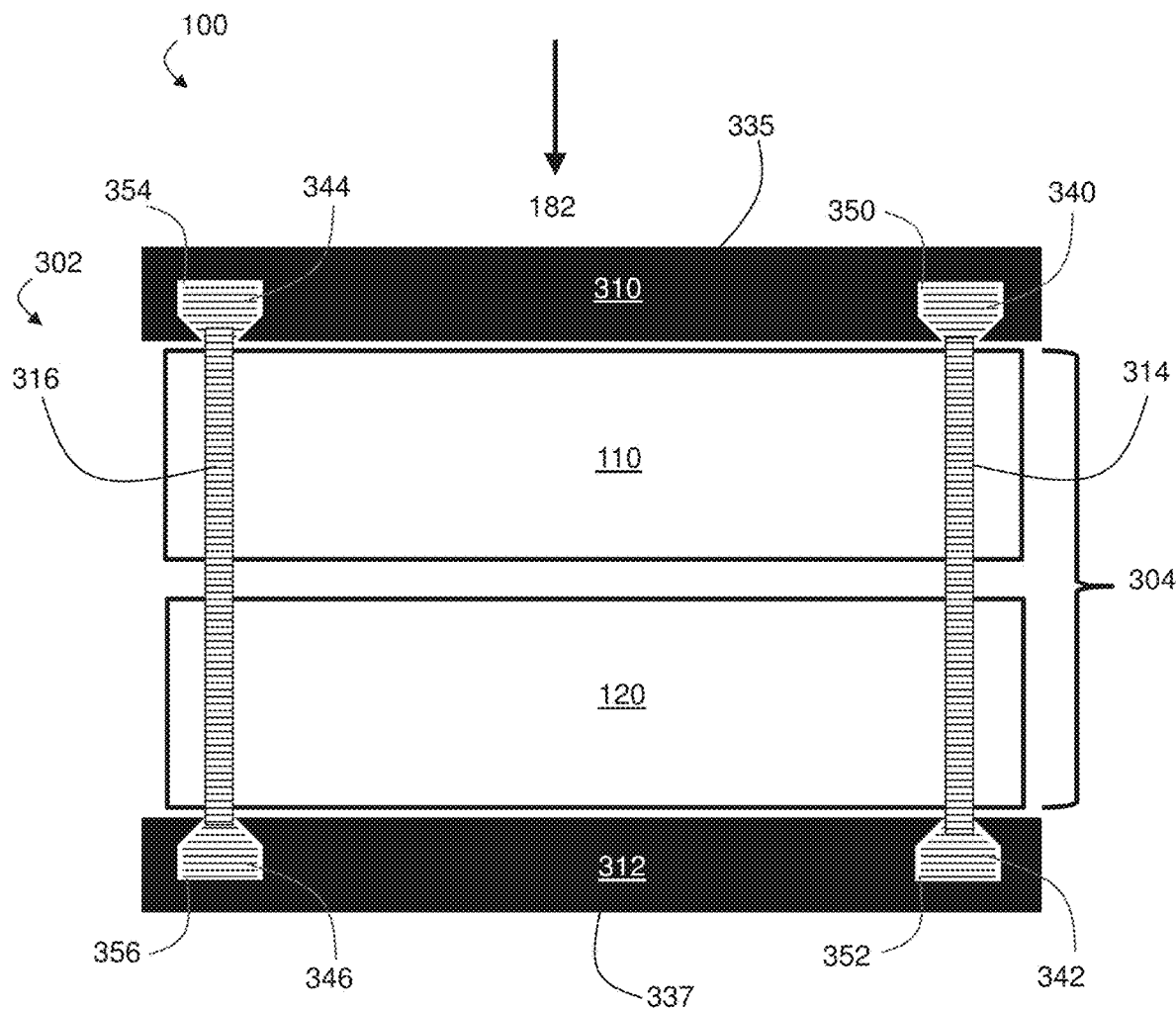
FIG. 6A shows a side-view schematic diagram of an exemplary battery comprising a stack comprising electrochemical cells, and a housing that comprises a solid plate comprising a recess and a solid housing component comprising a projection, according to some embodiments.
Figure 6B:
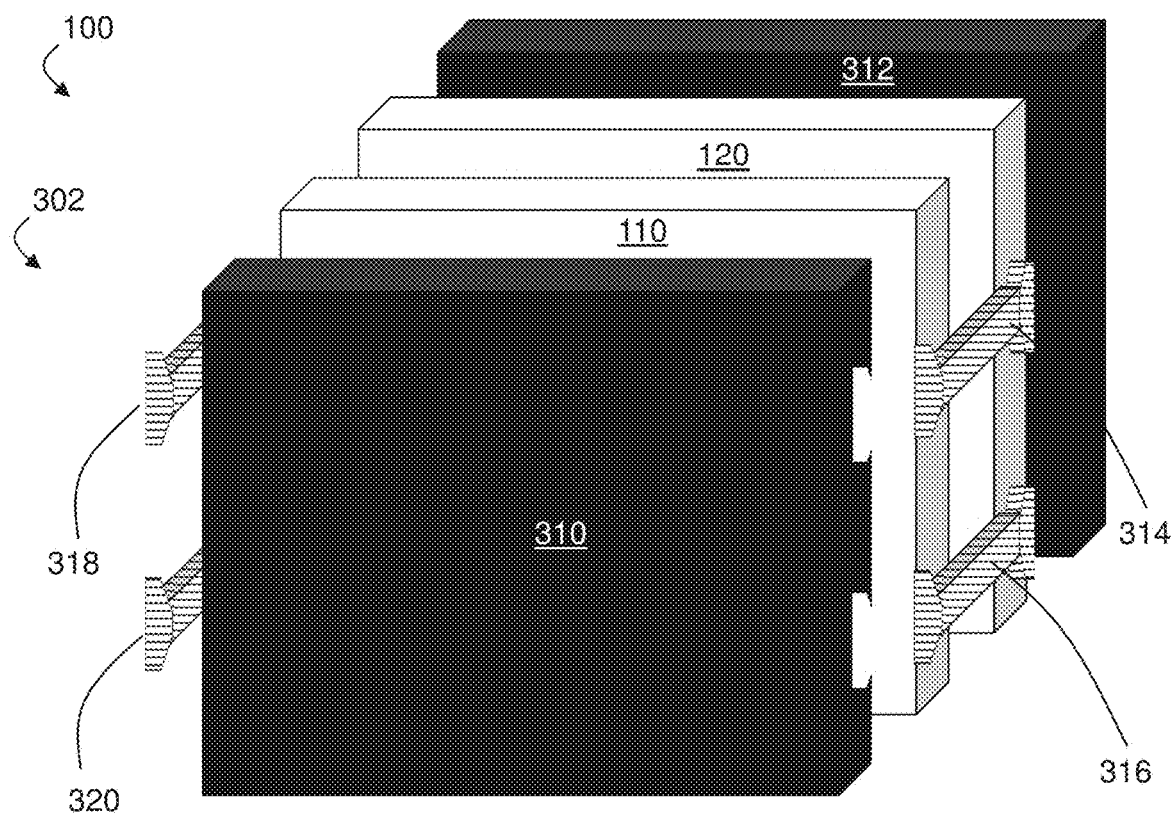
FIG. 6B shows an exploded perspective schematic diagram of an exemplary battery comprising a stack comprising electrochemical cells, and a housing that comprises a solid plate comprising a recess and a solid housing component comprising a projection, according to some embodiments.
Figure 6C:
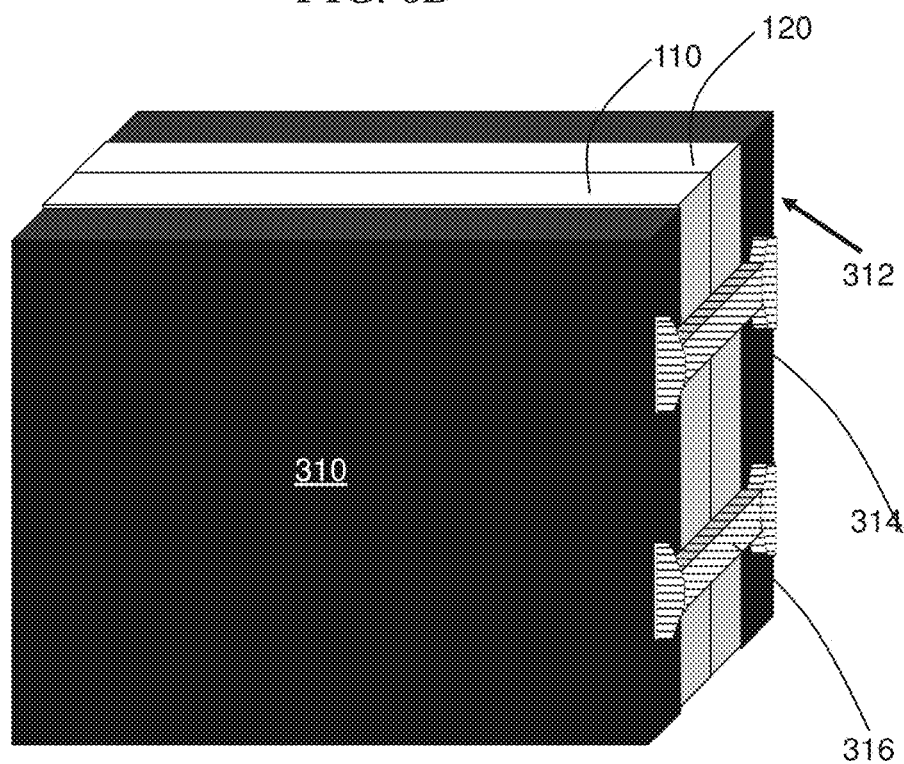
FIG. 6C shows a perspective schematic diagram of an exemplary battery comprising a stack comprising electrochemical cells, and a housing that comprises a solid plate comprising a recess and a solid housing component comprising a projection, according to some embodiments.

FIG. 6A shows a side view schematic illustration of exemplary battery 100, where all recesses are identical and where all projections are identical, in accordance with some embodiments. FIG. 6B shows an exploded schematic illustration of exemplary battery 100 of this type, also revealing optional third solid housing component 318 and optional fourth solid housing component 320. FIG. 6C shows a perspective schematic illustration of exemplary battery 100. It should be understood that other embodiments where projections differ from one another are also contemplated, as are embodiments with more or fewer solid housing components. In some embodiments, the solid housing component comprises recesses which can couple, at least in part, with projections of the solid plates to form joints. In some embodiments in which a solid housing component and a solid plate are coupled via interlocking mechanical features (e.g., via a woodworking joint), the solid housing component and the solid plate may further be coupled via, for example, an adhesive and/or a weld (e.g., at a joint formed by the interlocking features).

In some embodiments, the solid housing component is coupled to the solid plate via coupling to a housing stop portion adjacent to an exterior surface of the solid plate. The housing stop portion may be directly adjacent to the exterior surface of the solid plate (a surface of the plate facing away from the stack). However, in some embodiments, the housing stop portion is indirectly adjacent to the exterior surface of the solid plate such that one or more intervening components (e.g., washers, layers of material, etc.) is between the housing stop portion and the exterior surface of the solid plate. The housing stop portion may be discrete from the solid housing component and/or the solid plate. The housing stop portion may be made of any of a variety of materials, such as a metal (e.g., aluminum or titanium), a metal alloy (e.g., stainless steel), a composite (e.g., carbon fiber), a polymeric material (e.g., a rigid plastic), or a combination thereof. The housing stop portion may have any of a variety of shapes depending on, for example, a desired deflection of the solid plate and/or pressure distribution within the battery. It has been realized that some shapes of housing stop portions (e.g., elongated bars, or rings (e.g., rectangular or non-rectangular rings) conforming to a perimeter of the solid plate) can distribute force (e.g., from tension in the solid housing component) across the face of the solid plate more uniformly than, for example, solid plates coupled via discrete auxiliary fasteners (e.g., bolts with nuts) in contact with relatively small areas of the solid plate.

Figure 7A:
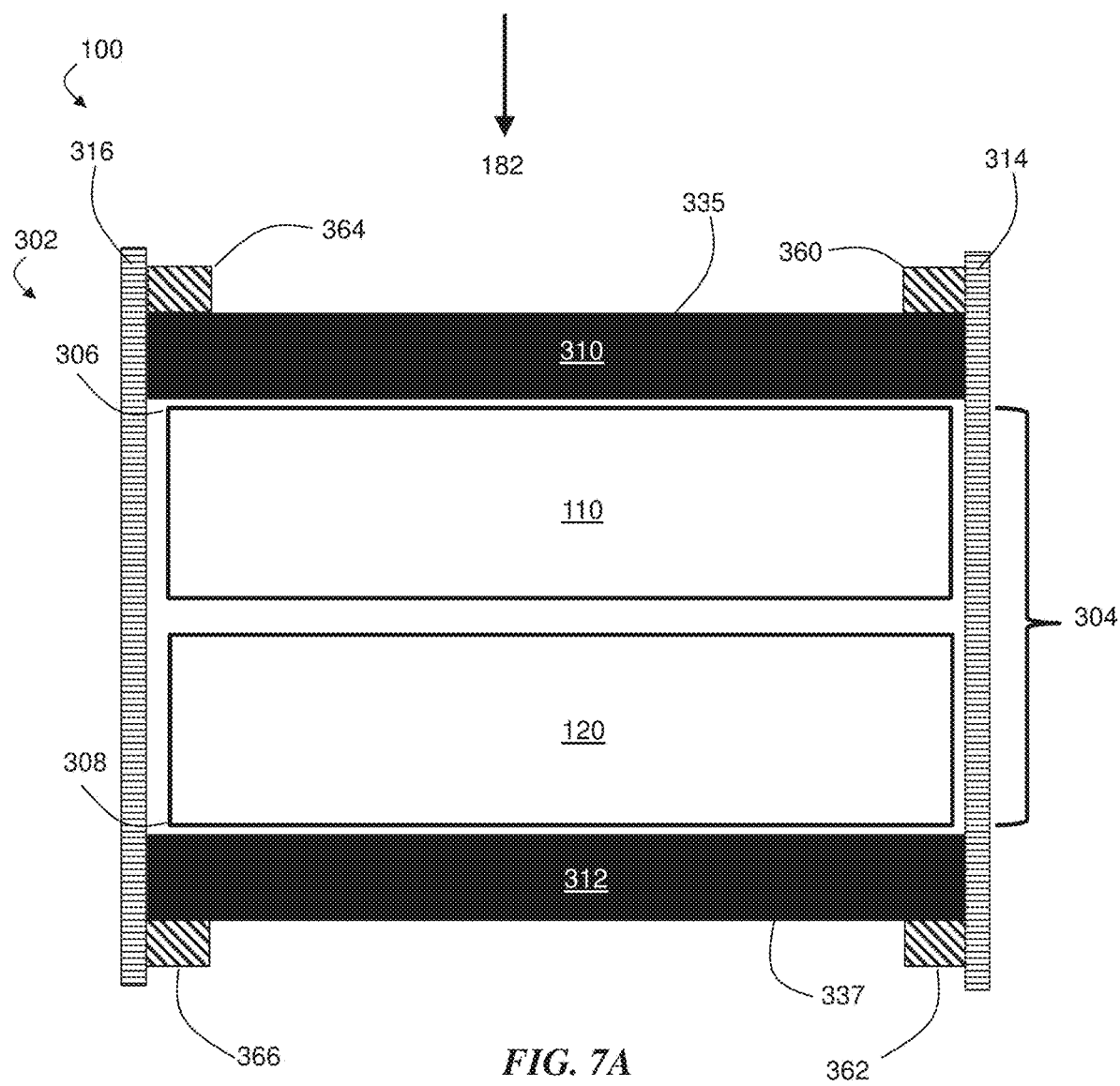
FIG. 7A shows a cross-sectional schematic diagram of an exemplary battery comprising a stack comprising electrochemical cells, and a housing that comprises a solid plate, a solid housing component, and a housing stop portion, according to some embodiments.
Figure 7B:
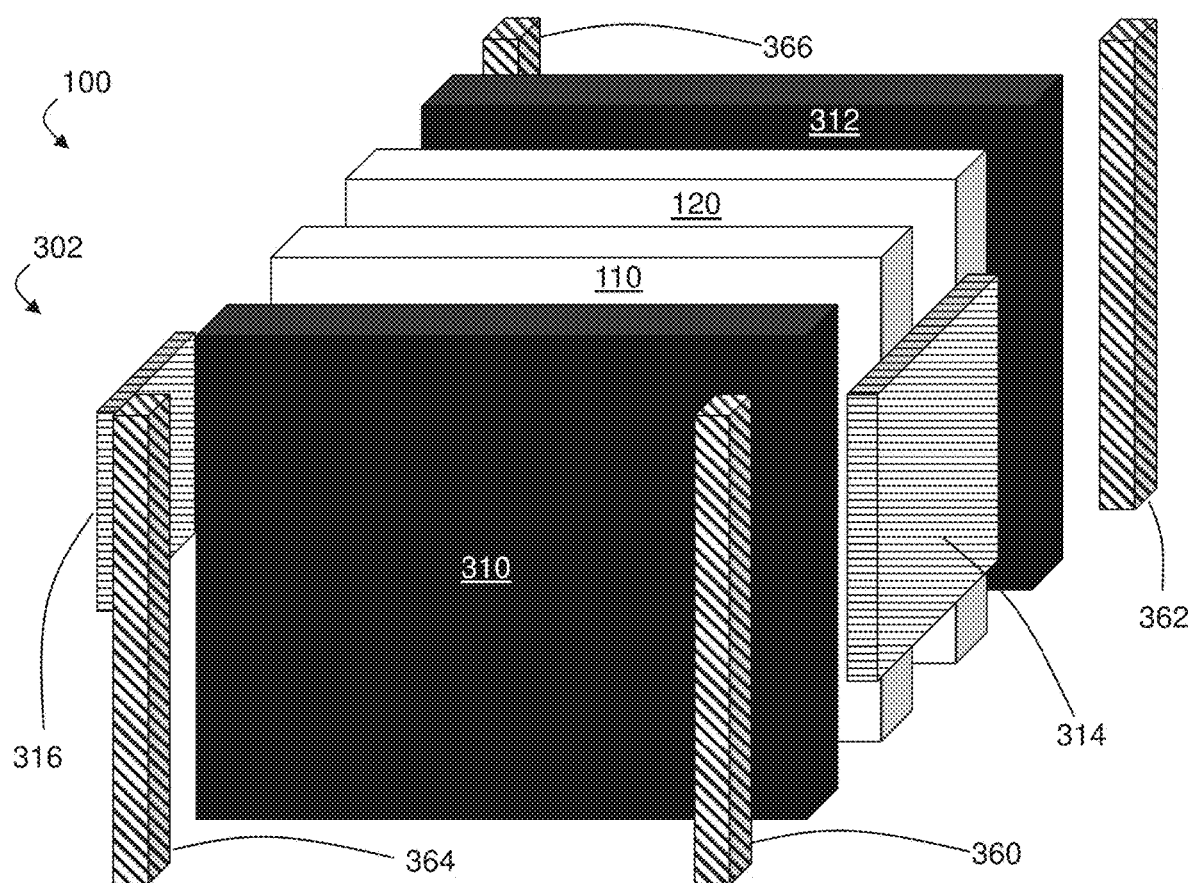
FIG. 7B shows an exploded perspective schematic diagram of an exemplary battery comprising a stack comprising electrochemical cells, and a housing that comprises a solid plate, a solid housing component, and a housing stop portion, according to some embodiments.
Figure 7C:
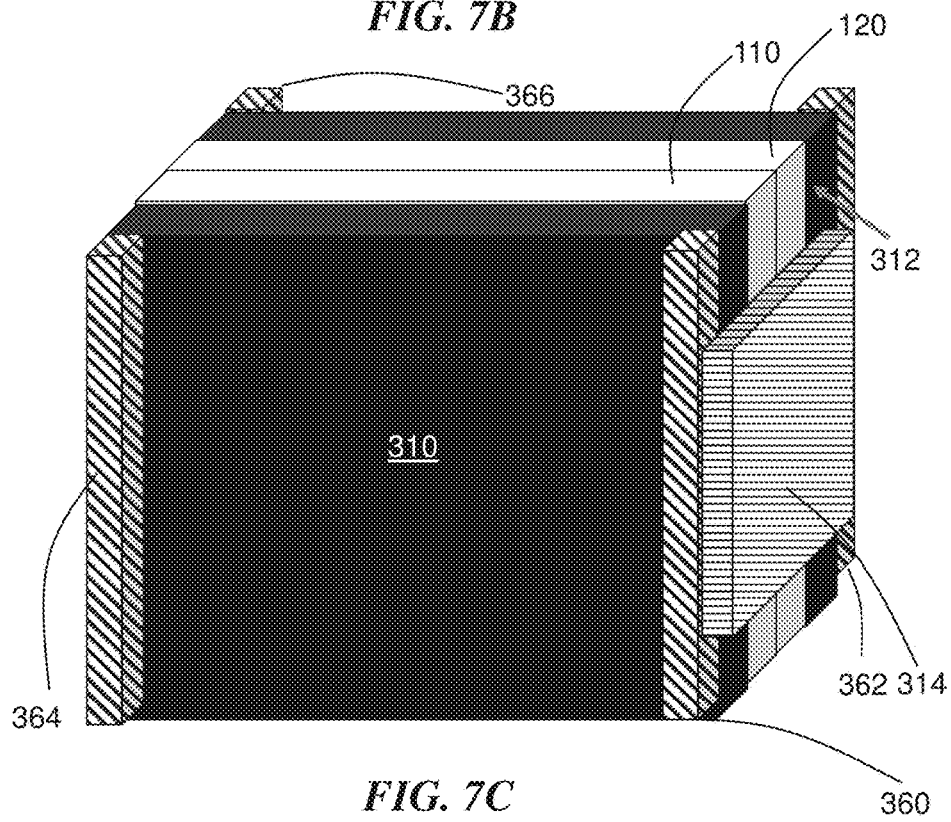
FIG. 7C shows a perspective schematic diagram of an exemplary battery comprising a stack comprising electrochemical cells, and a housing that comprises a solid plate, a solid housing component, and a housing stop portion, according to some embodiments.
Figure 7D:
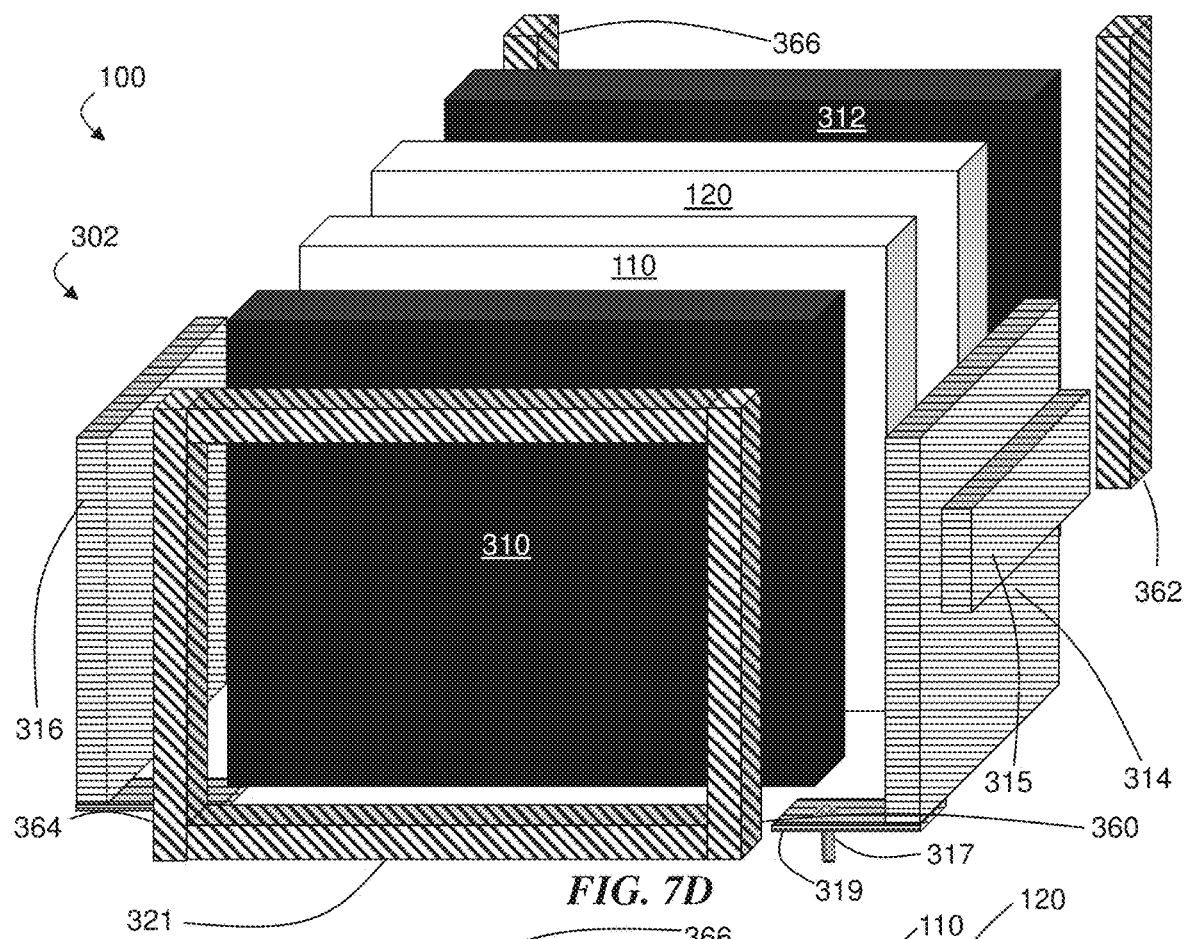
FIG. 7D shows an exploded perspective schematic diagram of an exemplary battery comprising a stack comprising electrochemical cells, and a housing that comprises a solid plate, a solid housing component, and a housing stop portion, according to some embodiments.
Figure 7E:
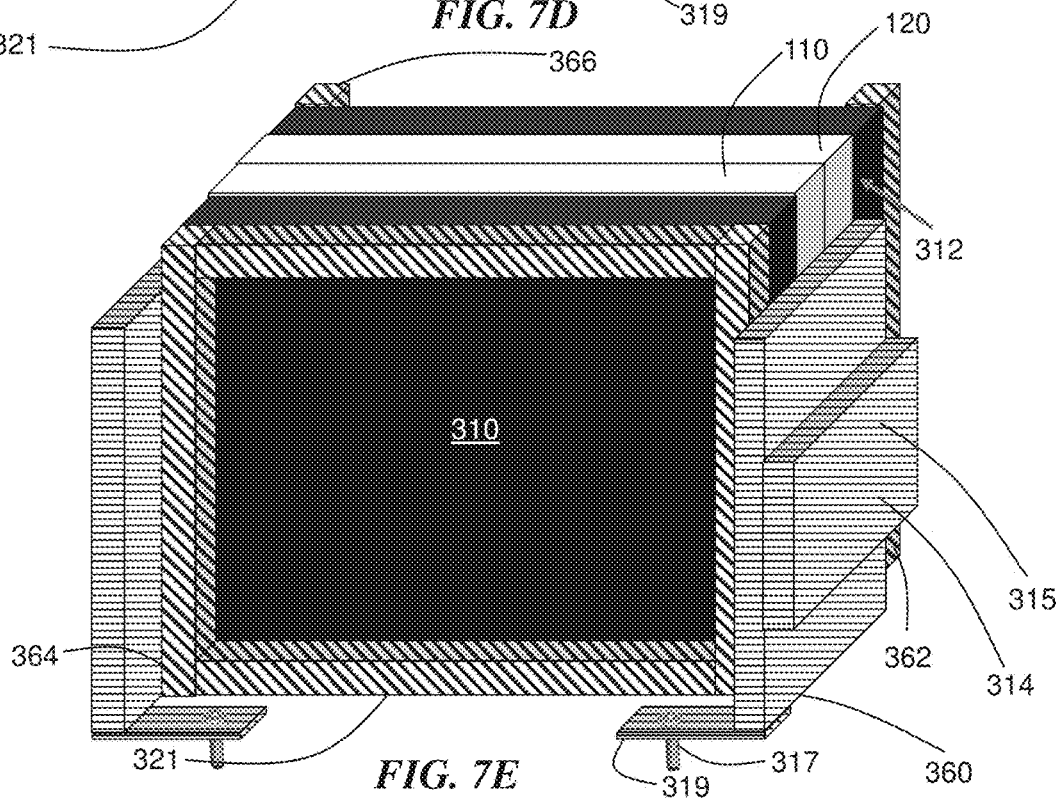
FIG. 7E shows a perspective schematic diagram of an exemplary battery comprising a stack comprising electrochemical cells, and a housing that comprises a solid plate, a solid housing component, and a housing stop portion, according to some embodiments.

Referring to FIGS. 7A-7C, exemplary battery 100 may be configured such that first solid housing component 314 is coupled to first solid plate 310 via coupling of the first solid housing component 314 to first housing stop portion 360 adjacent to exterior surface 335 of first solid plate 310. Optionally, in some embodiments first solid housing component 314 is coupled to optional second solid plate 312 via coupling of first solid housing component 314 to optional second housing stop portion 362 adjacent to exterior surface 337 of optional second solid plate 312. Optionally, exemplary battery 100 may further be configured as illustrated in FIGS. 7A-7C, such that optional second solid housing component 316 is coupled to first solid plate 310 via coupling of optional second solid housing component 316 to third housing stop portion 364 adjacent to exterior surface 335 of first solid plate 310, as well as to optional second solid plate 312 via coupling of first solid housing component 314 to optional fourth housing stop portion 366 adjacent to exterior surface 337 of optional second plate 312. The couplings between exemplary housing stop portions and exemplary solid housing components may comprise, for example, welds, fasteners, adhesives, or combinations thereof. A housing of this type may, in some embodiments, decrease a largest lateral pressure-applying dimension of the housing relative to a housing comprising, for example, fasteners coupling solid plates.

FIG. 7A shows a front view schematic illustration of exemplary battery 100 in one embodiment, where all housing stop portions are identical. FIG. 7B shows an exploded perspective of the same exemplary battery 100, and FIG. 7C shows a perspective illustration of the same exemplary battery 100. It should be understood that other embodiments, where housing stop portions have different geometries from each other, are possible, as are embodiments with more or fewer solid housing components and/or housing stop portions. In some embodiments, stop portions are discrete, as illustrated by FIGS. 7A-7C. However, in some embodiments, stop portions are portions of a single unitary object connected to multiple solid housing components (e.g., a first solid housing component and a second solid housing component). For example, FIGS. 7D-7E illustrate an embodiment where stop portion 360 and stop portion 364 are portions of single unitary object 321. The geometry of the stop portion may be configured to apply force to and/or support a relatively large area of the solid plate, in contrast to auxiliary fasteners (e.g., a bolt and nut), which may apply pressure in a fairly localized region. In some embodiments, at least 50%, at least 60%, at least 75%, at least 90%, at least 95%, at least 99%, or 100% of a perimeter of an exterior surface of a solid plate is covered by (e.g., adjacent to) one or more housing stop portions.

The solid housing component may be coupled to the housing stop portion via any of a variety of suitable techniques. For example, the solid housing component may be coupled to the housing stop portion via a weld, a fastener, an adhesive, or a combination thereof.

Figure 8A:
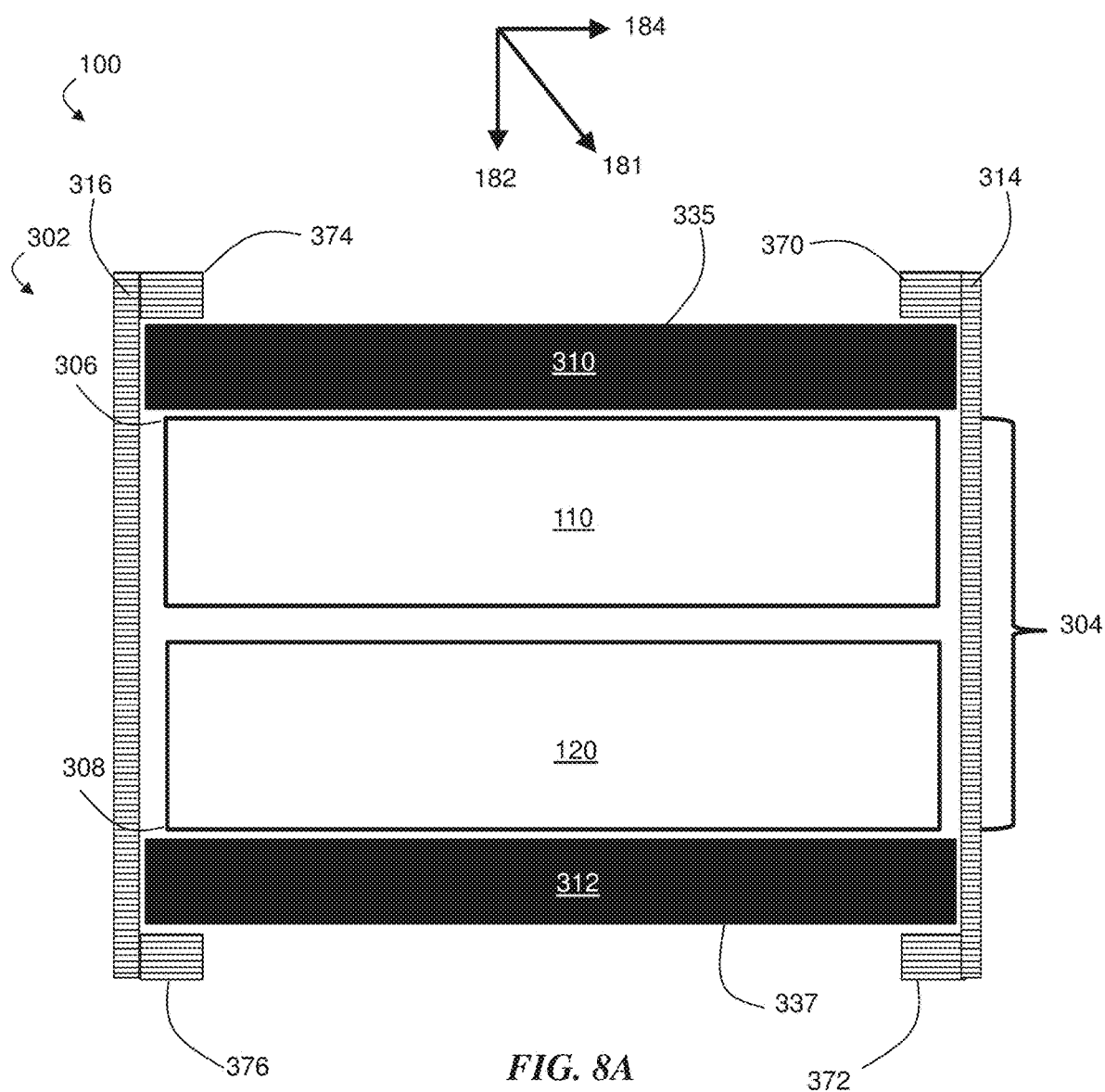
FIG. 8A shows a side-view schematic diagram of an exemplary battery comprising a stack comprising electrochemical cells, and a housing that comprises a solid plate and a solid housing component comprising a lateral portion, according to some embodiments.
Figure 8B:
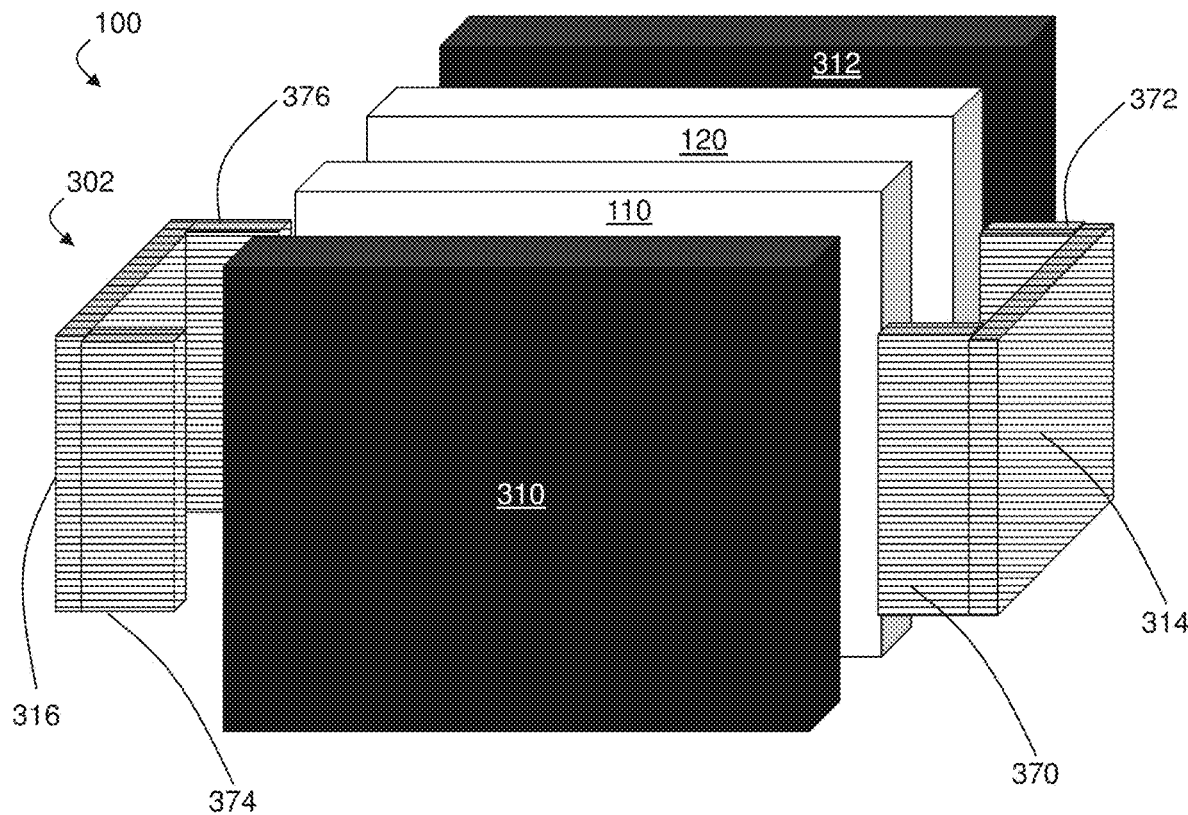
FIG. 8B shows an exploded perspective schematic diagram of an exemplary battery comprising a stack comprising electrochemical cells, and a housing that comprises a solid plate and a solid housing component comprising a lateral portion, according to some embodiments.
Figure 8C:
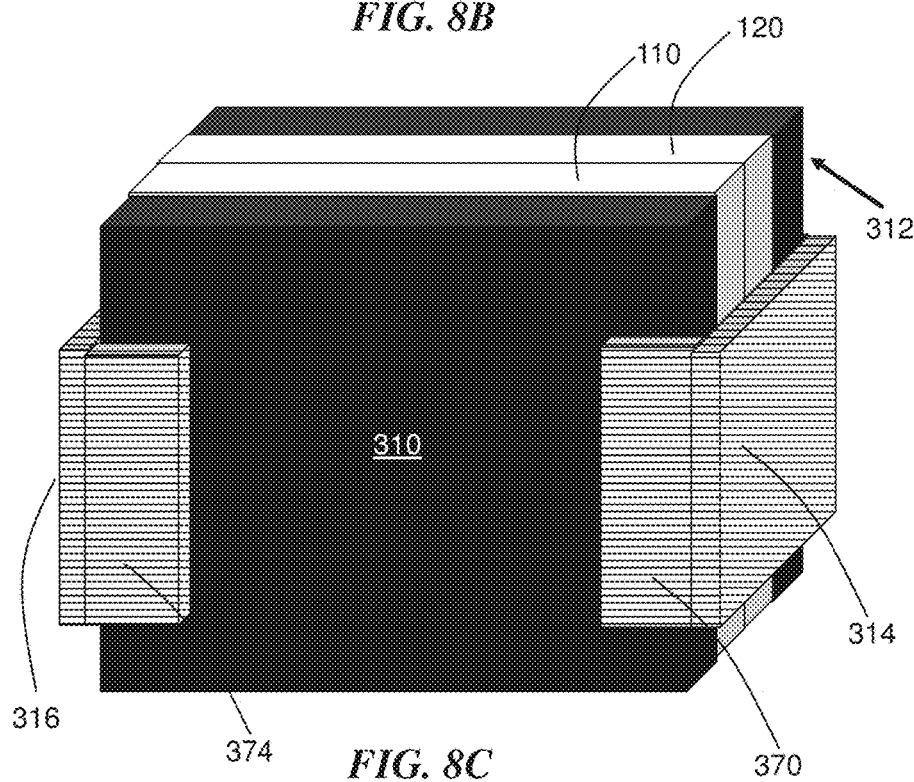
FIG. 8C shows a perspective schematic diagram of an exemplary battery comprising a stack comprising electrochemical cells, and a housing that comprises a solid plate and a solid housing component comprising a lateral portion, according to some embodiments.

In some embodiments, the solid housing component is coupled to the solid plate via a lateral portion of the solid housing component adjacent to an exterior surface of the solid plate. A lateral portion of the solid housing component refers to one which can be substantially parallel to a lateral surface of the solid plate when the solid housing component and the solid plate are coupled in the housing of the battery. For example, referring to FIGS. 8A-8C, exemplary battery 100 may be configured such that first solid housing component 314 is coupled to first solid plate 310 via first lateral portion 370 of first solid housing component 314 adjacent to exterior surface 335 of first solid plate 310. In FIG. 8A, first lateral portion 370 is substantially parallel to exterior surface 335 of solid plate 310, in accordance with some embodiments. Optionally, in some embodiments first solid housing component 314 is coupled to optional second solid plate 312 via second lateral portion 372 of optional second solid housing component 316 adjacent to exterior surface 337 of optional second solid plate 312. In some embodiments, the exemplary battery may further be configured as illustrated in FIGS. 8A-8C, such that optional second solid housing component 316 is coupled to first solid plate 310 via third lateral portion 374 of optional second solid housing component 316 adjacent to exterior surface 335 of first solid plate 310, and such that optional second solid housing component 316 is coupled to optional second solid plate 312 via fourth lateral portion 376 of optional second solid housing component 316 adjacent to exterior surface 337 of optional second solid plate 312. When the solid housing component coupled to the solid plate is in tension, the lateral portion of the solid plate may apply a force to at least a portion of the solid plate. For example, in FIGS. 8A-8C, tension in first solid housing component 304 may cause lateral portion 370 to press against exterior surface 335 of solid plate 310, thereby causing stack 304 to experience an anisotropic compressive force having a component in the direction of arrow 182 in FIG. 8A).

The lateral portion of the solid housing component may have any of a variety of shapes depending on, for example, a desired deflection of the solid plate and/or pressure distribution within the battery. It has been realized that some shapes of lateral portions (e.g., relatively flat portions) can distribute force (e.g., from tension in the solid housing component) across the face of the solid plate more uniformly than, for example, solid plates coupled via discrete auxiliary fasteners (e.g., bolts with nuts) in contact with relatively small areas of the solid plate. A housing of this type may, in some embodiments, decrease a largest lateral pressure-applying dimension of the housing relative to a housing comprising, for example, auxiliary fasteners coupling solid plates.

FIG. 8A shows a front view schematic illustration of exemplary battery 100 in one embodiment, where all the lateral portions are identical. FIG. 8B shows an exploded schematic illustration of the same exemplary battery 100, and FIG. 8C shows a perspective schematic illustration of the same exemplary battery 100. It should be understood that other embodiments, where lateral portions have different geometries from each other, are possible, as are embodiments with more or fewer solid housing components and/or lateral portions of solid housing components.

The lateral portion of the solid housing component may be directly adjacent to the exterior surface of the solid plate (a surface of the plate facing away from the stack). However, in some embodiments, the lateral portion is indirectly adjacent to the exterior surface of the solid plate such that one or more intervening components (e.g., washers, layers of material, etc.) is between the lateral portion of the solid housing component and the exterior surface of the solid plate. In some embodiments, the lateral portion of the solid housing component and a remainder of the solid housing component form a unitary object.

In some embodiments, the solid housing component contributes to force application by covering at least a portion (e.g., at least 10%, at least 25%, at least 50%, at least 75%, at least 90%, at least 95%, or all) of a first end of the stack comprising the first electrochemical cell and the second electrochemical cell. While in some embodiments a solid housing component directly covers at least a portion of an end of the stack (e.g., is directly adjacent), in some embodiments, the solid housing component covers at least a portion of an intervening component (e.g., a first solid plate) or part of a housing frame covering at least a portion of the end of the stack. In some embodiments, a second solid housing component contributes to force application by covering at least a portion of a second end of the stack. For example, referring to the cross-sectional schematic diagram in FIG. 9, housing 302 comprises first solid housing component 314 (which covers second end 308 of stack 304, and which has a portion along at least some of side 380 of the stack). Tension in first solid housing component 314 and in second solid housing component 316 may contribute force compressing stack 304, thereby applying an anisotropic force in direction of arrow 181 having component 182 normal to a first electrode active surface of first electrochemical cell 110 and/or a second electrode active surface of second electrochemical cell 120.

Figure 9:
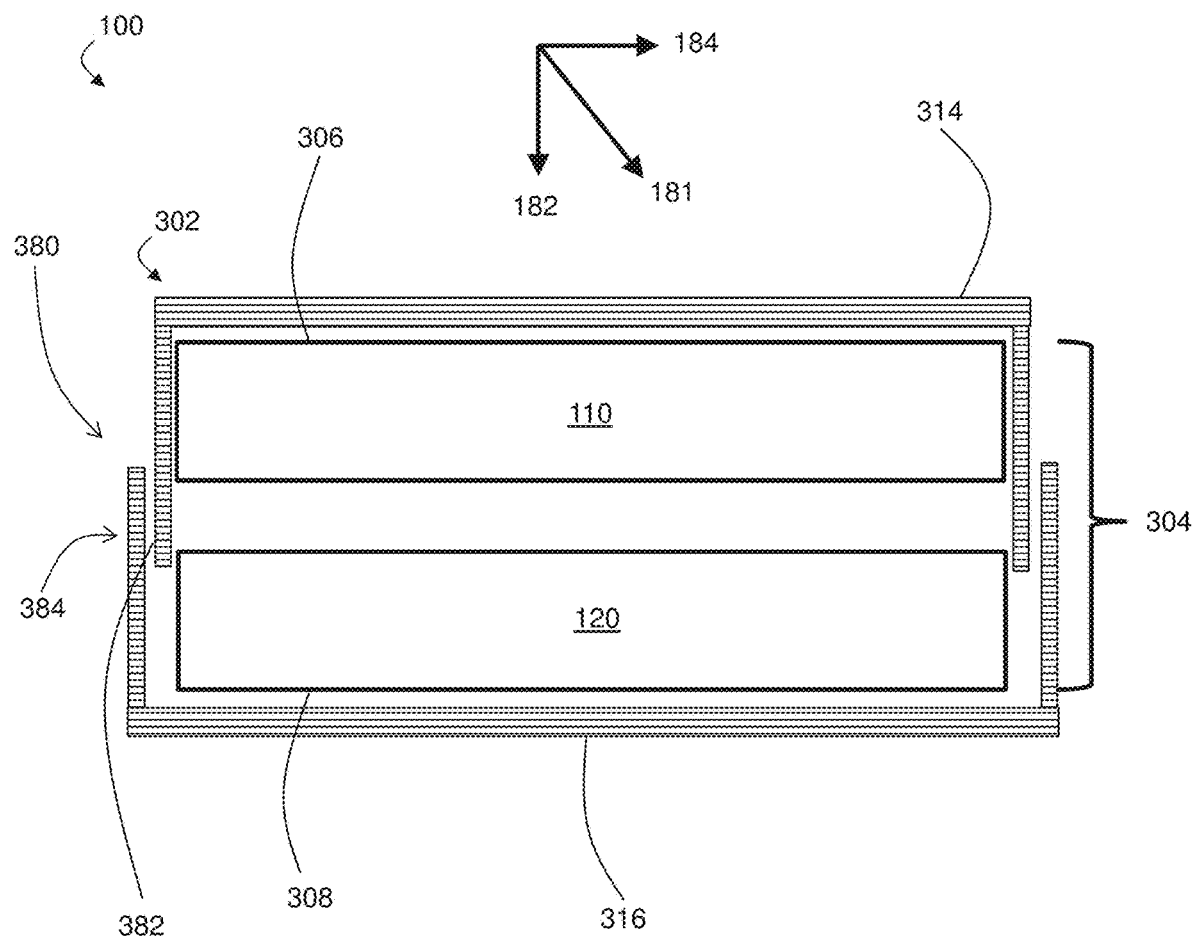
FIG. 9 shows a cross-sectional schematic diagram of an exemplary battery comprising a stack comprising electrochemical cells, and a housing that comprises solid housing components, according to some embodiments.

In some embodiments, the first solid housing component covers a portion (e.g., at least 10%, at least 25%, at least 50%, at least 75%, at least 90%, at least 95%, or all) of the first end of the stack and has a portion along at least some of the side of the stack. In some embodiments, a second solid housing component covers at least a portion (e.g., at least 10%, at least 25%, at least 50%, at least 75%, at least 90%, at least 95%, or all) of the second end of the stack a portion along at least some of the side of the stack. The first solid housing component and second solid housing component may be coupled directly or indirectly. Such a coupling be accomplished in any of a variety of suitable ways. For example, in some embodiments, a point of attachment between the first solid housing component and the second solid housing component is at a region of overlap between the first solid housing component and the second solid housing component along the side of the stack. It should be understood that a point of attachment may be part of a region of attachment between two surfaces (e.g., a region along a line of attached points, or a region occupying a 2-dimensional set of attached points), and is not meant to apply that an entirety of attachment is limited to a single point. It has been realized that, in some such embodiments, certain coupling techniques may establish coupling while maintaining relatively small lateral profiles for the housing, while maintaining an ability for the housing to apply and/or maintain an anisotropic force with a component normal to an active surface of one or more electrochemical cells of the stack. In some embodiments, the point of attachment between the first solid housing component and the second solid housing component comprises a weld, a fastener, an adhesive, friction, a joint, or a combination thereof. Referring to FIG. 9, which shows a cross-sectional schematic illustration of exemplary battery 100, first solid housing component 314 and second solid housing component 316 are coupled at point of attachment 382 at region of overlap 384 along side 380 of stack 304, in accordance with some embodiments. A similar point of attachment may be present at a region of overlap at an opposite side of the stack. A housing of this type may, in some embodiments, decrease a largest lateral pressure-applying dimension of the housing relative to a housing comprising, for example, auxiliary fasteners coupling solid plates. In some embodiments, the stack comprises one or more solid plates. For example, though not shown in FIG. 9, a solid plate of the same type as solid plate 310 in FIG. 4 may be between first solid housing component 314 and first electrochemical cell 110. The solid plate may be a first solid plate, and the stack may further comprise a second solid plate between the second solid housing component and the second electrochemical cell.

Figure 10:
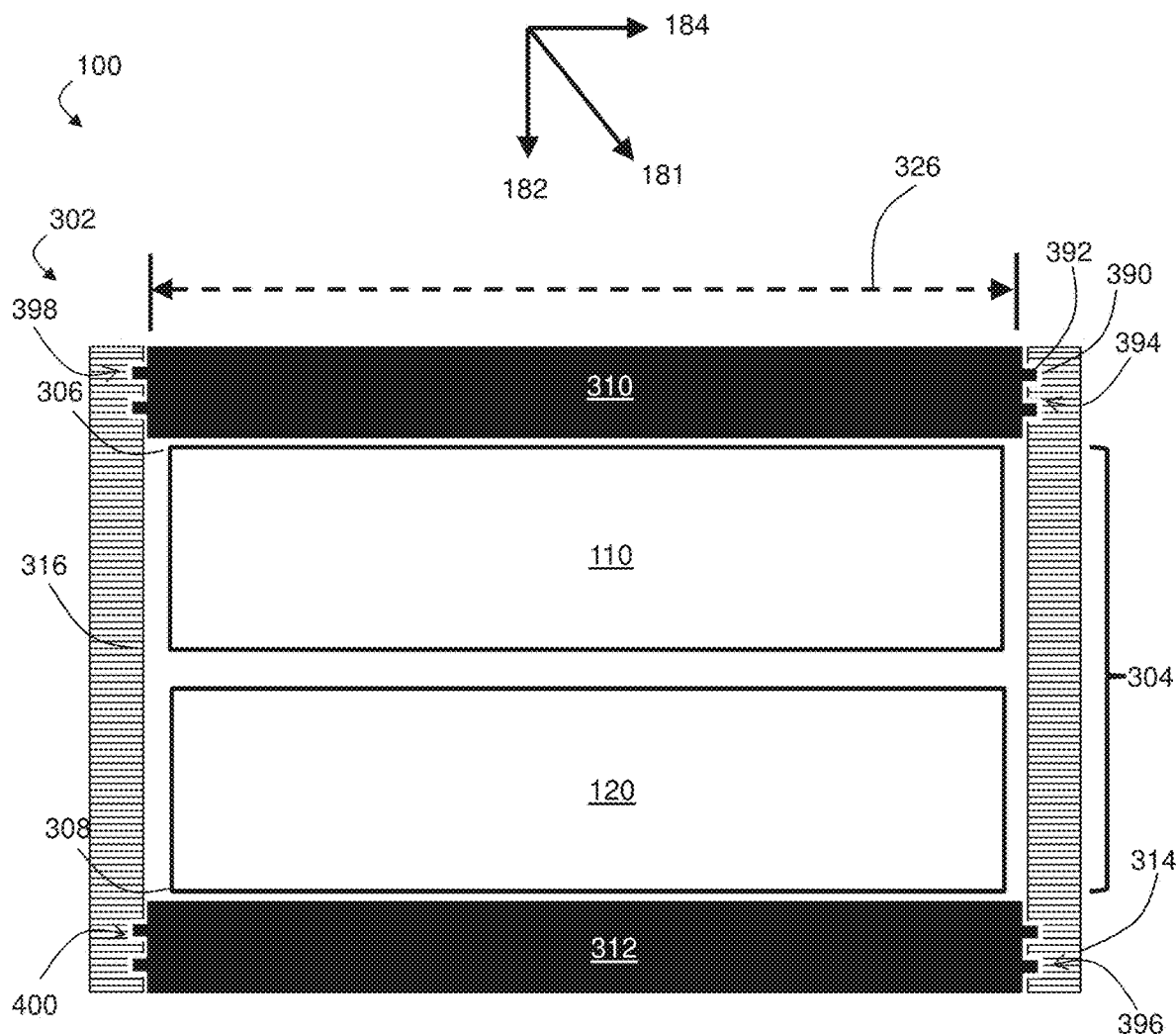
FIG. 10 shows a cross-sectional schematic diagram of an exemplary battery comprising a stack comprising electrochemical cells, and a housing that comprises a solid housing component joined to solid plates via mechanically interlocking features, according to some embodiments.

In some embodiments, the housing comprises a first solid plate covering at least a portion (e.g., at least 10%, at least 25%, at least 50%, at least 75%, at least 90%, at least 95%, or all) of the first end of the stack and a second solid plate covering at least a portion (e.g., at least 10%, at least 25%, at least 50%, at least 75%, at least 90%, at least 95%, or all) of the second end of the stack. In some such embodiments, a solid housing component possesses features that mechanically interlock with features along a lateral edge of the first solid plate to establish a joint. In some embodiments, the first solid housing component possesses features that mechanically interlock with features along a lateral edge of the second solid plate, establishing a second joint. In some embodiments, a second solid housing component possesses features that mechanically interlock with features along a lateral edge of the first plate and features along a lateral edge of the second plate to form a third joint and a fourth joint, respectively. Mechanically interlocking features may be designed to interlock in any of a variety of suitable ways, including, but not limited to, interdigitation of features, formation of woodworking joints (e.g. dovetail joints, Knapp joints, lap joints, box joints), or by a mechanical clipping mechanism. It has been realized that certain mechanically interlocking features may establish coupling while maintaining relatively small lateral profiles for the housing. For example, referring to the schematic cross-sectional illustration in FIG. 10, housing 302 of battery 100 comprises first solid plate 310 covering at least a portion of first end 306 of stack 304, as well as second solid plate 312 covering second end 308 of stack 304. First solid housing component 314 possesses features 390 that mechanically interlock with features 392 along lateral edges of first solid plate 310 to establish first joint 394 between first solid housing component 314 and first solid plate 310. Similar interlocking features establish second joint 396 between first solid housing component 314 and second solid plate 312, as well as third joint 398 between second solid housing component 314 and first solid plate 310 and fourth joint 400 between second solid housing component 314 and second solid plate 312. A housing of this type may, in some embodiments, decrease a largest lateral pressure-applying dimension of the housing relative to a housing comprising, for example, auxiliary fasteners coupling solid plates. In some embodiments, an adhesive further coupled the solid housing component and the solid plate (e.g., at interfaces between the mechanically interlocking features).

In some embodiments, the first solid housing component covers at least a portion (e.g., at least 10%, at least 25%, at least 50%, at least 75%, at least 90%, at least 95%, or all) of the first end of the stack and has a portion along at least some of the side of the stack. In some embodiments, a second solid housing component covers at least portion (e.g., at least 10%, at least 25%, at least 50%, at least 75%, at least 90%, at least 95%, or all) of the second end of the stack and has a portion along at least some of the side of the stack. In some embodiments, first solid housing component and the second solid housing component are each mechanically joined with at least one additional solid housing component (e.g., along a side of the stack). The at least one additional solid housing component may be coupled to the first solid housing component at a first region of overlap, and coupled to the second solid housing component at a second region of overlap. It has been realized that, in some embodiments, certain coupling techniques may establish coupling while maintaining relatively small lateral profiles for the housing. In some embodiments, the couplings between the solid housing components comprise welds, joints, and/or adhesives.

Figure 11:
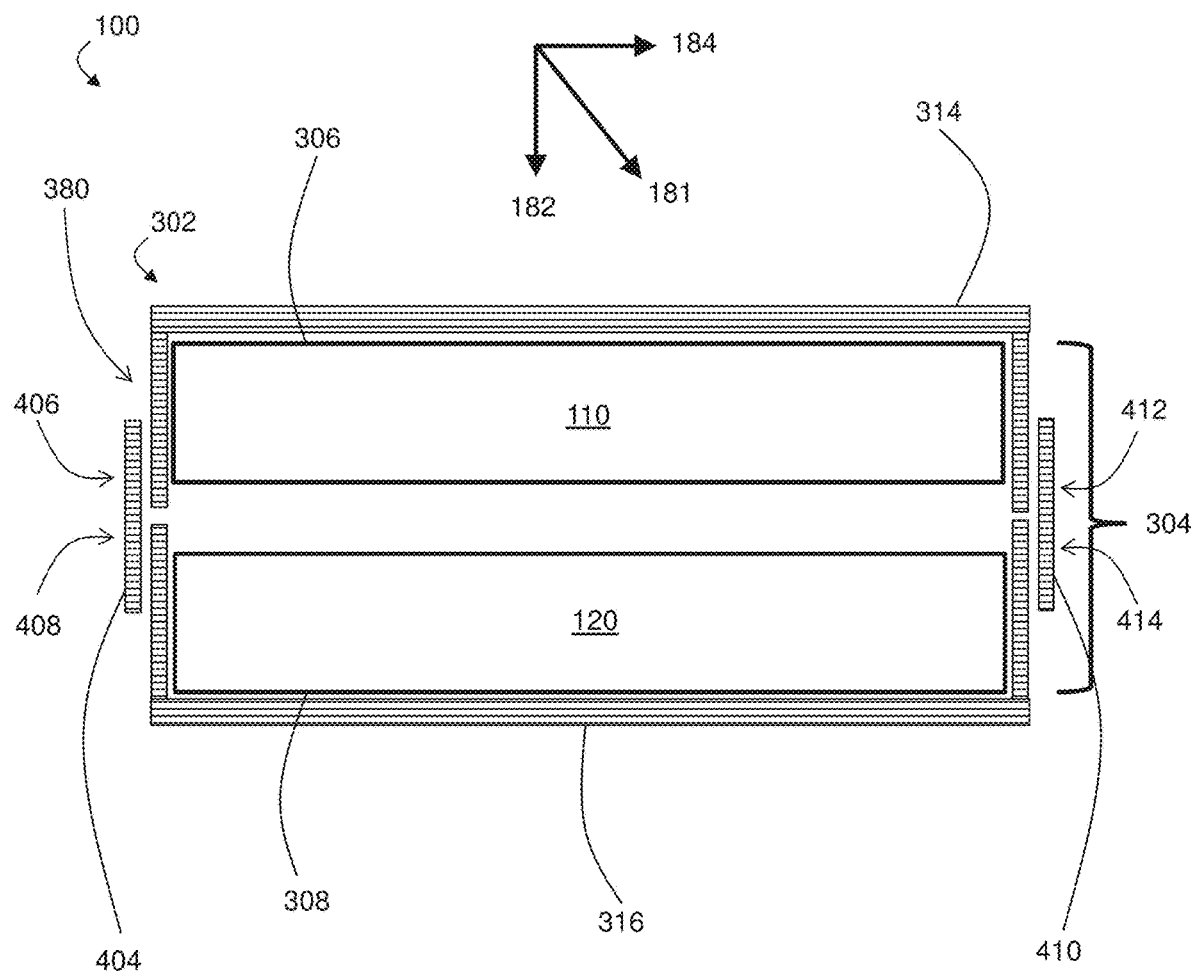
FIG. 11 shows a cross-sectional schematic diagram of an exemplary battery comprising a stack comprising electrochemical cells, and a housing that comprises solid housing components, according to some embodiments.

Referring to the cross-sectional schematic diagram in FIG. 11, first solid housing component 314 and second solid housing component 316 of housing 302 are coupled to additional solid housing component 404 of housing 302. First solid housing component 314 forms first region of overlap 406 with additional solid housing component 404, where the two housing components are mechanically joined (e.g., via a weld, an adhesive, friction, a fastener, etc.), in accordance with some embodiments. Second solid housing component 316 forms second region of overlap 408 with additional solid housing component 404, where the two housing components are mechanically joined (e.g., via a weld, an adhesive, friction, a fastener, etc.), in accordance with some embodiments. In some embodiments, such as the embodiment illustrated in FIG. 11, second additional housing component 410 may form third region of overlap 412 with first solid housing component 314 where the two solid housing components are mechanically joined, and may form fourth region of overlap 414 with second solid housing component 316 where the two solid housing components are mechanically joined, however embodiments with more or fewer additional housing components are also contemplated. A housing of this type may, in some embodiments, decrease a largest lateral pressure-applying dimension of the housing relative to a housing comprising, for example, auxiliary fasteners coupling solid plates.

Some embodiments comprise applying an external anisotropic force to a stack at least partially enclosed by a housing described above (e.g., with one or more solid housing components), the stack comprising a first electrochemical cell and a second electrochemical cell. As mentioned above, the external anisotropic force may have a component normal to a first electrode active surface of the first electrochemical cell and/or a second electrode active surface of the second electrochemical cell. The external anisotropic force may be applied via a pressure application device/system external to the battery (e.g., an external clamp, a hydraulic press, etc.), and may be applied, for example, during manufacture of a battery comprising the stack and the housing. The external anisotropic force may define a pressure of at least 10 kgf/cm$^2$, at least 12 kgf/cm$^2$, at least 20 kgf/cm$^2$, at least 25 kgf/cm$^2$ and/or up to 30 kgf/cm$^2$, up to 35 kgf/cm$^2$, up to 40 kgf/cm$^2$, or more. Some embodiments of such housings are described above.

In some embodiments, pressure on the stack is maintained via one or more components of the housing. For example, in some embodiments, a first solid housing component of the housing is attached during to a second, solid housing component during at least a portion of the step of applying the external anisotropic force. In some embodiments, a solid housing component is attached to a first solid plate covering at least a portion of a first end of the stack during at least a portion of the step of applying the external anisotropic force. In some such embodiments, the solid housing component is attached to a second solid plate covering at least a portion of a second end of the stack during at least a portion of the step of applying the external anisotropic force. In some embodiments, a first solid housing component is attached to a second discrete solid housing component during at least a portion of the step of applying the external anisotropic force by attaching the first solid housing component to one or more additional solid housing components that are attached to the second solid housing component.

In some embodiments, attaching the first solid housing component to the second solid housing component or to one or more additional solid housing comprises welding (e.g., laser welding) the first housing component and the second housing component together. In some embodiments, attaching the first solid housing component to the second solid housing component or to one or more additional solid housing comprises applying a fastener (e.g., a screw, a rivet, etc.) to the first housing component and the second housing component. In some embodiments, attaching the first solid housing component to the second solid housing component or to one or more additional solid housing comprises applying an adhesive to the first housing component and the second housing component, thereby forming an adhesive interaction. In some embodiments, attaching a solid housing component to the first solid plate and/or the second solid plate comprises establishing a joint by mechanically interlocking features of the solid housing component and a lateral edge of the first solid plate and/or second solid plate.

Subsequently, some embodiments include removing the applied external anisotropic force while maintaining, via tension in the attached first solid housing component and the second solid housing component, an anisotropic force having a component normal to the first electrode active surface and/or the second electrode active surface. The anisotropic force may have a component normal to the first electrode active surface of the first electrochemical cell of the stack and/or the second electrode active surface of the second electrochemical cell of the stack. As above, the anisotropic force may define a pressure of at least 10 kgf/cm$^2$, at least 12 kgf/cm$^2$, at least 20 kgf/cm$^2$, at least 25 kgf/cm$^2$ and/or up to 30 kgf/cm$^2$, up to 35 kgf/cm$^2$, up to 40 kgf/cm$^2$, or more. It has been realized that by applying an initial force the stack and subsequently establishing tension in one or more parts of the housing (e.g., a solid housing component and/or a solid plate), relatively high pressures may be established in the stack at a point of manufacture within a substantially fixed housing. Some such configurations may reduce a number of parts required for the overall battery, e.g., by avoiding use of tension in auxiliary fasteners (e.g., with separate screws or threaded rods, nuts, washers, etc.). A reduction in number of parts and/or fasteners in the housing may promote an overall reduction in housing and/or battery volume, which may be desirable in some applications.

In some embodiments, the solid housing component (e.g., a first solid housing component, a second solid housing component) comprises a solid sheet. It should be understood that in this context a solid sheet refers generally to an overall shape and aspect ratio of an object. A solid sheet need not be completely flat or completely planar to be considered a solid sheet. For example, a solid sheet can have surfaces forming an angle, such as solid housing object 314 in FIG. 9. In some embodiments, the solid housing component has a relatively large aspect ratio in terms of its lateral dimensions versus its thickness dimension. In some embodiments, a ratio of at least one (or all) lateral dimensions of the solid housing component to the thickness of the solid housing component is greater than or equal to 1.5, greater than or equal to 2, greater than or equal to 5, greater than or equal to 10, greater than or equal to 20, greater than or equal to 50, greater than or equal to 100, greater than or equal to 500, and/or up to 1000, up to 5000, or greater. In some embodiments, the solid housing component (e.g., comprising a solid sheet) has a relatively small thickness. Having a relatively small thickness (e.g., compared thickness of other components of the battery such as the electrochemical cells, solid plates when present, etc.) may contribute to the housing having a relatively small lateral profile, which may promote overall small volumes for the battery. In some embodiments, the solid housing component (e.g., comprising a solid sheet) has a thickness of less than or equal to 5 mm, less than or equal to 2 mm, less than or equal to 1 mm, less than or equal to 500 microns, and/or as low as 200 microns or less. In some embodiments, the solid housing component (e.g., first solid housing component, second solid housing component) comprises a metal and/or metal alloy sheet, such as an aluminum (e.g., aluminum metal) sheet.

Figure 12:
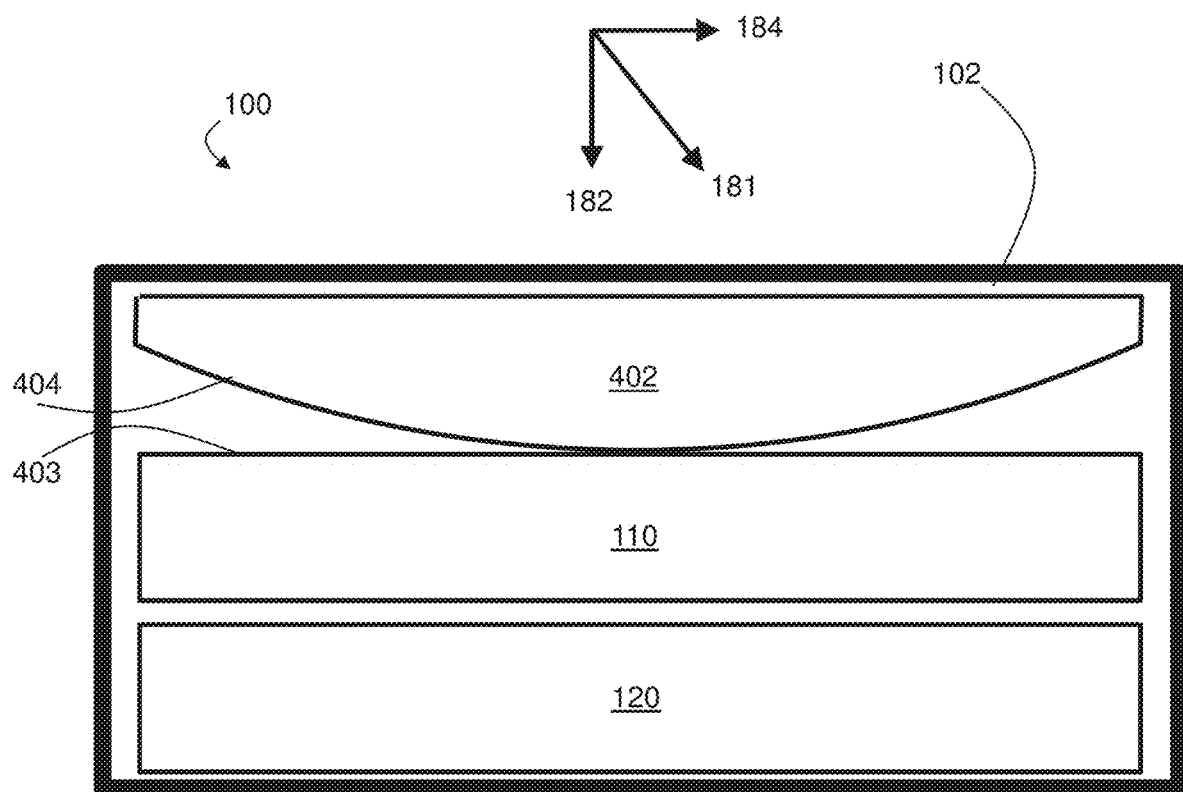
FIG. 12 shows a cross-sectional schematic diagram of an exemplary battery comprising a stack comprising electrochemical cells, a contoured solid article portion, and a housing, according to some embodiments.

In some embodiments, the battery further comprises a contoured solid article portion between a lateral exterior surface of the first electrochemical cell and a portion of the housing. The contoured solid article portion may comprise a surface adjacent (e.g., directly adjacent or indirectly adjacent) to the lateral exterior surface of the first electrochemical cell that is convex with respect to the lateral exterior surface in the absence of an applied force. In some embodiments, under at least one magnitude of applied force, the surface of the contoured solid article portion becomes less convex. Referring to the cross-sectional schematic diagram of battery in FIG. 12, battery 100 may comprise contoured solid article portion 402 between lateral exterior surface 403 of electrochemical cell 110 and a portion of housing 102, in accordance with certain embodiments. Surface 404 of contoured solid article portion 402, which is adjacent to lateral exterior surface 403, is convex with respect to lateral exterior surface 403 in the absence of an applied force. In some embodiments, the contoured solid article portion is a discrete article with respect to the housing. The contoured solid article portion may be between the lateral exterior surface of the first electrochemical cell and, for example, a solid plate of the housing and/or a solid housing component described above.

In some embodiments, under at least one magnitude of applied force, the surface of the contoured solid article portion becomes less convex. Such a change in convexity may be caused by force-induced deformation of the contoured solid article portion. For example, during application of at least one magnitude of an anisotropic force having a component normal to an active surface of an electrode of the first electrochemical cell, the surface of the contoured solid article portion may become less convex.

As would be understood by one of ordinary skill in the art, a solid surface that has a given shape "in the absence of an applied force" is one that, when all external forces are removed from the object comprising that surface, always assumes that particular shape. Accordingly, a surface that has a convex shape in the absence of an applied force is one that always assumes a convex shape when all external forces are removed from the object comprising that surface. Generally, a first surface is convex with respect to a second surface when the first surface curves away from the second surface. It should be understood that portions of surfaces being convex with respect to other surfaces refers to the external geometric surface of the portion. An external geometric surface of an object refers to the surface defining the outer boundaries of the object when analyzed on substantially the same scale as the maximum cross-sectional dimension of the object. Generally, the external geometric surface of an object does not include the internal surfaces, such as the surface defined by pores within a porous object.

It has been observed in the context of this disclosure that the presence of a contoured solid article portion can promote a desired pressure distribution experienced by one or more (or all) of the active surfaces of the electrochemical cells of the battery. For example, in some cases, a uniform pressure distribution is achieved. Such desired pressure distributions can, in some cases, lead to improved performance of the battery. The deformation of the contoured solid article portion (e.g., to become less convex) under applied force may, in some instances, reduce potentially deleterious effects in pressure distribution caused by deformation (e.g., deflection) of portions of the housing (e.g., solid plates) during application of pressure. Further description of contoured surfaces and related devices and methods is provided in International Application No. PCT/US2020/038375, filed on Jun. 18, 2020, and entitled "Methods, Systems, and Devices for Applying Forces to Electrochemical Devices," which is incorporated herein by reference in its entirety.

In some embodiments, the contoured solid article portion (e.g., that is part of a device configured to apply a force to an electrochemical device) comprises any suitable solid material. In some embodiments, the contoured solid article portion is or comprises a metal, metal alloy, composite material, or a combination thereof. In some cases, the metal that the contoured solid article portion is or comprises is a transition metal. For example, in some embodiments, the contoured solid article portion is or comprises Ti, Cr, Mn, Fe, Co, Ni, Cu, or a combination thereof. In some embodiments, the contoured solid article portion is or comprises a non-transition metal. For example, in some embodiments, the contoured solid article portion is or comprises Al, Zn, or combinations thereof. Exemplary metal alloys that the contoured solid article portion can be or comprise include alloys of aluminum, alloys of iron (e.g., stainless steel), or combinations thereof. Exemplary composite materials that the contoured solid article portion can be or comprise include, but are not limited to, reinforced polymeric, metallic, or ceramic materials (e.g., fiber-reinforced composite materials), carbon-containing composites, or combinations thereof.

In some embodiments, the contoured solid article portion comprising the solid surface (e.g., convex surface) comprises a polymeric material (e.g., an organic polymeric material). In some such embodiments, the contoured solid article portion comprises a polymeric material (e.g., an organic polymeric material) in an amount of greater than or equal to 25 weight percent (wt %), greater than or equal to 50 wt %, greater than or equal to 75 wt %, greater than or equal to 90 wt %, greater than or equal to 95 wt %, greater than or equal to 99 wt %, or up to 100 wt %. Example of suitable polymeric materials include, but are not limited to, acrylonitrile butadiene styrene, polylactic acid, polyamide, polyether ether ketone, Nylon, polycarbonate, polyetherimide resin, or combinations thereof. A contoured solid article portion comprising a polymeric material may be relatively inexpensive to fabricate and may deform relatively easily compared to other types of materials.

The contoured solid article portion may have any of a variety of suitable elastic moduli. The elastic modulus of the contoured solid article portion may be high enough such that it can adequately hold its shape. In some embodiments, the contoured solid article portion has an elastic modulus of greater than or equal to 10 MPa, greater than or equal to 50 MPa, greater than or equal to 100 MPa, greater than or equal to 200 MPa, greater than or equal to 500 MPa, greater than or equal to 1 GPa, greater than or equal to 2 GPa, greater than or equal to 5 GPa, greater than or equal to 10 GPa, greater than or equal to 20 GPa, greater than or equal to 50 GPa, greater than or equal to 100 GPa, greater than or equal to 200 GPa, or greater. In some embodiments, the contoured solid article portion comprising the solid surface has an elastic modulus of less than or equal to 800 GPa, less than or equal to 760 GPa, less than or equal to 500 GPa, less than or equal to 400 GPa, less than or equal to 300 GPa, less than or equal to 250 GPa, less than or equal to 200 GPa, less than or equal to 150 GPa, less than or equal to 100 GPa, less than or equal to 75 GPa, less than or equal to 50 GPa, less than or equal to 25 GPa, less than or equal to 10 GPa, less than or equal to 5 GPa, or lower). Combinations of these ranges are possible (e.g., greater than or equal to 10 MPa and less than or equal to 800 GPa, greater than or equal to 1 GPa and less than or equal to 250 GPa). Materials having a low elastic modulus tend to deform under a given load more than materials having a high elastic modulus.

Figure 13A:
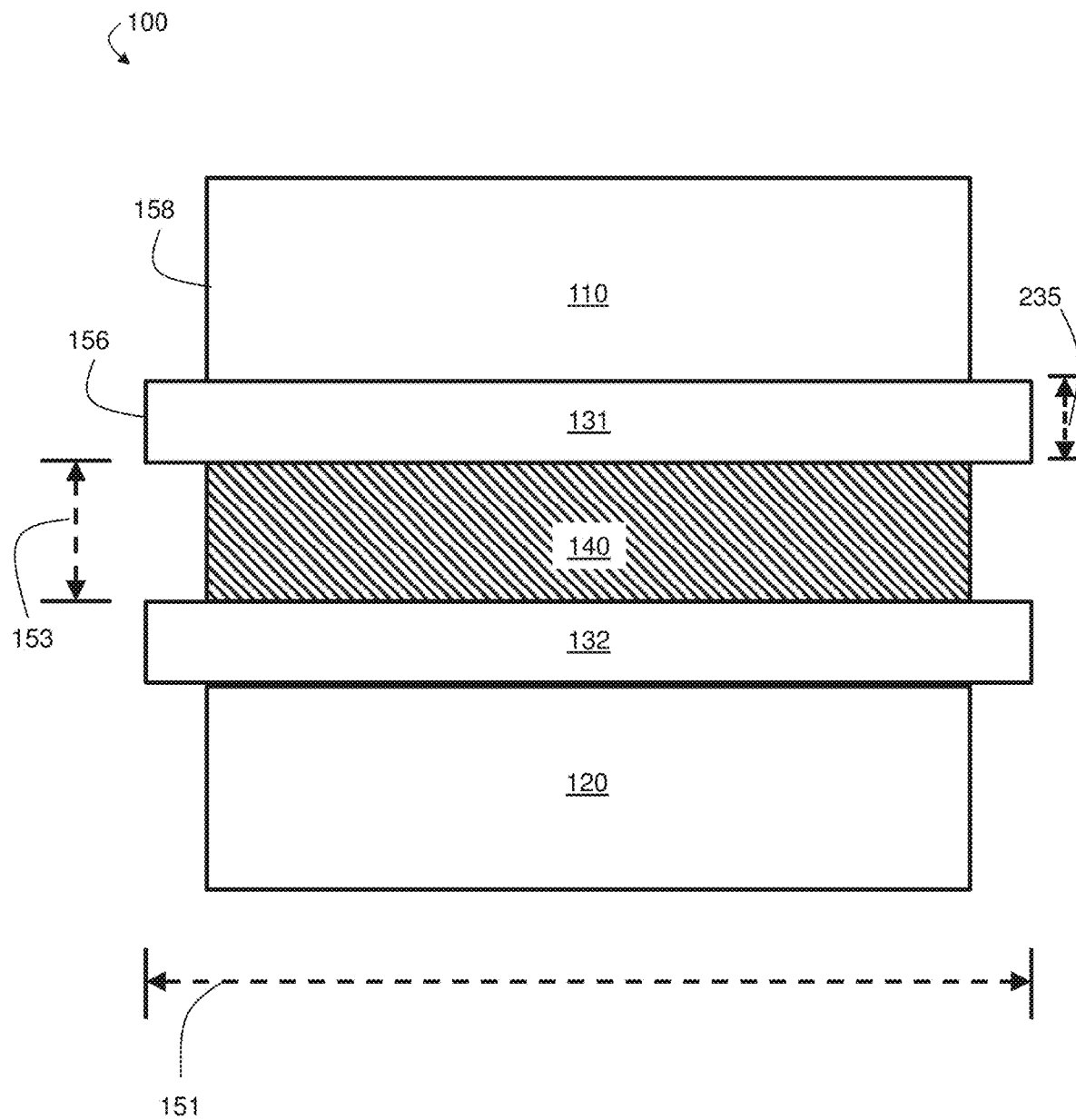
FIGS. 13A-13B show cross-sectional schematic diagrams of exemplary stacks comprising electrochemical cells, thermally conductive solid article portions, and a thermally insulating compressible solid article portion, according to some embodiments.
Figure 13B:
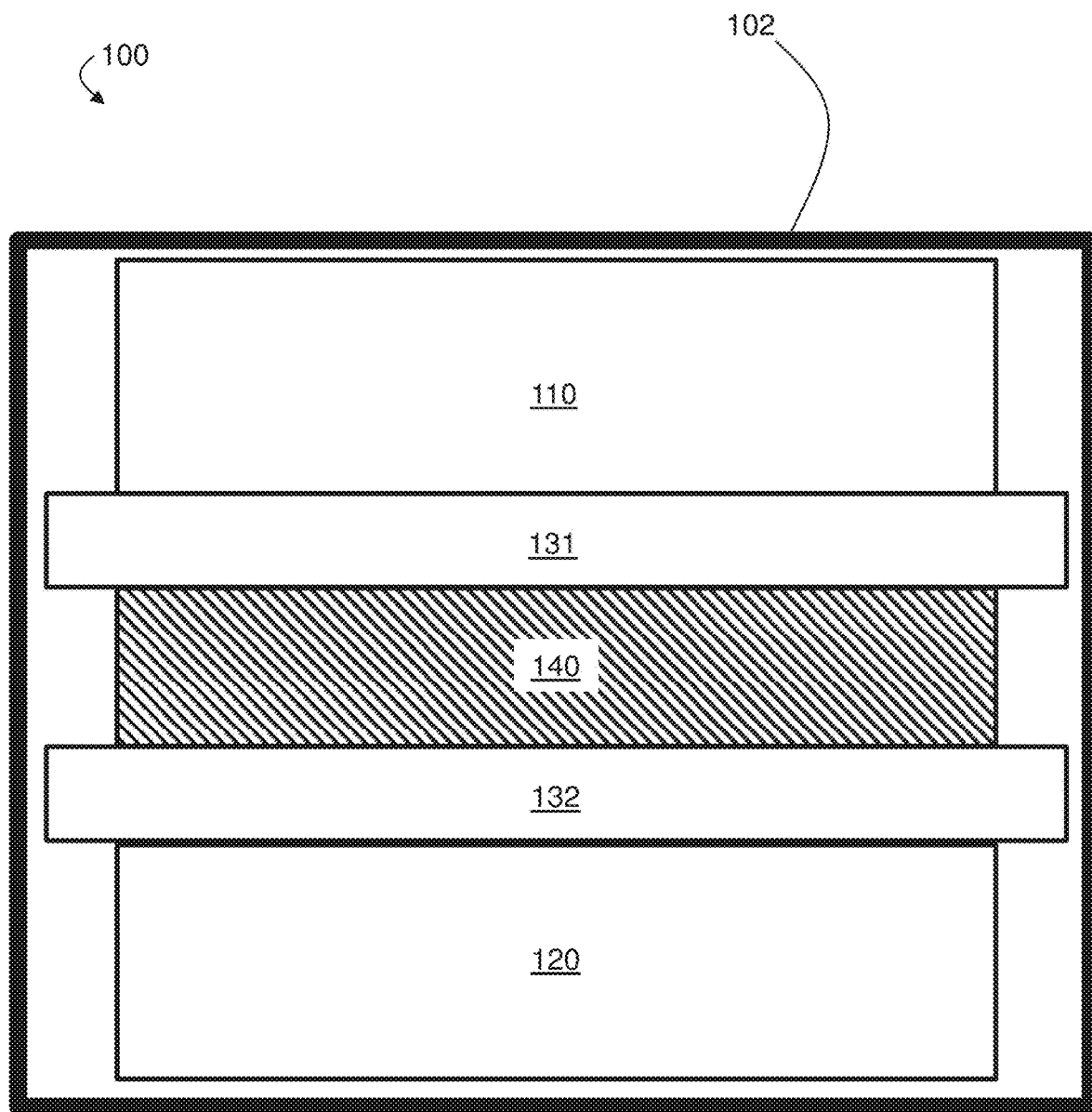

As mentioned above, the battery may comprise components having a potentially advantageous arrangement (e.g., for thermal management). For example, in some embodiments, a multicomponent stack is described comprising electrochemical cells, thermally conductive solid article portions, and thermally insulating compressible solid article portions. The multicomponent stack or stack of electrochemical cells may be part of a battery described herein. In some embodiments, a multicomponent stack comprises the following in the order listed: a first electrochemical cell; a first thermally conductive solid article portion; a thermally insulating compressible solid article portion; a second thermally conductive solid article portion; and a second electrochemical cell. For example, referring to FIG. 13A, battery 100 comprises a multicomponent stack comprising first electrochemical cell 110, first thermally conductive solid article portion 131, thermally insulating compressible solid article portion 140, second thermally conductive solid article portion 132, and second electrochemical cell 120. This arrangement of thermally conductive and thermally insulating components may facilitate relatively rapid transfer of heat away from electrochemical cells in the stack while mitigating thermal transfer between electrochemical cells of the stack. For example, battery 100 may have a relatively low rate of thermal transfer in thickness direction 153 shown in FIG. 13A, while at least a portion of battery 100 may have a relatively high rate of thermal transfer in lateral direction 151 as shown in FIG. 13A. Additionally, having one or more of the components be compressible may assist with mitigating expansion of the battery, e.g., during cumulative expansion of electrochemical cells during cycling. The stack may be at least partially enclosed by a housing. For example, battery 100 may be at least partially enclosed by optional housing 102 in FIG. 13B. In some, but not necessarily all embodiments, there are no intervening layers or components between these articles. For example, in some embodiments, the first electrochemical cell is directly adjacent to the first thermally conductive solid article portion, the first thermally conductive solid article portion is directly adjacent to the thermally insulating compressible solid article portion, the thermally insulating compressible solid article portion is directly adjacent to the second thermally conductive solid article portion, and the second thermally conductive solid article portion is directly adjacent to the second electrochemical cell. However, in other embodiments, intervening articles or layers may be present, such as sensors (e.g., pressure sensors, temperature sensors, etc.). In some embodiments, at least one lateral edge of the thermally conductive solid article portion extends past a lateral edge of the first electrochemical cell. For example, in FIG. 13A lateral edge 156 of first thermally conductive solid article portion 131 extends past lateral edge 158 of first electrochemical cell 110, in accordance with certain embodiments. This may facilitate removal of heat from the electrochemical cells.

Figure 14A:
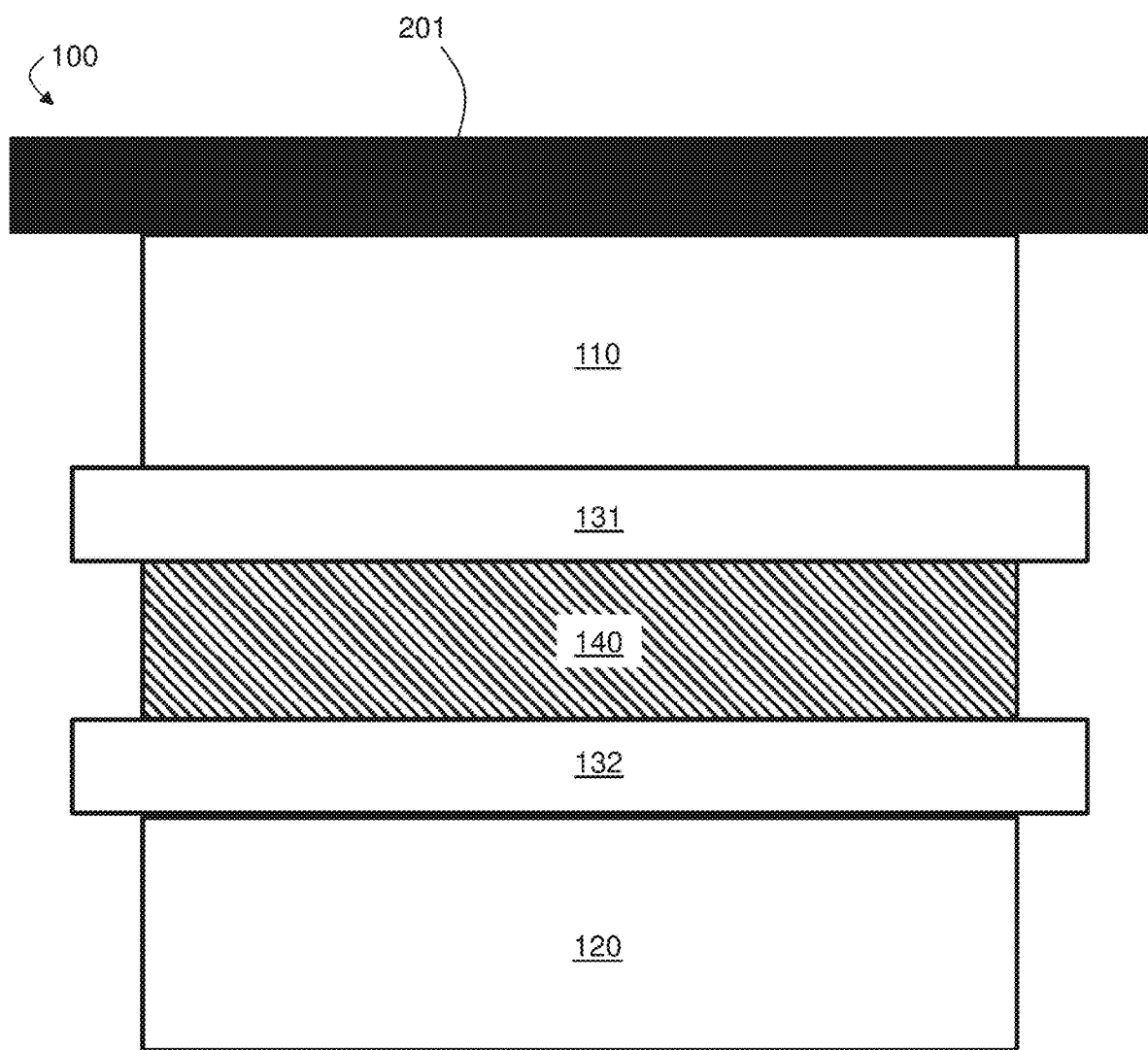
FIGS. 14A-14B show cross-sectional schematic diagrams of exemplary stacks comprising electrochemical cells, thermally conductive solid article portions, a thermally insulating compressible solid article portion, and a solid plate in the absence and presence of an anisotropic force, respectively, according to some embodiments.
Figure 14B:
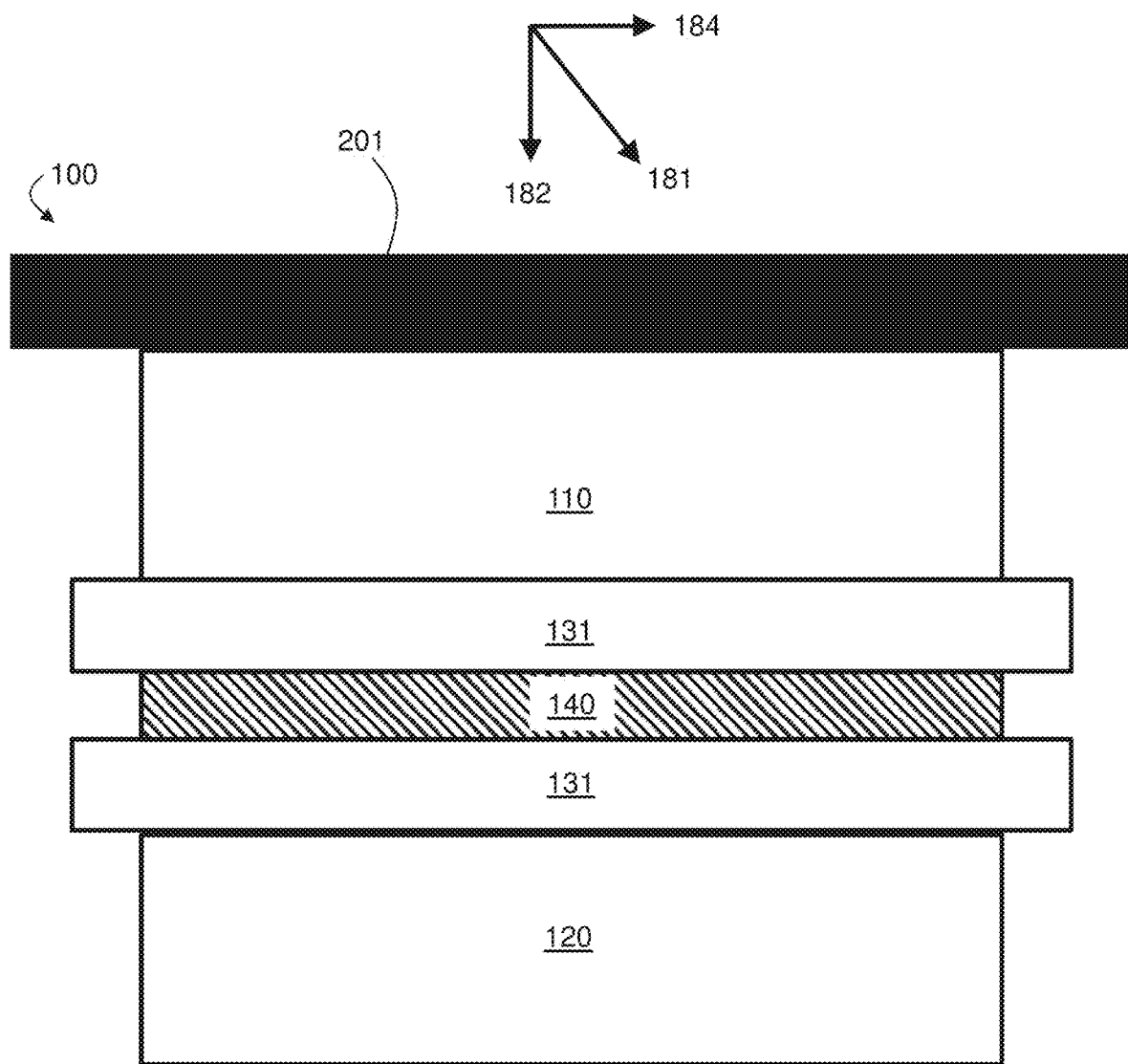

As mentioned above, some embodiments may comprise application of an anisotropic force (e.g., via a solid plate). FIGS. 14A-14B show one such embodiment, where anisotropic force 181 is applied via first solid plate 201 (see FIG. 14B). FIG. 14B illustrates how in some embodiments, the application of such a force causes thermally insulating compressible solid article portion 140 to compress.

In some embodiments, the battery comprises thermally conductive solid article portions. For example, referring back to FIGS. 13A-13B, battery 100 comprises first thermally conductive solid article portion 131 and second thermally conductive solid article portion 132. As mentioned above, the thermally conductive solid article portions may promote heat transfer away from components of the battery (e.g., the electrochemical cells) while also facilitating alignment of electrochemical active regions of the electrochemical cells. In some, but not necessarily all, cases thermally conductive solid article portions are in direct contact with the electrochemical cells. For example, in FIGS. 13A-13B, first thermally conductive solid article portion 131 is shown as being in direct contact with first electrochemical cell 110. However, direct contact is not required, and in some embodiments, there are one or more intervening components (e.g., sensors, etc.) between the thermally conductive solid article portions and the electrochemical cells.

In some embodiments, the thermally conductive solid article portion of the battery has a relatively high effective thermal conductivity. As mentioned above, such a high effective thermal conductivity may allow the thermally conductive solid article to assist with dissipating heat from one or more electrochemical cells of the battery. Thermal conductivity is generally understood to be an intrinsic property of a material related to its ability to conduct heat. Thermal conductivity is a temperature-dependent quantity and is typically reported in units of W m$^{-1}$ K$^{-1}$. The effective thermal conductivity of an article generally refers to the ability of an article to conduct heat, taking into account that the article may be made of a single material or may a non-homogeneous material that may be made of a combination of materials (e.g., a composite material such as a particulate material or layered material). An exemplary method for measuring the thermal conductivity or effective thermal conductivity of a thermally insulating compressible solid article portion is using a hot disk method, as described in ISO/DIS 22007-2.2.

In some embodiments, a thermally conductive solid article portion (e.g., first thermally conductive solid article portion, second thermally conductive solid article portion) has a relatively high effective thermal conductivity in an in-plane direction. Referring again to FIG. 13A, for example, first thermally conductive solid article portion 131 and/or second thermally conductive solid article portion 132 may have a high effective thermal conductivity in lateral direction 151, which is parallel to the in-plane directions of first thermally conductive solid article portion 131 and/or second thermally conductive solid article portion 132. As a result, first thermally conductive solid article portion 131 and/or second thermally conductive solid article portion 132 may enhance the rate at which heat conducted from first electrochemical cell 110 and/or second electrochemical cell 120 is then transferred away (in a lateral direction) from first electrochemical cell 110 and/or second electrochemical cell 120, according to certain embodiments. A resulting accelerated rate of cooling of the electrochemical cells may occur, and in combination with a reduced extent of heat transfer in the thickness direction can, in some instances, improve the safety and performance of the battery (e.g., by reducing thermal propagation). In some embodiments, a thermally conductive solid article portion (e.g., first thermally conductive solid article portion, second thermally conductive solid article portion) has an effective thermal conductivity of greater than or equal to 10 W m$^{-1}$ K$^{-1}$, greater than or equal to 25 W m$^{-1}$ K$^{-1}$, greater than or equal to 50 W m$^{-1}$ K$^{-1}$, greater than or equal to 65 W m$^{-1}$ K$^{-1}$, greater than or equal to 80 W m$^{-1}$ K$^{-1}$, greater than or equal to 100 W m$^{-1}$ K$^{-1}$, greater than or equal to 150 W m$^{-1}$ K$^{-1}$, and/or up to 159 W m$^{-1}$ K$^{-1}$, up to 200 W m$^{-1}$ K$^{-1}$, or greater in an in-plane direction at a temperature of 25° C. For example a thermally conductive solid article portion (e.g., first thermally conductive solid article portion, second thermally conductive solid article portion) may be made of aluminum and have an effective thermal conductivity of 159 W m$^{-1}$ K$^{-1}$ in an in-plane direction at a temperature of 25° C. The thermally conductive solid article portion (e.g., first thermally conductive solid article portion, second thermally conductive solid article portion) may comprise any of a variety of suitable materials. In some embodiments, a thermally conductive solid article portion (e.g., first thermally conductive solid article portion, second thermally conductive solid article portion) comprises a metal and/or metal alloy. Exemplary metals include, but are not limited to transition metals (e.g., titanium, manganese, iron, nickel, copper, zinc), non-transition metals (e.g., aluminum), and alloys or other combinations thereof. In certain embodiments, a thermally conductive solid article portion (e.g., first thermally conductive solid article portion, second thermally conductive solid article portion) comprises or is made of aluminum, at least because aluminum has a relatively high effective thermal conductivity and a relatively low mass density, which in some cases contributes to an overall high specific energy density for the battery. One exemplary type of aluminum material of which a thermally conductive solid article portion may be made is 3003 H14 series aluminum, which is aluminum alloyed with 1.2% manganese to increase strength. In some embodiments, a relatively high percentage (e.g., greater than or equal to 50 weight percent (wt %), greater than or equal to 75 wt %, greater than or equal to 90 wt %, greater than or equal to 95 wt %, greater than or equal to 99 wt %, or more) of the thermally conductive solid article portion is metal and/or metal alloy.

In some embodiments, the thermally conductive solid article portion comprises or is made of a carbon-based material. Suitable carbon-based materials include, but are not limited to, graphite, carbon-fiber, graphene (e.g., as part of thermally conductive solid article comprising a solid substrate and associated with graphene), and combinations thereof. In some embodiments, the carbon-based material is present in a relatively high percentage (e.g., greater than or equal to 50 wt %, greater than or equal to 75 wt %, greater than or equal to 90 wt %, greater than or equal to 95 wt %, greater than or equal to 99 wt %, or more) of the thermally conductive solid article portion. In some embodiments, a carbon-based material of a thermally conductive solid article portion has graphite, carbon-fiber, graphene, or a combination thereof present in an amount of at least 25 wt %, at least 50 wt %, at least 75 wt %, at least 90 wt %, at least 95 wt %, at least 99 wt %, or 100 wt %.

The thermally conductive solid article portion (e.g., first thermally conductive solid article portion, second thermally conductive solid article portion) may have any of a variety of form factors. In some embodiments, the thermally conductive solid article portion (e.g., first thermally conductive solid article portion, second thermally conductive solid article portion) is in the form of a relatively planar object (notwithstanding the non-planarities and/or alignment features described below). For example, the thermally conductive solid article portion (e.g., first thermally conductive solid article portion, second thermally conductive solid article portion) may be in the form of a sheet (e.g., a metal and/or metal alloy sheet). In some embodiments, the thermally conductive solid article portion (e.g., first thermally conductive solid article portion, second thermally conductive solid article portion) is or comprises a fin (e.g., a metal and/or metal alloy fin). In some embodiments, the thermally conductive solid article portion (e.g., first thermally conductive solid article portion, second thermally conductive solid article portion) is or comprises a solid plate. It should be understood that the surfaces of a sheet, fin, or solid plate do not necessarily need to be flat. For example, one of the sides of a sheet, fin, or solid plate could have any of the non-planarities and/or alignment features described herein.

The thermally conductive solid article portion (e.g., first thermally conductive solid article portion, second thermally conductive solid article portion) may have a thickness as well as two orthogonal lateral dimensions that are orthogonal to each other as well as orthogonal to the thickness. For example, referring to FIG. 13A, first thermally conductive solid article portion 131 has maximum thickness 235, lateral dimension 151, and a second lateral dimension (not pictured) orthogonal to both maximum thickness 235 and lateral dimension 151 (which would run into and out of the plane of the drawing in FIG. 13A).

The dimensions of the thermally conductive solid article portion may be chosen based on any of a variety of considerations. For example, the thickness or lateral dimensions may be chosen based on the desired total size of the battery and/or a desired pack burden. In some embodiments, one or more lateral dimensions of the thermally conductive solid article portion is such that heat generated by the electrochemical cells, once conducted to the thermally conductive solid article portions, can be transferred a relatively long distance from the electrochemical active regions of the electrochemical cells. In some embodiments, the thermally conductive solid article portion has one or more lateral dimensions that extends at least 1 mm, at least 2 mm, at least 5 mm, at least 1 cm, at least 2 cm, at least 5 cm, and/or up to 10 cm or more past the electrochemical active region of the electrochemical cell coupled to the thermally conductive solid article portion.

In some embodiments, the thermally conductive solid article portion (e.g., first thermally conductive solid article portion, second thermally conductive solid article portion) has at least one lateral dimension that is at least 5 times, at least 10 times, and/or up to 20 times, up to 50 times, up to 100 times or more greater than the maximum thickness of the thermally conductive solid article portion.

In some embodiments, the battery comprises a thermally insulating compressible solid article portion. The thermally insulating compressible solid article portion may be between two electrochemical cells of the battery. For example, referring back to FIGS. 13A-13B, battery 100 comprises thermally insulating compressible solid article portion 140 between first electrochemical cell 110 and second electrochemical cell 120, according to certain embodiments. A more detailed description of exemplary thermally insulating compressible solid article portions is described below.

Figure 15:
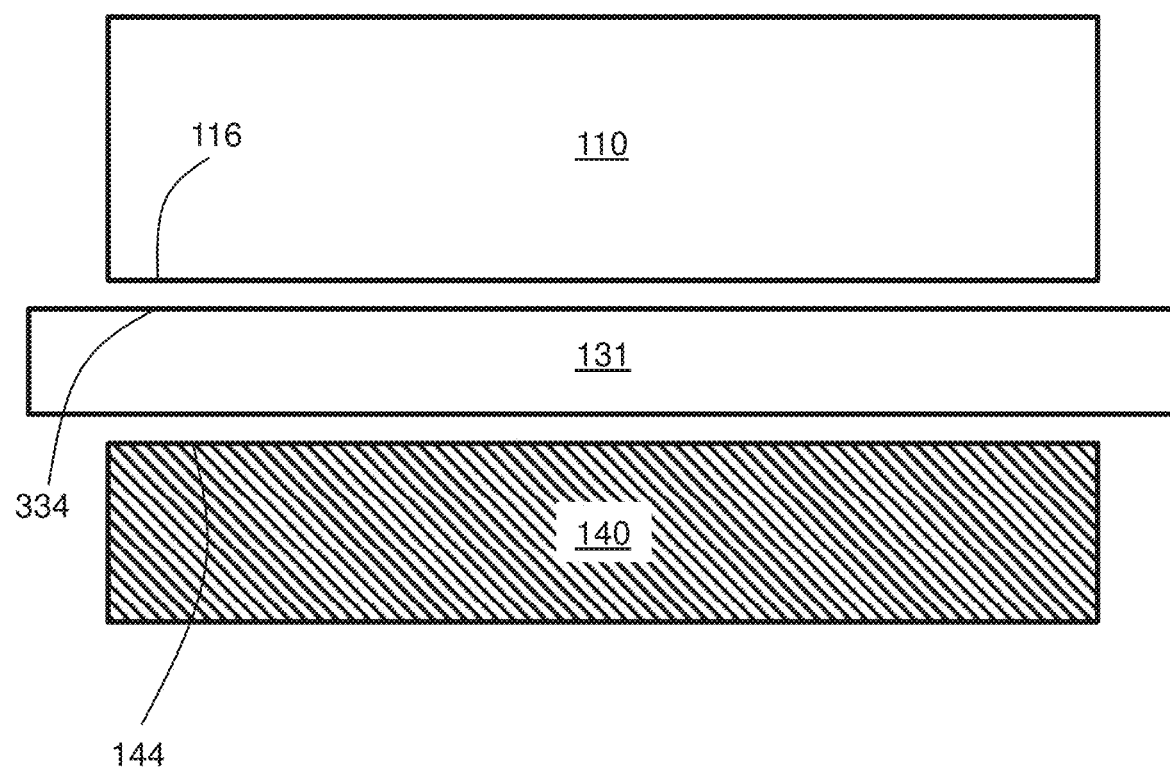
FIG. 15 shows a cross-sectional schematic diagram of an exemplary stack comprising an electrochemical cell, thermally conductive solid article portion, and a thermally insulating compressible solid article portion, according to some embodiments.

In some embodiments, the thermally conductive solid article portion is relatively smooth as compared to the thermally insulating compressible solid article portion. This may, in some cases, be advantageous, because, under high magnitudes of force, surface irregularities in certain types of thermally insulating compressible solid article portions (e.g., microcellular foams) may cause non-uniform pressure distributions on the electrode active surfaces of the battery. A relatively smooth thermally conductive solid article portion (e.g., a metal sheet) may, comparatively, have few irregularities and "smooth" out the pressure distribution. As one example, in FIG. 15, surface 144 of thermally insulating compressible solid article portion 140 may be relatively rough (e.g., have a relatively high surface roughness), while surface 334 of first thermally conductive solid article portion 131 may be relatively smooth (e.g., have a relatively low surface roughness), thereby mitigating irregularities in pressure distribution to surface 116 of first electrochemical cell 110. In some embodiments, the thermally conductive solid article portion has a surface facing a surface of the first electrochemical device having a surface roughness of less than or equal to 10 micrometers, less than or equal to 5 micrometers, less than or equal to 1 micrometer, less than or equal to 0.5 micrometers, less than or equal to 0.1 micrometers, less than or equal to 0.05 micrometers, less than or equal to 0.01 micrometers, or less. In some embodiments, the thermally conductive solid article portion has a surface facing a surface of the first electrochemical device having a surface roughness as low as 0.005 micrometers. That is to say, in some embodiments, the thermally conductive solid article portion has a surface having a surface roughness as low as 0.005 micrometers, with that surface facing a surface of the first electrochemical device.

Figure 16:
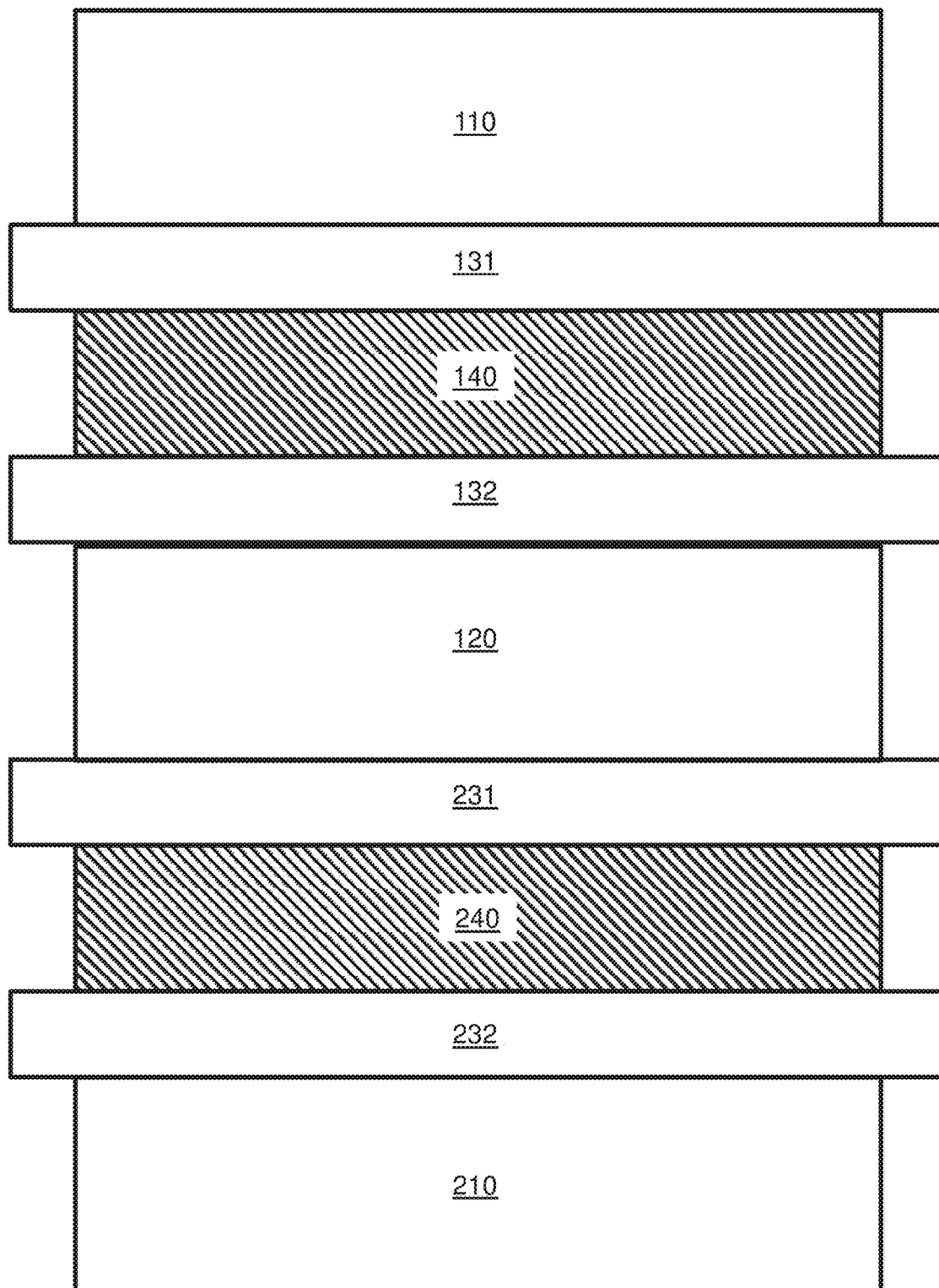
FIG. 16 shows a cross-sectional schematic diagram of an exemplary stack comprising electrochemical cells, thermally conductive solid article portions, and thermally insulating compressible solid article portions, according to some embodiments.

In some embodiments, the arrangement of components of the battery may be repeated. For example, in FIG. 16, battery 400 comprises first electrochemical cell 110, first thermally conductive solid article portion 131, first thermally insulating compressible solid article portion 140, second thermally conductive solid article portion 132, second electrochemical cell 120, third thermally conductive solid article portion 231, second thermally insulating compressible solid article portion 240, fourth thermally conductive solid article portion 232, and third electrochemical cell 210.

Figure 17:
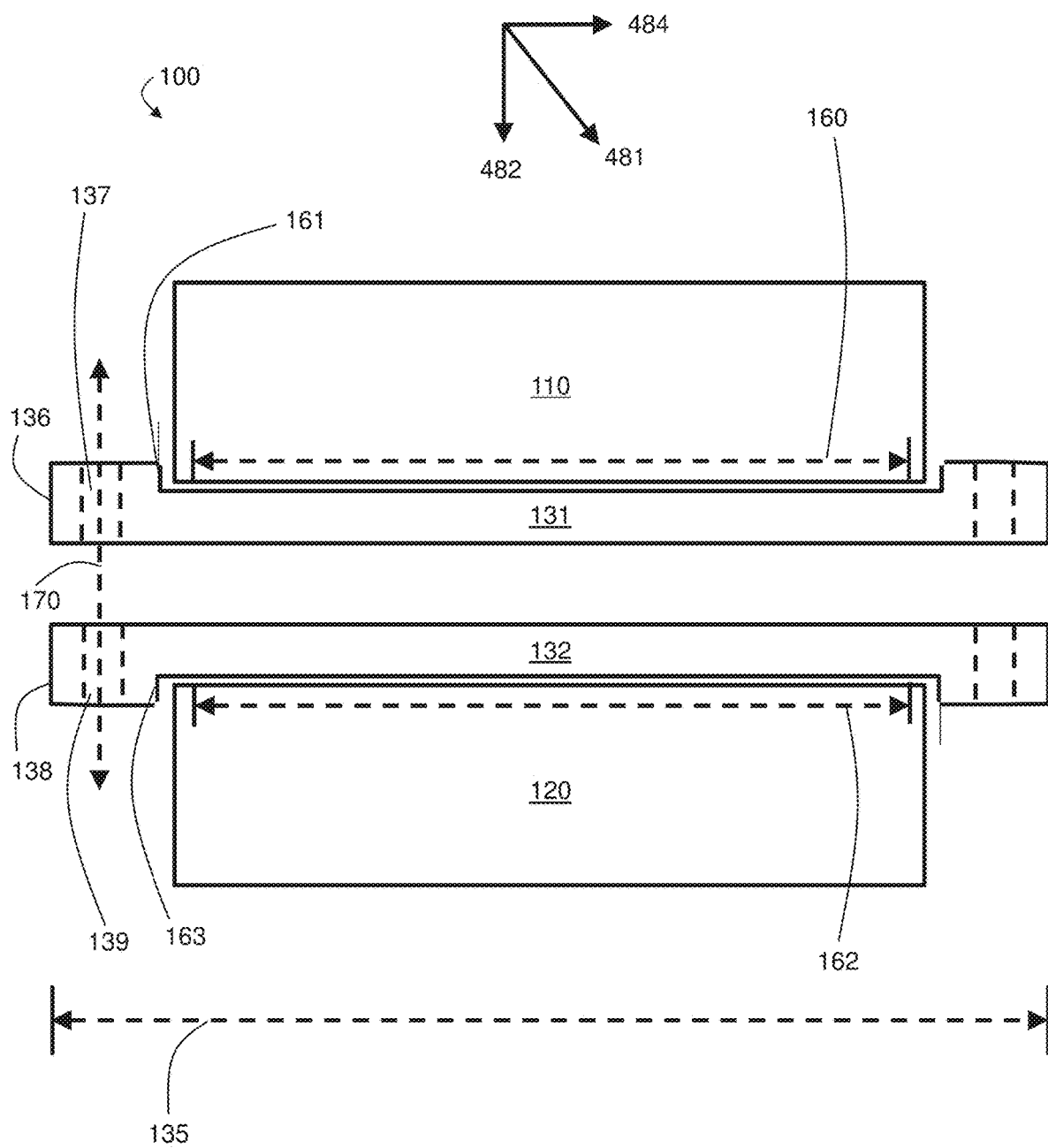
FIG. 17 shows a cross-sectional schematic diagram of an exemplary battery comprising electrochemical cells and thermally conductive solid article portions comprising alignment features, according to some embodiments.

In certain aspects, batteries with components that may facilitate alignment of electrochemical active areas are generally described. FIG. 17 is a schematic diagram of a non-limiting embodiment of battery 100. Battery 100 in FIG. 1 comprises first electrochemical cell 110 and second electrochemical cell 120 as part of a stack with first thermally conductive solid article portion 131 and second thermally conductive solid article portion 132, in accordance with certain embodiments. The thermally conductive solid article portions may comprise alignment features, as described in more detail below.

Figure 18:
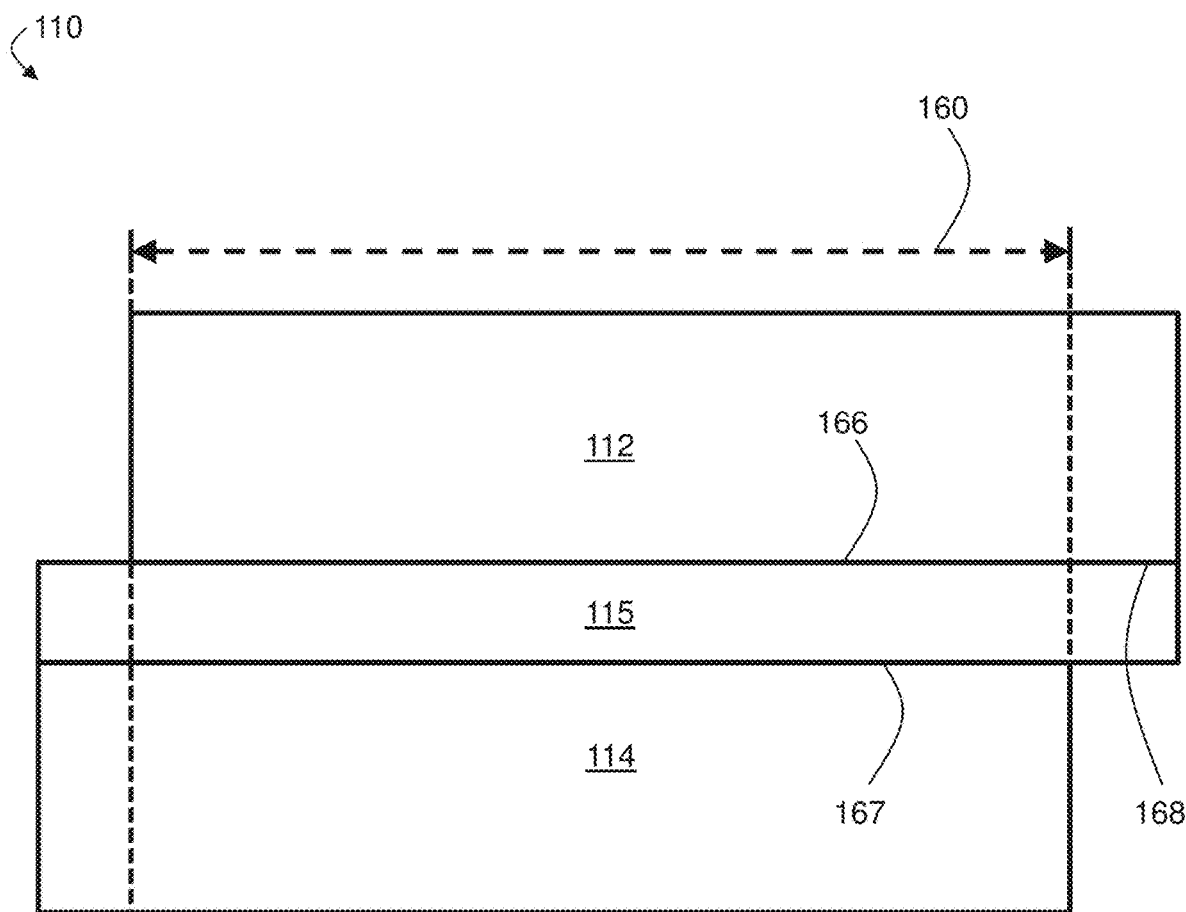
FIG. 18 shows a cross-sectional schematic diagram of an exemplary electrochemical cell, according to some embodiments.

Each of the electrochemical cells in the batteries described herein may have an electrochemical active region. For example, FIG. 17 shows an embodiment where battery 100 comprises first electrochemical cell 110 comprising first electrochemical active region 160 and second electrochemical cell 120 comprising second electrochemical active region 162. An electrochemical active region refers to a region defined by the overlap of the anode active surfaces of the anodes and cathode active surfaces of the cathodes of the electrochemical cell. For example, referring to FIG. 18, first electrochemical cell 110 has electrochemical active region 160 defined by the overlap of anode active surface 166 and cathode active surface 167. As used herein, the term "active surface" is used to describe a surface of an electrode that can be in physical contact with an electrolyte when the article is part of an electrochemical cell, and at which electrochemical reactions may take place. In some embodiments, a portion of an anode and/or cathode may not be part of the electrochemical active region of the electrochemical cell. For example, an anode and cathode may be offset such that a portion of an anode does not overlap with the corresponding cathode, thereby preventing that portion of the anode from participating in electrochemical reactions with the cathode. Referring to FIG. 18, portion 168 of anode 112 does not overlap with any of cathode 114 and therefore cannot participate in any electrochemical reactions with cathode 114, and therefore portion 118 of anode 112 is not part of first electrochemical active region 160, according to certain embodiments.

In some embodiments, an electrochemical cell of the battery (e.g., first electrochemical cell, second electrochemical cell) is coupled to a non-planarity of a thermally conductive solid article portion (e.g., first thermally conductive solid article portion, second thermally conductive solid article portion) of the battery. FIG. 17 shows one non-limiting such example, where battery 100 comprises first electrochemical cell 110 coupled to non-planarity 161 of first thermally conductive solid article portion 131 and battery 100 further comprises second electrochemical cell 120 coupled to non-planarity 163 of second thermally conductive solid article portion 132. Any of a variety of non-planarities may be part of a thermally conductive solid article portion and used to couple to an electrochemical cell. For example, a non-planarity of a thermally conductive solid article portion may be a deviation from the mean plane of a surface of the thermally conductive solid article portion facing the electrochemical cell to which it is coupled.

As used herein, a surface is said to be "facing" an object when a line extending normal to and away from the bulk of the material comprising the surface intersects the object. For example, a first surface and a second surface can be facing each other if a line normal to the first surface and extending away from the bulk of the material comprising the first surface intersects the second surface. A surface can be facing another object when it is in contact with the other object, or when one or more intermediate materials are positioned between the surface and the other object. For example, two surfaces that are facing each other can be in contact or can include one or more intermediate materials between them. In some instances, a surface and an object (e.g., another surface) facing each other are substantially parallel. In some embodiments, two surfaces can be substantially parallel if, for example, the maximum angle defined by the two planes is less than or equal to 10°, less than or equal to 5°, less than or equal to 2°, or less than or equal to 1°.

Figure 19:
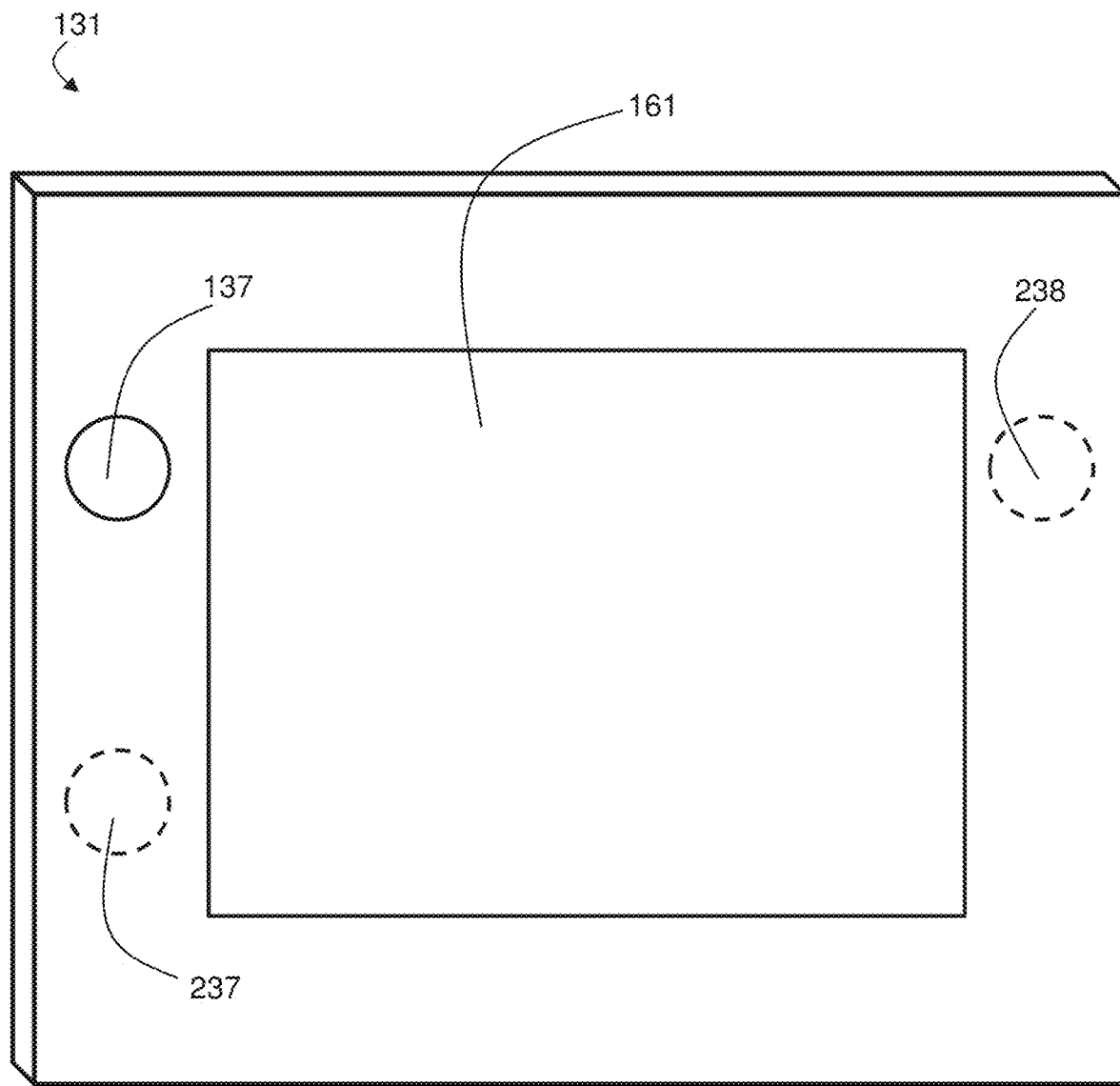
FIG. 19 shows a perspective view schematic diagram of an exemplary thermally conductive solid article portion comprising an alignment feature and a non-planarity, according to some embodiments.

In some embodiments, the non-planarity of a thermally conductive solid article portion (e.g., first thermally conductive solid article portion, second thermally conductive solid article portion) of the battery is a recess in the thermally conductive solid article portion. FIG. 17 and FIG. 19 show non-limiting such embodiments. In FIG. 17, non-planarity 161 and non-planarity 163 are recesses in first thermally conductive solid article portion 131 and second thermally conductive solid article portion 132, respectively, according to some embodiments. FIG. 19 shows a perspective view schematic diagram of first thermally conductive solid article 131 comprising non-planarity 161, which may be a recess in first thermally conductive solid article 131. A non-planarity (e.g., recess) may have any of a variety of shapes and dimensions, depending, for example, on the size and shape of a corresponding electrochemical cell (and its electrochemical active region).

An electrochemical cell may be coupled to a recess in a thermally conductive solid article portion by having a shape such that the electrochemical cell can fit into the recess. For example, referring again to FIG. 17, first electrochemical cell 110 fits into non-planarity 161 like an object in a pocket such that when first electrochemical cell 110 and first thermally conductive solid article portion 131 are coupled, the position of first electrochemical cell 110 is fixed with respect to first thermally conductive solid article portion 131. It should be understood that while FIG. 17 shows an entirety of the illustrated first electrochemical cell 110 fitting into non-planarity 161, in some embodiments one or more portions of an electrochemical cell, such as a conductive tab or pouch, may not be fit into the non-planarity, and may extend past the thermally conductive solid article portion.

Figure 20:
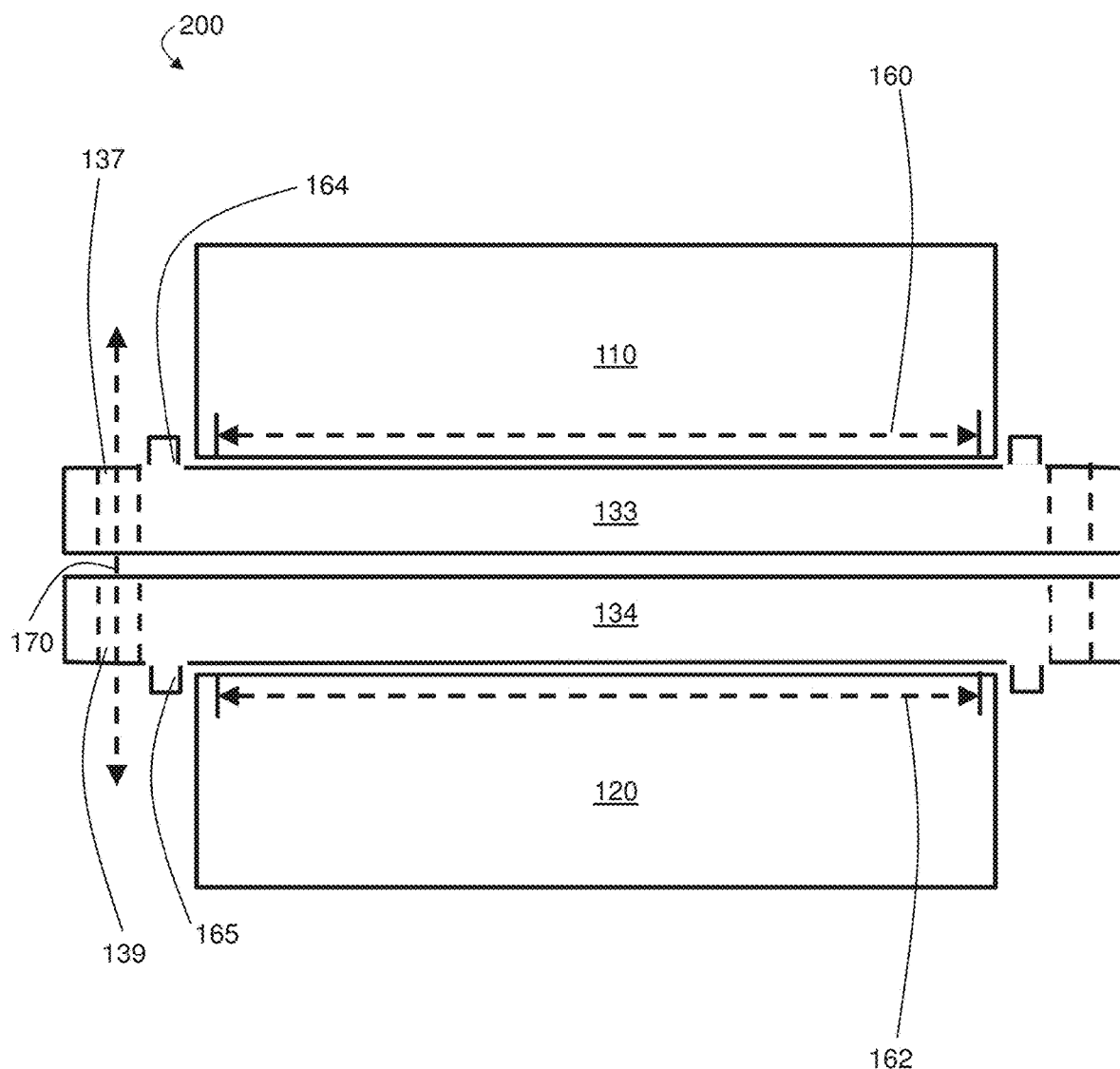
FIG. 20 shows a cross-sectional schematic diagram of an exemplary battery comprising electrochemical cells and thermally conductive solid article portions comprising alignment features, according to some embodiments.

In some embodiments, the non-planarity of a thermally conductive solid article portion (e.g., first thermally conductive solid article portion, second thermally conductive solid article portion) of the battery is a protrusion. The protrusion may extend away from the main surface of the thermally conductive solid article portion facing the electrochemical cell. For example, FIG. 20 shows a cross-sectional schematic diagram of battery 200 comprising first electrochemical cell 110 coupled to non-planarity 164 of first thermally conductive solid article portion 133 and second electrochemical cell 120 coupled to non-planarity 165 of second thermally conductive solid article portion 134. In FIG. 20, non-planarity 164 and non-planarity 165 are protrusions from first thermally conductive solid article portion 133 and second thermally conductive solid article portion 134, respectively.

An electrochemical cell may be coupled to a protrusion in a thermally conductive solid article portion by having a shape such that the electrochemical cell can fit between protrusions. For example, referring again to FIG. 20, first electrochemical cell 110 couples to non-planarity 164 by fitting between the protrusions of non-planarity 164 such that the position of first electrochemical cell 110 is fixed with respect to first thermally conductive solid article portion 133. It should be understood that while FIG. 20 shows an entirety of the illustrated first electrochemical cell 110 fitting between protrusions of non-planarity 164, in some embodiments one or more portions of an electrochemical cell, such as a conductive tab or pouch, may not be fit into or between portions of the non-planarity, and may extend past the thermally conductive solid article portion.

A non-planarity that is protrusion may take any of a variety of forms. For example, in some embodiments, a non-planarity that is a protrusion is a raised edge in the thermally conductive solid article portion (e.g., first thermally conductive solid article portion, second thermally conductive solid article portion). In some embodiments a non-planarity is a plurality of posts extending from the thermally conductive solid article portion.

Non-planarities in thermally conductive solid article portions (e.g., recesses, protrusions) may be formed in any of a variety of suitable ways, such as via machining, milling, molding, additive manufacturing (e.g., 3D-printing), etc.

In some embodiments, a thermally conductive solid article portion (e.g., first thermally conductive solid article portion, second thermally conductive solid article portion) comprises an alignment feature. An alignment feature may be, for example, a structural component of the thermally conductive solid article portion that can assist with the positioning of the thermally conductive solid article portion with respect to another thermally conductive solid article portion of the battery. In FIG. 17, first thermally conductive solid article portion 131 comprises first alignment feature 137 and second thermally conductive solid article portion 132 comprises second alignment feature 139, according to some embodiments. In some instances, first alignment feature 137 and second alignment feature 139 can be used to fix the relative positions of first thermally conductive solid article portion 131 and second thermally conductive solid article portion 132 with respect to each other.

An alignment feature may take any of a variety of suitable structural forms. For example, in some embodiments, an alignment feature of the thermally conductive solid article portion (e.g., first thermally conductive solid article portion, second thermally conductive solid article portion) is a gap in the thermally conductive solid article portion. FIG. 17 shows one such example, where first alignment feature 137 and second alignment feature 139 are gaps in first thermally conductive solid article portion 131 and second thermally conductive solid article portion 132, respectively. FIG. 19 shows a perspective view of first alignment feature 137 as a gap in first thermally conductive solid article portion 131, according to some embodiments. In certain cases, a gap serving as an alignment feature may be a through-hole, slot, or opening in a thermally conductive solid article portion. In some embodiments, an alignment feature of the thermally conductive solid article portion (e.g., first thermally conductive solid article portion, second thermally conductive solid article portion) is an edge of the thermally conductive solid article. For example, while FIG. 17 shows first alignment feature 137 and second alignment feature 139 as gaps, in some embodiments, edge 136 of first thermally conductive solid article portion 131 and edge 138 of second thermally conductive solid article portion 132 can be alignment features. In some embodiments, an alignment feature of the thermally conductive solid article portion (e.g., first thermally conductive solid article portion, second thermally conductive solid article portion) is a protrusion of the thermally conductive solid article. In some embodiments an alignment feature of the first thermally conductive solid article portion and an alignment feature of the second thermally conductive solid article portion are substantially similar or the same (e.g., both gaps, both edges, both protrusions). However, in some instances an alignment feature of a first thermally conductive solid article portion and an alignment feature of a second thermally conductive solid article portion are different (e.g., a first alignment feature is a gap and a second alignment feature is a protrusion). In some such cases, a first alignment feature of a first thermally conductive solid article portion is complementary to a second alignment feature of a second thermally conductive solid article portion (e.g., a protrusion in one thermally conductive solid article portion may fit into a recess or through-hole of another thermally conductive solid article portion).

In some embodiments, a thermally conductive solid article portion comprises multiple alignment features. In certain cases, using multiple alignment features per thermally conductive solid article portion may facilitate easier and/or more accurate alignment of components of the battery. Referring again to FIG. 19, in some embodiments, first thermally conductive solid article 131 comprises first alignment feature 137 and third alignment feature 237. Each of first alignment feature 137 and optional third alignment feature 237 may be substantially aligned with corresponding alignment features of second thermally conductive solid article portion 132 during an alignment process. In some embodiments, a thermally conductive solid article portion comprises multiple alignment features on the same side of the thermally conductive solid article portion with respect to an electrochemical cell coupled to the thermally conductive solid article portion. FIG. 19 shows one exemplary such embodiment with first alignment feature 137 and third alignment feature 237 on the same side of first thermally conductive solid article 131. Moreover, in some embodiments, the thermally conductive solid article portion comprises multiple alignment features on different sides of the thermally conductive solid article portion with respect to an electrochemical cell coupled to the thermally conductive solid article portion. FIG. 19 also shows one exemplary embodiment with first alignment feature 137 and third alignment feature 238 on the opposite side of first thermally conductive solid article 131. Third alignment feature 238 may be optional, as indicated by the dashed line. In some embodiments, the thermally conductive solid article portion comprises one or more (e.g., multiple such as two or more) alignment features on the same side of the thermally conductive solid article portion with respect to an electrochemical cell coupled to the thermally conductive solid article portion and one or more (e.g., multiple such as two or more) alignment features on different sides of the thermally conductive solid article portion with respect to an electrochemical cell coupled to the thermally conductive solid article portion.

Some embodiments comprise substantially aligning a first feature (e.g., a first alignment feature) of a first thermally conductive solid article portion with a second feature (e.g., a second alignment feature) of a second thermally conductive solid article portion. Such an alignment process may result in a first electrochemical active region of a first electrochemical cell coupled to a non-planarity of the first thermally conductive solid article portion being substantially aligned with a second electrochemical active region of a second electrochemical cell coupled to a non-planarity of the second thermally conductive solid article portion. In certain cases, the first alignment feature and the second alignment feature are located such that when the first alignment feature is substantially aligned with the second alignment feature, the first electrochemical active region and the second electrochemical active region are substantially aligned. For example, in FIG. 17, first alignment feature 137 and second alignment feature 139 may be located (e.g., with respect to non-planarity 161 and non-planarity 163) such that substantial alignment of first alignment feature 137 and second alignment feature 139 results in the substantial alignment of first electrochemical active region 160 with second electrochemical active region 162 due to the coupling of first electrochemical cell 110 to non-planarity 161 and the coupling of second electrochemical cell 120 with non-planarity 163. Substantially aligning electrochemical active areas of electrochemical cells in the battery may result in substantially uniform conditions for the electrochemical active areas (e.g., during charge and/or discharge). As one example, in some embodiments in which an anisotropic force with a component normal to one or more of the electrochemical cells is applied, the pressure distribution experienced by two substantially aligned electrochemical active areas may be substantially identical, which can in some cases lead to beneficial performance and/or durability for the battery. In some embodiments when a first electrochemical active area of the first electrochemical cell is substantially aligned with the second electrochemical active area of a second electrochemical cell, the first electrochemical active area and second electrochemical active area are aligned to within a distance of less than or equal to 2 mm, less than or equal to 1 mm, less than or equal to 0.5 mm, and/or as low as 0.1 mm, or less. In some embodiments when a first electrochemical active area of the first electrochemical cell is substantially aligned with the second electrochemical active area of a second electrochemical cell, at least 90%, at least 95%, at least 98%, at least 99%, at least 99.5% or more of the first electrochemical active area overlaps with the second electrochemical active area. The extent of alignment may be determined, for example, by visual inspection. Visual inspection in batteries may include discharging and charging the battery and visually examining and comparing the accumulation of electrode active material (e.g., lithium metal and/or a lithium metal alloy plating) on electrodes of the first electrochemical cell and second electrochemical cell.

One non-limiting way in which alignment features of thermally conductive solid article portions of the battery may be substantially aligned when they are gaps is by passing an object through the alignment features (e.g., through the first alignment feature and the second alignment feature). As an example, in FIG. 17, passing an object through first alignment feature 137 and second alignment feature 139 along an axis defined by arrow 170 may substantially align first alignment feature 137 and second alignment feature 139. The direction in which the object is passed through the alignment features may be substantially perpendicular to one or more lateral dimensions of the thermally conductive solid article portions (e.g., arrow 170 is substantially perpendicular to lateral dimension 135 of first thermally conductive solid article 131 and thermally conductive solid article portion 132 in FIG. 17). Exemplary objects that may be passed through the alignment features include, but are not limited to rods, fasteners, bands, and straps. An object passed through the alignment features may be kept in place even after alignment (e.g., permanently or removably kept in place), or the object may be removed following alignment. Another non-limiting way in which alignment features of the thermally conductive solid article portions of the battery may be substantially aligned is by visual or optical inspection (e.g., to see if electromagnetic radiation can pass through the alignment features).

Some embodiments may comprise substantially aligning two or more alignment features of the first thermally conductive solid article portion with two or more features of the second thermally conductive solid article portion. For example, alignment of components of the battery may comprise substantially aligning the first alignment feature of the first thermally conductive solid article portion with the second alignment feature of a second thermally conductive solid article portion and substantially aligning a third alignment feature of the first thermally conductive solid article portion with a fourth alignment feature of the second thermally conductive solid article portion. Aligning multiple alignment features of each thermally conductive solid article portion, can, in some cases, increase the accuracy and/or ease with which the components of the battery are aligned.

Another nonlimiting way of aligning features of a battery is by aligning components of the battery with a housing of the battery. For instance, in some embodiments, thermally conductive solid article portions may comprise alignment features that interlock with features of the housing. For example, an alignment feature such as non-planarity (e.g. a ridge) of a solid housing component of a housing may interlock with alignment features such as grooves of the thermally conductive solid article portions. In some embodiments, alignment may be achieved without the incorporation of alignment features, due to geometric constraints imposed by the housing (e.g., by one or more solid housing components described above) on components of the battery. Aligning components of the battery with the housing may prove advantageous to some embodiments by facilitating a reduction in the number of constituent parts of the housing, reducing a largest lateral pressure applying dimension of the housing, and/or increasing the battery's volumetric energy density.

Figure 21:
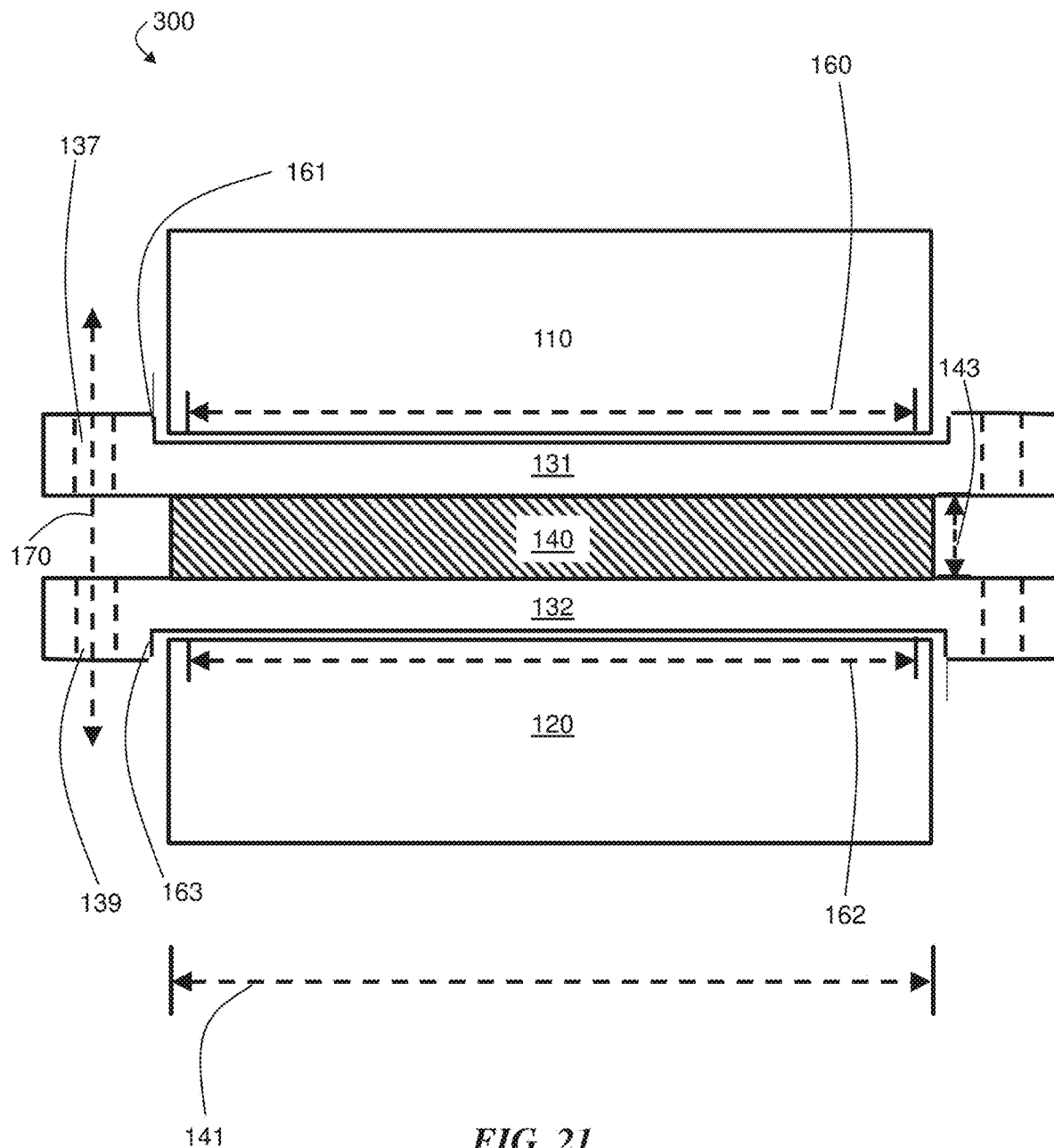
FIG. 21 shows a cross-sectional schematic diagram of an exemplary battery comprising electrochemical cells, thermally conductive solid article portions comprising alignment features, and a thermally insulating compressible solid article portion, according to some embodiments.

In some embodiments, a thermally conductive solid article portion (e.g., first thermally conductive solid article portion, second thermally conductive solid article portion) is between electrochemical cells (e.g., first electrochemical cell, second electrochemical cell) in the battery. FIG. 13A and FIG. 17 show examples of such embodiments, where first thermally conductive solid article portion 131 is between first electrochemical cell 110 and second electrochemical cell 120. In certain embodiments, both a first thermally conductive solid article portion and a second thermally conductive solid article portion are between the first electrochemical cell and the second electrochemical cell. For example, referring again to FIG. 13A and FIG. 17, first thermally conductive solid article portion 131 is between first electrochemical cell 110 and second electrochemical cell 120, and second thermally conductive solid article portion 132 is between first thermally conductive solid article portion 131 and second electrochemical cell 120. In some embodiments, a thermally insulating compressible solid article portion is between the first thermally conductive solid article portion and the second thermally conductive solid article portion. FIG. 21 shows one such embodiment, where thermally insulating compressible solid article portion 140 of exemplary battery 300 is between first thermally conductive solid article portion 131 and second thermally conductive solid article portion 132.

In some embodiments, the first thermally conductive solid article portion and the second thermally conductive solid article portion are part of discrete articles. Referring again to FIG. 13A, in some embodiments first thermally conductive solid article portion 131 and second thermally conductive solid article portion 132 are separate, discrete articles (e.g., separate sheets or fins). However, in some embodiments, first thermally conductive solid article portion and the second thermally conductive solid article portion are part of the same article. For example, first thermally conductive solid article portion 131 and second thermally conductive solid article portion 132 may be connected via a third thermally conductive solid article portion (not pictured) in FIG. 13A. As one example, the battery may comprise a thermally conductive solid article that is foldable and/or has a serpentine shape such that electrochemical cells and/or other components of the battery can be arranged between portions of the thermally conductive solid article.

Figure 22:
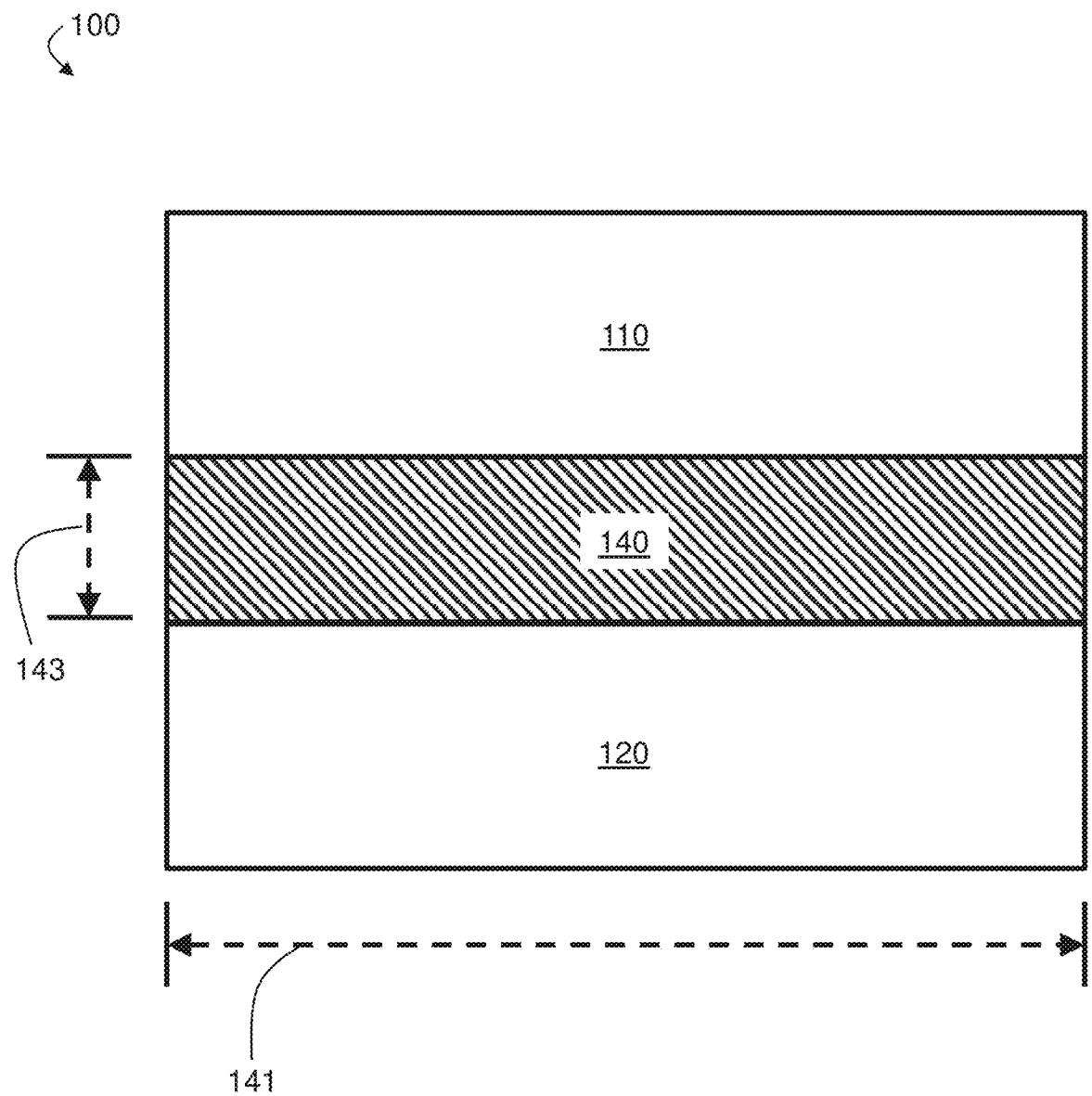
FIG. 22 shows a cross-sectional schematic diagram of an exemplary battery comprising electrochemical cells and a thermally insulating compressible solid article portion, according to some embodiments.

In some aspects, batteries comprising solid articles that can compensate for dimensional changes of other battery components while also limiting heat transfer between electrochemical cells are generally described. FIG. 22 is a schematic diagram of a non-limiting embodiment of battery 100. Battery 100 in FIG. 22 comprises first electrochemical cell 110 and second electrochemical cell 120 as part of a stack with thermally insulating compressible solid article portion 140. In some, but not necessarily all cases, the thermally insulating compressible solid article portion is in direct contact with the first electrochemical cell and/or the second electrochemical cell. For example, in FIG. 22, thermally insulating compressible solid article portion 140 is shown as being in direct contact with both first electrochemical cell 110 and second electrochemical cell 120. However, direct contact is not required, and in some embodiments there are one or more intervening components (e.g., other solid article portions such as plates or fins, sensors, etc.) between the thermally insulating compressible solid article portion and the first electrochemical cell and/or second electrochemical cell.

The thermally insulating compressible solid article portion may take any of a variety forms. For example, the thermally insulating compressible solid article portion may be in the form of a solid block, a foam sheet, a mesh, or any other suitable form, provided that it be thermally insulating and compressible. It should be understood that while the thermally insulating compressible solid article portion is referred to as a solid article, it may be at least partially hollow and/or contain pores or voids.

In some embodiments, the thermally insulating compressible solid article portion is a unitary object. FIG. 22 depicts thermally insulating compressible solid article portion 140 as a unitary object (e.g., a single sheet of foam), as one example. It should be understood that a thermally insulating compressible solid article portion that is a unitary object may be part of a larger article in some instances. In some embodiments, the thermally insulating compressible solid article portion comprises multiple separate objects. For example, the thermally insulating compressible solid article portion may comprise multiple layers (e.g., sheets) of either the same or different materials (e.g., foams) as a stack or otherwise arranged. For the properties described herein (e.g., uncompressed thickness, compression set, compressive stress versus percent compression, thermal conductivity, etc.), the measured values correspond to the entirety of the thermally insulating compressible solid article portion. For example, if the thermally insulating compressible solid article portion is a unitary object, the parameters correspond to that unitary object. In instances where the thermally insulating compressible solid article portion comprises multiple separate objects (e.g., a stack of foam sheets), the parameters of the thermally insulating compressible solid article portion correspond to that of the aggregate of all the separate objects of that portion (e.g., all foam sheets measured together as a stack).

In some embodiments, the thermally insulating compressible solid article portion comprises a foam. A foam solid article generally refers to a solid containing pockets of ("cells") capable of being occupied by a fluid. The pockets may be present throughout the dimensions of the solid. The foam may be present as a relatively high percentage of the thermally insulating compressible solid article portion (e.g., greater than or equal to 50 weight percent (wt %), greater than or equal to 75 wt %, greater than or equal to 90 wt %, greater than or equal to 95 wt %, greater than or equal to 99 wt %, or more). The use of thermally insulating compressible solid article portions comprising a relatively large amount of foam may, in some cases, contribute to a relatively high compressibility of the thermally insulating compressible solid article portion. For example, referring back to FIG. 13A or FIG. 22, in certain embodiments in which thermally insulating compressible solid article portion 140 has a relatively high foam content, pressure experienced by battery 100 may result in a relatively large compression of thermally insulating compressible solid article portion 140.

Figure 23A:
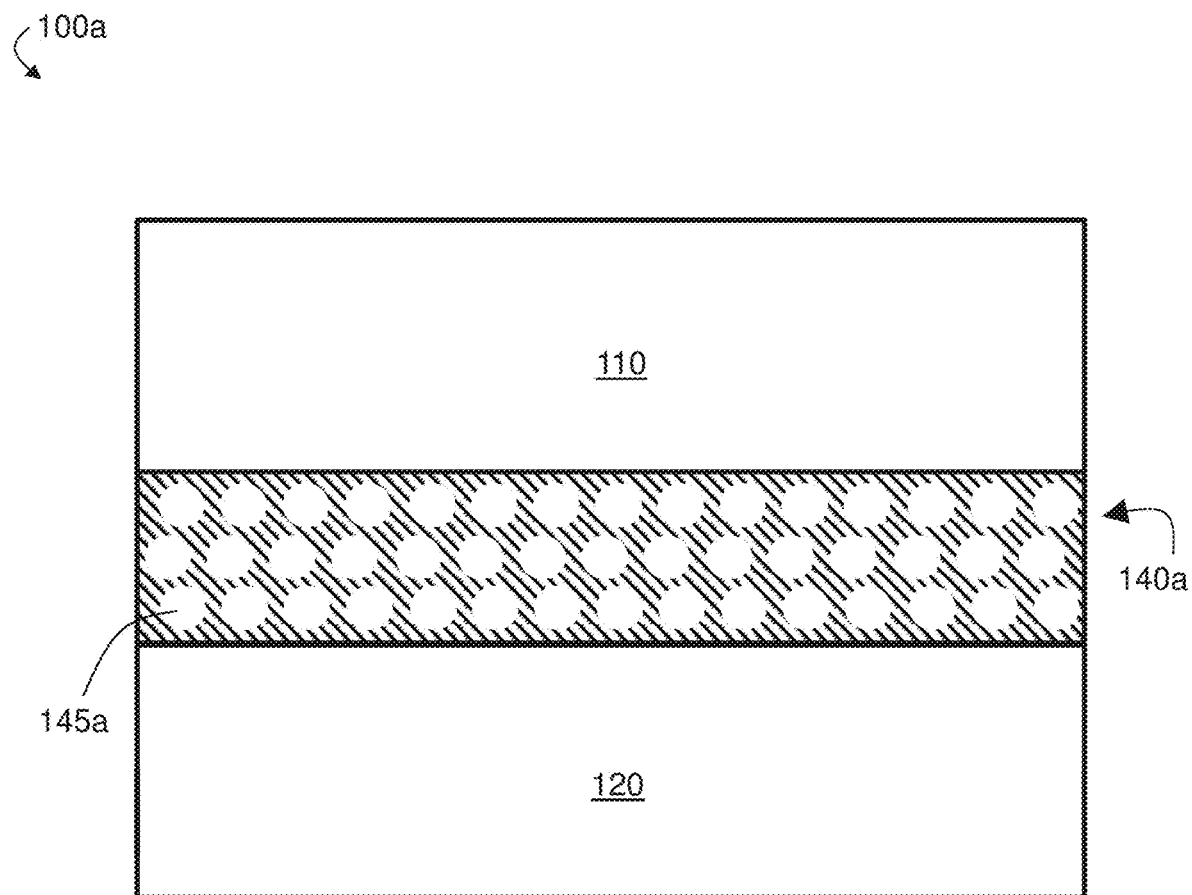
FIGS. 23A-23B show cross-sectional schematic diagrams of exemplary batteries comprising electrochemical cells and a thermally insulating compressible solid article portion, according to some embodiments.

In some embodiments, the thermally insulating compressible solid article portion is or comprises a closed-cell foam. A closed-cell foam solid generally refers to a foam comprising cells (gas pockets) that are discrete and completely surrounded by the solid material of the foam. FIG. 23A shows one such example, where thermally insulating compressible solid article portion 140a of battery 100a is a closed-cell foam comprising discrete cells 145a.

Figure 23B:
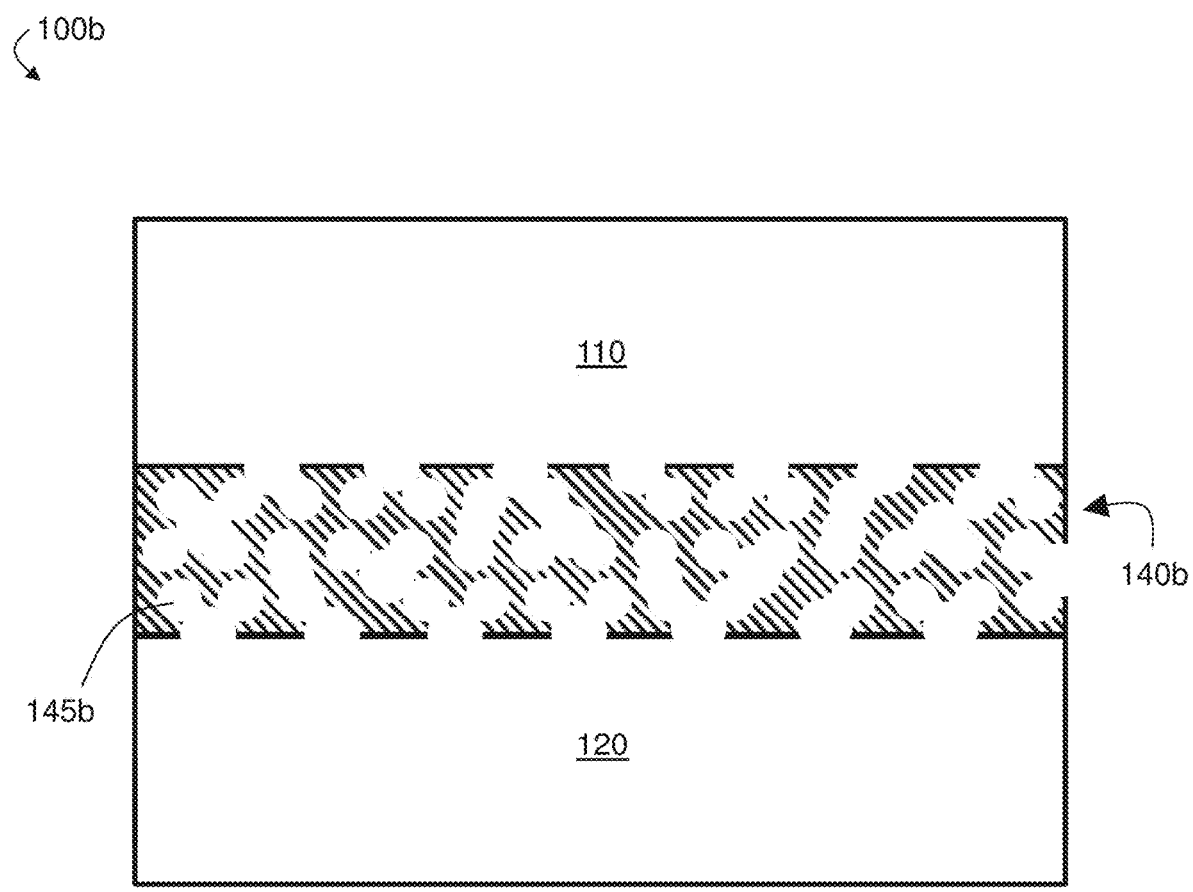

However, in some embodiments, the thermally insulating compressible solid article portion is or comprises an open-cell foam. An open-cell foam solid generally refers to a foam comprising cells connected to each other, thereby allowing for a gas or other fluid to travel from cell to cell. FIG. 23B shows one such example, where thermally insulating compressible solid article portion 140b of battery 100b is an open-cell foam comprising connected cells 145b.

In some embodiments, thermally insulating compressible solid article portion 140 comprises a microcellular foam. A microcellular foam generally refers to a foam whose cells have an average largest cross-sectional dimension on the order of microns (e.g., greater than or equal to 0.1 micron, greater than or equal to 1 micron, and/or up to 50 microns, up to 100 microns, or up to 500 microns). For example, in embodiments in which thermally insulating compressible solid article portion 140 in FIG. 23A is a microcellular foam, cell 145a may have a largest cross-sectional dimension of between 0.1 and 500 microns. Microcellular foams are typically made of polymeric materials (e.g., plastics) and can be prepared, for example by dissolving gases under high pressure into the material from which the foam is made. Foams such as microcellular foams may be useful in some instances in which thermally insulating compressible solid article portions having a relatively low mass density are desired. A low-density thermally insulating compressible solid article portion may contribute at least in part to a battery having a high specific energy density. In some embodiments, the density of the thermally-insulating compressible solid article portion is variable. For example, in some embodiments, regions occupying at least 0.5%, at least 1%, at least 2%, at least 5%, at least 10%, or more of the external geometric volume of the thermally insulating compressible solid article portion have a density (mass density) that is at least 5%, at least 10%, at least 25%, at least 50%, at least 75%, at least 90%, at least 95%, or at least 99% lower than an overall average density of the thermally insulating compressible solid article portion (which can be calculating by dividing the mass of the overall thermally insulating compressible solid article by the overall uncompressed volume of the thermally insulating compressible solid article). One non-limiting way of achieving such variance in density is by including holes/gaps in the thermally insulating compressible article portion such that the overall external geometric dimensions of the thermally insulating solid article portion are suitable for performing some or all of the roles described herein, while a mass of the thermally insulating compressible solid article is reduced. It has been observed that some such configurations may provide for a relative reduction in the mass of the battery (and an increase in energy density) without significantly affecting performance of the battery. Further, it has also been observed that some such configurations may provide for relatively uniform pressure distribution experienced by one or more electrochemical cells of the battery is relatively uniform, at least because the density of region of a thermally compressible solid article may affect a magnitude of force experienced by an electrochemical cell adjacent to that region.

In some embodiments, the thermally insulating compressible solid article portion comprises a mesh. As an example, in certain instances, the thermally insulating compressible solid article portion is a mesh structure made of strands of flexible, thermally-insulating material (e.g., fiber, plastic) that are attached and/or woven together.

In some embodiments, the thermally insulating compressible solid article portion is porous. As one example, referring again to FIGS. 13A-13B and FIG. 22, thermally insulating compressible solid article portion 140 is made of a porous material. As used herein, a "pore" refers to a pore as measured using ASTM Standard Test D4284-07, and generally refers to a conduit, void, or passageway, at least a portion of which is surrounded by the medium in which the pore is formed such that a continuous loop may be drawn around the pore while remaining within the medium. Generally, voids within a material that are completely surrounded by the material (and thus, not accessible from outside the material, e.g., closed cells) are not considered pores within this context. As such, a thermally insulating compressible solid article portion may be or comprise an open-cell solid, such an open-cell solid foam. It should be understood that, in cases where the thermally insulating compressible solid article portion comprises an agglomeration of particles, pores include both the interparticle pores (i.e., those pores defined between particles when they are packed together, e.g., interstices) and intraparticle pores (i.e., those pores lying within the envelopes of the individual particles). Pores may comprise any suitable cross-sectional shape such as, for example, circular, elliptical, polygonal (e.g., rectangular, triangular, etc.), irregular, and the like.

The porosity of a component of a battery (e.g., the thermally insulating compressible solid article portion comprising open cells) may be measured by physically separating the different regions of the electrochemical device by, for example, cutting out a region of the component, and then measuring the separated portion using the above-referenced ASTM Standard Test D4284-07.

In some instances, the thermally insulating compressible solid article portion (e.g., comprising an open-cell solid such as an open-cell foam) has a relatively high porosity. Having a relatively high porosity may contribute to the thermally insulating compressible solid article portion having a relatively low density, which in some instances can be advantageous as described above. A high porosity may also contribute, in some cases, to a relatively high compressibility. In some embodiments, the thermally insulating compressible solid article portion has a porosity of greater than or equal to 40%, greater than or equal to 50%, greater than or equal to 60%, or higher by volume. In some embodiments, the thermally insulating compressible solid article portion has a porosity of less than or equal to 90%, less than or equal to 80%, less than or equal to 70%, or less by volume. Combinations of these ranges are possible. For example, in some cases, the thermally insulating compressible solid article portion has a porosity of greater than or equal to 40% and less than or equal to 90%.

The thermally insulating compressible solid article portion may have any of a variety of suitable pore sizes, depending on, for example, the choice of material for the compressible solid article portion or the magnitude of force to be applied to the battery. For example, in some cases, the thermally insulating compressible solid article portion has an average pore size of greater than or equal to 0.1 microns, greater than or equal to 0.5 microns, greater than or equal to one micron, greater than or equal to 10 microns, greater than or equal to 50 microns, or greater. In some cases, the thermally insulating compressible solid article portion has an average pore size of less than or equal to 1 mm, less than or equal to 500 microns, less than or equal to 100 microns, or less. Combinations of these ranges are possible. For example, in some embodiments, the thermally insulating compressible solid article portion has an average pore size of greater than or equal to 0.1 microns and less than or equal to 1 mm, or greater than or equal to 1 micron and less than or equal to 100 microns.

In some embodiments, the thermally insulating compressible solid article portion has a relatively high void percentage. The voids of a solid object in this context generally refers to portions of the solids object not occupied by solid material. Voids may be occupied by a fluid such as a gas (e.g., air) or a liquid. It should be understood that pores such as open-cells may contribute to the void percentage, and closed-cells may also contribute to void percentage. As such, a thermally insulating compressible solid article portion comprising closed cells (e.g., a closed-cell foam such as thermally insulating compressible solid article portion 140a in FIG. 23A) may have a relatively high void percentage. Void percentage a solid article may be determined by dividing the void volume of the article by the volume defined by the outer boundaries of the article. Having a relatively high void percentage may contribute to the thermally insulating compressible solid article portion having a relatively low density, which in some instances can be advantageous as described above. A high void percentage may also contribute, in some cases, to a relatively high compressibility. In some embodiments, the thermally insulating compressible solid article portion has a void percentage of greater than or equal to 25%, greater than or equal to 40%, greater than or equal to 50%, and/or up to 60%, up to 75%, up to 90%, or more.

As a thermal insulator, the thermally insulating compressible solid article portion may contribute at least in part to advantageous thermal management of components of the battery. In some embodiments, the thermally insulating compressible solid article portion has a relatively low effective thermal conductivity (consequently making it a relatively good thermal insulator). The thermal insulating capability of the thermally insulating compressible solid article portion can, in some cases, contribute at least in part to thermally isolating one or more electrochemical cells and the battery from one or more other portions of the battery. For example, referring back to FIGS. 13A-13B and FIG. 22, in some embodiments in which thermally insulating compressible solid article portion 140 has a relatively low effective thermal conductivity, thermally insulating compressible solid article portion 140 mitigates heat transfer between first electrochemical cell 110 and second electrochemical cell 120. Such a mitigation in heat transfer can, in some instances, reduce propagation of deleterious phenomena among the electrochemical cells (e.g., during cycling).

In some embodiments, the thermally insulating compressible solid article portion has a relatively low effective thermal conductivity in the thickness direction. Referring again to FIG. 22, for example, thermally insulating compressible solid article portion 140 may have a low effective thermal conductivity in thickness direction 143. As a result, thermally insulating compressible solid article portion 140 may reduce the rate at which heat is transferred from first electrochemical cell 110, through thermally insulating compressible solid article portion 140 in thickness direction 143, and to second electrochemical cell 120, according to certain embodiments. This reduced extent of heat transfer in the thickness direction can, in some instances, improve the safety and performance of the battery (e.g., by reducing thermal propagation). In some embodiments, the thermally insulating compressible solid article portion has an effective thermal conductivity of less than or equal to 0.5 W m$^{-1}$ K$^{-1}$, less than or equal to 0.25 W m$^{-1}$ K$^{-1}$, and/or as low as 0.1 W m$^{-1}$ K$^{-1}$, as low as 0.01 W m$^{-1}$ K$^{-1}$, or less in the thickness direction at a temperature of 25° C. For example, the thermally insulating compressible solid article portion may comprise a microcellular foam and have an effective thermal conductivity of 0.21 W m$^{-1}$ K$^{-1}$ in the thickness direction at a temperature of 25° C. In some embodiments, the rate of heat transfer between two components of the battery (e.g., first electrochemical cell 110 and second electrochemical cell 120 in FIG. 22) is relatively low. In certain cases, the rate of heat transfer from the first electrochemical cell to the second electrochemical cell is less than or equal to 5 W m$^{-1}$ K$^{-1}$, less than or equal to 2.5 W m$^{-1}$ K$^{-1}$, and/or as low as 1 W m$^{-1}$ K$^{-1}$, as low as 0.1 W m$^{-1}$ K$^{-1}$, or less when the temperature difference between the first electrochemical cell and the second electrochemical cell is 10 K.

The compressibility of the thermally insulating compressible solid article portion may be useful in any of a variety of applications. As one example, in some instances in which one or more components of the battery change dimension during a charging and/or discharge process, a resulting compression of the thermally insulating compressible solid article portion may compensate for that change in dimension. In some such cases, the compressibility of the thermally insulating compressible solid article portion under stress may reduce the extent to which a battery expands or contracts when electrochemical cells within the battery undergo expansion and/or contraction during cycling.

Figure 24A:
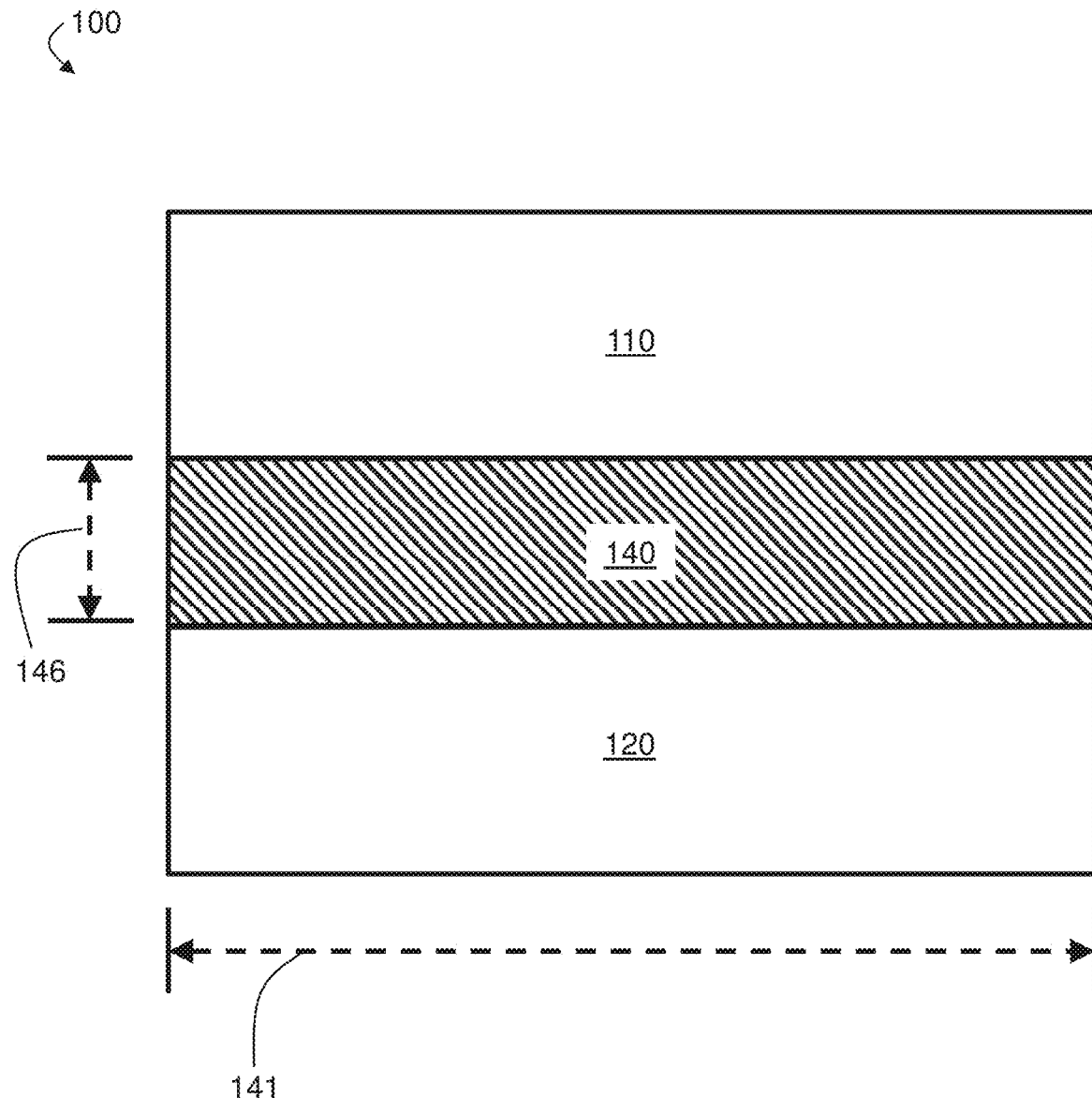
FIGS. 24A-24B show cross-sectional schematic diagrams of an exemplary battery comprising electrochemical cells and a thermally insulating compressible solid article portion in the absence and presence of an anisotropic force, respectively, according to some embodiments.
Figure 24B:
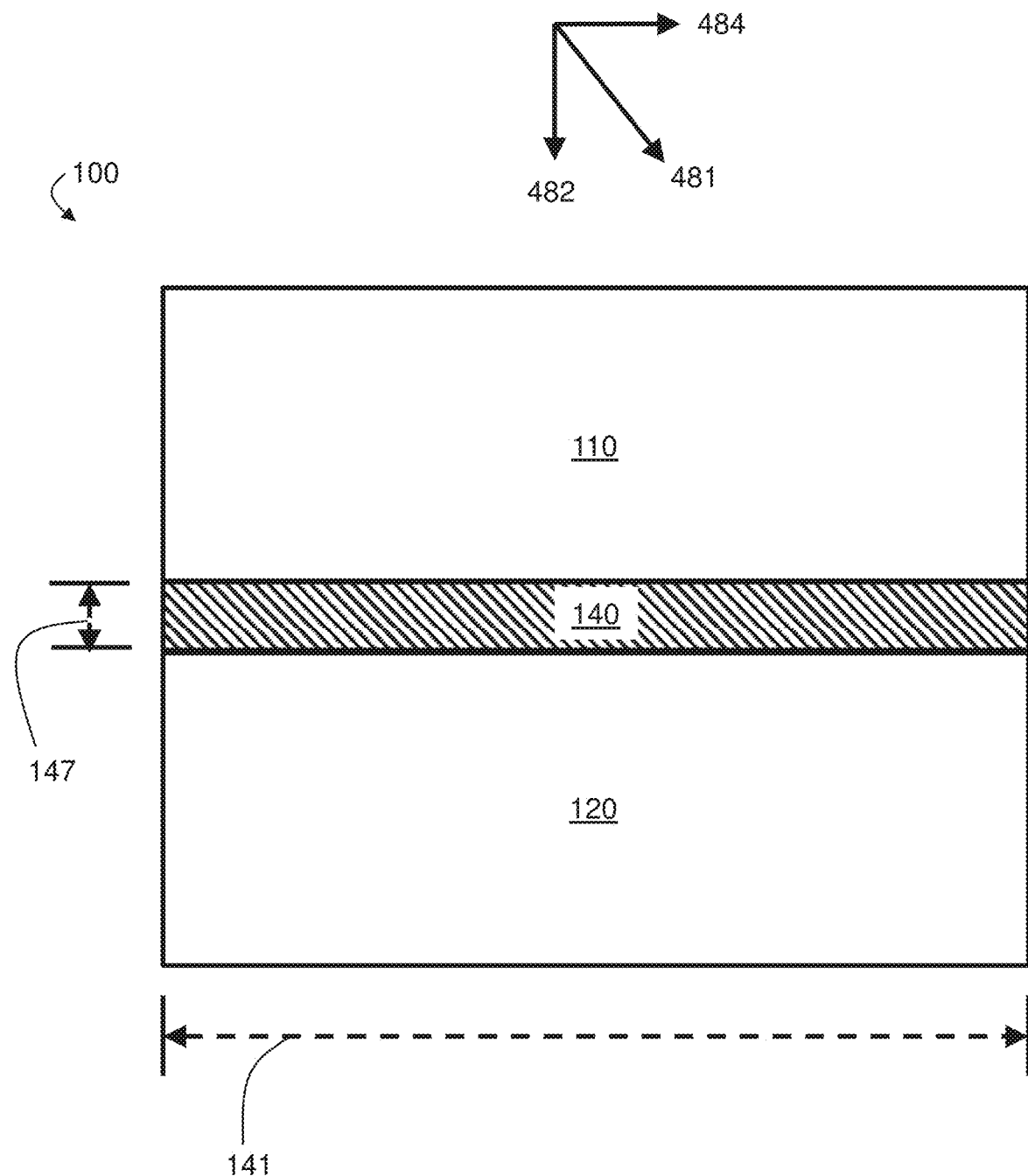

FIGS. 24A-24B show cross-sectional schematic diagrams of battery 100 in the absence (FIG. 24A) and presence (FIG. 24B) of an anisotropic force in the direction of arrow 481, with a component 482 normal to an electrochemical cell. The anisotropic force in the direction of arrow 481 may also have a component 484 parallel to an electrochemical cell. As described above, in some cases, at least a portion of the anisotropic force is applied by a pressure device such as solid plate (e.g., an endplate). In some instances, at least a portion of the anisotropic force is caused by a change in dimension (e.g., expansion) of one or more components of the battery. For example, in some cases a charging process of the battery causes one or more electrochemical cells (e.g., the first electrochemical cell, the second electrochemical cell) to expand in a thickness direction. One such example is in certain cases where a lithium metal and/or a lithium metal alloy is used as an anode active material, and lithium deposition on the anode occurs during charging.

In some embodiments, the application of force to the thermally insulating compressible solid article portion (e.g., via the first electrochemical cell and/or the second electrochemical cell or an intervening battery component) causes the thermally insulating compressible solid article portion to compress in the thickness direction. Referring again to FIGS. 24A-24B, for example, thermally insulating compressible solid article portion 140 may have uncompressed thickness 146 in the absence of an applied anisotropic force (as shown in FIG. 24A) and smaller compressed thickness 147 when anisotropic force 481 is applied and/or when expansion of first electrochemical cell 110 and/or second electrochemical cell 120 occurs.

In some embodiments, the thermally insulating compressible solid article portion has a relatively low compression set. The compression set of an article generally refers to the amount of permanent (plastic) deformation that occurs when the article is compressed to a given deformation, for a given amount of time, at a given temperature. Compression set of an article can be measured, for example using ASTM D395. For elastomeric materials, having a low compression set is associated with an ability for the material to maintain elastic properties even after prolonged compressive stress. Having a relatively low compression set may be beneficial, in some cases, where it is desired that the thermally insulating compressible solid article portion be able to regain at least a portion of its thickness when an applied compressive stress is removed. As an example, in some cases where the thermally insulating compressible solid article portion is compressed due to an expansion of an electrochemical cell in the battery, a subsequent contraction of the electrochemical cell may reduce the compressive stress applied. Having a relatively low compression set may then allow the thermally insulating compressible solid article to expand in thickness as the electrochemical cell contracts, thereby compensating for the change in dimension. In some embodiments, the thermally insulating compressible solid article portion has a compression set of less than or equal 15%, less than or equal to 12%, or less. In some embodiments, the thermally insulating compressible solid article portion has a compression set of less than or equal to 10%, less than or equal to 5%, or less. In some embodiments, the thermally insulating compressible solid article portion has a compression set of greater than or equal to 1%, greater than or equal to 2%, or more. Combinations of these ranges are possible. For example, in some embodiments, the thermally insulating compressible solid article portion has a compression set of greater than or equal to 1% and less than or equal to 10%. In some embodiments, the thermally insulating compressible solid article portion has a compression set value in one of the ranges above determined using a constant force measurement (e.g., ASTM D395 Test Method A). In some embodiments, the thermally insulating compressible solid article portion has a compression set value in one of the ranges above determined using a constant displacement measurement (e.g., ASTM D395 Test Method B).

In some embodiments, the thermally insulating compressible solid article portion has a relatively high compressibility. The compressibility of an article generally refers to the relative dimensional change of an article as a response to a change in compressive stress. In some instances, for example, the change in thickness 147 relative to thickness 146 in FIGS. 24A-24B is relatively large for a given magnitude of compressive stress (e.g., when the force from arrow 481 is applied). In some embodiments, at a compressive stress of 12 kgf/cm$^2$, the percent compression of the thermally insulating compressible solid article portion is at least 30%, and at a compressive stress of 40 kgf/cm$^2$, the percent compression of the thermally insulating compressible solid article portion is at least 80%. In some embodiments, at a compressive stress of 12 kgf/cm$^2$, the percent compression of the thermally insulating compressible solid article portion is at least 30%, and at a compressive stress of 40 kgf/cm$^2$, the percent compression of the thermally insulating compressible solid article portion is at least 50%.

The compressive response of a thermally insulating compressible solid article portion may be considered as a compressive stress versus percent compression curve. The thermally insulating compressible solid article portion may have a compressive stress versus percent compression curve that is suitable for a battery in which a high magnitude of anisotropic force with a component normal to one or more of the electrochemical cells is applied. In some instances, the thermally insulating compressible solid article portion has a compressive stress versus percent compression curve that is suitable for a battery in which one or more electrochemical cell undergoes a relatively high change in dimension during charging and discharging (e.g., such as certain electrochemical cells comprising lithium metal and/or lithium metal anode active materials).

Figure 25:
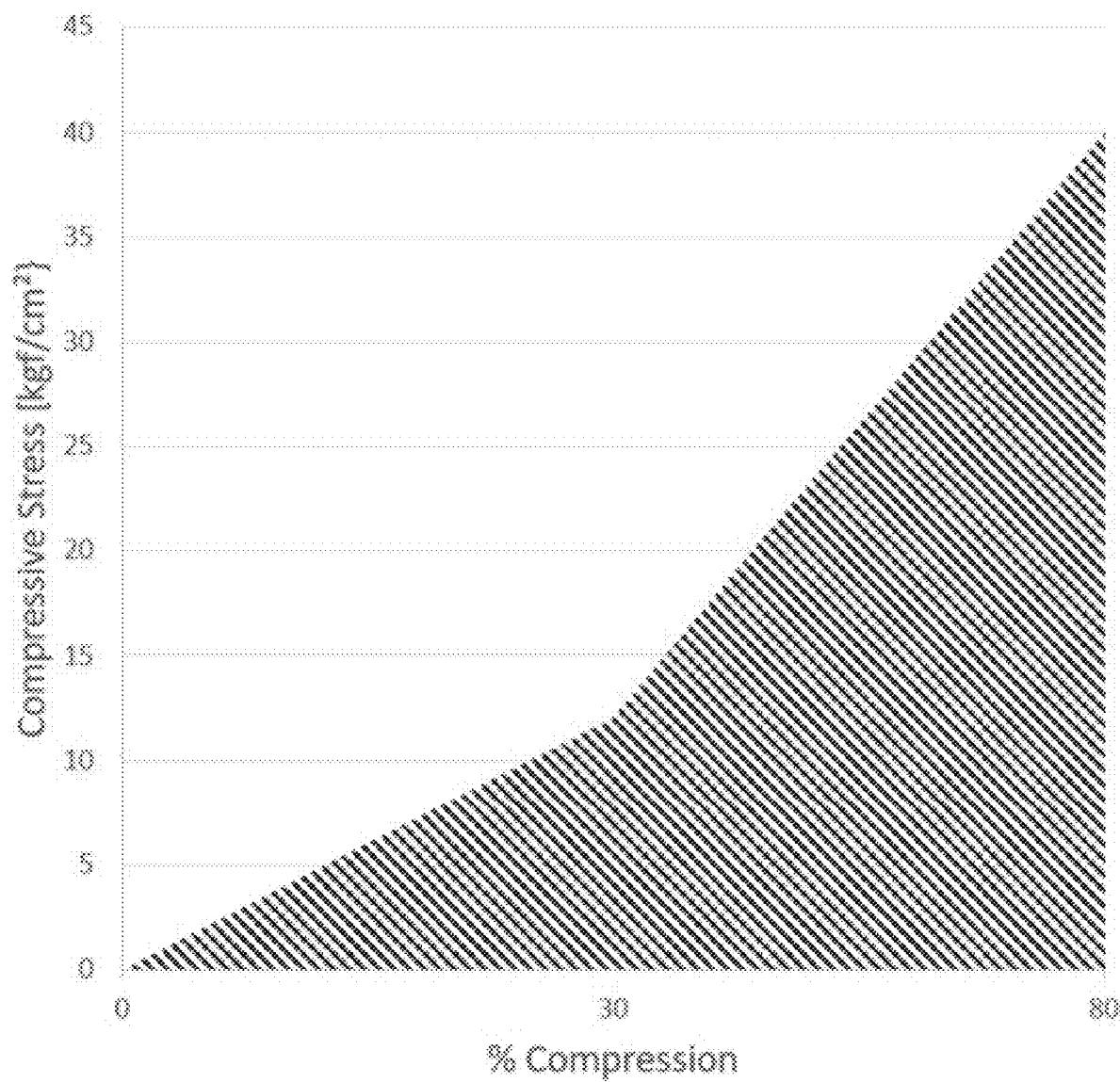
FIG. 25 shows a plot of a region of compressive stress versus percent compression responses for a thermally insulating compressible solid article portion, according to some embodiments.

In some such embodiments, the thermally insulating compressible solid article has a compressive stress versus percent compression curve in the hatched region of FIG. 25. It should be understood that a curve is considered to be in the hatched region if it is in the interior of the hatched region or at a boundary of the hatched region. In some embodiments, at least 50%, at least 75%, at least 90%, or more of the x-axis values of the compressive stress versus percent compression curve of the thermally insulating compressible solid article portion is in the hatched region. For example, if a compressive stress versus percent compression curve is measured for a sample for 100 equally spaced compression values between 0% and 80% (i.e., x-axis increments of 0.8%), and the measured compressive stress falls within the hatched region of FIG. 25 for at least 50 of the 100 compression values measured, then at least 50% of the x-axis value of the compressive stress versus percent compression curve of that sample is in the hatched region. In some embodiments, the thermally insulating compressible solid article has a compressive stress versus percent compression curve in the hatched region of FIG. 25 for x-axis values of greater than or equal to 1%, greater than or equal to 10%, greater than or equal to 20%, greater than or equal to 30%, greater than or equal to 40%, and/or up to 50%, up to 60%, up to 80%, or greater. Combinations of these ranges (e.g., x-axis values of greater than or equal to 1% and less than or equal to 80% or greater than or equal to 30% and less than or equal to 50%) are possible. Properties that may affect the compressive stress versus percent compression curve of a thermally insulating compressible solid article portion include intrinsic properties (e.g., uncompressed density) and extrinsic properties (e.g., thickness).

The measurement of the compressive stress versus percent compression curve (as shown in FIG. 25) of a sample may be conducted as follows. The compression rate may be, for example, greater than or equal to 0.001 mm/s, greater than or equal to 0.05, and/or up to 0.1 mm/s using a modified version of ASTM D3574.

In some embodiments, the thermally insulating compressible solid article portion has a relatively high resilience. The resilience of an article generally refers to the percentage of energy released when a deformed object recovers from deformation relative to the energy required to produce the deformation. Resilience can be measured, for example, using ASTM D3574 Test H (a ball drop resilience measurement). A relatively high resilience may contribute to the thermally insulating compressible solid article portion being durable under multiple repeated compressions and decompression of the battery (e.g., during charging and discharging). In some embodiments, the thermally insulating compressible solid article portion has a resilience of at least 60%, at least 65%, at least 75%, at least 90%, at least 95%, or more. In some embodiments, the thermally insulating compressible solid article portion has both a relatively high compressibility and a relatively high resilience (e.g., with values in the ranges described above), which may contribute to a high extent of compensation of dimensional changes in the battery while also being durable.

In some embodiments, the thermally insulating compressible solid article portion has a relatively high dynamic continuous load limit. A dynamic continuous load limit generally refers to the maximum compressive stress applied to the article before failure occurs. Having a relatively high dynamic continuous load limit may be useful in some embodiments where a relatively high magnitude of anisotropic force with a component normal to one or more electrochemical cells of the battery is applied, or where one or more of the electrochemical cells undergoes a relatively large expansion during cycling. In some embodiments, the thermally insulating compressible solid article portion has a dynamic continuous load limit of greater than or equal to 30 kgf/cm$^2$, greater than or equal to 35 kgf/cm$^2$, greater than or equal to 40 kgf/cm$^2$, and/or up to 45 kgf/cm$^2$, or greater.

In some embodiments, the thermally insulating compressible solid article portion has a relatively low uncompressed mass density. A low mass density may contribute, at least in part, to the battery having a relatively high specific energy density. The uncompressed mass density of the thermally insulating compressible solid article portion refers to the bulk mass per unit volume of the article portion in the absence of a load (e.g., compressive stress). In some embodiments, the thermally insulating compressible solid article portion has an uncompressed mass density of greater than or equal to 0.3 g/cm$^3$, greater than or equal to 0.35 g/cm$^3$, greater than or equal to 0.4 g/cm$^3$, greater than or equal to 0.45 g/cm$^3$, greater than or equal to 0.5 g/cm$^3$, and/or up to 0.55 g/cm$^3$, up to 0.6 g/cm$^3$, up to 0.65 g/cm$^3$, up to 0.7 g/cm$^3$, or greater at 25° C.

The thermally insulating compressible solid article portion can be made of any of a variety of suitable materials, provided that it have one or more of the combinations of thermal and mechanical properties in the present disclosure. In some embodiments, the thermally insulating compressible solid article portion comprises a polymeric material. A relatively large percentage of the thermally insulating compressible solid article portion may be made of a polymeric material. For example, greater than or equal to 50 wt %, greater than or equal to 75 wt %, greater than or equal to 90 wt %, greater than or equal to 95 wt %, greater than or equal to 99 wt %, or more (e.g., 100 wt %) of the thermally insulating compressible solid article portion may be made of a polymeric material. In certain embodiments, the thermally insulating compressible solid article portion comprises a polymeric foam, such as a microcellular polymeric foam.

While any of a variety of polymeric materials may be suitable, in certain instances the thermally insulating compressible solid article portion comprises a relatively elastic polymer. In some embodiments, the thermally insulating compressible solid article portion is or comprises an elastomer. As one non-limiting example, the thermally insulating compressible solid article portion may comprise a polyurethane. Polyurethanes are polymers comprising organic repeat units linked by carbamate (urethane) units. Polyurethanes can be made using any of a variety of techniques, such as by reacting isocyanates and polyols. In some embodiments, the thermally insulating compressible solid article portion is or comprises a microcellular polyurethane foam (e.g., foam sheet or foam layer). Referring to FIG. 22, for example, battery 100 may comprise first electrochemical cell 110, second electrochemical cell 120, and thermally insulating compressible solid article portion 140 between first electrochemical cell 110 and second electrochemical cell 120, where thermally insulating compressible solid article portion 140 is an elastomeric microcellular foam layer or sheet made of polyurethane. One non-limiting example of an elastomeric microcellular polyurethane foam that can be used as a thermally insulating compressible solid article portion is sold by BASF under the trade name Cellasto®.

The thermally insulating compressible solid article may have a thickness as well as two orthogonal lateral dimensions that are orthogonal to each other as well as orthogonal to the thickness. For example, referring to FIG. 24A, thermally insulating compressible solid article portion 140 has thickness 146, lateral dimension 141, and a second lateral dimension (not pictured) orthogonal to both thickness 146 and lateral dimension 141 (which would run into and out of the plane of the drawing in FIG. 24A). As mentioned above, the thermally insulating compressible solid article may have an uncompressed thickness (e.g., uncompressed thickness 146 in FIG. 24A) and a compressed thickness (e.g., compressed thickness 147 FIG. 24B), with the latter depending in some cases on the magnitude of an applied force.

The dimensions of the thermally insulating compressible solid article portion may be chosen based on any of a variety of considerations. For example, the thickness (e.g., uncompressed thickness) or lateral dimensions may be chosen based on the desired total size of the battery and/or a desired pack burden (defined as one minus the mass of the electrochemical cells of the battery divided by the total mass of the battery). In some embodiments, the uncompressed thickness of the thermally insulating compressible solid article portion is such that a sufficient amount of compression can occur (e.g., to compensate for expansion of the first electrochemical cell and/or second electrochemical cell during cycling).

In some embodiments, the thermally insulating compressible solid article portion has an uncompressed thickness of greater than or equal to 2 mm, greater than or equal to 3 mm, greater than or equal to 4 mm, greater than or equal to 5 mm, greater than or equal to 5.5 mm, greater than or equal to 6 mm, or greater. In some embodiments, the thermally insulating compressible solid article portion has an uncompressed thickness of less than or equal to 10 mm, less than or equal to 9 mm, less than or equal to 7 mm, or less. Combinations of these ranges are possible. For example, in some embodiments, the thermally insulating compressible solid article portion has an uncompressed thickness of greater than or equal to 2 mm and less than or equal to 10 mm, or greater than or equal to 5.5 mm and less than or equal to 6 mm.

In some embodiments the thermally insulating compressible solid article portion has one or more lateral dimension of greater than or equal to 50 mm, greater than or equal to 65 mm, greater than or equal to 80 mm, and/or up to 90 mm, up to 100 mm, up to 200 mm, or more. In some embodiments, the thermally insulating compressible solid article portion has at least one lateral dimension that is at least 5 times, at least 10 times, and/or up to 20 times, up to 50 times, up to 100 times or more greater than the uncompressed thickness of the thermally insulating compressible solid article portion.

Figure 26:
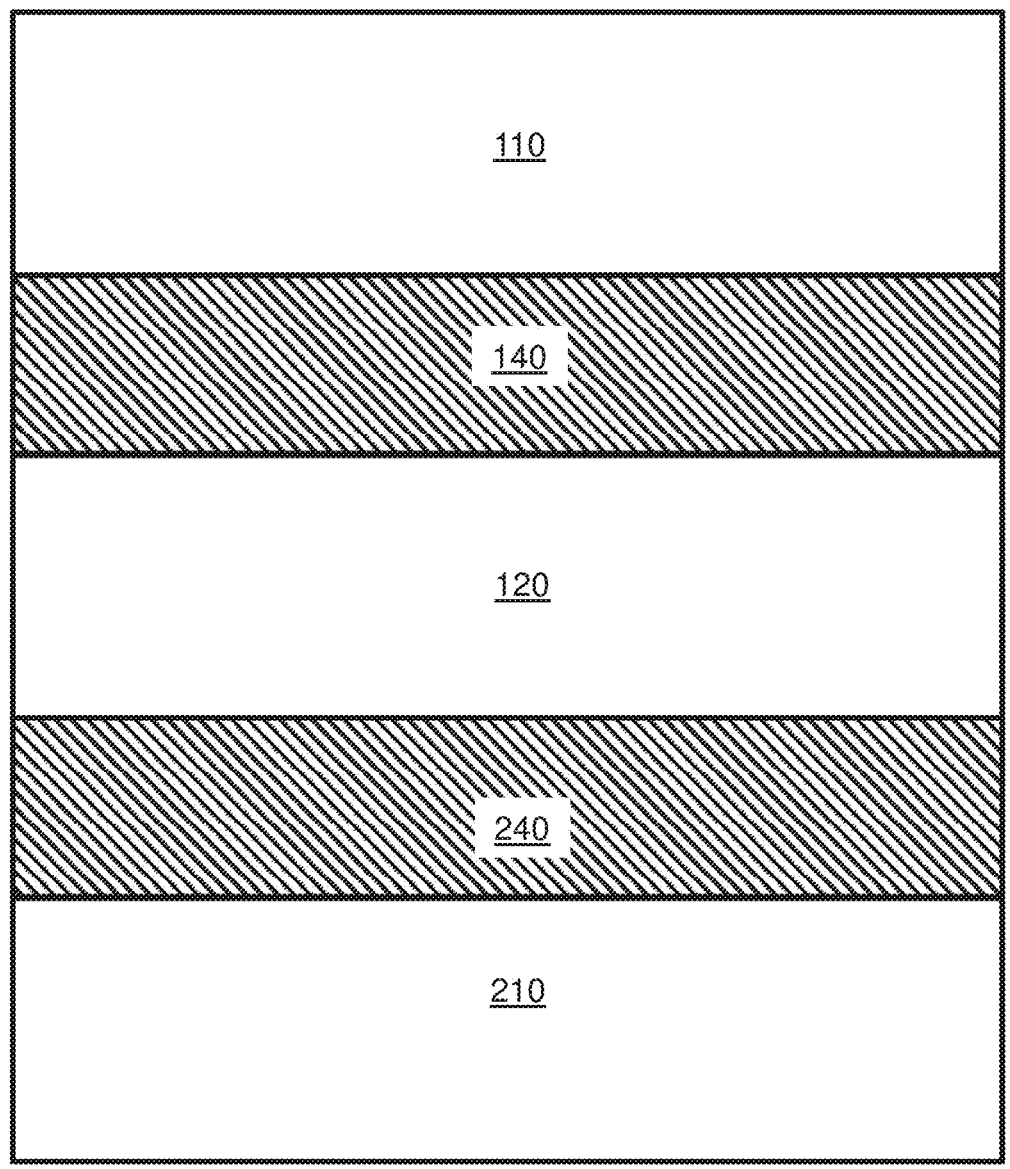
FIG. 26 shows a cross-sectional schematic diagram of an exemplary battery comprising electrochemical cells and thermally insulating compressible solid article portions, according to some embodiments.

In some embodiments, the battery has more than one thermally insulating compressible solid article portion. For example, in some embodiments, the battery comprises a third electrochemical cell, and a second thermally insulating compressible solid article portion between the second electrochemical cell and the third electrochemical cell. FIG. 26 shows a cross-sectional schematic diagram of one such embodiment, where battery 600 comprises, in order: first electrochemical cell 110, first thermally insulating compressible solid article portion 140, second electrochemical cell 120, second thermally insulating compressible solid article portion 240, and third electrochemical cell 210. It should be understood that the battery may not be limited to three electrochemical cells, and may comprise at least 1, at least 2, at least 3, at least 5, at least 8, at least 10, and/or up to 12, up to 15, up to 20, up to 24, up to 30 or more electrochemical cells. In some such cases, the total number of thermally insulating compressible solid article portions is equal to one more than the total number of electrochemical cells in the battery (e.g., 12 electrochemical cells and 13 thermally insulating compressible solid article portions). For example, there may be an electrochemical cell between each of the thermally insulating compressible solid article portions.

In some embodiments, the first thermally insulating compressible solid article portion and the second thermally insulating compressible solid article portion are part of discrete articles. Referring again to FIG. 26, in some embodiments first thermally insulating compressible solid article portion 140 and second thermally insulating compressible solid article portion 240 are separate, discrete articles (e.g., separate foam sheets). However, in some embodiments, the first thermally insulating compressible solid article portion and the second thermally insulating compressible solid article portion are part of the same article. For example, first thermally insulating compressible solid article portion 140 and second thermally insulating compressible solid article portion 240 may be connected via a third thermally insulating compressible solid article portion hidden behind second electrochemical cell 120 in FIG. 26. As one example, the battery may comprise a thermally insulating compressible solid article that is foldable and/or has a serpentine shape such that electrochemical cells and/or other components of the battery can be arranged between portions of the thermally insulating compressible solid article.

A variety of anode active materials are suitable for use with the anodes of the electrochemical cells described herein, according to certain embodiments. In some embodiments, the anode active material comprises lithium (e.g., lithium metal), such as lithium foil, lithium deposited onto a conductive substrate or onto a non-conductive substrate (e.g., a release layer), and lithium alloys (e.g., lithium-aluminum alloys and lithium-tin alloys). Lithium can be contained as one film or as several films, optionally separated. Suitable lithium alloys for use in the aspects described herein can include alloys of lithium and aluminum, magnesium, silicium (silicon), indium, and/or tin. In some embodiments, the anode active material comprises lithium (e.g., lithium metal and/or a lithium metal alloy) during at least a portion of or during all of a charging and/or discharging process of the electrochemical cell. In some embodiments, the anode active material comprises during a portion of a charging and/or discharging process of the electrochemical cell, but is free of lithium metal and/or a lithium metal alloy at a completion of a discharging process.

In some embodiments, the anode active material contains at least 50 wt % lithium. In some cases, the anode active material contains at least 75 wt %, at least 90 wt %, at least 95 wt %, or at least 99 wt % lithium.

In some embodiments, the anode is an electrode from which lithium ions are liberated during discharge and into which the lithium ions are integrated (e.g., intercalated) during charge. In some embodiments, the anode active material is a lithium intercalation compound (e.g., a compound that is capable of reversibly inserting lithium ions at lattice sites and/or interstitial sites). In some embodiments, the anode active material comprises carbon. In certain cases, the anode active material is or comprises a graphitic material (e.g., graphite). A graphitic material generally refers to a material that comprises a plurality of layers of graphene (i.e., layers comprising carbon atoms covalently bonded in a hexagonal lattice). Adjacent graphene layers are typically attracted to each other via van der Waals forces, although covalent bonds may be present between one or more sheets in some cases. In some cases, the carbon-comprising anode active material is or comprises coke (e.g., petroleum coke). In certain embodiments, the anode active material comprises silicon, lithium, and/or any alloys of combinations thereof. In certain embodiments, the anode active material comprises lithium titanate ($Li_4Ti_5O_{12}$, also referred to as "LTO"), tin-cobalt oxide, or any combinations thereof.

A variety of cathode active materials are suitable for use with cathodes of the electrochemical cells described herein, according to certain embodiments. In some embodiments, the cathode active material comprises a lithium intercalation compound (e.g., a compound that is capable of reversibly inserting lithium ions at lattice sites and/or interstitial sites). In certain cases, the cathode active material comprises a layered oxide. A layered oxide generally refers to an oxide having a lamellar structure (e.g., a plurality of sheets, or layers, stacked upon each other). Non-limiting examples of suitable layered oxides include lithium cobalt oxide ($LiCoO_2$), lithium nickel oxide ($LiNiO_2$), and lithium manganese oxide ($LiMnO_2$). In some embodiments, the layered oxide is lithium nickel manganese cobalt oxide ($LiNi_xMn_y$-$Co_zO_2$, also referred to as "NMC" or "NCM"). In some such embodiments, the sum of x, y, and z is 1. For example, a non-limiting example of a suitable NMC compound is $LiNi_{1/3}Mn_{1/3}Co_{1/3}O_2$. In some embodiments, a layered oxide may have the formula $(Li_2MnO_3)_x(LiMO_2)_{(1-x)}$ where M is one or more of Ni, Mn, and Co. For example, the layered oxide may be $(Li_2MnO_3)_{0.25}(LiNi_{0.3}Co_{0.15}Mn_{0.55}O_2)_{0.75}$. In some embodiments, the layered oxide is lithium nickel cobalt aluminum oxide ($LiNi_xCo_yAl_zO_2$, also referred to as "NCA"). In some such embodiments, the sum of x, y, and z is 1. For example, a non-limiting example of a suitable NCA compound is $LiNi_{0.8}Co_{0.15}Al_{0.05}O_2$. In certain embodiments, the cathode active material is a transition metal polyanion oxide (e.g., a compound comprising a transition metal, an oxygen, and/or an anion having a charge with an absolute value greater than 1). A non-limiting example of a suitable transition metal polyanion oxide is lithium iron phosphate ($LiFePO_4$, also referred to as "LFP"). Another non-limiting example of a suitable transition metal polyanion oxide is lithium manganese iron phosphate ($LiMn_xFe_{1-x}PO_4$, also referred to as "LMFP"). A non-limiting example of a suitable LMFP compound is $LiMn_{0.8}Fe_{0.2}PO_4$. In some embodiments, the cathode active material is a spinel (e.g., a compound having the structure $AB_2O_4$, where A can be Li, Mg, Fe, Mn, Zn, Cu, Ni, Ti, or Si, and B can be Al, Fe, Cr, Mn, or V). A non-limiting example of a suitable spinel is a lithium manganese oxide with the chemical formula $LiM_xMn_{2-x}O_4$ where M is one or more of Co, Mg, Cr, Ni, Fe, Ti, and Zn. In some embodiments, x may equal 0 and the spinel may be lithium manganese oxide ($LiMn_2O_4$, also referred to as "LMO"). Another non-limiting example is lithium manganese nickel oxide ($LiNi_xM_{2-x}O_4$, also referred to as "LMNO"). A non-limiting example of a suitable LMNO compound is $LiNi_{0.5}Mn_{1.5}O_4$. In certain cases, the electroactive material of the second electrode comprises $Li_{1.14}Mn_{0.42}Ni_{0.25}Co_{0.29}O_2$ ("HC-MNC"), lithium carbonate ($Li_2CO_3$), lithium carbides (e.g., $Li_2C_2$, $Li_4C$, $Li_6C_2$, $Li_8C_3$, $Li_6C_3$, $Li_4C_3$, $Li_4C_5$), vanadium oxides (e.g., $V_2O_5$, $V_2O_3$, $V_6O_{13}$), and/or vanadium phosphates (e.g., lithium vanadium phosphates, such as $Li_3V_2(PO_4)_3$), or any combination thereof.

In some embodiments, the cathode active material comprises a conversion compound. For instance, the cathode may be a lithium conversion cathode. It has been recognized that a cathode comprising a conversion compound may have a relatively large specific capacity. Without wishing to be bound by a particular theory, a relatively large specific capacity may be achieved by utilizing all possible oxidation states of a compound through a conversion reaction in which more than one electron transfer takes place per transition metal (e.g., compared to 0.1-1 electron transfer in intercalation compounds). Suitable conversion compounds include, but are not limited to, transition metal oxides (e.g., $Co_3O_4$), transition metal hydrides, transition metal sulfides, transition metal nitrides, and transition metal fluorides (e.g., $CuF_2$, $FeF_2$, $FeF_3$). A transition metal generally refers to an element whose atom has a partially filled d sub-shell (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs).

In some cases, the cathode active material may be doped with one or more dopants to alter the electrical properties (e.g., electrical conductivity) of the cathode active material. Non-limiting examples of suitable dopants include aluminum, niobium, silver, and zirconium.

In some embodiments, the cathode active material may be modified by a surface coating comprising an oxide. Non-limiting examples of surface oxide coating materials include: MgO, $Al_2O_3$, SiO2, $TiO_2$, $ZnO_2$, $SnO_2$, and $ZrO_2$. In some embodiments, such coatings may prevent direct contact between the cathode active material and the electrolyte, thereby suppressing side reactions.

In certain embodiments, the cathode active material comprises sulfur. In some embodiments, the cathode active material comprises electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within an electrode (e.g., a cathode) comprises at least 40 wt % sulfur. In some cases, the electroactive sulfur-containing material comprises at least 50 wt %, at least 75 wt %, or at least 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130, each of which is incorporated herein by reference in its entirety for all purposes. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al., each of which is incorporated herein by reference in its entirety for all purposes. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al., each of which is incorporated herein by reference in its entirety for all purposes.

One or more electrodes may further comprise additional additives, such as conductive additives, binders, etc., as described in U.S. Pat. No. 9,034,421 to Mikhaylik et al.; and U.S. Patent Application Publication No. 2013/0316072, each of which is incorporated herein by reference in its entirety for all purposes.

In some embodiments, the electrochemical cells of the battery further comprise a separator between two electrode portions (e.g., an anode portion and a cathode portion). The separator may be a solid non-conductive or insulative material, which separates or insulates the anode and the cathode from each other preventing short circuiting, and which permits the transport of ions between the anode and the cathode. In some embodiments, the porous separator may be permeable to the electrolyte.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

As described above, in some embodiments, a force, or forces, is applied to portions of an electrochemical cell. Such application of force may reduce irregularity or roughening of an electrode surface of the cell (e.g., when lithium metal or lithium alloy anodes are employed), thereby improving performance. Electrochemical devices in which anisotropic forces are applied and methods for applying such forces are described, for example, in U.S. Pat. No. 9,105,938, issued Aug. 11, 2015, published as U.S. Patent Publication No. 2010/0035128 on Feb. 11, 2010, and entitled "Application of Force in Electrochemical Cells," which is incorporated herein by reference in its entirety for all purposes.

In the embodiments described herein, batteries may undergo a charge/discharge cycle involving deposition of metal (e.g., lithium metal or other active material) on a surface of an anode upon charging and reaction of the metal on the anode surface, wherein the metal diffuses from the anode surface, upon discharging. The uniformity with which the metal is deposited on the anode may affect cell performance. For example, when lithium metal is removed from and/or redeposited on an anode, it may, in some cases, result in an uneven surface. For example, upon redeposition it may deposit unevenly forming a rough surface. The roughened surface may increase the amount of lithium metal available for undesired chemical reactions which may result in decreased cycling lifetime and/or poor cell performance. The application of force to the electrochemical device has been found, in accordance with certain embodiments described herein, to reduce such behavior and to improve the cycling lifetime and/or performance of the cell.

In some embodiments, the battery (e.g., a housing of the battery) is configured to apply, during at least one period of time during charge and/or discharge of the device, an anisotropic force with a component normal to an electrode active surface of one of the electrochemical cells (e.g., first electrochemical cell, second electrochemical cell).

In some embodiments, an anisotropic force with a component normal to an electrode active surface of one of the electrochemical cells (e.g., first electrochemical cell, second electrochemical cell) is applied during at least one period of time during charge and/or discharge of the battery. In some embodiments, the force may be applied continuously, over one period of time, or over multiple periods of time that may vary in duration and/or frequency. The anisotropic force may be applied, in some cases, at one or more pre-determined locations, optionally distributed over an active surface of the one or more of the electrochemical cells of the battery. In some embodiments, the anisotropic force is applied uniformly over one or more active surfaces of the anode.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes certain forces applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

A force with a "component normal" to a surface, for example an active surface of an electrode such as a anode, is given its ordinary meaning as would be understood by those of ordinary skill in the art and includes, for example, a force which, at least in part, exerts itself in a direction substantially perpendicular to the surface. Those of ordinary skill can understand other examples of these terms, especially as applied within the description of this document.

In some embodiments, the anisotropic force can be applied such that the magnitude of the force is substantially equal in all directions within a plane defining a cross-section of the battery, but the magnitude of the forces in out-of-plane directions is substantially unequal to the magnitudes of the in-plane forces.

In one set of embodiments, batteries (e.g., housings) described herein are configured to apply, during at least one period of time during charge and/or discharge of the cell, an anisotropic force with a component normal to an electrode active surface of one of the electrochemical cells (e.g., first electrochemical cell, second electrochemical cell). Those of ordinary skill in the art will understand the meaning of this. In such an arrangement, the electrochemical cell may be formed as part of a container which applies such a force by virtue of a "load" applied during or after assembly of the cell, or applied during use of the battery as a result of expansion and/or contraction of one or more components of the battery itself.

The magnitude of the applied force is, in some embodiments, large enough to enhance the performance of the battery. An electrode active surface (e.g., anode active surface) and the anisotropic force may be, in some instances, together selected such that the anisotropic force affects surface morphology of the electrode active surface to inhibit increase in electrode active surface area through charge and discharge and wherein, in the absence of the anisotropic force but under otherwise essentially identical conditions, the electrode active surface area is increased to a greater extent through charge and discharge cycles. "Essentially identical conditions," in this context, means conditions that are similar or identical other than the application and/or magnitude of the force. For example, otherwise identical conditions may mean a battery that is identical, but where it is not constructed (e.g., by couplings such as brackets or other connections) to apply the anisotropic force on the subject battery.

As described herein, in some embodiments, the surface of an anode can be enhanced during cycling (e.g., for lithium, the development of mossy or a rough surface of lithium may be reduced or eliminated) by application of an externally-applied (in some embodiments, uniaxial) pressure. The externally-applied pressure may, in some embodiments, be chosen to be greater than the yield stress of a material forming the anode. For example, for an anode comprising lithium, the cell may be under an externally-applied anisotropic force with a component defining a pressure of at least 10 kgf/cm$^2$, at least 20 kgf/cm$^2$, or more. This is because the yield stress of lithium is around 7-8 kgf/cm$^2$. Thus, at pressures (e.g., uniaxial pressures) greater than this value, mossy Li, or any surface roughness at all, may be reduced or suppressed. The lithium surface roughness may mimic the surface that is pressing against it. Accordingly, when cycling under at least about 10 kgf/cm$^2$, at least about 20 kgf/cm$^2$, and/or up 30 kgf/cm$^2$, up to 40 kgf/cm$^2$ of externally-applied pressure, the lithium surface may become smoother with cycling when the pressing surface is smooth.

In some cases, one or more forces applied to the cell have a component that is not normal to an active surface of an anode. For example, in FIG. 1A force 184 is not normal to electrode active surfaces of the first electrochemical cell 110 and second electrochemical cell 120. In one set of embodiments, the sum of the components of all applied anisotropic forces in a direction normal to any electrode active surface of the battery is larger than any sum of components in a direction that is non-normal to the electrode active surface. In some embodiments, the sum of the components of all applied anisotropic forces in a direction normal to any electrode active surface of the battery is at least about 5%, at least about 10%, at least about 20%, at least about 35%, at least about 50%, at least about 75%, at least about 90%, at least about 95%, at least about 99%, or at least about 99.9% larger than any sum of components in a direction that is parallel to the electrode active surface.

In some cases, electrochemical cells may be pre-compressed before they are inserted into housings, and, upon being inserted to the house, they may expand to produce a net force on the electrochemical cells. Such an arrangement may be advantageous, for example, if the electrochemical cells are capable of withstanding relatively high variations in pressure.

Figure 27A:
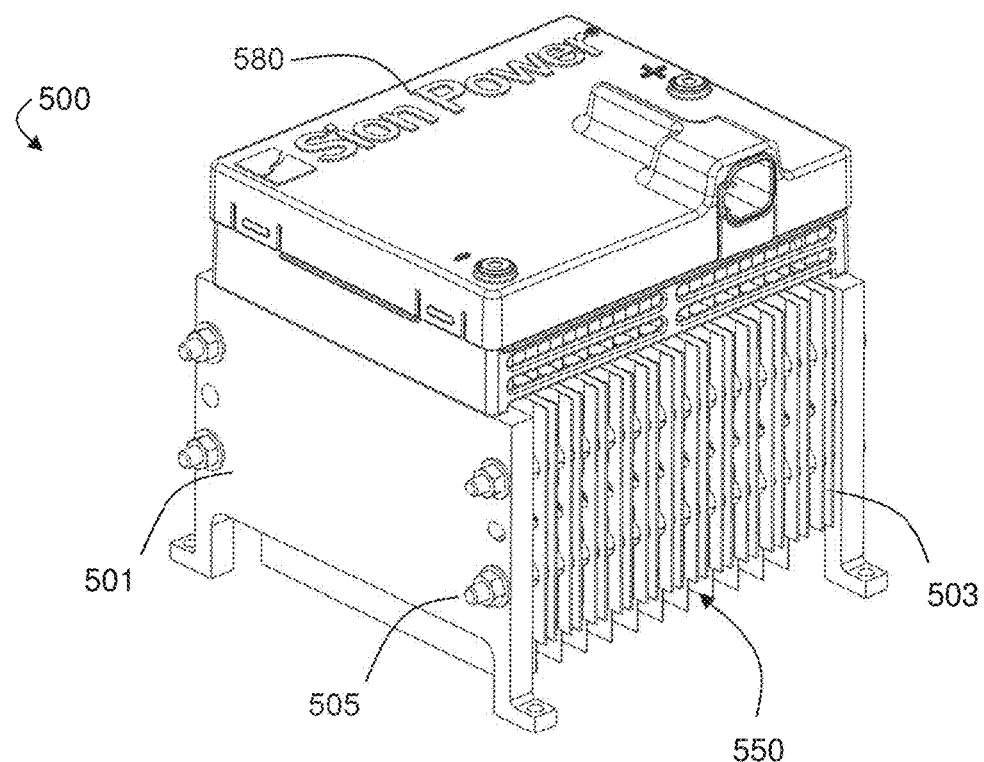
FIGS. 27A-27B show perspective schematic illustrations of an exemplary battery comprising electrochemical cells, according to some embodiments.
Figure 27B:
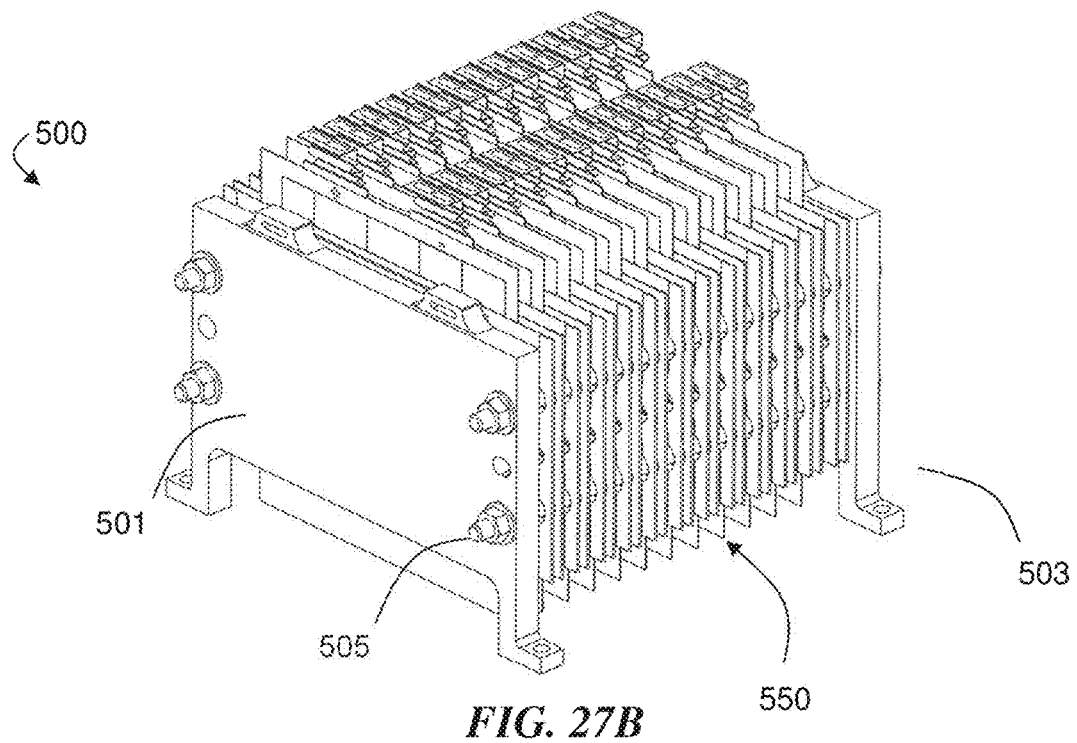
Figure 28:
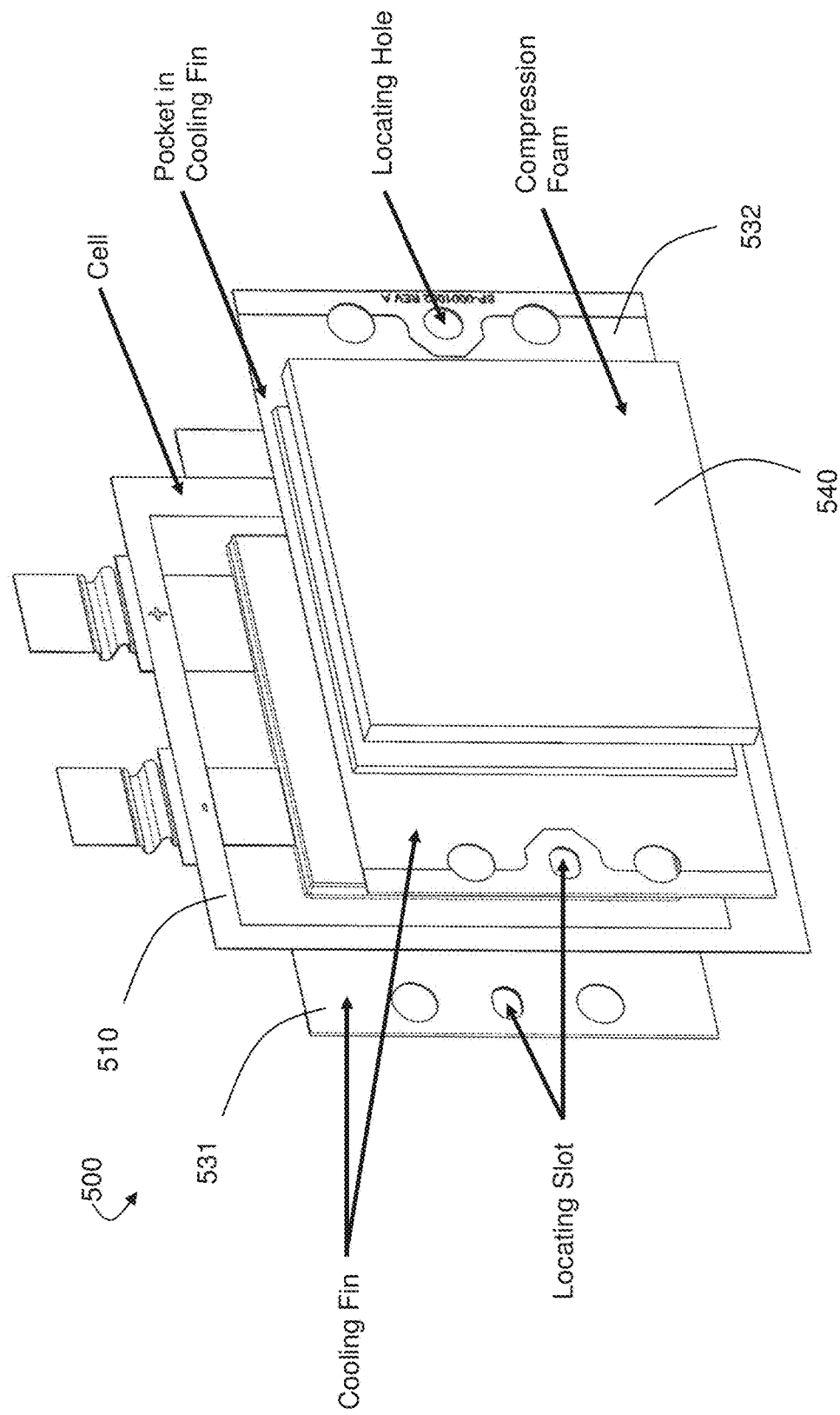
FIG. 28 shows a perspective schematic illustration of an exemplary battery comprising electrochemical cells, thermally conductive solid article portions comprising alignment features, and a thermally insulating compressible solid article portion, according to some embodiments.

FIGS. 27A-27B show perspective view schematic illustrations of battery 500, according to certain embodiments. Battery 500 shown in FIGS. 27A-27B comprises a plurality of electrochemical cells arranged in stack 550. FIG. 28 shows an exploded perspective view schematic illustration of a repeating unit of components in battery 500 according to certain embodiments, comprising electrochemical cell 510 between first thermally conductive solid article portion 531 and second thermally conductive solid article portion 532 (shown as aluminum cooling fins with locating holes and locating slots for alignment) and thermally insulating compressible solid article portion 540 shown as a compression foam comprising microcellular elastomeric foam. Battery 500 in FIGS. 27A-27B also comprises carbon fiber endplates 501 and 503 connected by compression rods 505. Exemplary battery 500 can also include a power bus and battery management system 580, as shown on the top of battery 500 in FIG. 27A. The electrochemical cells may comprise lithium metal anodes (e.g., vapor-deposited lithium metal) and lithium metal oxide intercalation cathodes (e.g., nickel-cobalt manganese intercalation cathodes).

Figure 29A:
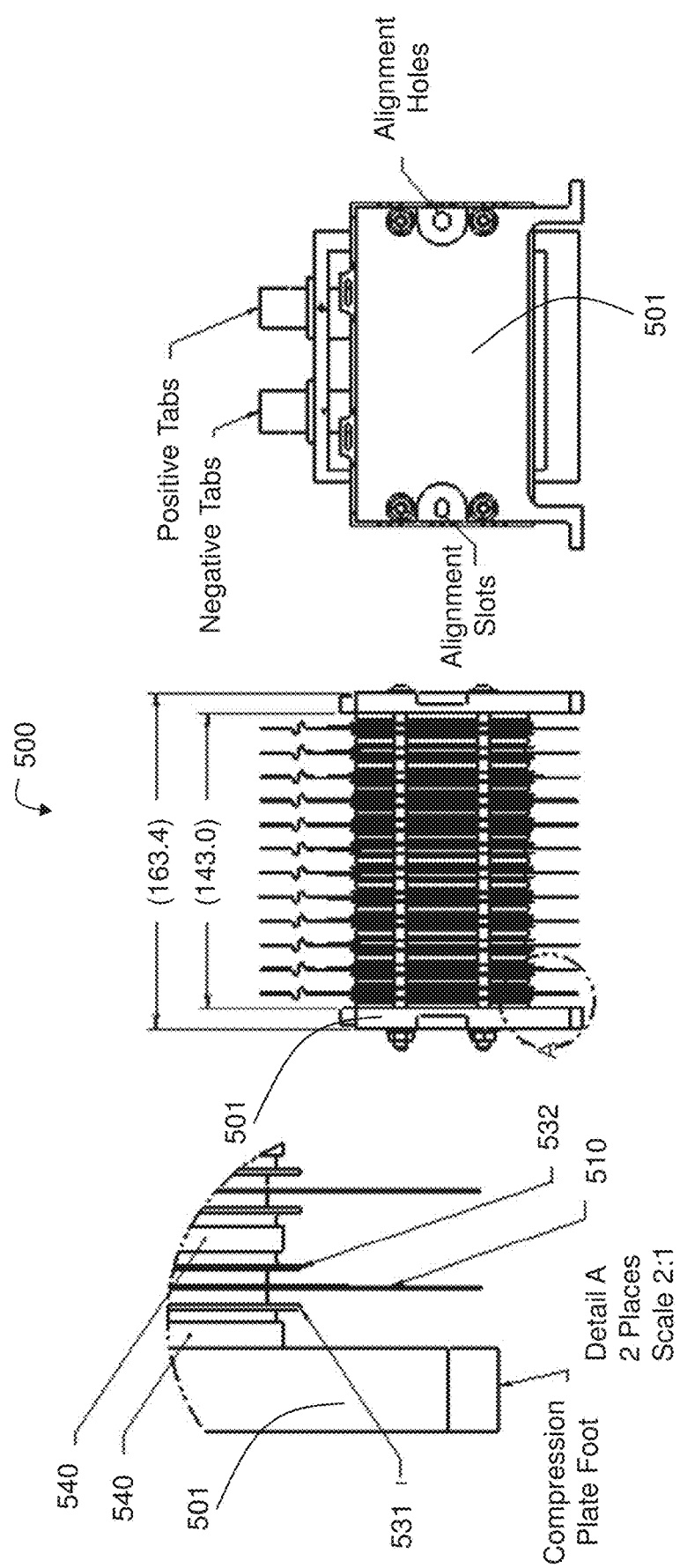
FIGS. 29A-29E show schematic diagrams of components of an exemplary battery, according to some embodiments.
Figure 29B:
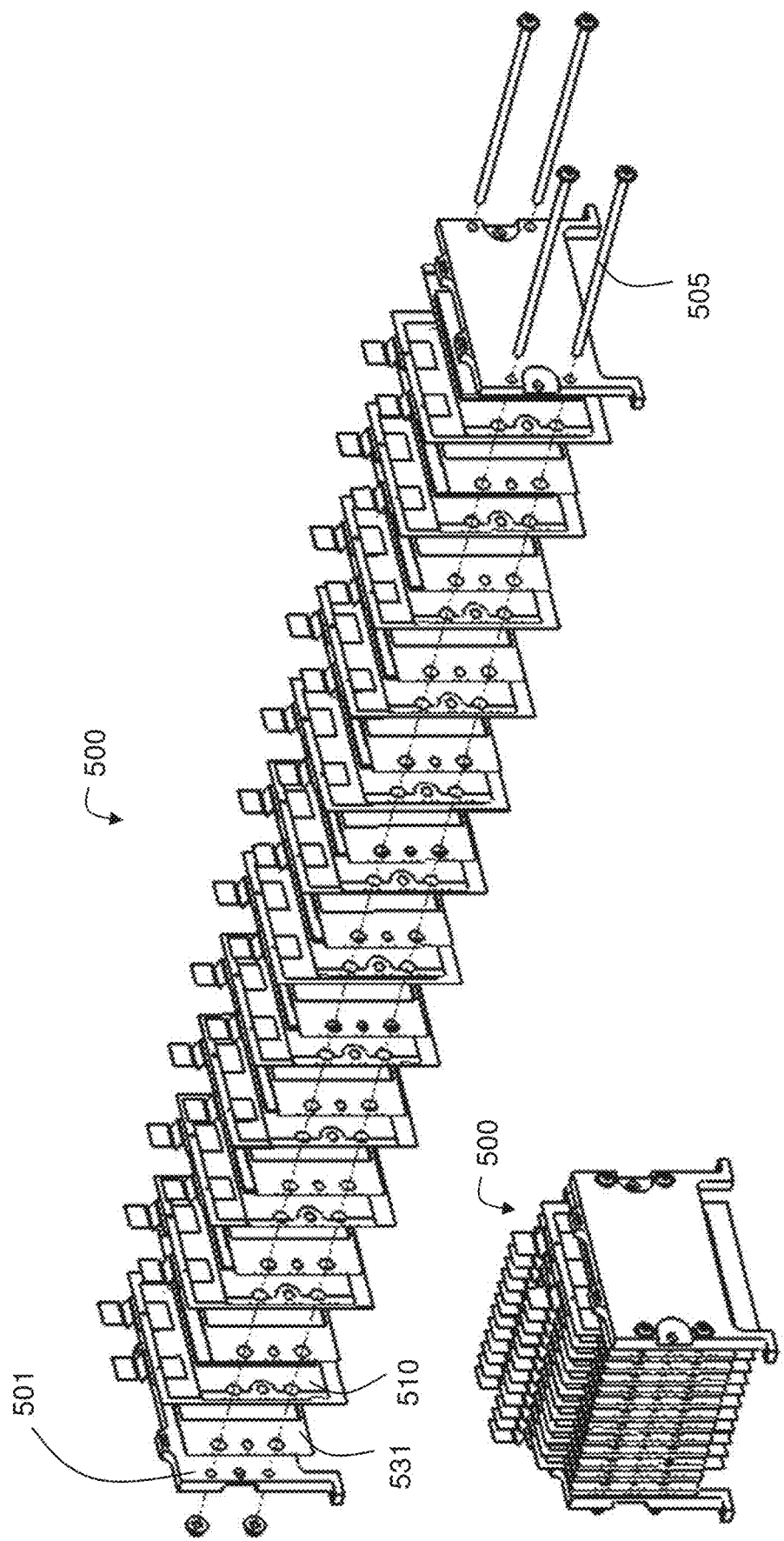
Figure 29C:
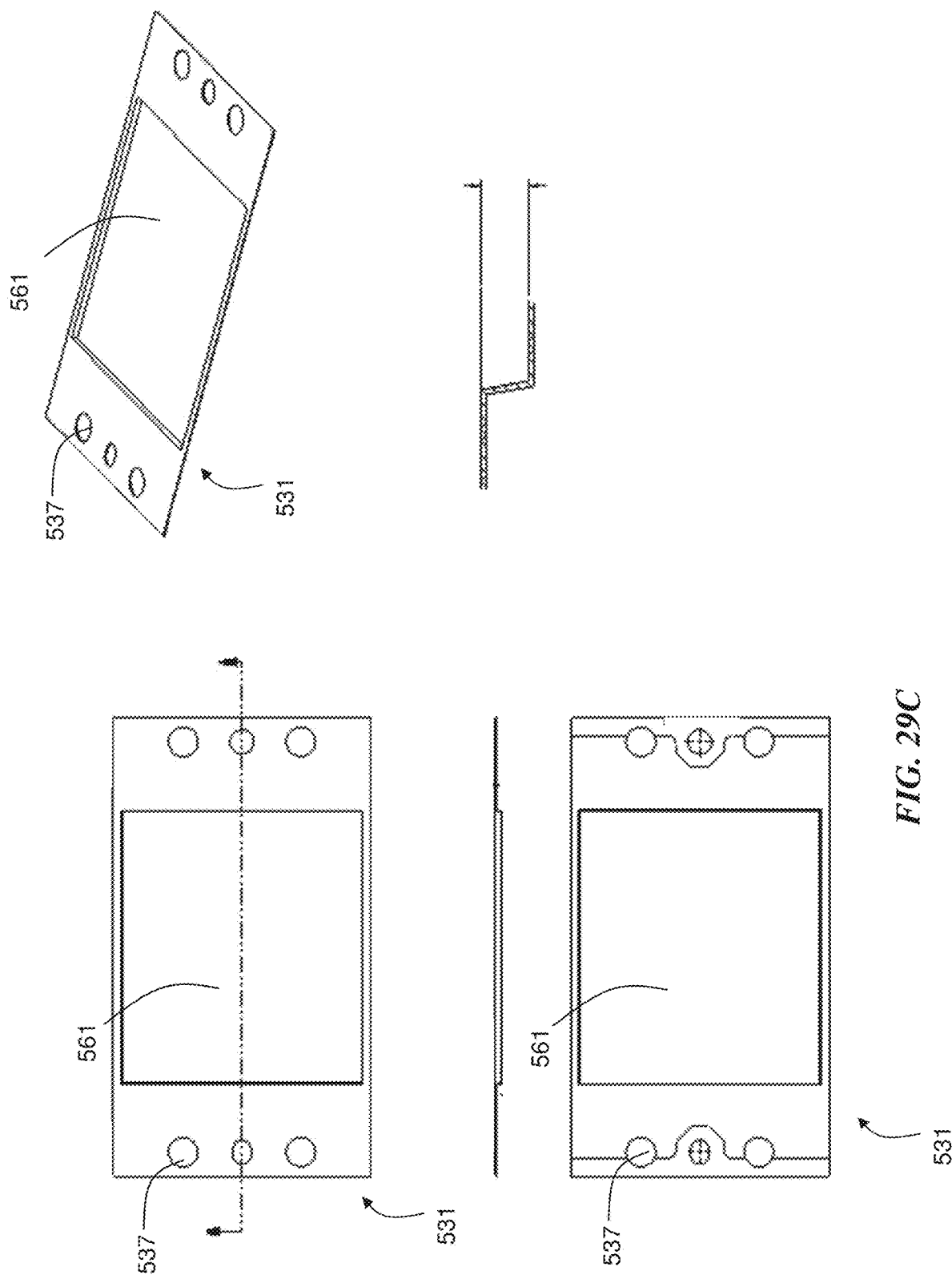
Figure 29D:
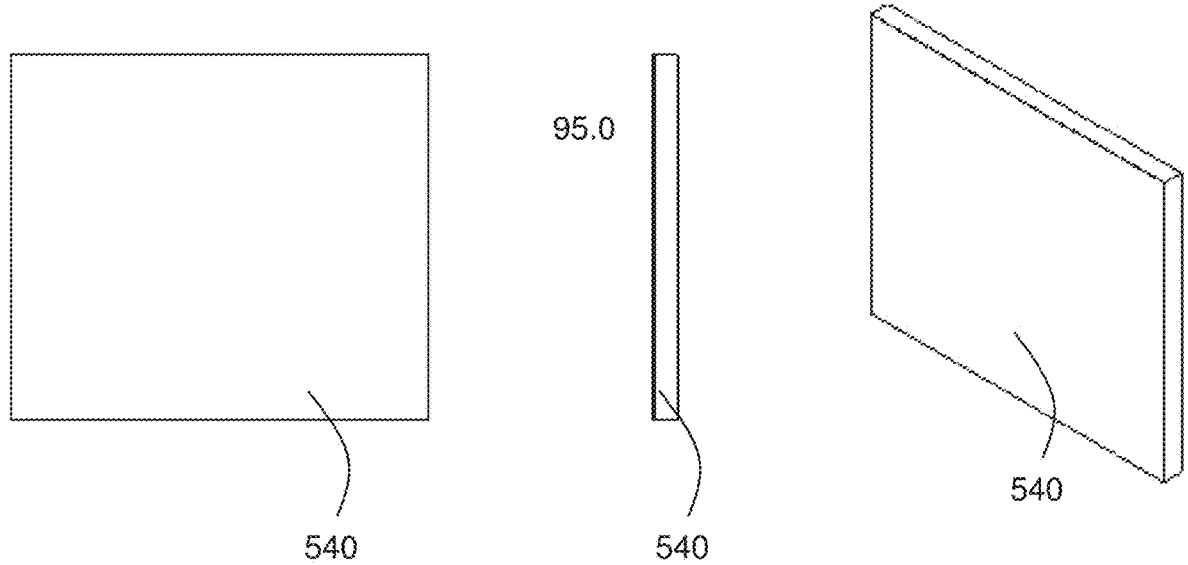
Figure 29E:
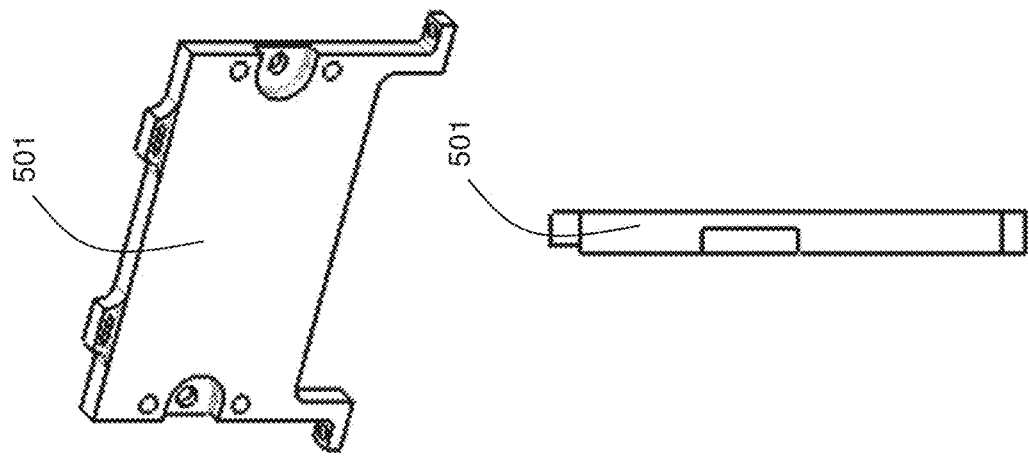
Figure 29E:
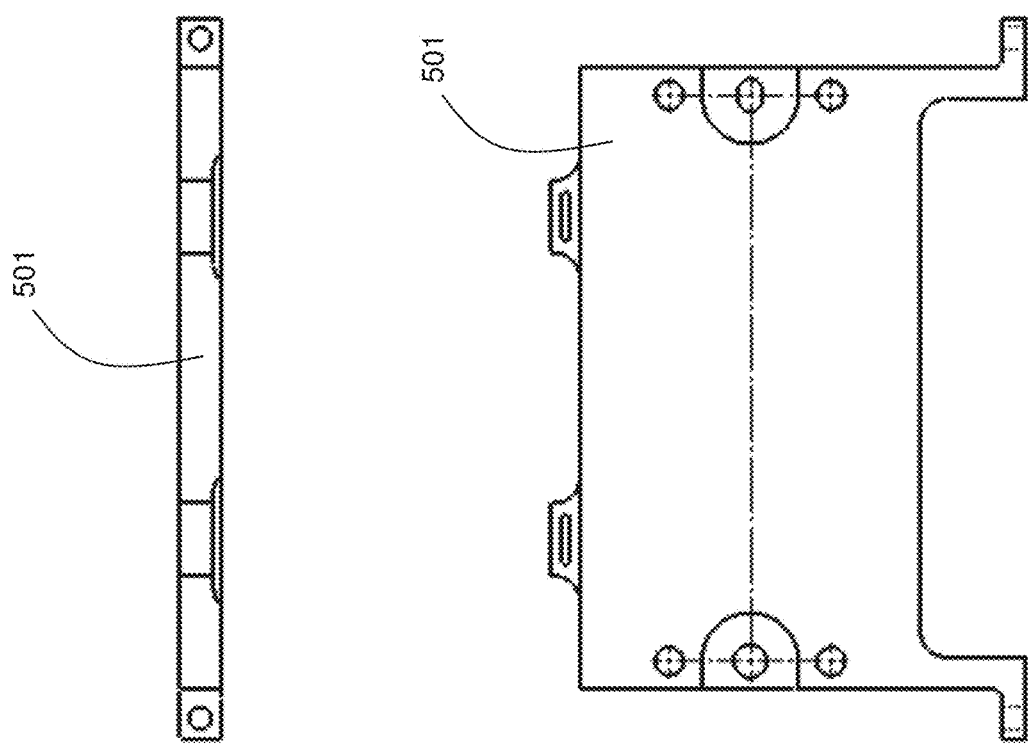

FIGS. 29A-29E show schematic diagrams of components of exemplary battery 500. FIG. 29A shows side view (center of FIG. 29A) and end view (right side of FIG. 29A) schematic illustrations of battery 500, including an inset (left side of FIG. 29A). FIG. 29A depicts arrangements of endplate 501, electrochemical cell 510 between first thermally conductive solid article portion 531 and second thermally conductive solid article portion 532 (shown as aluminum cooling fins with locating holes and locating slots for alignment) and thermally insulating compressible solid article portion 540 shown as a compression foam comprising microcellular elastomeric foam. FIG. 29B shows an exploded schematic illustration (top) and a perspective view schematic illustration (bottom) of battery 500, according to certain embodiments, including a solid plate in the form of endplate 501, a coupling comprising compression rods 505, electrochemical cell 510, and thermally conductive solid article portion 531). FIG. 29C shows schematic illustrations of exemplary thermally conductive solid article portion 531 in the form of a metal cooling fin comprising alignment feature 537 in the form of a holes and non-planarity 561 in the formed of a recessed pocket to couple to the electrochemical cells (e.g., electrochemical cell 510). FIG. 29D shows schematic illustrations of exemplary thermally insulating compressible solid article portion 540 in the form of a microcellular elastomeric foam. FIG. 29E shows schematic illustrations of exemplary endplate 501 to be used in the housing of exemplary battery 500, endplate 501 being in the form of a laminate carbon fiber endplate, according to certain embodiments.

The following applications are incorporated herein by reference, in their entirety, for all purposes: U.S. Patent Publication No. US 2007/0221265, published on Sep. 27, 2007, filed as application Ser. No. 11/400,781 on Apr. 6, 2006, and entitled "Rechargeable Lithium/Water, Lithium/Air Batteries"; U.S. Patent Publication No. US 2009/0035646, published on Feb. 5, 2009, filed as application Ser. No. 11/888,339 on Jul. 31, 2007, and entitled "Swelling Inhibition in Batteries"; U.S. Patent Publication No. US 2010/0129699, published on May 17, 2010, filed as application Ser. No. 12/312,674 on Feb. 2, 2010, patented as U.S. Pat. No. 8,617,748 on Dec. 31, 2013, and entitled "Separation of Electrolytes"; U.S. Patent Publication No. US 2010/0291442, published on Nov. 18, 2010, filed as application Ser. No. 12/682,011 on Jul. 30, 2010, patented as U.S. Pat. No. 8,871,387 on Oct. 28, 2014, and entitled "Primer for Battery Electrode"; U.S. Patent Publication No. US 2009/0200986, published on Aug. 31, 2009, filed as application Ser. No. 12/069,335 on Feb. 8, 2008, patented as U.S. Pat. No. 8,264,205 on Sep. 11, 2012, and entitled "Circuit for Charge and/or Discharge Protection in an Energy-Storage Device"; U.S. Patent Publication No. US 2007/0224502, published on Sep. 27, 2007, filed as application Ser. No. 11/400,025 on Apr. 6, 2006, patented as U.S. Pat. No. 7,771,870 on Aug. 10, 2010, and entitled "Electrode Protection in Both Aqueous and Non-Aqueous Electrochemical cells, Including Rechargeable Lithium Batteries"; U.S. Patent Publication No. US 2008/0318128, published on Dec. 25, 2008, filed as application Ser. No. 11/821,576 on Jun. 22, 2007, and entitled "Lithium Alloy/Sulfur Batteries"; U.S. Patent Publication No. US 2002/0055040, published on May 9, 2002, filed as application Ser. No. 09/795,915 on Feb. 27, 2001, patented as U.S. Pat. No. 7,939,198 on May 10, 2011, and entitled "Novel Composite Cathodes, Electrochemical Cells Comprising Novel Composite Cathodes, and Processes for Fabricating Same"; U.S. Patent Publication No. US 2006/0238203, published on Oct. 26, 2006, filed as application Ser. No. 11/111,262 on Apr. 20, 2005, patented as U.S. Pat. No. 7,688,075 on Mar. 30, 2010, and entitled "Lithium Sulfur Rechargeable Battery Fuel Gauge Systems and Methods"; U.S. Patent Publication No. US 2008/0187663, published on Aug. 7, 2008, filed as application Ser. No. 11/728,197 on Mar. 23, 2007, patented as U.S. Pat. No. 8,084,102 on Dec. 27, 2011, and entitled "Methods for Co-Flash Evaporation of Polymerizable Monomers and Non-Polymerizable Carrier Solvent/Salt Mixtures/Solutions"; U.S. Patent Publication No. US 2011/0006738, published on Jan. 13, 2011, filed as application Ser. No. 12/679,371 on Sep. 23, 2010, and entitled "Electrolyte Additives for Lithium Batteries and Related Methods"; U.S. Patent Publication No. US 2011/0008531, published on Jan. 13, 2011, filed as application Ser. No. 12/811,576 on Sep. 23, 2010, patented as U.S. Pat. No. 9,034,421 on May 19, 2015, and entitled "Methods of Forming Electrodes Comprising Sulfur and Porous Material Comprising Carbon"; U.S. Patent Publication No. US 2010/0035128, published on Feb. 11, 2010, filed as application Ser. No. 12/535,328 on Aug. 4, 2009, patented as U.S. Pat. No. 9,105,938 on Aug. 11, 2015, and entitled "Application of Force in Electrochemical Cells"; U.S. Patent Publication No. US 2011/0165471, published on Jul. 15, 2011, filed as application Ser. No. 12/180,379 on Jul. 25, 2008, and entitled "Protection of Anodes for Electrochemical Cells"; U.S. Patent Publication No. US 2006/0222954, published on Oct. 5, 2006, filed as application Ser. No. 11/452,445 on Jun. 13, 2006, patented as U.S. Pat. No. 8,415,054 on Apr. 9, 2013, and entitled "Lithium Anodes for Electrochemical Cells"; U.S. Patent Publication No. US 2010/0239914, published on Sep. 23, 2010, filed as application Ser. No. 12/727,862 on Mar. 19, 2010, and entitled "Cathode for Lithium Battery"; U.S. Patent Publication No. US 2010/0294049, published on Nov. 25, 2010, filed as application Ser. No. 12/471,095 on May 22, 2009, patented as U.S. Pat. No. 8,087,309 on Jan. 3, 2012, and entitled "Hermetic Sample Holder and Method for Performing Microanalysis under Controlled Atmosphere Environment"; U.S. Patent Publication No. US 2011/00765560, published on Mar. 31, 2011, filed as application Ser. No. 12/862,581 on Aug. 24, 2010, and entitled "Electrochemical Cells Comprising Porous Structures Comprising Sulfur"; U.S. Patent Publication No. US 2011/0068001, published on Mar. 24, 2011, filed as application Ser. No. 12/862,513 on Aug. 24, 2010, and entitled "Release System for Electrochemical Cells"; U.S. Patent Publication No. US 2012/0048729, published on Mar. 1, 2012, filed as application Ser. No. 13/216,559 on Aug. 24, 2011, and entitled "Electrically Non-Conductive Materials for Electrochemical Cells"; U.S. Patent Publication No. US 2011/0177398, published on Jul. 21, 2011, filed as application Ser. No. 12/862,528 on Aug. 24, 2010, and entitled "Electrochemical Cell"; U.S. Patent Publication No. US 2011/0070494, published on Mar. 24, 2011, filed as application Ser. No. 12/862,563 on Aug. 24, 2010, and entitled "Electrochemical Cells Comprising Porous Structures Comprising Sulfur"; U.S. Patent Publication No. US 2011/0070491, published on Mar. 24, 2011, filed as application Ser. No. 12/862,551 on Aug. 24, 2010, and entitled "Electrochemical Cells Comprising Porous Structures Comprising Sulfur"; U.S. Patent Publication No. US 2011/0059361, published on Mar. 10, 2011, filed as application Ser. No. 12/862,576 on Aug. 24, 2010, patented as U.S. Pat. No. 9,005,009 on Apr. 14, 2015, and entitled "Electrochemical Cells Comprising Porous Structures Comprising Sulfur"; U.S. Patent Publication No. US 2012/

0070746, published on Mar. 22, 2012, filed as application Ser. No. 13/240,113 on Sep. 22, 2011, and entitled "Low Electrolyte Electrochemical Cells"; U.S. Patent Publication No. US 2011/0206992, published on Aug. 25, 2011, filed as application Ser. No. 13/033,419 on Feb. 23, 2011, and entitled "Porous Structures for Energy Storage Devices"; U.S. Patent Publication No. 2013/0017441, published on Jan. 17, 2013, filed as application Ser. No. 13/524,662 on Jun. 15, 2012, patented as U.S. Pat. No. 9,548,492 on Jan. 17, 2017, and entitled "Plating Technique for Electrode"; U.S. Patent Publication No. US 2013/0224601, published on Aug. 29, 2013, filed as application Ser. No. 13/766,862 on Feb. 14, 2013, patented as U.S. Pat. No. 9,077,041 on Jul. 7, 2015, and entitled "Electrode Structure for Electrochemical Cell"; U.S. Patent Publication No. US 2013/0252103, published on Sep. 26, 2013, filed as application Ser. No. 13/789,783 on Mar. 8, 2013, patented as U.S. Pat. No. 9,214,678 on Dec. 15, 2015, and entitled "Porous Support Structures, Electrodes Containing Same, and Associated Methods"; U.S. Patent Publication No. US 2013/0095380, published on Apr. 18, 2013, filed as application Ser. No. 13/644,933 on Oct. 4, 2012, patented as U.S. Pat. No. 8,936,870 on Jan. 20, 2015, and entitled "Electrode Structure and Method for Making the Same"; U.S. Patent Publication No. US 2014/0123477, published on May 8, 2014, filed as application Ser. No. 14/069,698 on Nov. 1, 2013, patented as U.S. Pat. No. 9,005,311 on Apr. 14, 2015, and entitled "Electrode Active Surface Pretreatment"; U.S. Patent Publication No. US 2014/0193723, published on Jul. 10, 2014, filed as application Ser. No. 14/150,156 on Jan. 8, 2014, patented as U.S. Pat. No. 9,559,348 on Jan. 31, 2017, and entitled "Conductivity Control in Electrochemical Cells"; U.S. Patent Publication No. US 2014/0255780, published on Sep. 11, 2014, filed as application Ser. No. 14/197,782 on Mar. 5, 2014, patented as U.S. Pat. No. 9,490,478 on Nov. 6, 2016, and entitled "Electrochemical Cells Comprising Fibril Materials"; U.S. Patent Publication No. US 2014/0272594, published on Sep. 18, 2014, filed as application Ser. No. 13/833,377 on Mar. 15, 2013, and entitled "Protective Structures for Electrodes"; U.S. Patent Publication No. US 2014/0272597, published on Sep. 18, 2014, filed as application Ser. No. 14/209,274 on Mar. 13, 2014, and entitled "Protected Electrode Structures and Methods"; U.S. Patent Publication No. US 2014/0193713, published on Jul. 10, 2014, filed as application Ser. No. 14/150,196 on Jan. 8, 2014, patented as U.S. Pat. No. 9,531,009 on Dec. 27, 2016, and entitled "Passivation of Electrodes in Electrochemical Cells"; U.S. Patent Publication No. US 2014/0272565, published on Sep. 18, 2014, filed as application Ser. No. 14/209,396 on Mar. 13, 2014, and entitled "Protected Electrode Structures"; U.S. Patent Publication No. US 2015/0010804, published on Jan. 8, 2015, filed as application Ser. No. 14/323,269 on Jul. 3, 2014, and entitled "Ceramic/Polymer Matrix for Electrode Protection in Electrochemical Cells, Including Rechargeable Lithium Batteries"; U.S. Patent Publication No. US 2015/044517, published on Feb. 12, 2015, filed as application Ser. No. 14/455,230 on Aug. 8, 2014, and entitled "Self-Healing Electrode Protection in Electrochemical Cells"; U.S. Patent Publication No. US 2015/0236322, published on Aug. 20, 2015, filed as application Ser. No. 14/184,037 on Feb. 19, 2014, and entitled "Electrode Protection Using Electrolyte-Inhibiting Ion Conductor"; U.S. Patent Publication No. US 2016/0072132, published on Mar. 10, 2016, filed as application Ser. No. 14/848,659 on Sep. 9, 2015, and entitled "Protective Layers in Lithium-Ion Electrochemical Cells and Associated Electrodes and Methods"; International Publication No. WO 2018/170413 A1, published on Sep. 20, 2018, file as Application No. PCT/US2018/022889 on Mar. 16, 2018, and entitled "Electrode Edge Protection in Electrochemical Cells"; International Publication No. WO 2020/139802 A2, published on Jul. 2, 2020, file as Application No. PCT/US2019/068244 on Dec. 23, 2019, and entitled "Electrochemical Devices and Related Articles, Components, Configurations, and Methods"; International Application No. PCT/US2020/033938, filed on May 21, 2020, and entitled "Electrically Coupled Electrodes, and Associated Articles and Methods"; and International Application No. PCT/US2020/038375, filed on Jun. 18, 2020, and entitled "Methods, Systems, and Devices for Applying Forces to Electrochemical Devices."

U.S. Provisional Patent Application Ser. No. 62/937,761, filed Nov. 19, 2019, and entitled "Batteries, and Associated Systems and Methods," U.S. Provisional Application Ser. No. 62/951,086, filed Dec. 20, 2019, and entitled "Batteries, and Associated Systems and Methods," U.S. Provisional Application Ser. No. 62/951,099, filed Dec. 20, 2019, and entitled "Electrochemical Cell Stacks, and Associated Components," U.S. Provisional Application Ser. No. 62/951,144, filed Dec. 20, 2019, and entitled "Thermally Insulating Compressible Components for Battery Packs," U.S. Provisional Application Ser. No. 62/951,151, filed Dec. 20, 2019, and entitled "Battery Alignment, and Associated Systems and Methods," and U.S. Provisional Application Ser. No. 62/951,161, filed Dec. 20, 2019, and entitled "Batteries with Components Including Carbon Fiber, and Associated Systems and Methods," are each incorporated herein by reference in its entirety for all purposes.

It should be understood that when a portion (e.g., layer, structure, region) is "on", "adjacent", "above", "over", "overlying", or "supported by" another portion, it can be directly on the portion, or an intervening portion (e.g., layer, structure, region) also may be present. Similarly, when a portion is "below" or "underneath" another portion, it can be directly below the portion, or an intervening portion (e.g., layer, structure, region) also may be present. A portion that is "directly on", "directly adjacent", "immediately adjacent", "in direct contact with", or "directly supported by" another portion means that no intervening portion is present. It should also be understood that when a portion is referred to as being "on", "above", "adjacent", "over", "overlying", "in contact with", "below", or "supported by" another portion, it may cover the entire portion or a part of the portion.

The following examples are intended to illustrate certain embodiments of the present invention, but do not exemplify the full scope of the invention.

Example 1

Figure 30A:
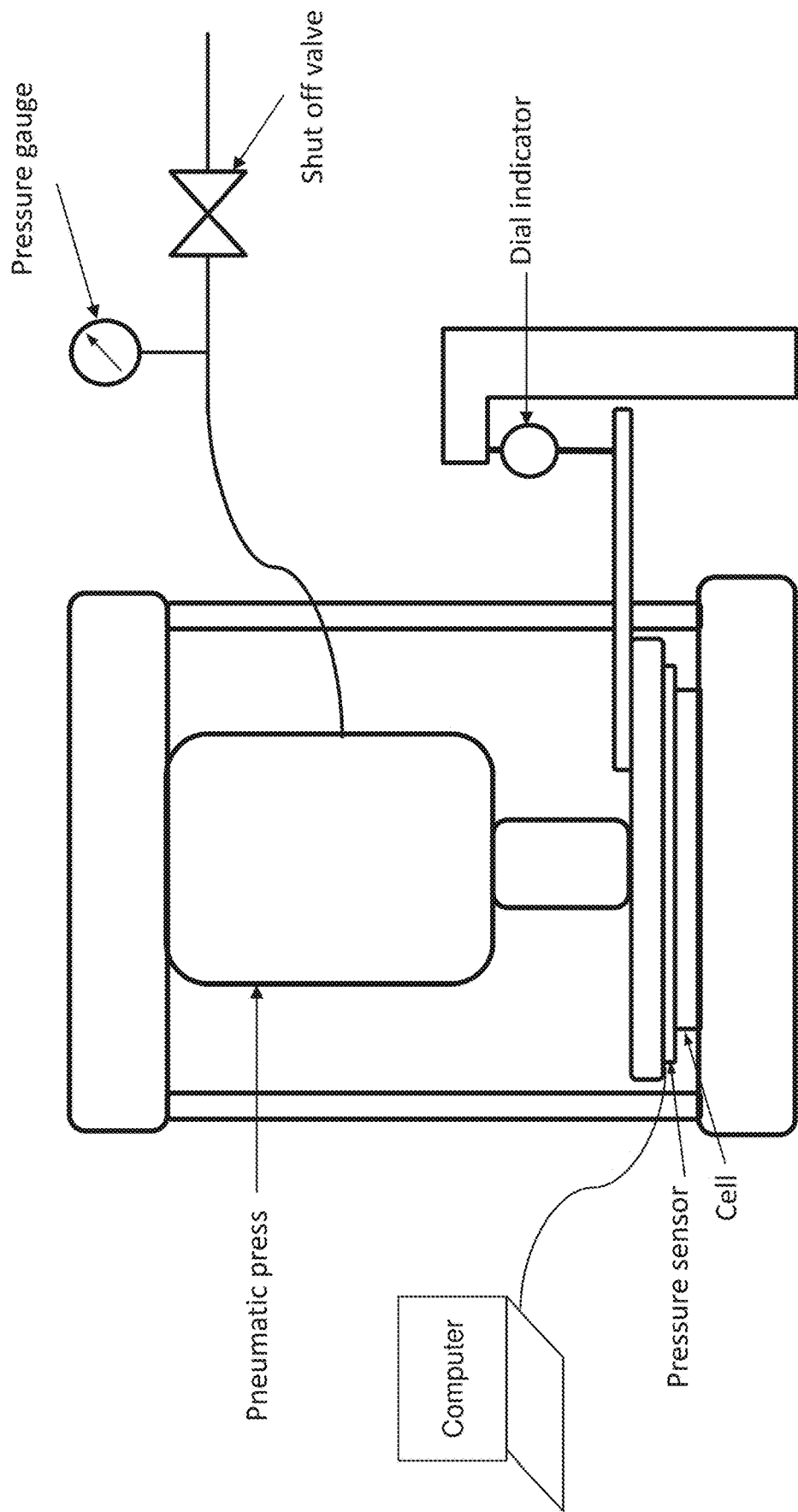
FIG. 30A shows a schematic illustration of an exemplary apparatus for applying a force to an electrochemical cell and measuring pressure and changes in electrochemical cell thickness, according to some embodiments.

This Example describes the measurement of electrochemical cell thicknesses and battery discharge capacity during the cycling of an exemplary battery. In the experiments, a uniform pressure of 12 kgf/cm$^2$ was applied to the electrochemical active areas of 20 Ah electrochemical cells comprising lithium metal anodes. The pressure was applied to the 91 mm×80 mm electrochemical active areas of the electrochemical cells. FIG. 30A shows a schematic illustration of the experimental apparatus, where a pneumatic cylinder press (Numatics Series NFPA, PN: F1AU-50AE-CAA3) equipped with a pressure regulator was employed to apply pressure to the 20 Ah cell. The pneumatic cylinder was maintained at 80 psi (12.28 kgf/cm$^2$). A Tekscan 5101 sensor and I-scan software were used to measure the pressure and pressure distribution. The sensor was calibrated to a target pressure of 15 kgf/cm$_2$ with a 91 mm×80 mm area. A Mitutoyo ABSOLUTE Digimatic Indicator (dial indicator) Model ID-C125EXB having a resolution of 0.00005 inches or 0.001 mm was used to measure the height change during the application of pressure via the pneumatic cylinder press. The pressure sensor and the Mitutoyo Digimatic Indicator were connected to a laptop computer to record the data.

The testing procedure involved measuring and recording the initial 20 Ah electrochemical cell thickness, and then assembling the 20 Ah electrochemical cell and the Tekscan sensor 5101 between two 91 mm×80 mm×6 mm pieces of Cellasto® elastomeric microcellular polyurethane foam layers purchased from BASF in an interconnect tray assembly. The Tekscan sensor was placed between the electrochemical cell and the Cellasto® foam. The assembly in the interconnect tray was placed in the cylinder press assembly illustrated schematically in FIG. 30A, which was then placed in a containment box for fire safety. The Mitutoyo Digimatic Indicator was secured as shown in FIG. 30A.

Figure 30B:
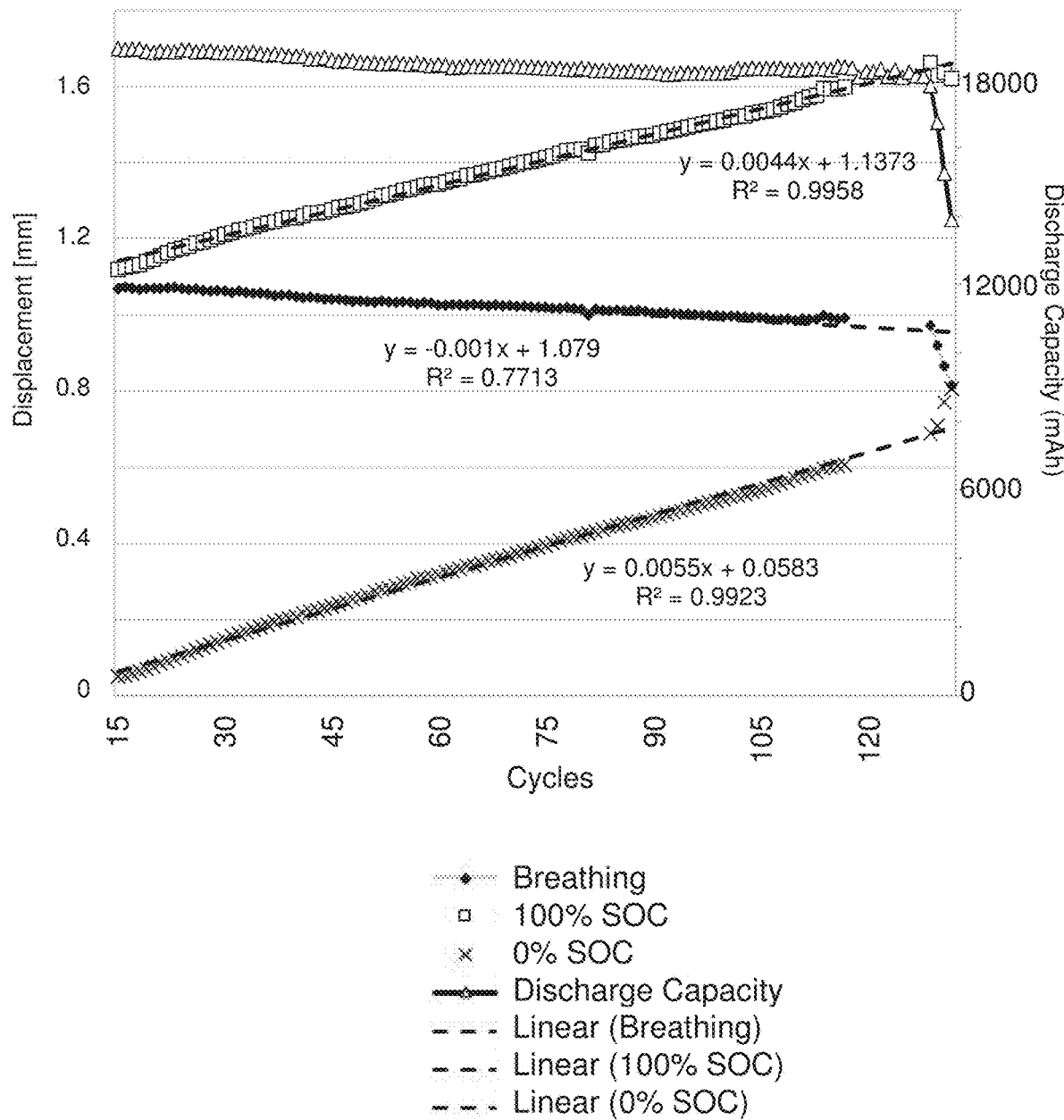
FIG. 30B shows a plot of displacement, cell breathing, and discharge capacity as a function of number of cycles of an exemplary battery, according to some embodiments.

One hundred thirty-two cycles were measured after three formation cycles, with each cycle consisting of a C/6 charge and a 2C/3 discharge. The formation cycles involved a 2 minute rest, followed by charging at 1320 mA to 4.35 V (~16 hours), tapering the charging at 4.35 V down to a 264 mA current (~15 minutes), followed by another 2 minute rest, followed by a discharge at 5280 mA to 3.2 V, with a capacity cut-off of 15 Ah. The one hundred thirty-two post-formation cycles involved a 2 minute rest, charging at 3300 mA to 4.35 V (~6.6 hours), tapering the charging at 4.35 V down to 660 mA (~30 minutes), followed by a 2 minute rest, followed by discharging at 13,200 mA to 3.2 V, with a capacity cut-off of 15 Ah. The test ended after the one hundred thirty-two cycles when the cell capacity fell below the 15 Ah cut-off. Changes in the thickness of the cells were measured as displacement using the dial indicator. The electrochemical cell had a thickness of 8.110 mm following the three formation cycles. FIG. 30B shows the results, with the 0% state of charge (SOC) displacement shown as X's, the 100% SOC shown as boxes, the "breathing" shown as filled diamonds (the breathing being the difference between the 0% SOC and 100% SOC displacements), and the discharge capacity of the battery shown as unfilled triangles. The data points were recorded at a rate of 1 per minute. Linear fits are shown as dashed lines.

As can be seen in FIG. 30B, an average breathing of the cells of 1.03 mm during each cycle was observed, and an overall 0.6 mm growth of the cells from beginning of operational life (BoL) to end of operational life (EoL) was observed during the course of the one hundred thirty-two cycles (comparing 0% SOC at BoL to 0% SOC at EoL).

Example 2

This Example describes the measurement of compression percentage of a series of thermally insulating compressible solid articles as a function of compressive stress. Each of the thermally insulating compressible solid articles was made of Cellasto® elastomeric microcellular polyurethane foam purchased from BASF. Samples of varying uncompressed thickness and density were measured at different compression rates.

A total of 7 samples sets were used, each sample set having a quantity of 10 identical specimens measured under identical conditions, except for sample set 7. Each specimen had a width and lateral dimensions of 91 mm×80 mm. Compressive stress versus percent compression curves were generated by measuring foam displacement according to a modified version the ASTM D3574 standard test in which the compression rate was varied between different samples (specified in Table 1 below). Table 1 reports sample information:

TABLE 1

Sample set dimensions and properties.

| Sample Set No. | Uncompressed Thickness (mm) | Uncompressed Density (g/cm$^3$) | Compression Rate |
|---|---|---|---|
| 1 | 3.15 | 0.45 | 0.1 mm/s |
| 2 | 3.15 | 0.45 | 0.05 mm/s |
| 3 | 6.35 | 0.45 | 0.1 mm/s |
| 4 | 6.35 | 0.45 | 0.05 mm/s |
| 5 | 6.35 | 0.6 | 0.1 mm/s |
| 6 | 6.35 | 0.6 | 0.05 mm/s |
| 7 | 6.35 | 0.6 | 6 hour duration |

Figure 31:
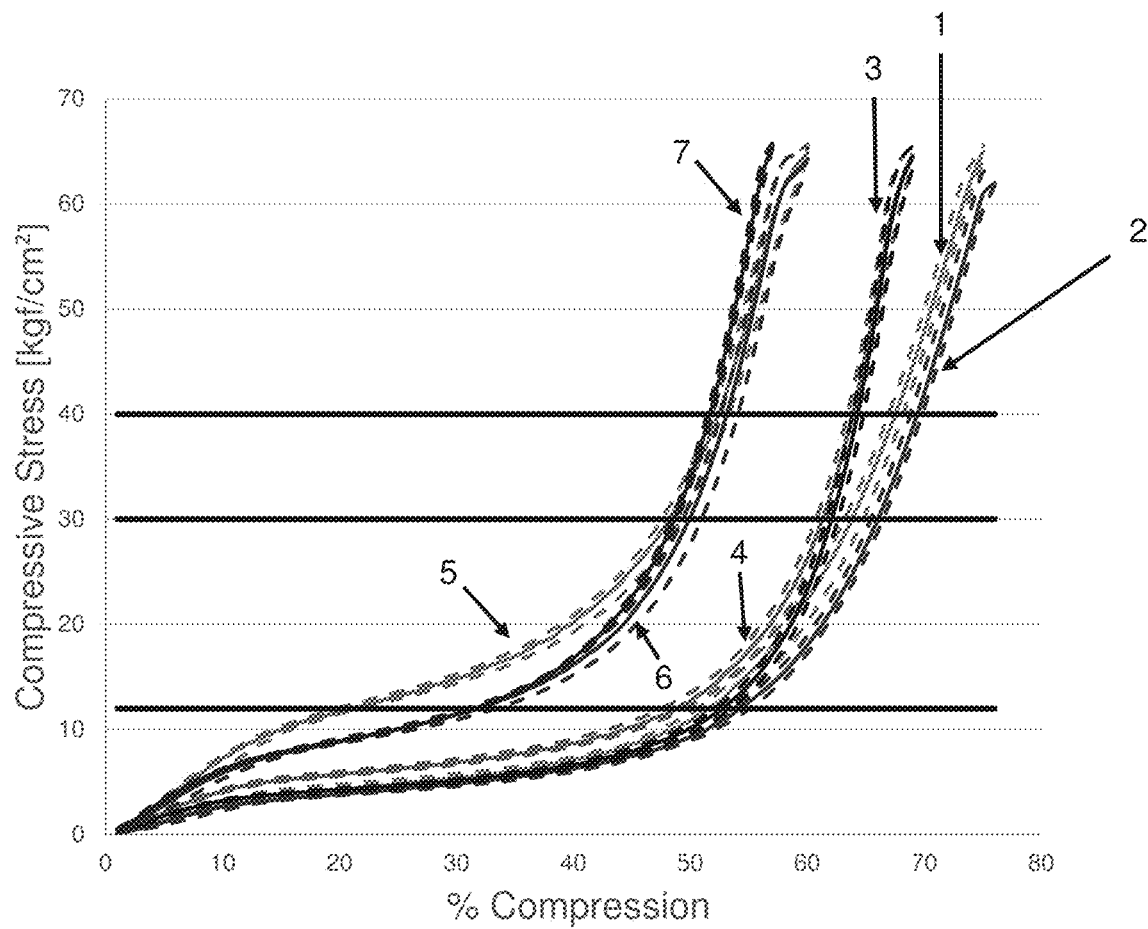
FIG. 31 shows a plot of compressive stress versus percent compression curves for thermally insulating compressible solid article portions, according to some embodiments.

FIG. 31 shows the compressive stress versus percent compression curves for each of samples sets 1-7. The solids lines are the average measured values for the specimens within the sample sets, and the dashed lines represent the first and third quartile as the statistical upper and lower limits. The measured curves showed that the mass density of the samples had a significant effect on the stress-strain characteristics of the samples, with the more dense samples showing a more gradual and lower extent of compression than the less dense samples. The curves showed that the uncompressed thickness of the samples had a small but observable effect on the extent of compression at lower compressive stresses and a more significant effect at high compressive stresses. During the experiments, it was observed that the Cellasto® foam samples had a continuous dynamic load limit of 40 kgf/cm$^2$. However, it was also observed that single impacts generating compressive stresses of up to 200 kgf/cm$^2$ did not cause failure of the samples.

The thick solid horizontal lines in FIG. 31 represent compressive stresses of 12 kgf/cm$^2$, 30 kgf/cm$^2$, and 40 kgf/cm$^2$. These lines indicate that the thermally insulating compressible solid article samples tested in this Example are capable of undergoing compression of between approximately 30% and approximately 50% under compressive stresses of between 12 kgf/cm$^2$ and 30 kgf/cm$^2$.

Example 3

Figure 32A:
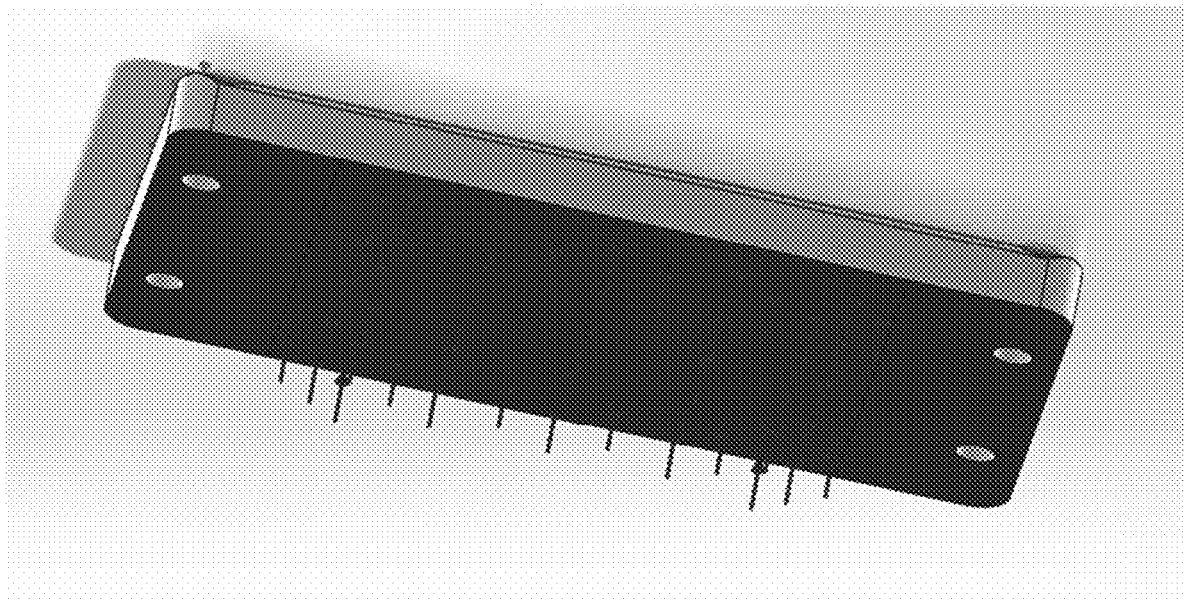
FIGS. 32A-32C show schematic illustrations related to exemplary solid plates and related tests for batteries, according to some embodiments.

This Example describes displacement of exemplary endplates that can be included in a battery. Endplates with unidirectional carbon fiber with moduli of 19 Msi (130 GPa), 33 Msi (226 GPa), and 53 Msi (363 GPa) and 93 Msi (637 GPa) were used. The carbon fiber endplates had a laminate design (plies with a [0°/90°/0°] arrangement), and samples had thicknesses of 8 mm, 10 mm, and 12 mm. FIG. 32A shows an illustration of arrows indicating the direction of the application of force to the carbon fiber end plates.

Figure 32B:
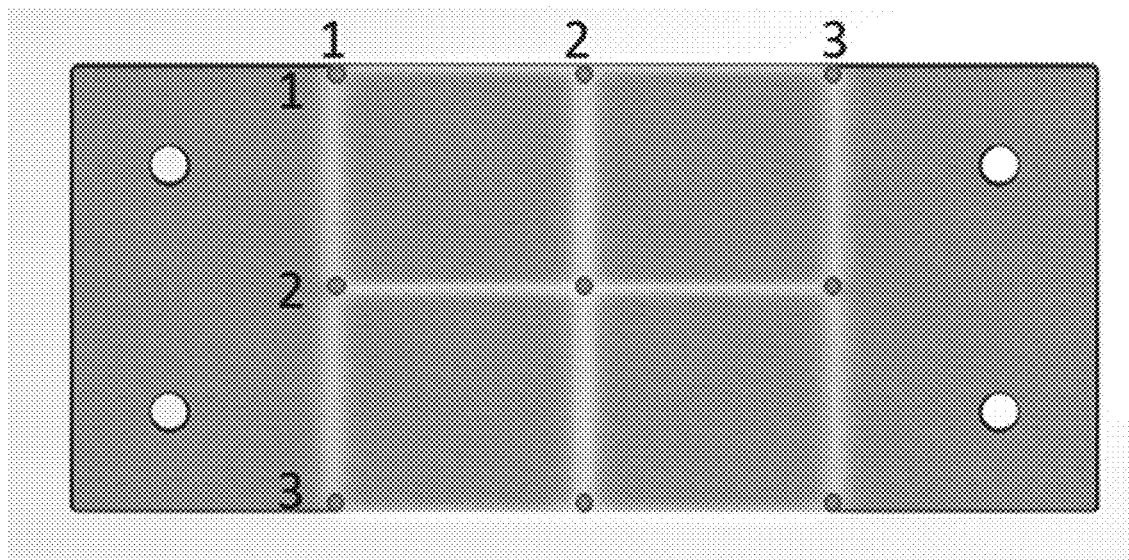
Figure 32C:
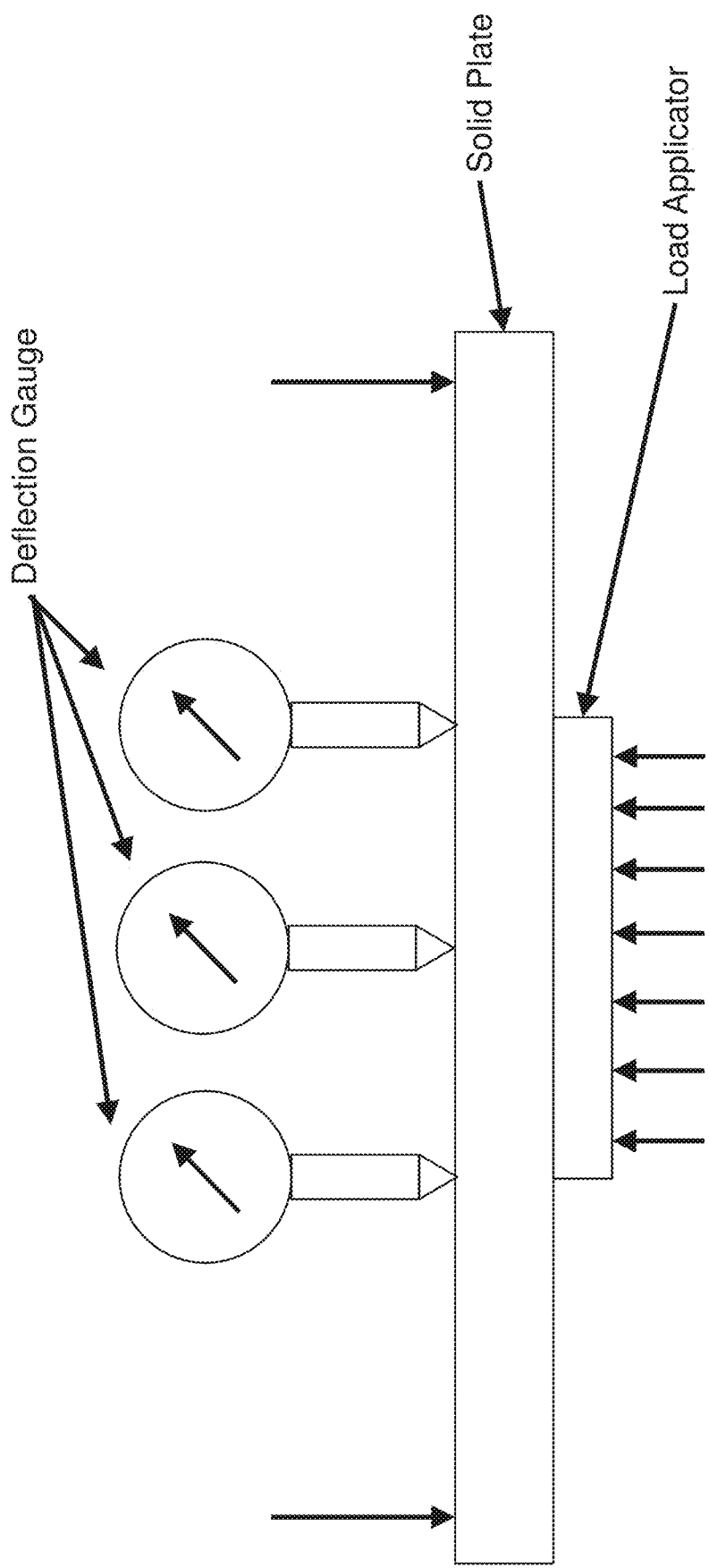

Sample plate 1 was a unidirectional carbon fiber end plate having dimensions of 154 mm×84 mm×10 mm, a modulus of 33 Msi (226 GPa), a fiber content of 65 wt %, a binder content of 35 wt %, a mass of 198 g, and having 51 laminated plies (layers) using a [0°/90°/0°] orientation sequence. A 9-point deflection test was simulated on sample plate 1 using a force defining a uniform pressure of 12 kgf/cm$^2$ applied to a 91 mm×80 mm area of the end plate. FIG. 32B shows a schematic of a nine-point deflection test, which measured the displacement of the carbon fiber end plate under a 12 kgf/cm² load. FIG. 32C shows side-view schematic of an experimental setup for a 9-point deflection test as used in examples below, indicating the direction of applied forces and the position of deflection gauges. In this Example, finite element analysis (FEA) was used to analyze the deflection one would obtain in the setup of FIG. 32C. Table 2 shows a map of the raw data as well as the "delta" deflection difference with respect to the center point under the load. All values in Table 2 are in millimeters. For example, Table 2 shows that plate 1 was deflected under the load by 0.488 more millimeters at point (1,1) than at the center point (2,2).

TABLE 2

9-Point Deflection Map for sample plate 1.

|  | 1 | 2 | 3 |
|---|---|---|---|
| Raw (mm) | | | |
| 1 | 8.581 | 7.983 | 8.576 |
| 2 | 8.637 | 8.093 | 8.639 |
| 3 | 8.581 | 7.988 | 8.573 |
| Delta Deflection (mm) | | | |
| 1 | 0.488 | −0.110 | 0.483 |
| 2 | 0.544 | 0.000 | 0.546 |
| 3 | 0.488 | −0.105 | 0.480 |

Sample plate 2 was a simulated unidirectional carbon fiber endplate having dimensions of 145 mm×84 mm×12 mm, a modulus of 93 Msi (637 GPa), a fiber content of 65 wt %, a binder content of 35 wt %, and having 63 laminated plies (layers) using a [0°/90°/0°] orientation sequence. Uniform loads of 12 kgf/cm², 20 kgf/cm², and 40 kgf/cm² were applied to sample plate during FEA as conditions 2A, 2B, and 2C, respectively, and deflection, Max Von Mises Stress, and safety factors were measured for each condition. Table 3A shows lists condition information and the simulated results from the load tests:

TABLE 3A

Load measurements for sample plate 2. Values acquired from simulation.

| Condition No. | Mass, grams | Load Condition, kg/cm² | Deflection Max, mm | Deflection Ideal, mm | % deviation | Max Von Mises Stress. MPa | Safety Factor |
|---|---|---|---|---|---|---|---|
| 2A | 217.72 | 12 | 0.06 | 0.1 | −40 | 107.2 | 22.11 |
| 2B | 217.72 | 20 | 0.11 | 0.1 | 10 | 178.66 | 13.27 |
| 2C | 217.72 | 40 | 0.22 | 0.1 | 120 | 357.38 | 6.63 |

Additionally, a 9-point deflection test was simulated for sample plate 2, with a applied force defining a uniform pressure of 12 kgf/cm² applied to a 91 mm×80 mm area of the end plate. Table 3B shows a map the raw data for each of the 9 coordinates, as well as the "delta" deflection difference with respect to the center point (2,2) under the load. All values in Table 3B are in millimeters. For example, Table 3B shows that sample plate 2 was deflected under the load by 0.103 more millimeters at point (1,1) than at the center point (2,2).

TABLE 3B

9-Point Deflection Map for sample plate 2. Values acquired from simulation.

|  | 1 | 2 | 3 |
|---|---|---|---|
| Raw (mm) | | | |
| 1 | 3.320 | 3.437 | 3.320 |
| 2 | 3.313 | 3.423 | 3.313 |
| 3 | 3.320 | 3.437 | 3.320 |
| Delta Deflection (mm) | | | |
| 1 | 0.103 | −0.014 | 0.103 |
| 2 | 0.110 | 0.000 | 0.110 |
| 3 | 0.103 | −0.014 | 0.103 |

Sample plate 3 was a simulated unidirectional carbon fiber endplate having dimensions of 145 mm×84 mm×10 mm, a modulus of 53 Msi (363 GPa), a fiber content of 65 wt %, a binder content of 35 wt %, and having 51 laminated plies (layers) using a [0°/90°/0°] orientation sequence. Uniform loads of 12 kgf/cm², 20 kgf/cm², and 40 kgf/cm² were applied to sample plate 3 as conditions 3A, 3B, and 3C, respectively, and deflection, Max Von Mises Stress, and safety factors were measured for each condition. Table 4 shows lists condition information and the calculations from the load tests:

TABLE 4

Load measurements for sample plate 3. Values acquired from simulation.

| Condition No. | Mass, grams | Load Condition, kg/cm² | Deflection Max, mm | Deflection Ideal, mm | % deviation | Max Von Mises Stress MPa | Safety Factor |
|---|---|---|---|---|---|---|---|
| 3A | 181.24 | 12 | 0.187 | 0.1 | 210 | 153.96 | 15.39 |
| 3B | 181.24 | 20 | 0.31 | 0.1 | 210 | 256.94 | 9.22 |
| 3C | 181.24 | 40 | 0.62 | 0.1 | 520 | 516.4 | 4.59 |

Comparison of the 9-point deflection maps for sample plate 1 and sample plate 2 shows that the higher modulus of sample plate 2 compared to sample plate 1 contributes to smaller and more uniform deflections at all points in the two-dimensional array. Additionally, this data shows that the carbon fiber plates described in this disclosure are capable of undergoing max delta deflections of less than 0.4 mm under the loads tested, which may be useful in applications for which relatively uniform pressure distributions across electrochemical cell active regions are desired.

Example 4

This Example describes pressure distribution and foam compression distribution measurements upon application of loads to unidirectional carbon fiber plates and thermally insulating compressible solid articles. Sample plate 1 from Example 3 was used as the carbon fiber end plate. A 6.3 mm-thick (uncompressed) Cellasto® elastomeric microcellular polyurethane foam purchased from BASF having dimensions of 95 mm×84 mm×6.35 mm was used as the thermally insulating compressible solid article. Sample plate 1, the Cellasto® foam, and a 20 Ah electrochemical cell (with a lithium metal anode) were arranged in a stack, with a 2 mm offset between sample plate 1 and the Cellasto® foam. A uniform load was applied to the stack with the following statistics: average load=20.1 kgf/cm², median load=20.9 kgf/cm², average deviation=3.65 kgf/cm², standard deviation=4.24 kgf/cm², maximum load=30.6 kgf/cm², and minimum load=5.8 kgf/cm². Pressure measurements were made with a Tekscan 5101 SN022 sensor integrated into the stack. The sensor had a calibrated target load of 20 kgf/cm² (based on a 5 point calibration), a calibrated maximum load of 20.1 kgf/cm², and a sensitivity of S-22. Table 5 shows a two-dimensional array of the load measurements from the Tekscan sensor. The array includes averaged measurements at locations of a 10×11 equally spaced grid on the Tekscan scanner surface. The indices for the grid locations are shown in bold font in Table 5.

TABLE 5

Two-dimensional array of pressure measurements (in kg$_f$/cm²).

| Index | 0 | 1 | 2 | 3 | 4 | 5 | 6 | 7 | 8 | 9 | 10 |
|---|---|---|---|---|---|---|---|---|---|---|---|
| 0 | 14.3 | 15.3 | 15.3 | 15.1 | 15.3 | 15.3 | 16.0 | 15.8 | 17.0 | 17.5 | 16.5 |
| 1 | 15.8 | 18.6 | 19.1 | 19.4 | 19.0 | 19.5 | 20.8 | 20.4 | 21.3 | 21.6 | 19.1 |
| 2 | 17.1 | 21.9 | 22.3 | 23.1 | 23.1 | 22.6 | 23.7 | 22.7 | 24.1 | 24.3 | 20.3 |
| 3 | 17.4 | 22.6 | 23.6 | 24.5 | 24.4 | 24.5 | 24.7 | 25.0 | 25.3 | 24.8 | 21.7 |
| 4 | 18.3 | 23.4 | 24.3 | 24.8 | 25.2 | 24.4 | 25.6 | 24.7 | 25.8 | 26.6 | 23.9 |
| 5 | 17.0 | 21.8 | 24.0 | 24.9 | 25.0 | 24.7 | 24.8 | 24.1 | 25.8 | 25.3 | 22.7 |
| 6 | 16.6 | 20.2 | 21.8 | 23.5 | 24.4 | 22.8 | 23.8 | 23.4 | 24.1 | 24.7 | 21.5 |
| 7 | 15.4 | 19.4 | 20.9 | 23.0 | 23.8 | 22.6 | 23.1 | 22.5 | 22.8 | 23.6 | 20.7 |
| 8 | 13.6 | 16.4 | 18.8 | 19.8 | 19.6 | 19.8 | 19.9 | 20.4 | 21.0 | 20.7 | 18.4 |
| 9 | 11.7 | 13.8 | 15.5 | 15.7 | 15.5 | 15.4 | 16.2 | 15.7 | 16.2 | 15.3 | 14.4 |

The measurements shown in Table 5 are indicative of the pressure distribution across the face of components of the stack when pressure is applied via the sample plate 1, with greater pressure experienced near the center and lower pressures experienced near the edges.

The spatial distribution of the average Cellasto® foam compression was also measured. Table 6 shows Cellasto® foam compression for a 3×3 measurement (each value being an average of a 3×3 grid of adjacent cells in the Tekscan scanner at the indicated location). The tables show maps of the raw data for each of the 9 coordinates, as well as the "delta" compression difference with respect to the center point (middle, center) under the load.

TABLE 6

Compressive Displacement of Foam from Carbon Fiber Endplate Deflection

| | Left | Center | Right |
|---|---|---|---|
| Raw Compressive Displacement (mm) | | | |
| Top | 2.46 | 2.65 | 2.68 |
| Middle | 2.90 | 3.63 | 2.95 |
| Bottom | 1.86 | 2.44 | 1.85 |
| Delta Compression (mm) | | | |
| Top | −1.17 | −0.99 | −0.95 |
| Middle | −0.73 | 0.00 | −0.68 |
| Bottom | −1.77 | −1.19 | −1.79 |

Tables 5 and 6 show that Cellasto® foam is capable of at least 50% compression under the applied loads via the carbon fiber end plates, with uniformity of compression within 2 mm across the two-dimensional array. Additionally, these results show that the Cellasto® foam can compress enough under the applied loads to compensate for changes of thicknesses of electrochemical cells of over 1 mm during cycling (i.e., cell "breathing").

Example 5

This example describes displacement of exemplary endplates that can be included in a battery. In this example the behavior of exemplary endplates—sample plate 4 and sample plate 5—with different laminate designs is compared. The experimental setup was identical to that of Example 3. As in Example 3, FIG. 32A shows an illustration of arrows indicating the direction of the application of force to the carbon fiber end plates. As in Example 3, FIG. 32B shows a schematic of a 9-point deflection test, which measured the displacement of the carbon fiber end plate under a 12 kgf/cm² load, a 20 kgf/cm² load, and a 30 kgf/cm² load.

Figure 33A:
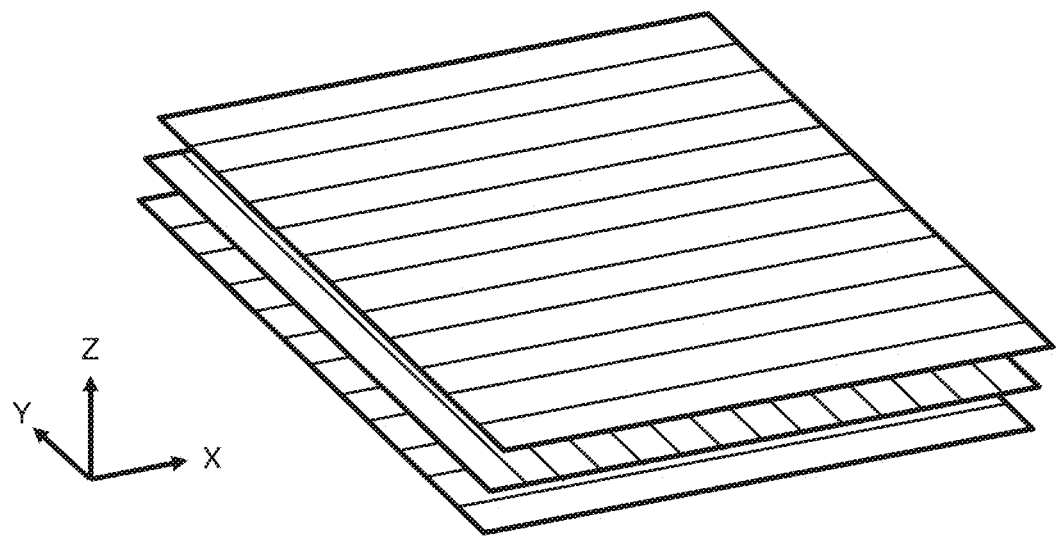
FIGS. 33A-33B show exploded perspective schematic illustrations of carbon fiber layers, according to some embodiments.
Figure 33B:
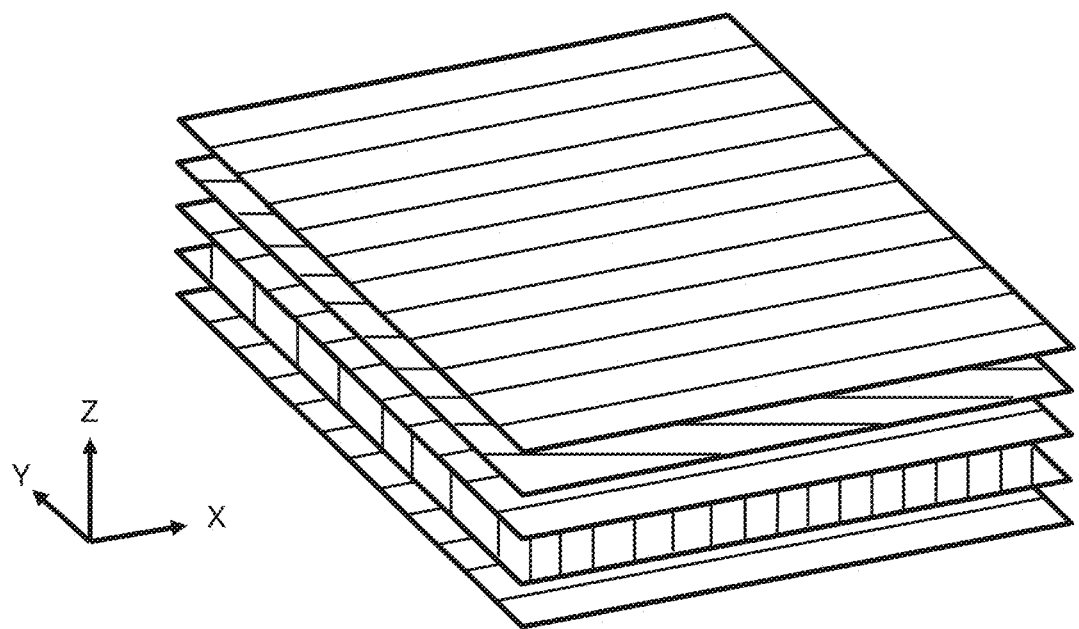
Figure 34A:
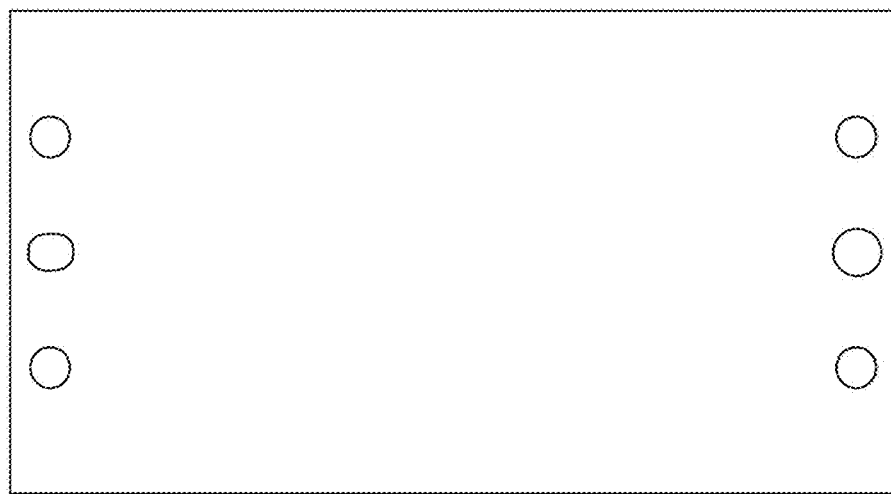
FIGS. 34A-34B show schematic illustrations of solid plates, according to some embodiments.

Endplates were constructed with unidirectional carbon fiber with moduli of 33 Msi (226 GPa) and a thickness of 10 mm. Sample plate 4 was a unidirectional carbon fiber end plate having dimensions of 154 mm×84 mm×10 mm and possessing a laminate structure pictured in FIG. 33A (51 plies with a [0°/90°/0°] arrangement). Sample plate 5 was a unidirectional carbon fiber end plate having dimensions of 154 mm×84 mm×10 mm and possessing a laminate structure pictured in FIG. 33B (50 plies with a [0°/30°/0°/−30°/0°] arrangement). FIG. 34A illustrates the geometry of sample plate 4 and sample plate 5.

Table 7 shows a map of the raw data as well as the "delta" deflection difference with respect to the center point under each load condition. All values in Table 7 are in millimeters. For example, Table 7 shows that sample plate 4 was deflected under the load by 0.5926 more millimeters at point (1,1) than at the center point (2,2) under an applied 30 kgf/cm² load. Table 8 shows the percent difference (in raw data as well as the "delta" deflection) between values reported for sample plate 4 and sample plate 5 under an applied load. For example, Table 8 shows that at point (1,1) sample plate 4 experienced a delta deflection of 0.5926 mm and sample plate 5 experienced a delta deflection of 0.2903 mm under an applied 30 kgf/cm² load. Therefore, the percent difference in the delta deflection at point (1,1) is equal to (0.2903 mm-0.5926 mm)/0.5926 mm*100%, which reduces to −51%.

TABLE 7

Nine-point deflection test results for sample plate 4 and sample plate 5 under different loads.

| | | Sample plate 4: [0°/90°/0°] × 17 | | | | Sample plate 5: [0°/30°/0°/−30°/0°] × 10 | | |
|---|---|---|---|---|---|---|---|---|
| | | 1 | 2 | 3 | | 1 | 2 | 3 |
| | | 30 kg/cm² | | | | 30 kg/cm² | | |
| Raw Data (mm) | 1 | 0.8069 | 1.3936 | 0.8135 | 1 | 0.9064 | 1.4368 | 0.868 |
| | 2 | 0.7805 | 1.3995 | 0.7872 | 2 | 0.6716 | 1.1967 | 0.677 |
| | 3 | 0.773 | 1.3715 | 0.7823 | 3 | 0.8022 | 1.3469 | 0.8454 |
| Delta Deflection (mm) | 1 | 0.5926 | 0.0059 | 0.586 | 1 | 0.2903 | −0.2401 | 0.3287 |
| | 2 | 0.619 | 0 | 0.6172 | 2 | 0.5251 | 0 | 0.5197 |
| | 3 | 0.6265 | 0.028 | 0.8135 | 3 | 0.3945 | −0.1502 | 0.3513 |
| | | 20 kg/cm² | | | | 20 kg/cm² | | |
| Raw Data (mm) | 1 | 0.5569 | 0.9489 | 0.564 | 1 | 0.6138 | 0.9771 | 0.5974 |
| | 2 | 0.5296 | 0.9421 | 0.5354 | 2 | 0.4448 | 0.7923 | 0.4511 |
| | 3 | 0.5263 | 0.9274 | 0.5352 | 3 | 0.548 | 0.9104 | 0.5727 |
| Delta Deflection (mm) | 1 | 0.3852 | −0.0068 | 0.3781 | 1 | 0.1785 | −0.1848 | 0.1949 |
| | 2 | 0.4125 | 0 | 0.4067 | 2 | 0.3475 | 0 | 0.3412 |
| | 3 | 0.4158 | 0.0147 | 0.4069 | 3 | 0.2443 | −0.1181 | 0.2196 |
| | | 12 kg/cm² | | | | 12 kg/cm² | | |
| Raw Data (mm) | 1 | 0.3518 | 0.5249 | 0.3593 | 1 | 0.3766 | 0.5952 | 0.3708 |
| | 2 | 0.3222 | 0.564 | 0.3259 | 2 | 0.2642 | 0.469 | 0.2699 |
| | 3 | 0.3145 | 0.5484 | 0.3201 | 3 | 0.3388 | 0.5545 | 0.3528 |
| Delta Deflection (mm) | 1 | 0.2122 | 0.0391 | 0.2047 | 1 | 0.0924 | −0.1262 | 0.0982 |
| | 2 | 0.2418 | 0 | 0.2381 | 2 | 0.2048 | 0 | 0.1991 |
| | 3 | 0.2495 | 0.0156 | 0.2439 | 3 | 0.1302 | −0.0855 | 0.1162 |

TABLE 8

Percent difference between sample plate 4 and sample plate 5.

| | | 1 | 2 | 3 | | | 1 | 2 | 3 |
|---|---|---|---|---|---|---|---|---|---|
| | | 30 kg/cm² | | | | | | | |
| Raw Data (% difference) | 1 | 12% | 3% | 7% | Delta Deflection (% difference) | 1 | −51% | −4169% | −44% |
| | 2 | −14% | −14% | −14% | | 2 | −15% | | −15% |
| | 3 | 4% | −2% | 8% | | 3 | −37% | −636% | −43% |
| | | 20 kg/cm² | | | | | | | |
| Raw Data (% difference) | 1 | 10% | 3% | 6% | Delta Deflection (% difference) | 1 | −54% | 2618% | −48% |
| | 2 | −16% | −16% | −16% | | 2 | −16% | | −16% |
| | 3 | 4% | −2% | 7% | | 3 | −41% | −903% | −46% |
| | | 12 kg/cm² | | | | | | | |
| Raw Data (% difference) | 1 | 7% | 13% | 3% | Delta Deflection (% difference) | 1 | −56% | −423% | −52% |
| | 2 | −18% | −17% | −17% | | 2 | −15% | | −16% |
| | 3 | 8% | 1% | 10% | | 3 | −48% | −648% | −52% |

Table 7 and 8 demonstrate that under all applied loads, the delta deflection was reduced by at least 15% in every observed position of sample plate 5, relative to sample plate 4. The maximum raw deflection increased in some cases, which is attributed to a layering sequence variation and manufacturing quality difference. In applications in which a uniform pressure distribution is desired, a reduction in delta deflection, as demonstrated for sample 5, can be desirable.

Figure 34B:
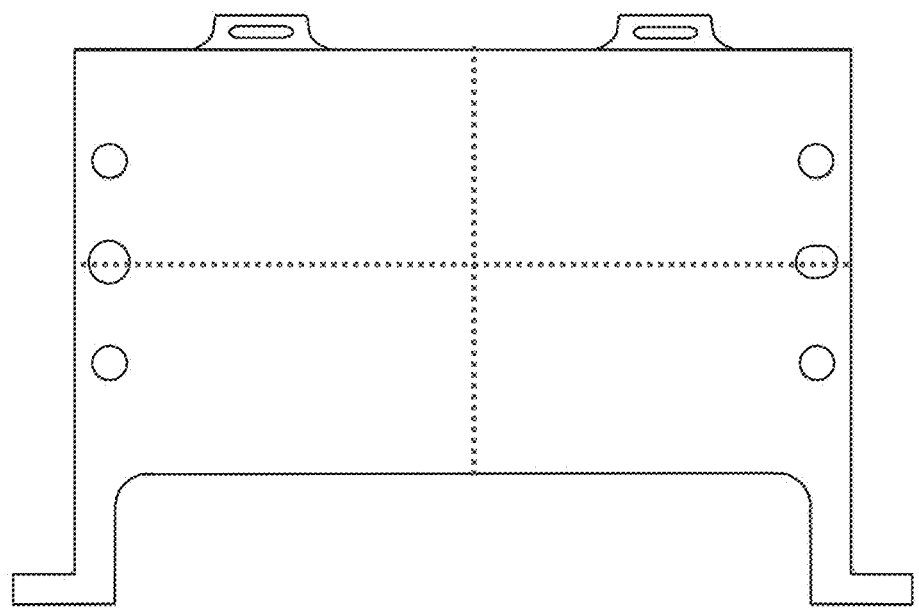

FIG. 34B illustrates an alternative sample plate geometry, which was employed for sample plate 6. Sample plate 6 was a unidirectional carbon fiber end plate having a thickness through its center of mass of 10 mm and in-plane dimensions of 154 mm×84 mm, where the in-plane dimensions are measured along the dashed lines indicated in FIG. 34B. Sample plate 6 possessed a laminate structure pictured in FIG. 33A (51 plies with a [0°/90°/0°] arrangement). Deflection results for sample plate 6 are compared with deflection results for sample plate 5 in Table 9 and Table 10, which are arranged identically to Table 7 and Table 8, respectively. These results demonstrate that sample plate deflection also depends on plate geometry, since the percent difference in delta deflection observed in Table 10 differs from the percent difference in delta deflection observed in Table 8.

TABLE 9

Nine-point deflection test results for sample plate 6 and sample plate 5 under different loads.

| | | Sample plate 6: [0°/90°/0°] × 17 | | | | Sample plate 5: [0°/30°/0°/−30°/0°] × 10 | | |
|---|---|---|---|---|---|---|---|---|
| | | 1 | 2 | 3 | | 1 | 2 | 3 |
| | | 30 kg$_f$/cm$^2$ | | | | 30 kg$_f$/cm$^2$ | | |
| Raw Data (mm) | 1 | 0.741 | 1.2604 | 0.7479 | 1 | 0.9064 | 1.4368 | 0.868 |
| | 2 | 0.7348 | 1.2623 | 0.7378 | 2 | 0.6716 | 1.1967 | 0.677 |
| | 3 | 0.7261 | 1.2529 | 0.7278 | 3 | 0.8022 | 1.3469 | 0.8454 |
| Delta Deflection (mm) | 1 | 0.5181 | −0.0094 | 0.5151 | 1 | 0.2903 | −0.2401 | 0.3287 |
| | 2 | 0.5268 | 0 | 0.5251 | 2 | 0.5251 | 0 | 0.5197 |
| | 3 | 1.2529 | 1.2529 | 1.2529 | 3 | 0.3945 | −0.1502 | 0.3513 |
| | | 20 kg$_f$/cm$^2$ | | | | 20 kg$_f$/cm$^2$ | | |
| Raw Data (mm) | 1 | 0.5164 | 0.8652 | 0.5229 | 1 | 0.6138 | 0.9771 | 0.5974 |
| | 2 | 0.5027 | 0.858 | 0.5036 | 2 | 0.4448 | 0.7923 | 0.4511 |
| | 3 | 0.5007 | 0.8528 | 0.5005 | 3 | 0.548 | 0.9104 | 0.5727 |
| Delta Deflection (mm) | 1 | 0.3416 | −0.0072 | 0.3351 | 1 | 0.1785 | −0.1848 | 0.1949 |
| | 2 | 0.3553 | 0 | 0.3544 | 2 | 0.3475 | 0 | 0.3412 |
| | 3 | 0.3573 | 0.0052 | 0.3575 | 3 | 0.2443 | −0.1181 | 0.2196 |
| | | 12 kg$_f$/cm$^2$ | | | | 12 kg$_f$/cm$^2$ | | |
| Raw Data (mm) | 1 | 0.327 | 0.4855 | 0.3347 | 1 | 0.3766 | 0.5952 | 0.3708 |
| | 2 | 0.3084 | 0.5179 | 0.309 | 2 | 0.2642 | 0.469 | 0.2699 |
| | 3 | 0.3049 | 0.5114 | 0.3032 | 3 | 0.3388 | 0.5545 | 0.3528 |
| Delta Deflection (mm) | 1 | 0.1909 | 0.0324 | 0.1832 | 1 | 0.0924 | −0.1262 | 0.0982 |
| | 2 | 0.2095 | 0 | 0.2089 | 2 | 0.2048 | 0 | 0.1991 |
| | 3 | 0.213 | 0.0065 | 0.2147 | 3 | 0.1302 | −0.0855 | 0.1162 |

TABLE 10

Percent difference between sample plate 6 and sample plate 5.

| | | 1 | 2 | 3 | | | 1 | 2 | 3 |
|---|---|---|---|---|---|---|---|---|---|
| | | 30 kg$_f$/cm$^2$ | | | | | | | |
| Raw Data (% difference) | 1 | 22% | 14% | 16% | Delta Deflection (% difference) | 1 | −44% | 2454% | −36% |
| | 2 | −9% | −5% | −8% | | 2 | 0% | | −1% |
| | 3 | 10% | 8% | 16% | | 3 | −69% | −112% | −72% |
| | | 20 kg$_f$/cm$^2$ | | | | | | | |
| Raw Data (% difference) | 1 | 19% | 13% | 14% | Delta Deflection (% difference) | 1 | −48% | 2467% | −42% |
| | 2 | −12% | −8% | −10% | | 2 | −2% | | −4% |
| | 3 | 9% | 7% | 14% | | 3 | −32% | −2371% | −39% |
| | | 12 kg$_f$/cm$^2$ | | | | | | | |
| Raw Data (% difference) | 1 | 15% | 23% | 11% | Delta Deflection (% difference) | 1 | −52% | −490% | −46% |
| | 2 | −14% | −9% | −13% | | 2 | −2% | | −5% |
| | 3 | 11% | 8% | 16% | | 3 | −39% | −1415% | −46% |

Example 6

This example describes the pressure distribution within exemplary single-cell batteries. In this example the behavior of exemplary endplates—sample plate 5 as described above, and sample plate 7—with different laminate designs is compared. Both exemplary single-cell batteries contained two 3 mm-thick (uncompressed) Cellasto® elastomeric microcellular polyurethane foam sheets. Sample plate 7 was a unidirectional carbon fiber end plate having dimensions of 154 mm×84 mm×10 mm and possessing a laminate structure pictured in FIG. 33A (51 plies with a [0°/90°/0°] arrangement). FIG. 34A illustrates the geometry of sample plate 7, which was rotated 180° in-plane from the orientation of sample plates 4 and 5 described above. The experimental setup was identical to that shown in Example 3. As in Example 3, FIG. 32A shows an illustration of arrows indicating the direction of the application of force to the carbon fiber end plates. The pressure and pressure distribution were measured by a Tekscan 5101 sensor, as in Example 1.

Figure 35A:
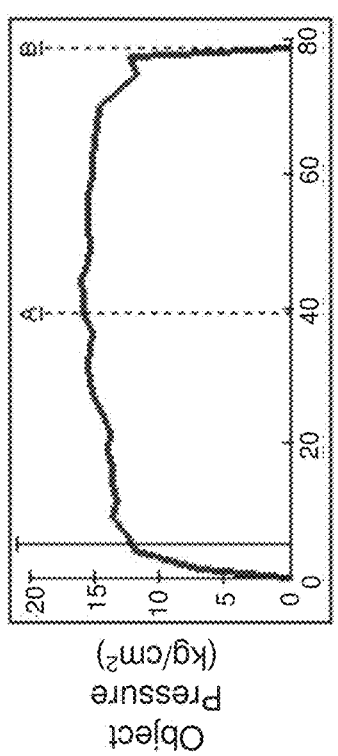
FIGS. 35A-35B show pressure distributions measured within exemplary batteries, according to some embodiments.
Figure 35B:
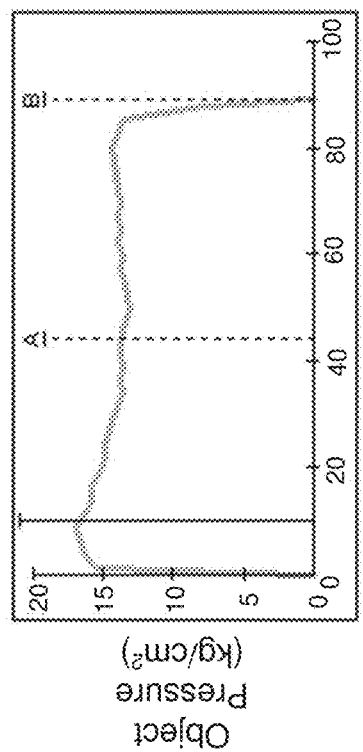
Figure 36A:
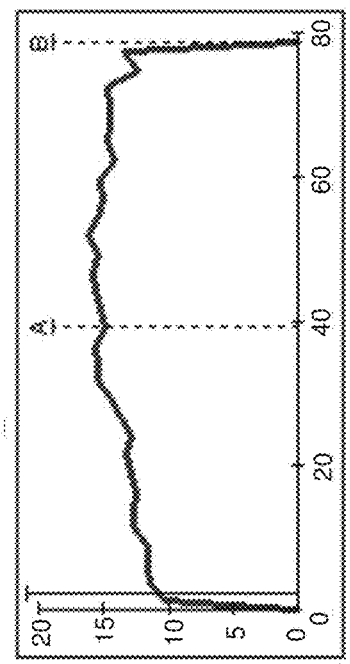
FIGS. 36A-36B show pressure distributions measured within exemplary batteries, according to some embodiments.
Figure 36B:
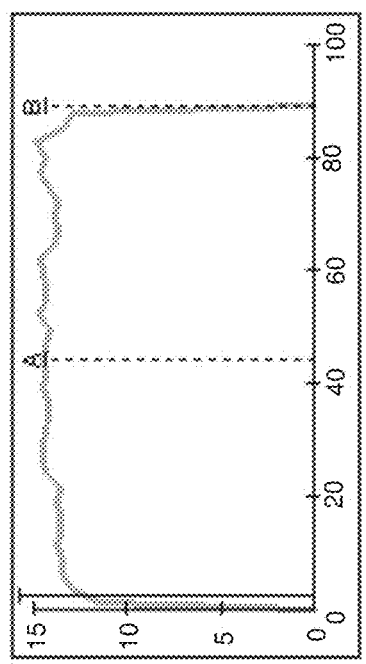
Figure 38B:
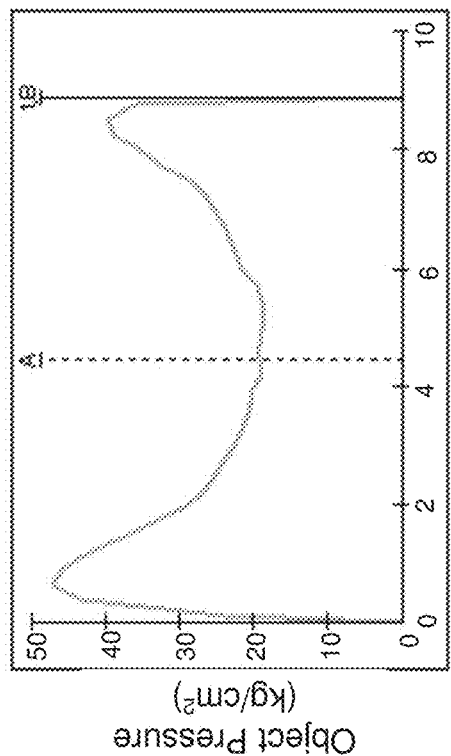
FIGS. 38A-38B show pressure distributions measured within exemplary batteries, according to some embodiments.
Figure 38A:
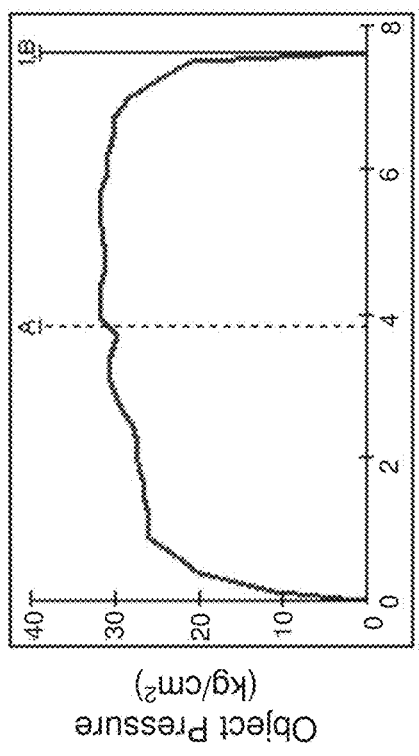
Figure 37B:
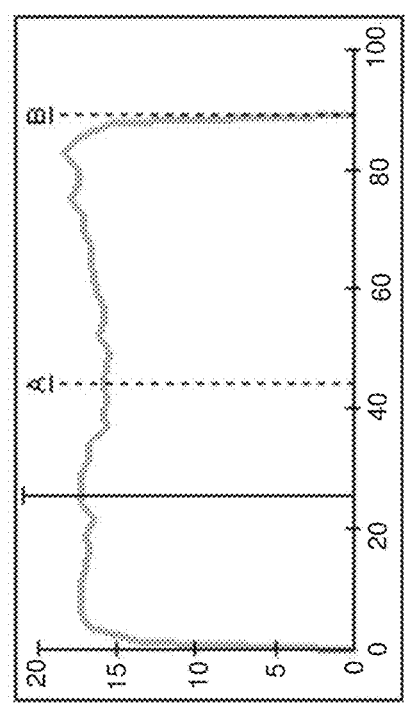
FIGS. 37A-37B show pressure distributions measured within exemplary batteries, according to some embodiments.
Figure 37A:
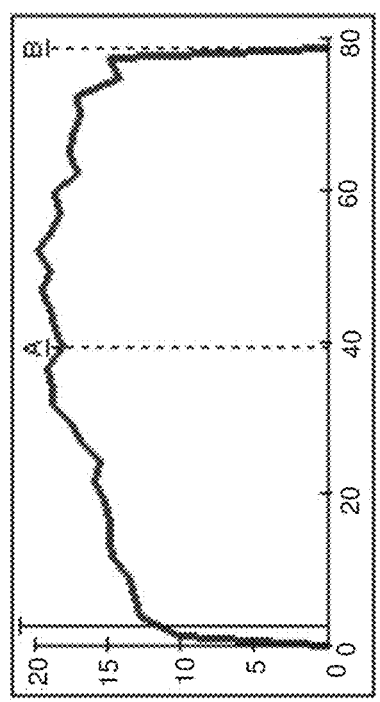

FIGS. 35A-35B show the pressure (in kgf/cm$^2$) of sample plate 5 averaged across rows (FIG. 35A) and across columns (FIG. 35B) of the Tekscan 5101 sensor after 44 charge/discharge cycles of the cell, with a 0% SOC under an applied load of 20 kgf/cm$^2$. FIGS. 36A-36B show the pressure (in kgf/cm$^2$) of sample plate 7 averaged across rows (FIG. 36A) and across columns (FIG. 36B) of the Tekscan 5101 sensor after 43 cycles with a 0% SOC under an applied load of 20 kgf/cm$^2$. As indicated by the figures, the pressure was more uniform for sample plate 5 under these conditions. FIGS. 37A-37B show the pressure (in kgf/cm$^2$) of sample plate 5 averaged across rows (FIG. 37A) and across columns (FIG. 37B) of the Tekscan 5101 sensor after 70 cycles with a 0% SOC under an applied load of 20 kgf/cm$^2$. FIGS. 38A-38B show the pressure (in kgf/cm$^2$) of sample plate 7 averaged across rows (FIG. 38A) and across columns (FIG. 38B) of the Tekscan 5101 sensor after 70 cycles with a 0% SOC under an applied load of 20 kgf/cm$^2$. As indicated by these figures, the pressure was more uniform for sample plate 5 under these conditions.

Figure 39A:
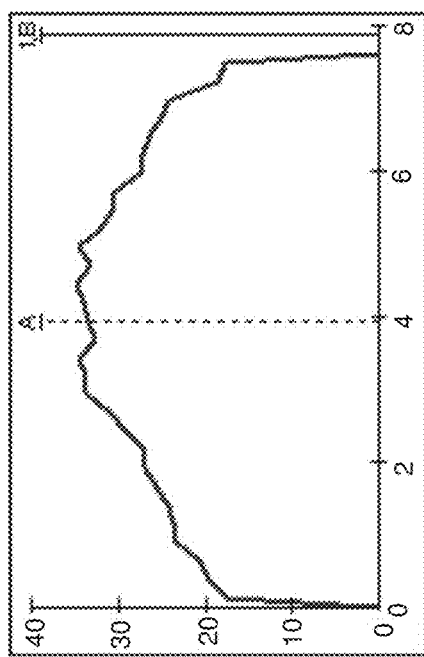
FIGS. 39A-39B show pressure distributions measured within exemplary batteries, according to some embodiments.
Figure 39B:
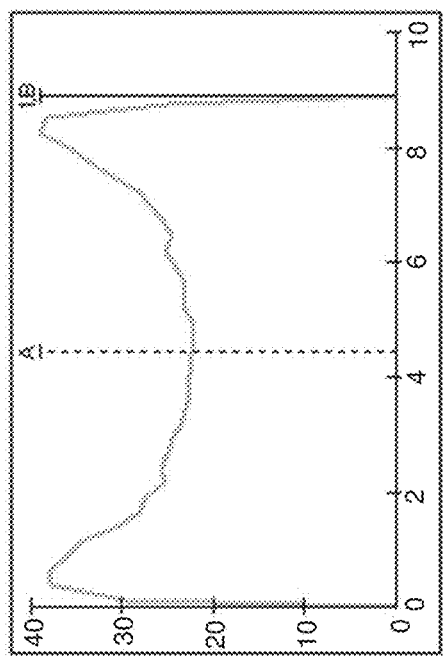
Figure 40A:
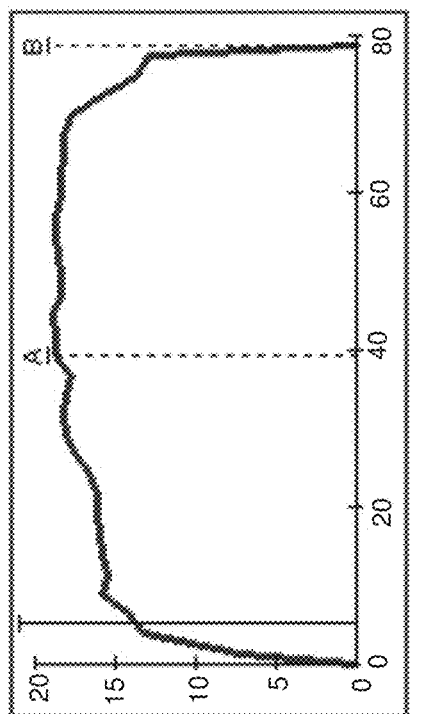
FIGS. 40A-40B show pressure distributions measured within exemplary batteries, according to some embodiments.
Figure 40B:
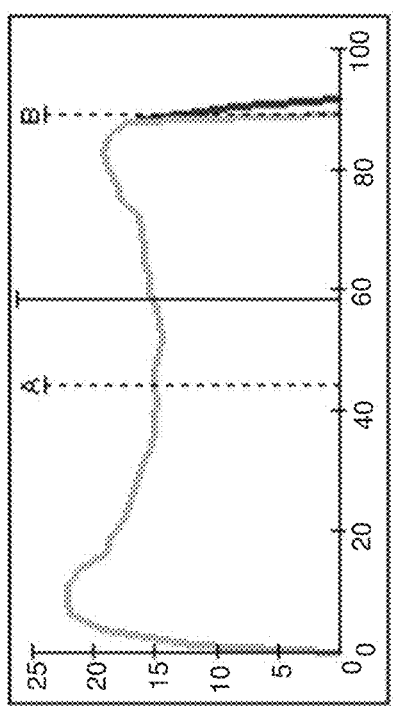
Figure 41A:
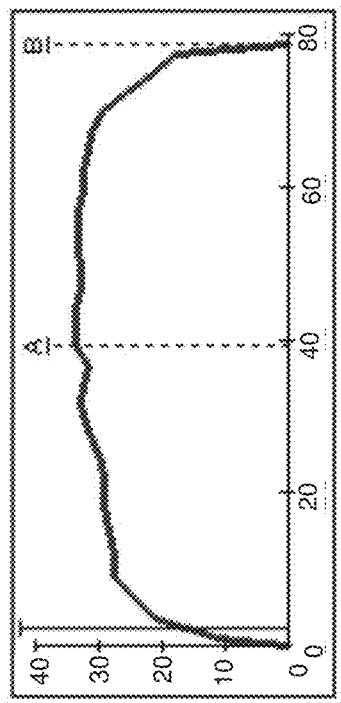
FIGS. 41A-41B show pressure distributions measured within exemplary batteries, according to some embodiments.
Figure 41B:
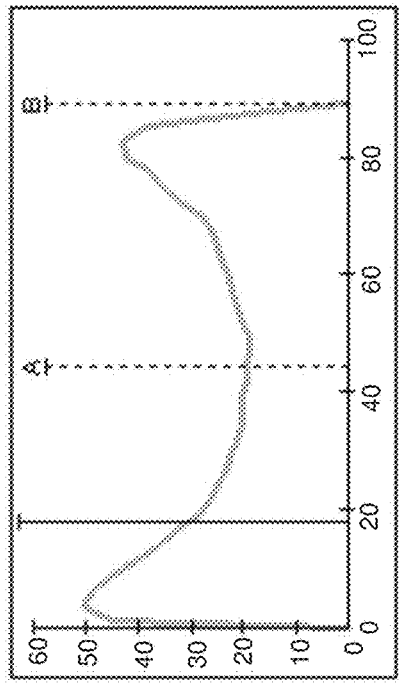
Figure 42A:
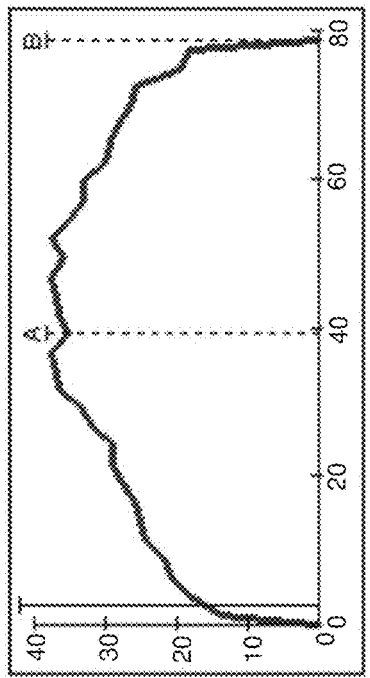
FIGS. 42A-42B show pressure distributions measured within exemplary batteries, according to some embodiments.
Figure 42B:
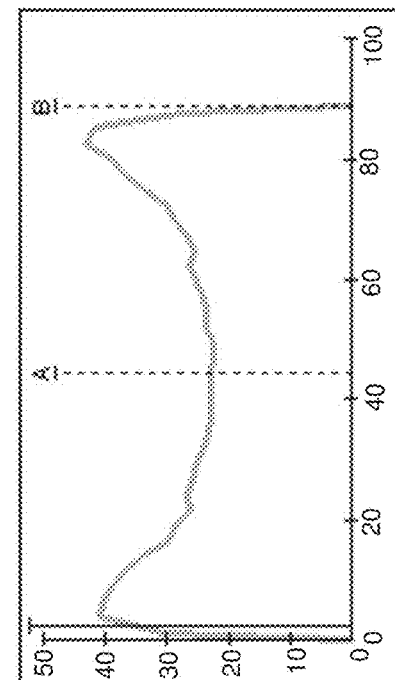

FIGS. 39A-39B show the pressure (in kgf/cm$^2$) of sample plate 5 averaged across rows (FIG. 39A) and across columns (FIG. 39B) of the Tekscan 5101 sensor after 44 cycles with a 100% SOC under an applied load of 20 kgf/cm$^2$. FIGS. 40A-40B show the pressure (in kgf/cm$^2$) of sample plate 7 averaged across rows (FIG. 40A) and across columns (FIG. 40B) of the Tekscan 5101 sensor after 43 cycles with a 100% SOC under an applied load of 20 kgf/cm$^2$. As indicated by these figures, the pressure was more uniform across columns and less uniform across rows for sample plate 5 under these conditions. FIGS. 41A-41B show the pressure (in kgf/cm$^2$) of sample plate 5 averaged across rows (FIG. 41A) and across columns (FIG. 41B) of the Tekscan 5101 sensor after 69 cycles with a 100% SOC under an applied load of 20 kgf/cm$^2$. FIGS. 42A-42B show the pressure (in kgf/cm$^2$) of sample plate 7 averaged across rows (FIG. 42A) and across columns (FIG. 42B) of the Tekscan 5101 sensor after 69 cycles with a 100% SOC under an applied load of 20 kgf/cm$^2$. As indicated by these figures, the pressure was more uniform across columns and less uniform across rows for sample plate 5 under these conditions. These results do not necessarily reflect the final number of cycles reached by each exemplary battery before failure. In other experiments, similar cells under similar conditions were able to achieve 115+/−10 cycles before reaching a cycle limit.

These results demonstrate that for some embodiments, the pressure distribution experienced by a cell in a battery depends, at least in part, on solid plate laminate structure, because in some exemplary embodiments, the pressure can be made more or less uniform through incorporation of a different laminate structure.

Example 7

This example describes 9-point deflection experiments performed on exemplary single-cell batteries comprising endplates and two 3 mm-thick Cellasto® elastomeric microcellular polyurethane foam sheets, used to determine suitable proportions for contoured solid article portions, in accordance with some embodiments. The experimental setup was identical to that shown in Example 3. As in Example 3, FIG. 32A shows an illustration of arrows indicating the direction of the application of force to the carbon fiber end plates. As in Example 3, FIG. 32B shows a schematic of a 9-point deflection test, which measured the displacement of the carbon fiber end plate under a 20 kgf/cm$^2$ load or a 30 kgf/cm$^2$ load. The observed deflections are reported in Table 11, and variables possess the same meaning and interpretation described in Example 5.

TABLE 11

Raw data and delta deflections for exemplary batteries containing sample plates 8 or 9.

| | | 1 | 2 | 3 | | | 1 | 2 | 3 |
|---|---|---|---|---|---|---|---|---|---|
| | | | | Sample plate 8, 20 kg/cm$^2$ applied load | | | | | |
| Raw Data (mm) | 1 | 0.409 | 0.747 | 0.406 | Delta Deflection (mm) | 1 | 0.356 | 0.018 | 0.359 |
| | 2 | 0.415 | 0.765 | 0.397 | | 2 | 0.350 | 0 | 0.368 |
| | 3 | 0.341 | 0.769 | 0.416 | | 3 | 0.334 | −0.004 | 0.349 |
| | | | | Sample plate 8, 30 kg/cm$^2$ applied load | | | | | |
| Raw Data (mm) | 1 | 0.640 | 1.163 | 0.637 | Delta Deflection (mm) | 1 | 0.521 | −0.003 | 0.524 |
| | 2 | 0.626 | 1.161 | 0.609 | | 2 | 0.535 | 0 | 0.551 |
| | 3 | 0.618 | 1.121 | 0.611 | | 3 | 0.542 | 0.039 | 0.550 |
| | | | | Sample plate 9, 20 kg/cm$^2$ applied load | | | | | |
| Raw Data (mm) | 1 | 0.547 | 1.010 | 0.548 | Delta Deflection (mm) | 1 | 0.473 | 0.010 | 0.471 |
| | 2 | 0.539 | 1.019 | 0.522 | | 2 | 0.480 | 0 | 0.498 |
| | 3 | 0.545 | 0.983 | 0.535 | | 3 | 0.474 | 0.036 | 0.484 |

In this example, 9-point deflection experiments were performed on three exemplary batteries. Two types of exemplary endplates—sample plate 8 and sample plate 9—were used. These had the geometry illustrated in FIG. 34A, possessing a laminate structure pictured in FIG. 33A (51 plies with a [0°/90°/0°] arrangement and a 33 Msi (226 GPa) modulus). Sample plate 8 had a thickness of 10 mm. Sample plate 9, had a thickness of 8 mm. Sample plate 8 and sample plate 9 possessed the [0°/90°/0°] laminate structure pictured in FIG. 33A, and had a 33 Msi (226 GPa) modulus. The first deflection experiment was performed with an applied load of 20 kgf/cm$^2$ on an exemplary battery comprising sample plate 8. The second was performed with an applied load of 30 kgf/cm$^2$ on an exemplary battery comprising sample plate 8. The third was performed with an applied load of 20 kgf/cm$^2$ on an exemplary battery comprising sample plate 9.

Figure 43:
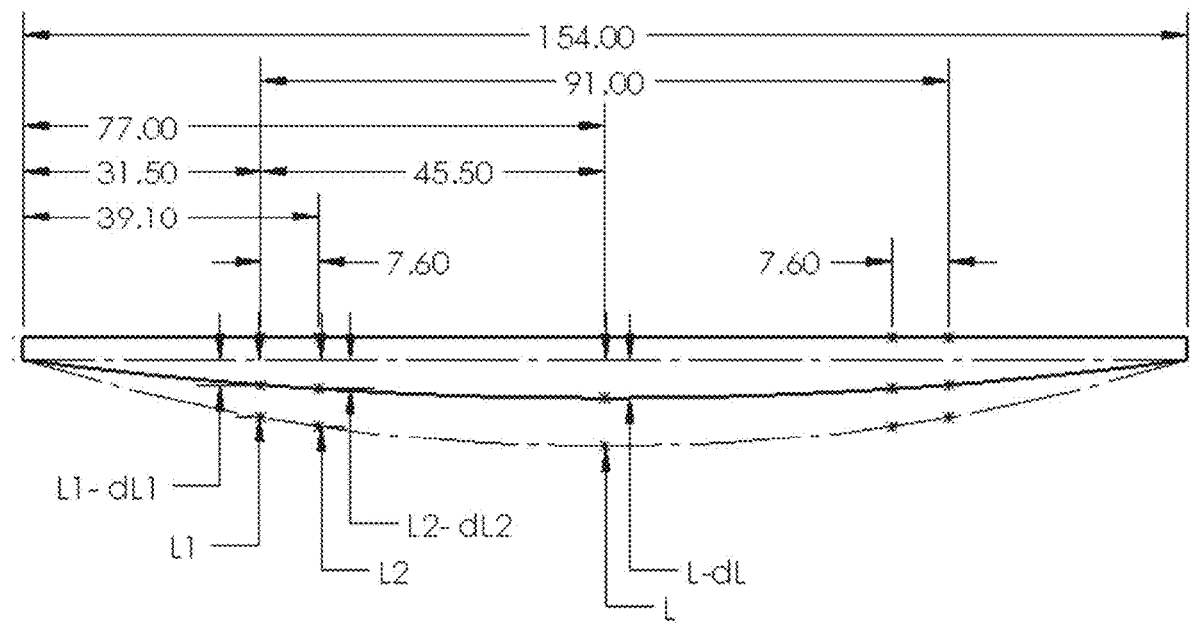
FIG. 43 shows cross-sectional schematic diagram of a contoured solid article portion, according to some embodiments.
Figure 44A:
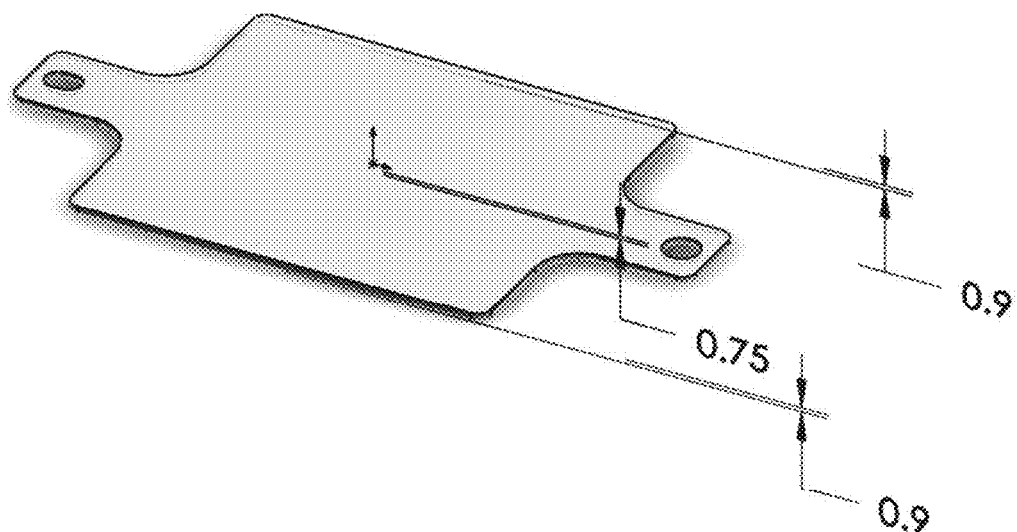
FIG. 44A-44B show perspective schematic illustrations of contoured solid article portions, according to some embodiments.
Figure 44B:
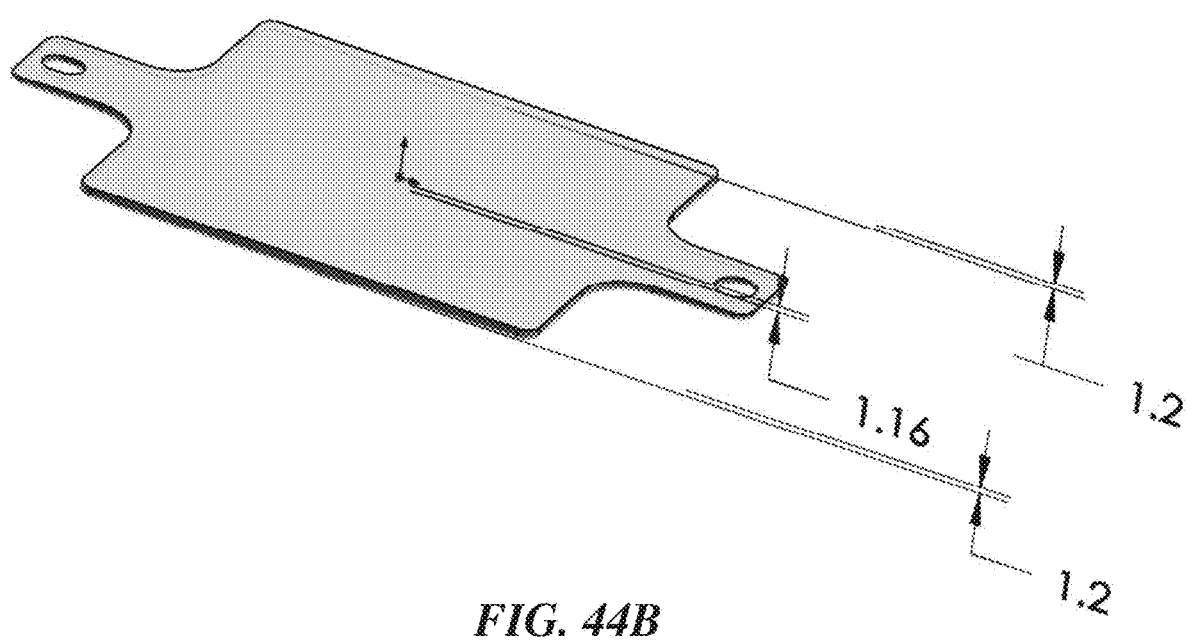

These results informed the design of exemplary contoured solid article portions in the form of contoured shims made of a Nylon-12 carbon fiber composite, and a contour geometry illustrated in FIG. 43. Two types of exemplary shims were identified, sample shim 1 and sample shim 2. Contoured shims were designed with an ultimate compression strength of 67 MPa along the XZ axis and 92 MPa along the ZX axis, at a compression rate of 0.050 in./min, with a compression modulus of 2.7 MPa along the XZ axis and 2.2 MPa along the ZX axis. Sample shim 1 had the geometry illustrated in FIG. 44A, which shows an overall plate thickness of 0.9 mm with an additional thickness of 0.75 mm through the center of the contour. Sample shim 2 had the geometry illustrated in FIG. 44B, which shows an overall plate thickness of 1.2 mm with an additional thickness of 1.16 mm through the center of the contour.

In these experiments, an exemplary contoured shim geometry was disclosed, and 9-point deflection experiments were used to select embodiments of this shim suitable for some batteries. These results indicate that contoured shim geometries may be tailored to take into account deflection characteristics of endplates, and in some cases can promote behavior tending toward more uniform pressure distributions experienced by electrochemical cells in batteries.

Example 8

This example describes the measured pressure distribution within an exemplary single-cell battery containing a contoured shim and two, 3 mm Cellasto® elastomeric microcellular polyurethane foam sheets. The exemplary battery further incorporated sample plate 7 endplates (described in Example 6), and sample shim 2 (described in Example 7). The experimental setup was identical to that of Example 3. As in Example 3, FIG. 32A shows an illustration of arrows indicating the direction of the application of force to the carbon fiber end plates. The pressure and pressure distribution were measured by a Tekscan 5101 sensor, as in Example 1.

Figure 45A:
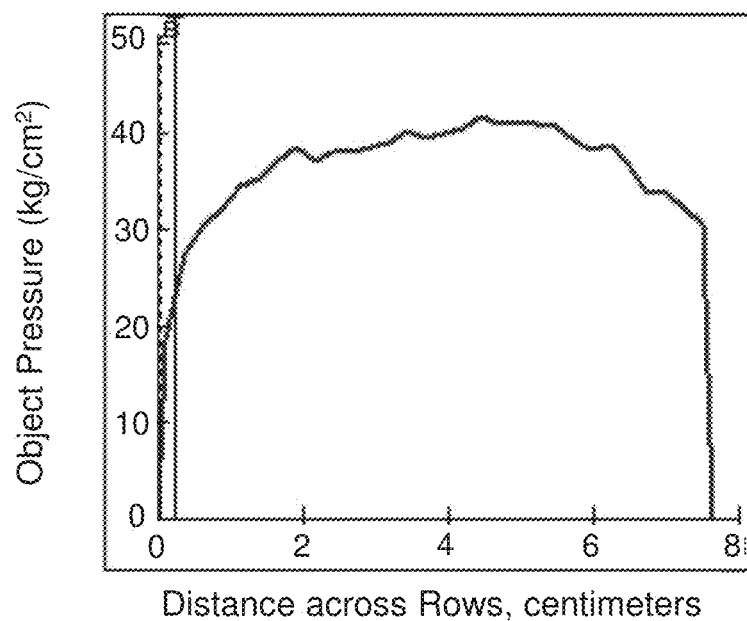
FIGS. 45A-45B show pressure distributions measured within exemplary batteries, according to some embodiments.
Figure 45B:
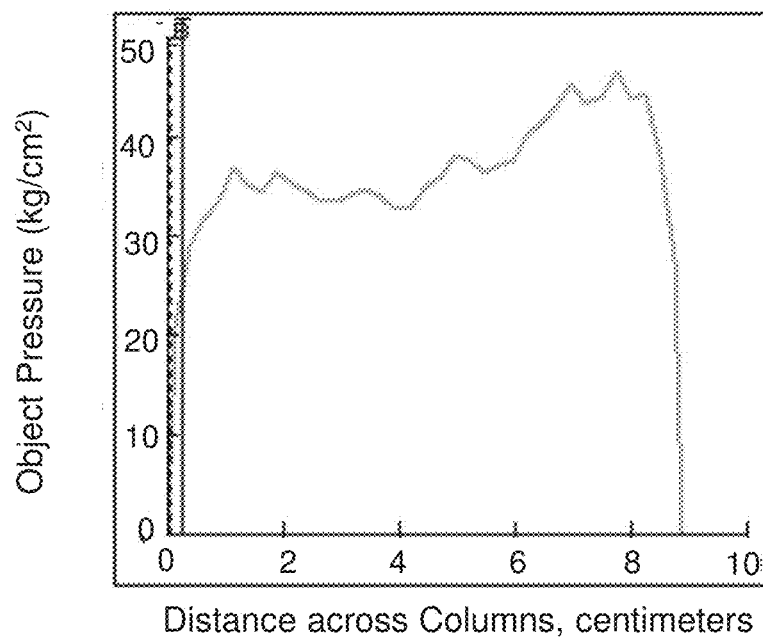

FIGS. 45A-45B show the measured pressure (in $kgf/cm^2$) averaged across rows (FIG. 45A) and across columns (FIG. 45B) of the Tekscan 5101 sensor after 80 cycles with a 100% SOC under an applied load of 20 $kgf/cm^2$, in the presence of a contoured shim. These figures may be compared with FIGS. 42A-42B (described in Example 6), which show identical plots for an exemplary battery that lacked a contoured shim, but was otherwise identical, collected after 70 cycles with a 100% SOC.

FIGS. 45A-45B are characterized by a substantially higher uniformity of measured pressure than FIGS. 42A-42B, demonstrating that for at least some embodiments, incorporation of a contoured shim can have a significant effect on the distribution of pressure under an applied load.

Example 9

This example describes the control of the pressure distribution experienced by exemplary single-cell batteries, and resulting effects on cycling durability. In this example, control over these properties was achieved by controlling endplate design, foam sheet thickness, and the design and incorporation of contoured shims (of the type described in Example 7) into the batteries. The experimental setup for measuring deflection and pressure was identical to that of Example 3. As in Example 3, FIG. 32A shows an illustration of arrows indicating the direction of the application of force to the carbon fiber end plates. As in Example 3, FIG. 32B shows a schematic of a nine-point deflection test, which measured the displacement of the carbon fiber end plate under loads of between 12 $kgf/cm^2$ and 30 $kgf/cm^2$. The pressure and pressure distribution were measured by a Tekscan 5101 sensor, as in Example 1. For all experiments described, the charge-discharge rates were identical for all exemplary batteries and follow protocols outlined in Example 1 (C/6 charge and 2C/3 discharge, abbreviated below as C/6 C-2C/3 D). In some cases, the number of charge-discharge cycles completed before discharge capacity fell below a threshold value (referred to as the "cycle limit") varied significantly with the foam and laminate structure.

Figure 46A:
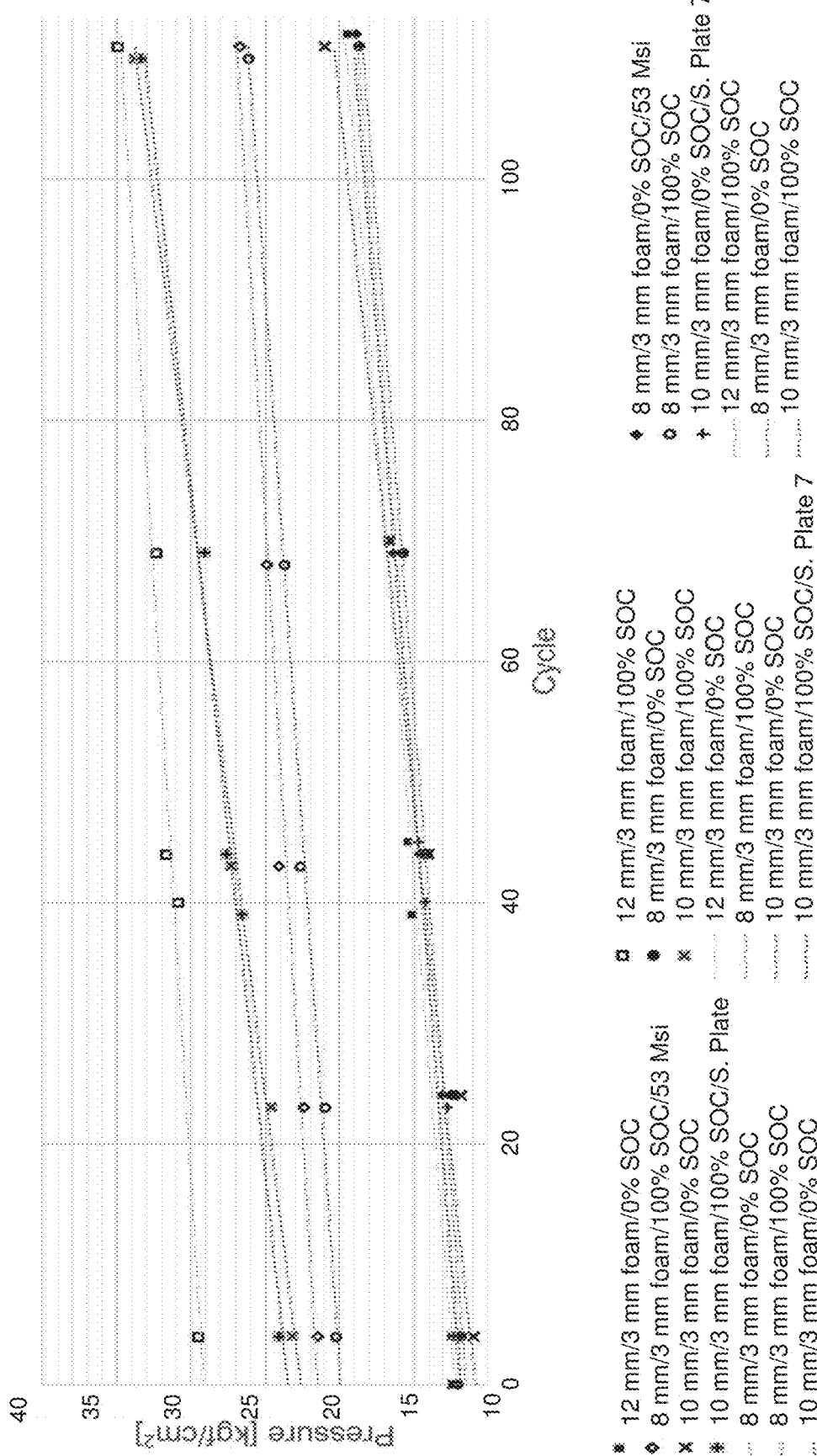
FIGS. 46A-46B show pressure measured within exemplary batteries as a function of the number of charge-discharge cycles, according to some embodiments.

FIG. 46A illustrates the effect of endplate thickness, endplate type, and SOC on the pressure within an exemplary battery, as a function of the number of charge-discharge cycles performed. The exemplary battery had exemplary endplates comprising a [0°/90°/0°] laminate structure with a 10 mm thickness and a 33 Msi (226 GPa) modulus (unless otherwise noted in the figure). The exemplary endplates had cross-sections identical to the cross-section illustrated in FIG. 34A, unless designated in the figure with 'Alt', which indicates that the exemplary endplates used the alternative cross-section illustrated in FIG. 34B. The exemplary batteries were placed under an applied load of 12 $kgf/cm^2$, and contained two 3 mm-thick (uncompressed) Cellasto® elastomeric microcellular polyurethane foam sheets. Pressure experienced by cells within the batteries was elevated for cells with a higher SOC, and was observed to increase linearly with the number of charge-discharge cycles.

Figure 46B:
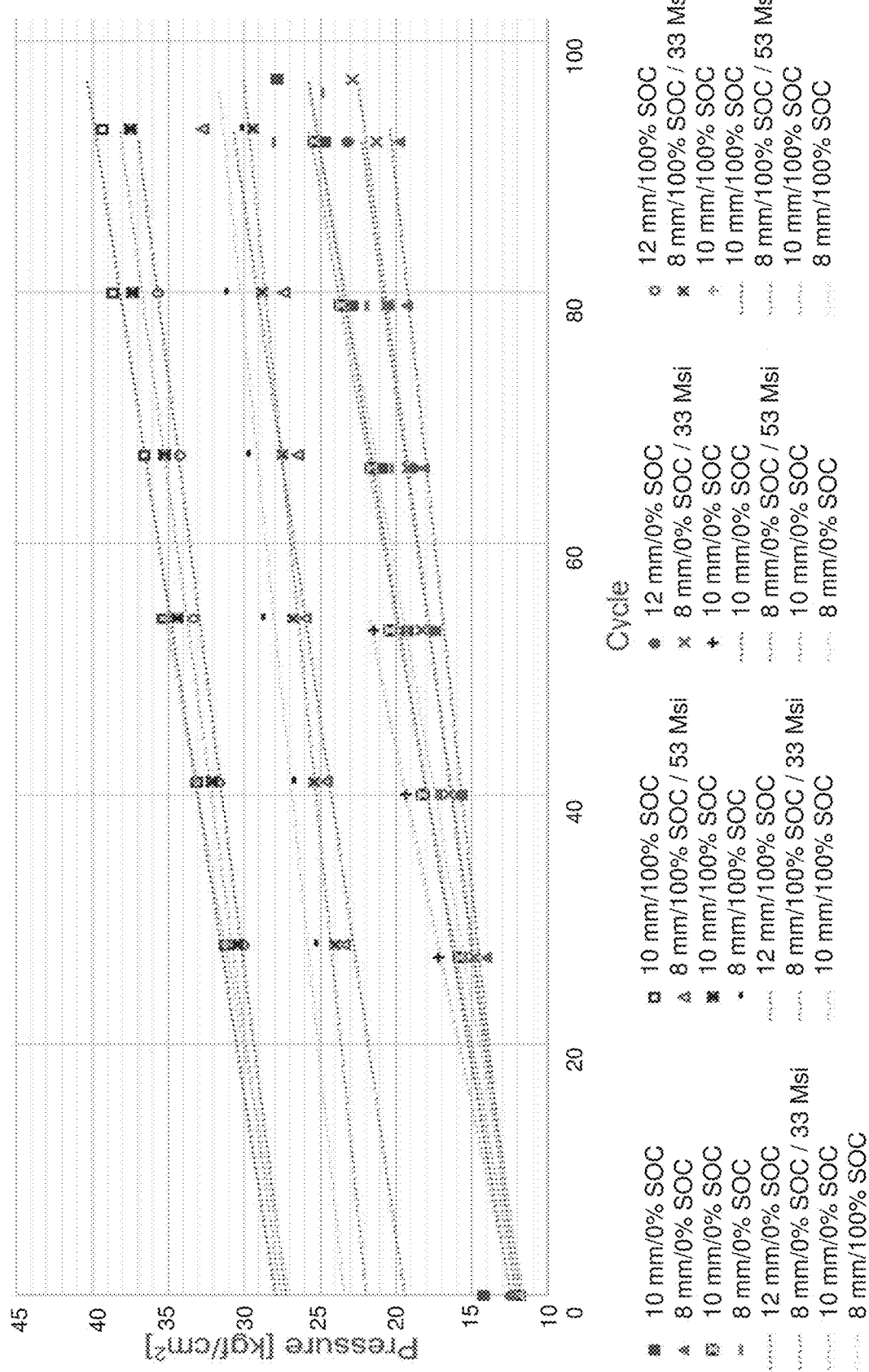

FIG. 46B is similar to FIG. 46A, except that it demonstrates the behavior of exemplary batteries without Cellasto® elastomeric microcellular polyurethane foam sheets. The same type of linear trends was generally observed, but the slope of the lines tended to be steeper. These results indicate that the presence or absence of Cellasto® elastomeric microcellular polyurethane foam sheets, as well as the geometry and mechanical properties of exemplary endplates, can affect the experienced pressure of batteries during cycling.

Figure 47A:
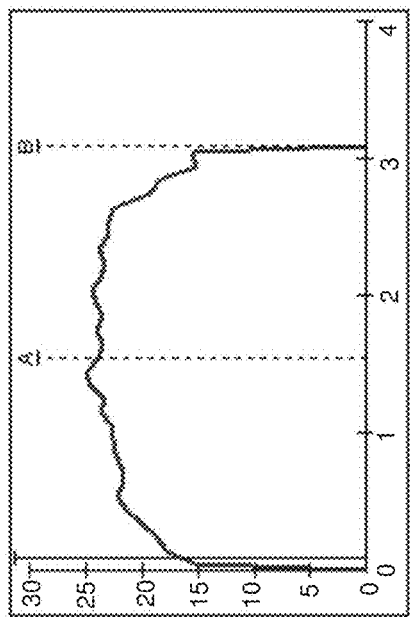
FIGS. 47A-47B show pressure distributions measured within exemplary batteries, according to some embodiments.
Figure 47B:
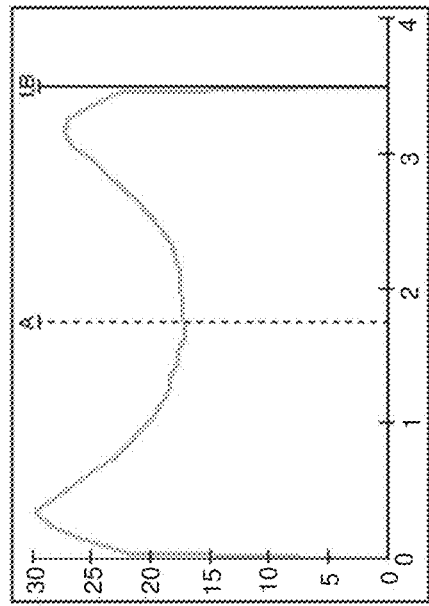
Figure 48A:
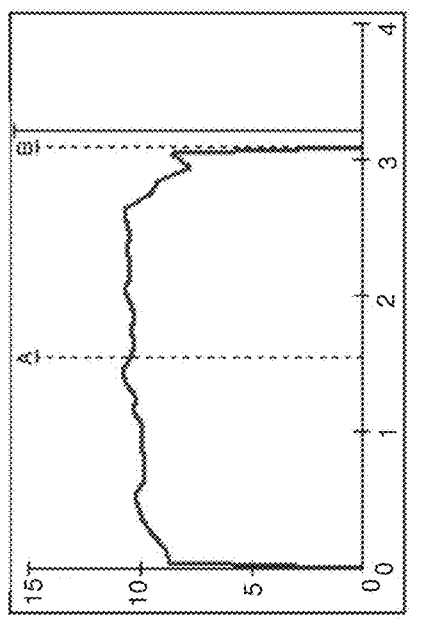
FIGS. 48A-48B show pressure distributions measured within exemplary batteries, according to some embodiments.
Figure 48B:
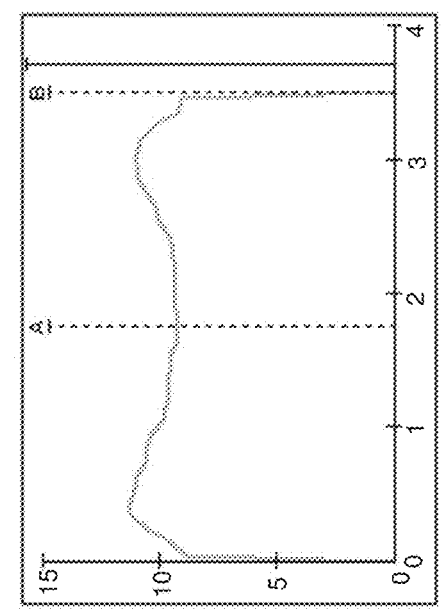
Figure 49A:
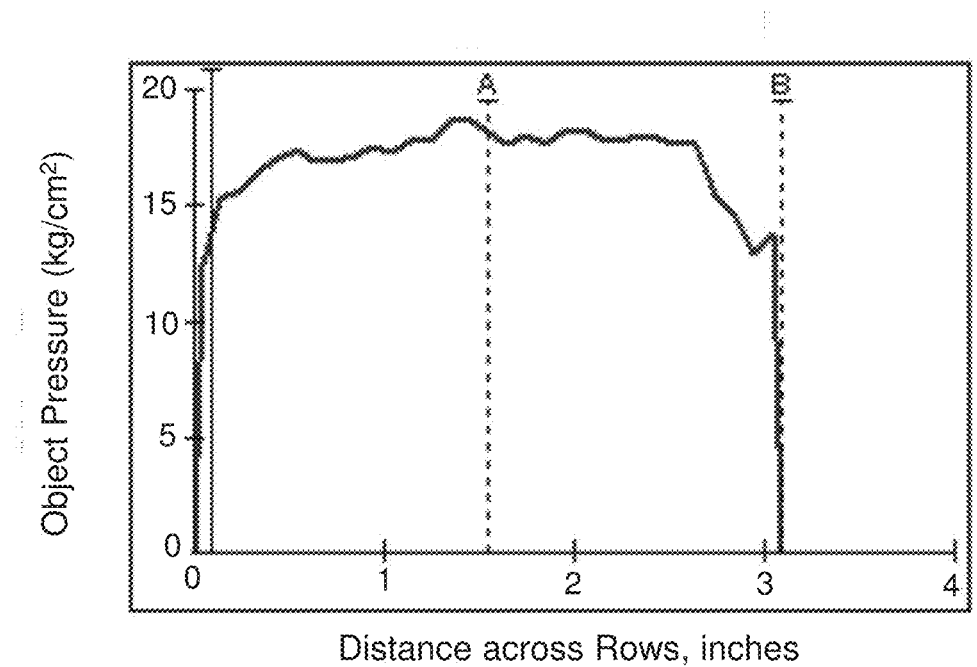
FIGS. 49A-49B show pressure distributions measured within exemplary batteries, according to some embodiments.
Figure 49B:
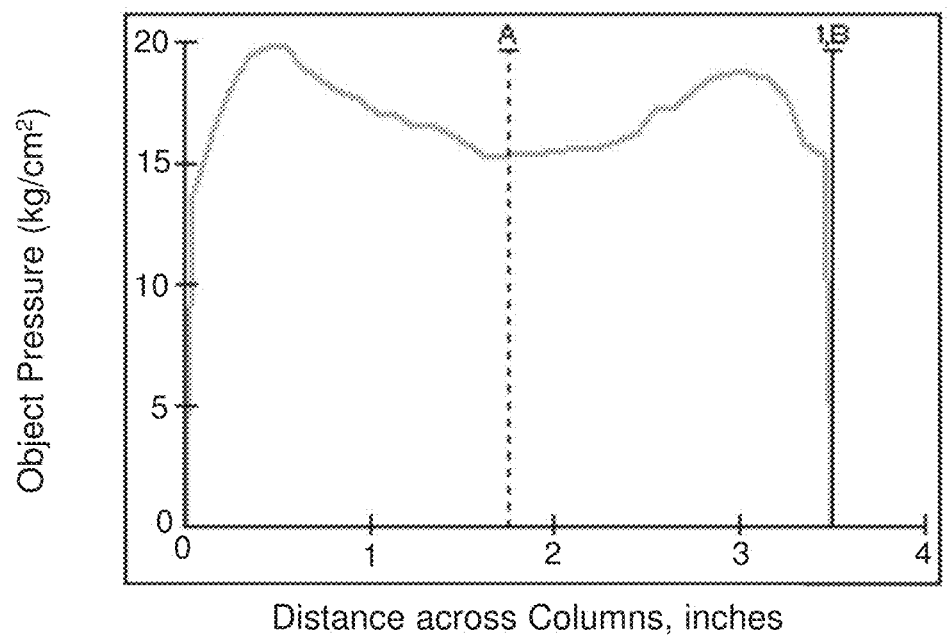

FIGS. 47A-49B present measured pressure distributions within an exemplary battery comprising a lithium metal electrochemical cell, under various conditions. This battery comprised exemplary endplates comprising a [0°/90°/0°] unidirectional carbon fiber laminate structure with a 10 mm thickness and a 33 Msi (226 GPa) modulus. The battery further comprised two 3 mm foam-thick (uncompressed) Cellasto® elastomeric microcellular polyurethane foam sheets on either side of the cell. The cell and foam sheets and were placed under an applied load of 12 $kgf/cm^2$ via the endplates. FIGS. 47A-47B show the measured pressure (in $kgf/cm^2$) of cells averaged across rows (FIG. 47A) and across columns (FIG. 47B) of the Tekscan 5101 sensor after 1 cycle with a 0% SOC. FIGS. 48A-48B show the pressure (in $kgf/cm^2$) of cells averaged across rows (FIG. 48A) and across columns (FIG. 48B) of the Tekscan 5101 sensor after 3 cycles with a 100% SOC. FIGS. 49A-49B show the pressure (in $kgf/cm^2$) of cells averaged across rows (FIG. 49A) and across columns (FIG. 49B) of the Tekscan 5101 sensor after 63 cycles—the cycle limit of the cell in this particular battery—with a 0% SOC. These figures demonstrate that the pressure magnitude and spatial distribution is affected by the state of charge of the cell and the cycle number. It is believed that lithium deposition upon charging causes "breathing" (change in cell thickness), which leads to greater pressure magnitudes under the fixed endplate configuration and less uniform pressure across the "column" dimension in the Tekscan sensor (which is believed to be attributable to deflection in the endplates caused by the load-bearing auxiliary fasteners near edges of the endplates).

Figure 50:
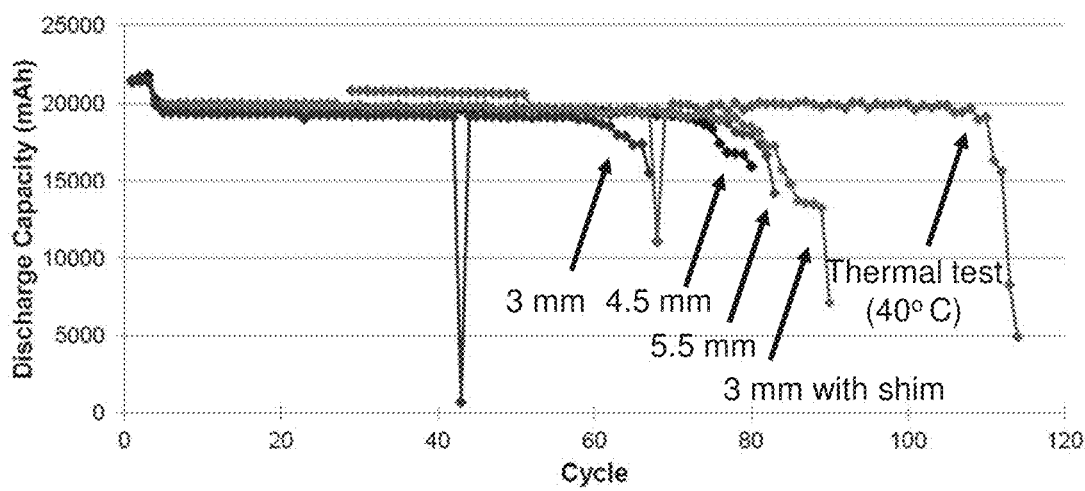
FIG. 50 shows the discharge capacity of batteries as a function of the number of charge-discharge cycles, according to some embodiments.

FIG. 50 illustrates the effect of foam sheet thickness and contoured shims on the discharge capacity of exemplary single-cell batteries, as a function of the number of charge-discharge cycles performed. The exemplary single-cell batteries were placed under an applied load of 12 $kgf/cm^2$. The exemplary endplates of these batteries were identical to sample plate 4, described above, comprising a [0°/90°/0°] unidirectional carbon fiber laminate structure with a 10 mm thickness and a 33 Msi (226 GPa) modulus. The exemplary single-cell batteries contained two foam sheets with sheet thicknesses in the range of 3 mm to 5.5 mm, and one battery contained a contoured shim that modulated the pressure distribution experienced by the cell of the exemplary battery. An additional exemplary battery was subjected to thermal testing (at 40° C.) with the microcellular foam but without collecting pressure data. In the absence of a shim, the cycle limit was lowest in the exemplary battery with the 3 mm foam sheets. When a contoured shim was included in the exemplary battery, the cycle limit increased substantially, exceeding the cycle limit of batteries with thicker foam sheets which lacked shims.

Figure 51:
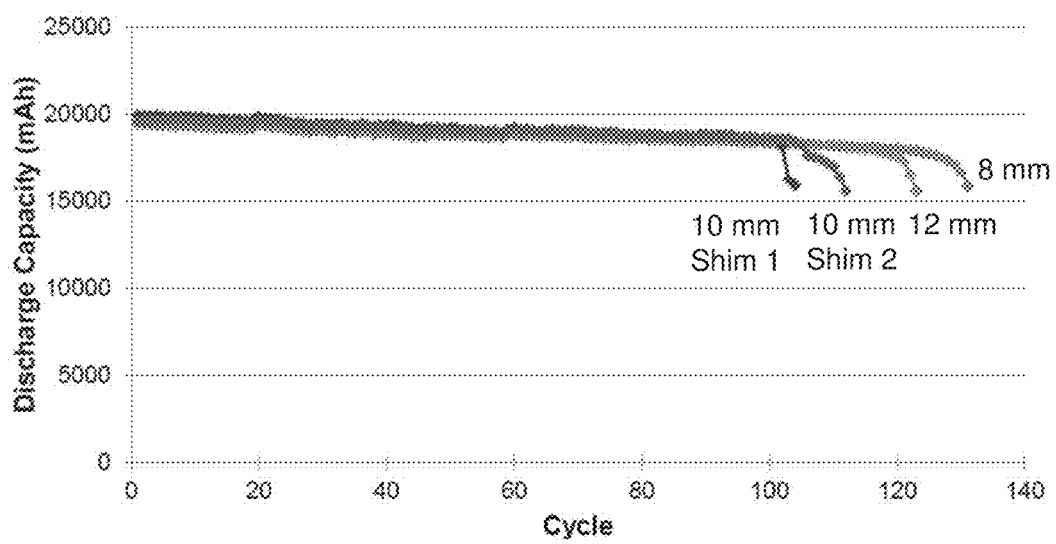
FIG. 51 shows the discharge capacity of exemplary batteries as a function of the number of charge-discharge cycles, according to some embodiments.

FIG. 51 is similar to FIG. 50, this time illustrating the effect of laminate structure and contoured shims on the discharge capacity of exemplary batteries, as a function of the number of charge-discharge cycles performed. The exemplary batteries had exemplary endplates comprising a [0°/90°/0°] unidirectional carbon fiber laminate structure with a 31 Msi (363 GPa) modulus and endplate thicknesses in the range of 8-12 mm. The exemplary batteries were placed under an applied load of 12 kgf/cm². The exemplary batteries comprised two foam sheets with a sheet thickness of 3 mm, 4.5 mm, or 5.5 mm, and additionally comprised one cooling fin. Two of the exemplary batteries comprised exemplary endplates with a 10 mm thickness. Each of the exemplary batteries contained one of two different contoured shims (shim 1 and shim 2) of the type illustrated in FIG. 43. The exemplary batteries had different cycle limits, demonstrating that the shape of the contour shim can affect this property. The exemplary battery with an 8 mm thick endplate and the exemplary battery with a 12 mm thick endplate did not contain contoured shims. As demonstrated by the results in FIG. 51 and in Table 12, these exemplary batteries had different cycle limits, demonstrating that the thickness of the exemplary endplates can affect this property.

TABLE 12

Cycle limits for different battery constructions.

| Plate | Thickness | Modulus | Foam | Rate | Cycle Limit |
|---|---|---|---|---|---|
| [0/90/0] × 17 | 10 mm | 33Msi | 3 mm × 2 | C/6 C-2C/3 D | 63 |
| [0/90/0] × 17 | 10 mm | 33Msi | 3 mm × 2 | C/6 C-2C/3 D | 123 |
| [0/30/0/−30/0] × 10 | 10 mm | 33Msi | 3 mm × 2 | C/6 C-2C/3 D | 119 |
| [0/90/0] × 20 | 12 mm | 33Msi | 3 mm × 2 | C/6 C-2C/3 D | 123 |
| [0/90/0] × 20 | 12 mm | 33Msi | 3 mm × 2 | C/6 C-2C/3 D | 124 |
| [0/90/0] × 13 | 8 mm | 33Msi | 3 mm × 2 | C/6 C-2C/3 D | 122 |
| [0/90/0] × 13 | 8 mm | 53Msi | 3 mm × 2 | C/6 C-2C/3 D | 131 |
| [0/90/0] × 13 | 8 mm | 53Msi | 3 mm × 2 | C/6 C-2C/3 D | 117 |
| [0/90/0] × 17 | 10 mm | 33Msi | 4.5 mm × 2 | C/6 C-2C/3 D | 79 |
| [0/90/0] × 17 | 10 mm | 33Msi | 5.5 mm × 2 | C/6 C-2C/3 D | 76 |

These results collectively demonstrate that both endplate thickness, foam sheet thickness, and the shape and inclusion of contoured shims can affect the pressure experienced by exemplary cells under an applied load, as well as their cycle limit.

Example 10

This example describes the effect of the incorporation of contoured shims and variable-density foams on the cycle limit of exemplary single-cell batteries. In this example, one of two sample plate types—sample plate 4 (described in example 5) or sample plate 7 (described in Example 6)—is used as the endplates for all batteries. When exemplary batteries comprised contoured shims, one of two exemplary shim types—sample shim 1 and sample shim 2, described in Example 7—was incorporated into the battery. All batteries containing contoured shims contained two, 3 mm Cellasto® elastomeric microcellular polyurethane foam sheets of uniform density.

Figure 52A:
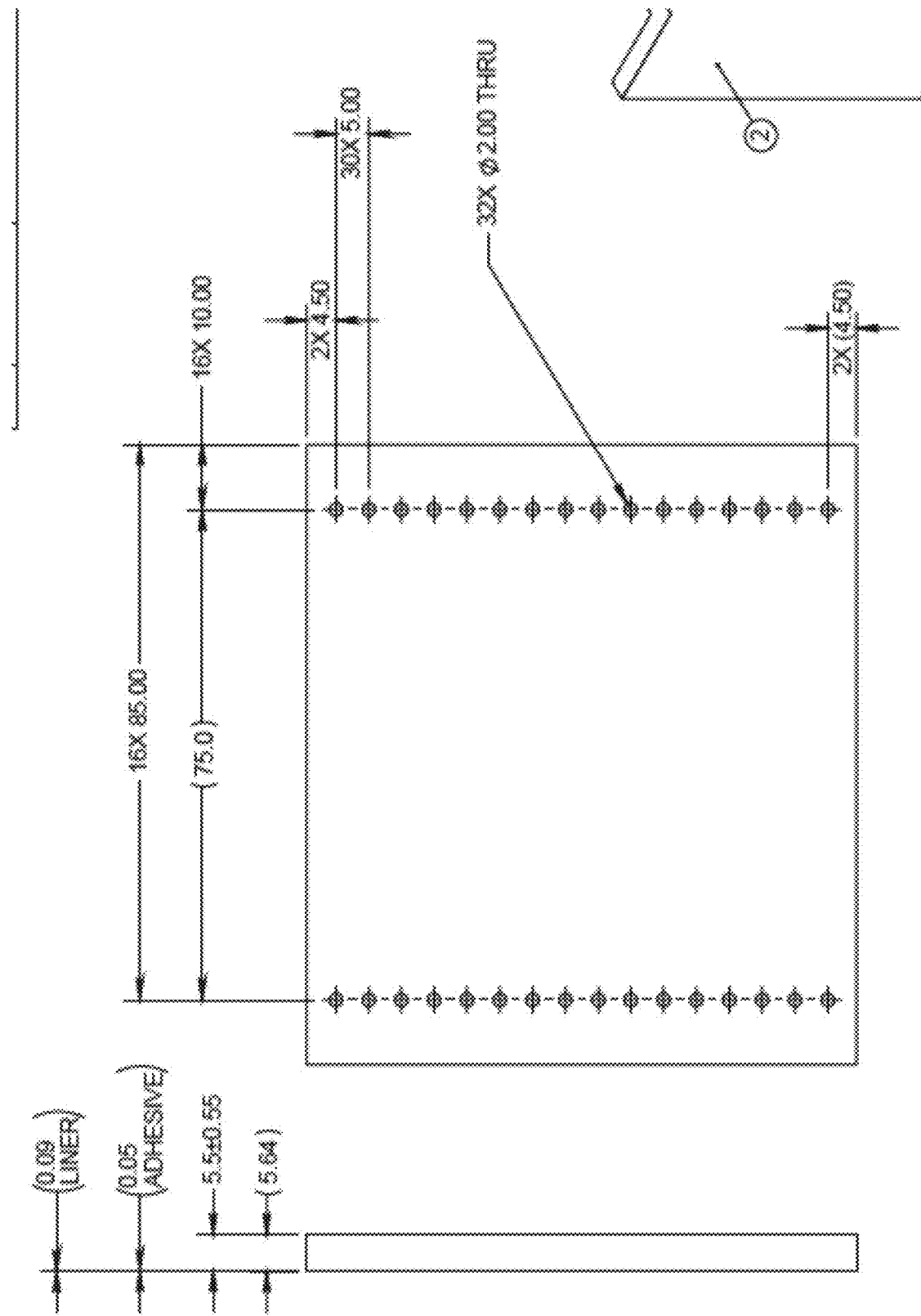
FIGS. 52A-52B show thermally insulating compressible solid article portions having variable density, according to some embodiments.
Figure 52B:
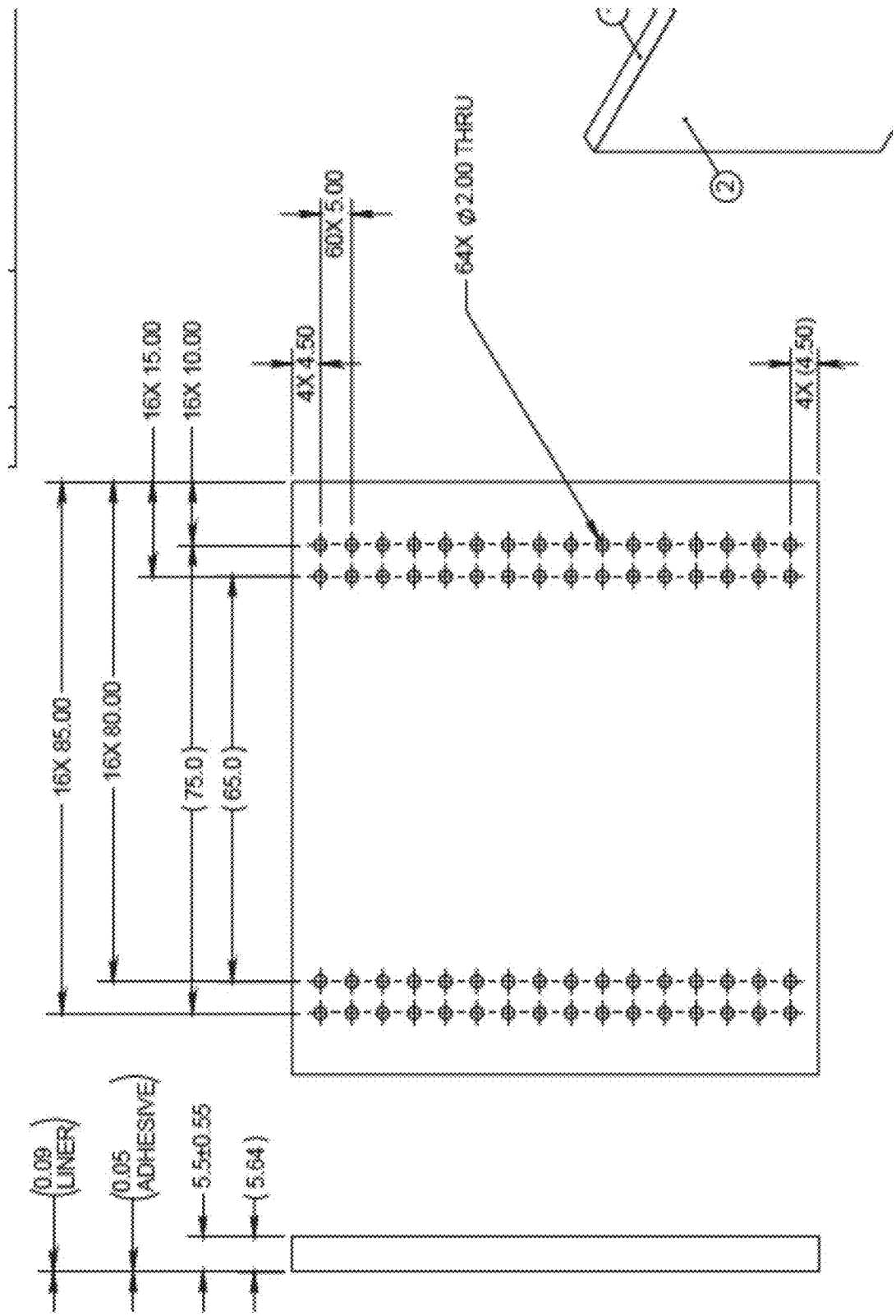

Exemplary batteries without contoured shims contained two 5.5 mm-thick Cellasto® elastomeric microcellular polyurethane foam sheets. One contained a 5.5 mm-thick Cellasto® elastomeric microcellular polyurethane foam sheets of uniform density. Another comprised 5.5 mm Cellasto® elastomeric microcellular polyurethane foam sheets of variable density of the type illustrated in FIG. 52A, containing 1 row of holes. Another contained 5.5 mm Cellasto® elastomeric microcellular polyurethane foam sheets of variable density of the type illustrated in FIG. 52B, containing 2 rows of holes. In both cases, variable density was achieved by excavating a set of holes out of the sheet to modulate the film's local stiffness. Batteries were cycled according to a C/6 C-2C/3 D charge-discharge protocol.

Results are presented in Table 13. These results show that changes in the contour of a contoured shim, as well as endplate geometry for cells with identical shim contours, can affect the cycle limit of exemplary batteries. Exemplary batteries that contained variable-density Cellasto® elastomeric microcellular polyurethane foam sheets showed improvement in the cycle-limit when the density of the Cellasto® elastomeric microcellular polyurethane foam sheets near the edges was decreased. More specifically, the Cellasto® elastomeric microcellular polyurethane foam sheets with uniform density had the lowest cycle limit (100), while the Cellasto® elastomeric microcellular polyurethane foam sheets containing two rows of holes had the highest cycle limit (110).

TABLE 13

Cycle limits for different battery constructions.

| Sample plate | Sample shim | Foam | Rate | Cycle Limit |
|---|---|---|---|---|
| 4 | 2 | 3 mm × 2 | C/6 C-2C/3 D | 90 |
| 7 | 2 | 3 mm × 2 | C/6 C-2C/3 D | 112 |
| 7 | 1 | 3 mm × 2 | C/6 C-2C/3 D | 104 |
| 7 | None | 5.5 mm × 2 (Uniform) | C/6 C-2C/3 D | 100 |
| 7 | None | 5.5 mm × 2 (1 Row) | C/6 C-2C/3 D | 105 |
| 7 | None | 5.5 mm × 2 (2 Rows) | C/6 C-2C/3 D | 110 |

Example 11

Figure 53A:
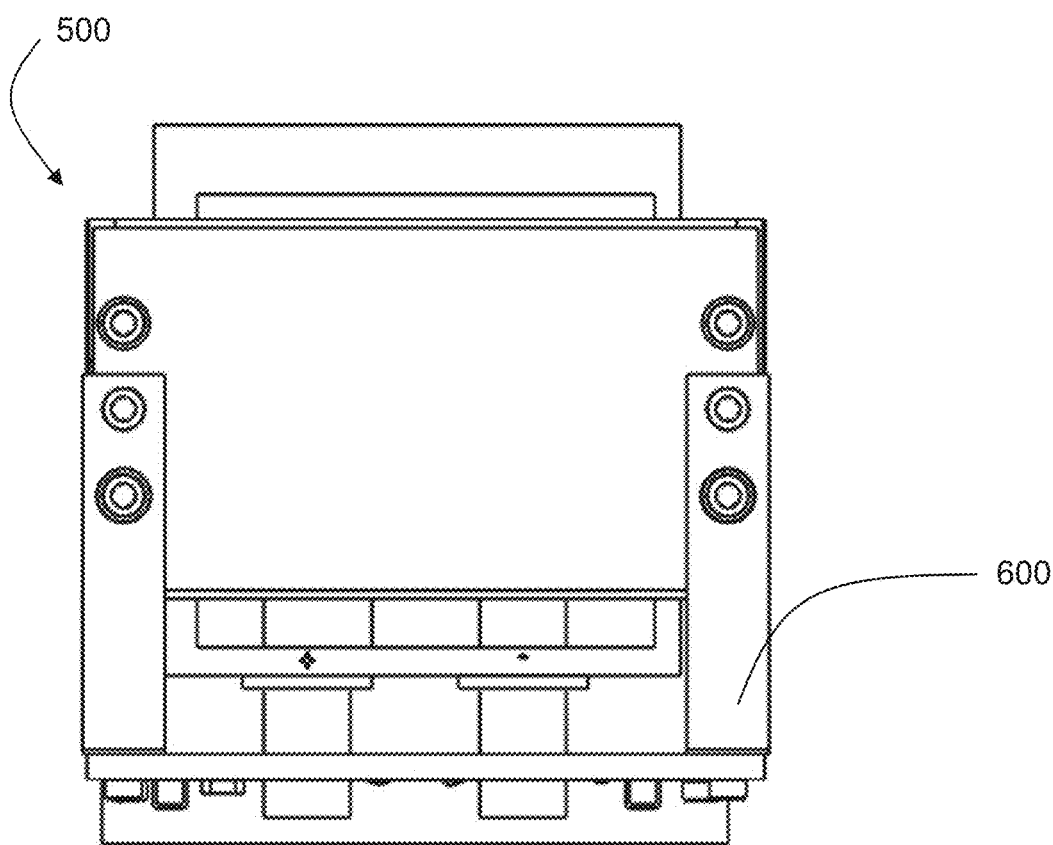
FIGS. 53A-53B show schematic diagrams of multi-cell batteries, according to some embodiments.
Figure 53B:
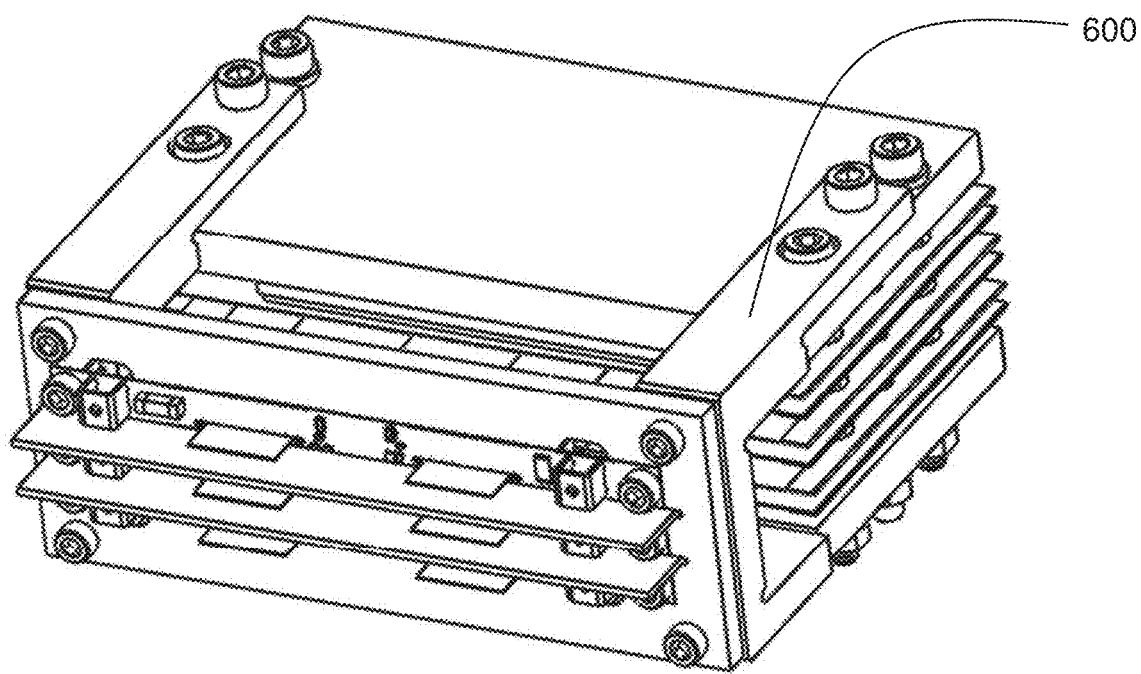

This example describes the discharge capacity and pressure experienced by cells within an exemplary battery comprising multiple electrochemical cells aligned in series (referred to as a "multi-cell stack"). This multi-cell stack comprised three electrochemical cells and four 4.5 mm-thick (uncompressed) Cellasto® elastomeric microcellular polyurethane foam sheets—one placed between the first electrochemical cell and the second electrochemical cell, one placed between the second electrochemical cell and the third electrochemical cell, one placed between the first electrochemical cell and a first endplate, and one placed between the third electrochemical cell and a second endplate. The endplates comprised a [0°/90°/0°] laminate structure with a 10 mm thickness and a 33 Msi (226 GPa) modulus. The battery further comprised thermally conductive solid articles in the form of aluminum cooling fins to assist with thermal management and alignment of the cells. A balance board was used to sync and balance the cells in the battery during the testing of this Example. FIGS. 53A-53B illustrates this architecture with exemplary battery 500 and balancing board 600. FIG. 53A presents a front-view illustration of battery 500 and balance board 600 multi-cell stack, while FIG. 53B presents perspective view illustration of the battery 500 and balance board 600. During measurements, the stack in the battery incorporated a Tekscan 5101 sensor with a 95 mm×84 mm area to measure pressure and pressure distribution—properties computed using I-scan software. The sensor was equilibrated at 100 psi and calibrated using five points of pressure (10 kgf/cm$^2$, 20 kgf/cm$^2$, 30 kgf/cm$^2$, 40 kgf/cm$^2$, and 50 kgf/cm$^2$) after being pressure soaked for at least three days to properly precondition the sensor to the load applied in the test. A load of 13.9 kgf/cm$^2$ was applied to the stack.

Figure 54:
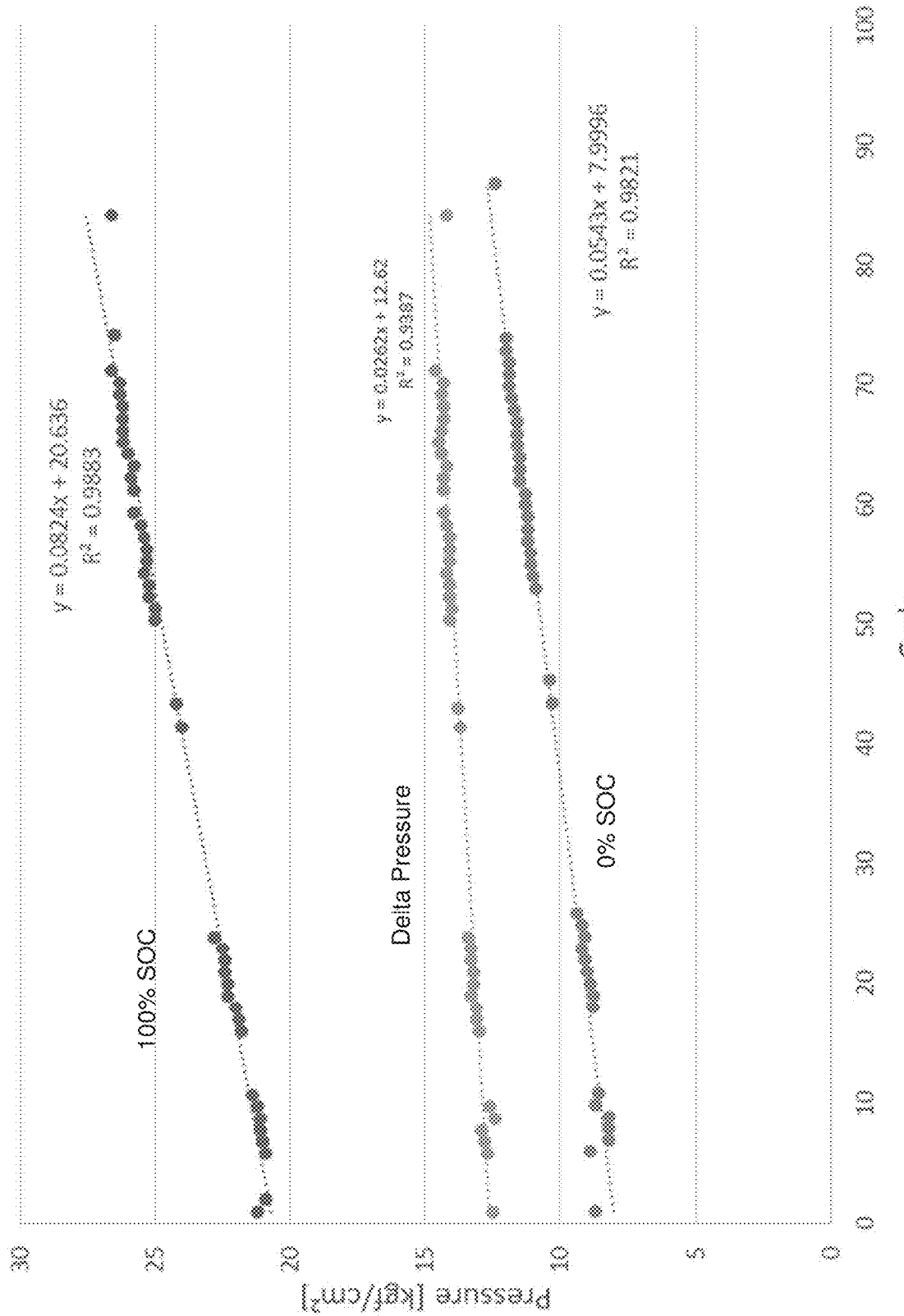
FIG. 54 shows pressure measured within an exemplary battery as a function of the number of charge-discharge cycles, according to some embodiments.
Figure 55:
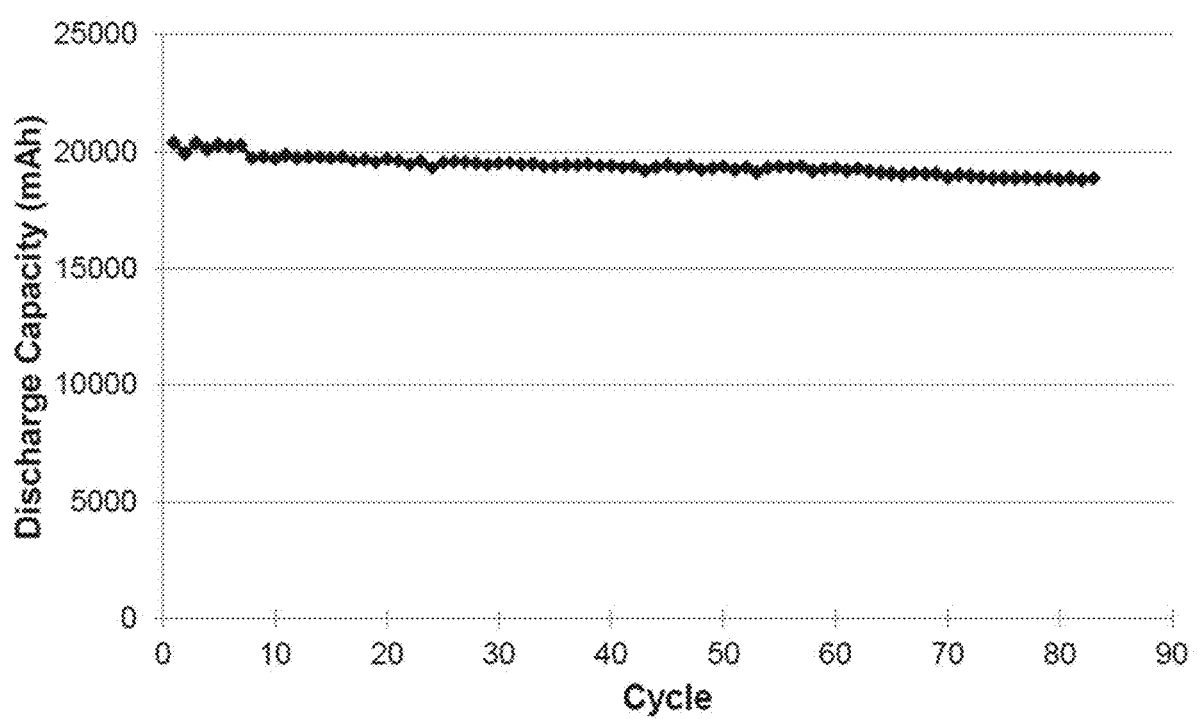
FIG. 55 shows discharge capacity of an exemplary battery as a function of the number of charge-discharge cycles, according to some embodiments.

A plurality of charge-discharge cycles, consisting of a C/4 charge and a 1 C discharge, were performed on the multi-cell stack, and the pressure was monitored using the Tekscan 5101 sensor. FIG. 54 presents the measured pressure as a function of cycle number and SOC. Also included is the "Delta Pressure", the pressure difference between a 0% SOC and a 100% SOC within a given cycle. Pressure and delta pressure both depended linearly on cycle number. FIG. 55 presents the discharge capacity of the multi-cell stack in the exemplary battery as a function of cycle number. This discharge capacity decreased slowly over time, but was not observed to reach a cycle limit (as defined in Example 6) during this experiment's limited number of cycles.

After the experiment, cells from the exemplary multi-cell stack of the battery were disassembled for visual inspection. A small amount of gas was observed during disassembly. The cells remained evenly wet with electrolyte, and a thin, black powder was observed on the electrochemical active region of the lithium electrode—however, almost all lithium was observed to be metallic, with only a small quantity of decomposition products. Utilization across the cells was very uniform.

This example illustrates the viability of multi-cell stacks under applied loads greater than the yield stress of the anode-forming material, and indicates that, using combinations of components presented and arranged in accordance with this disclosure, pressure from anisotropic applied force can be controlled in a fashion consistent with the single-cell examples previously presented.

Example 12

Figure 56A:
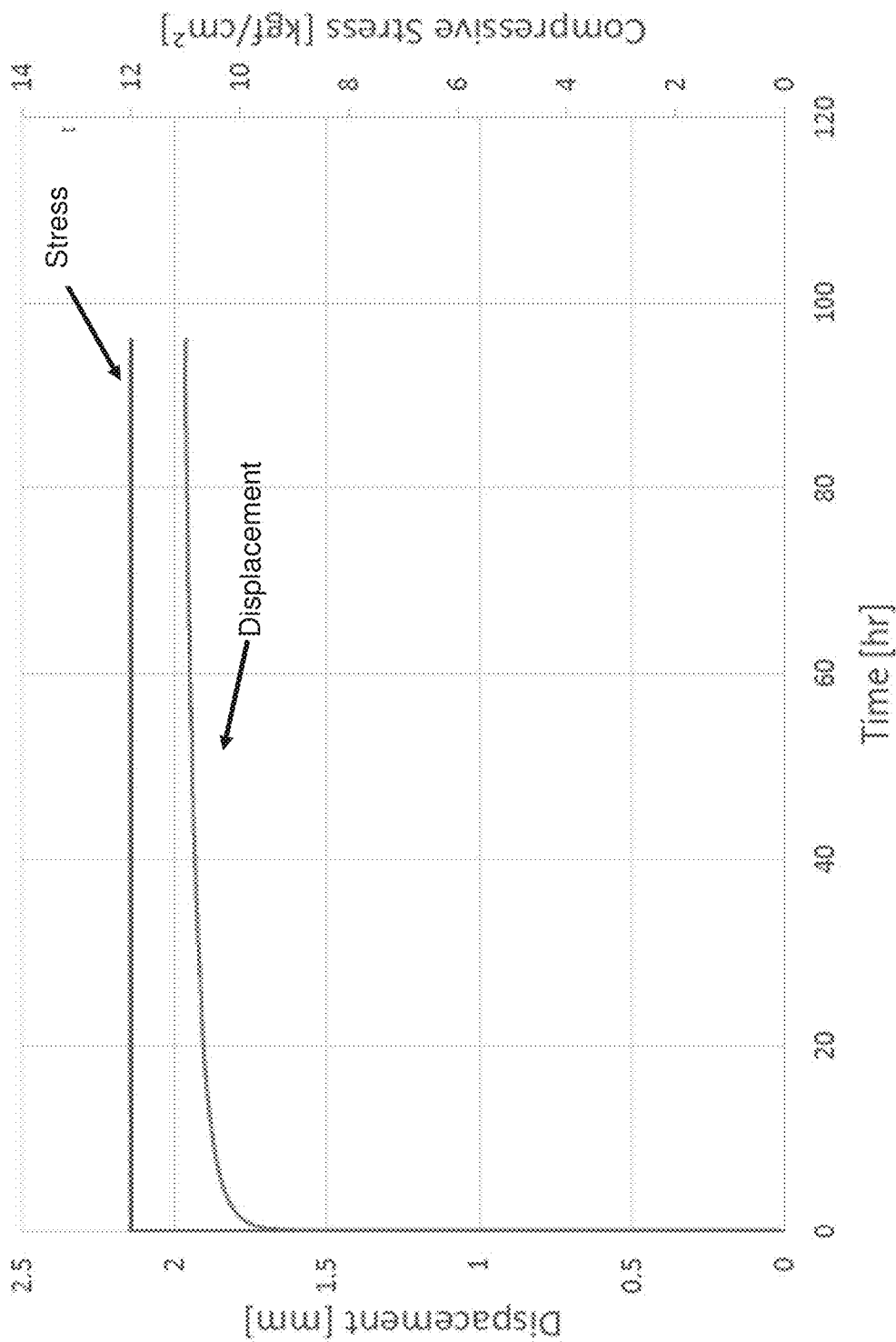
FIG. 56A shows a constant-load creep curve of a thermally insulating compressible solid article portion, according to some embodiments.
Figure 56B:
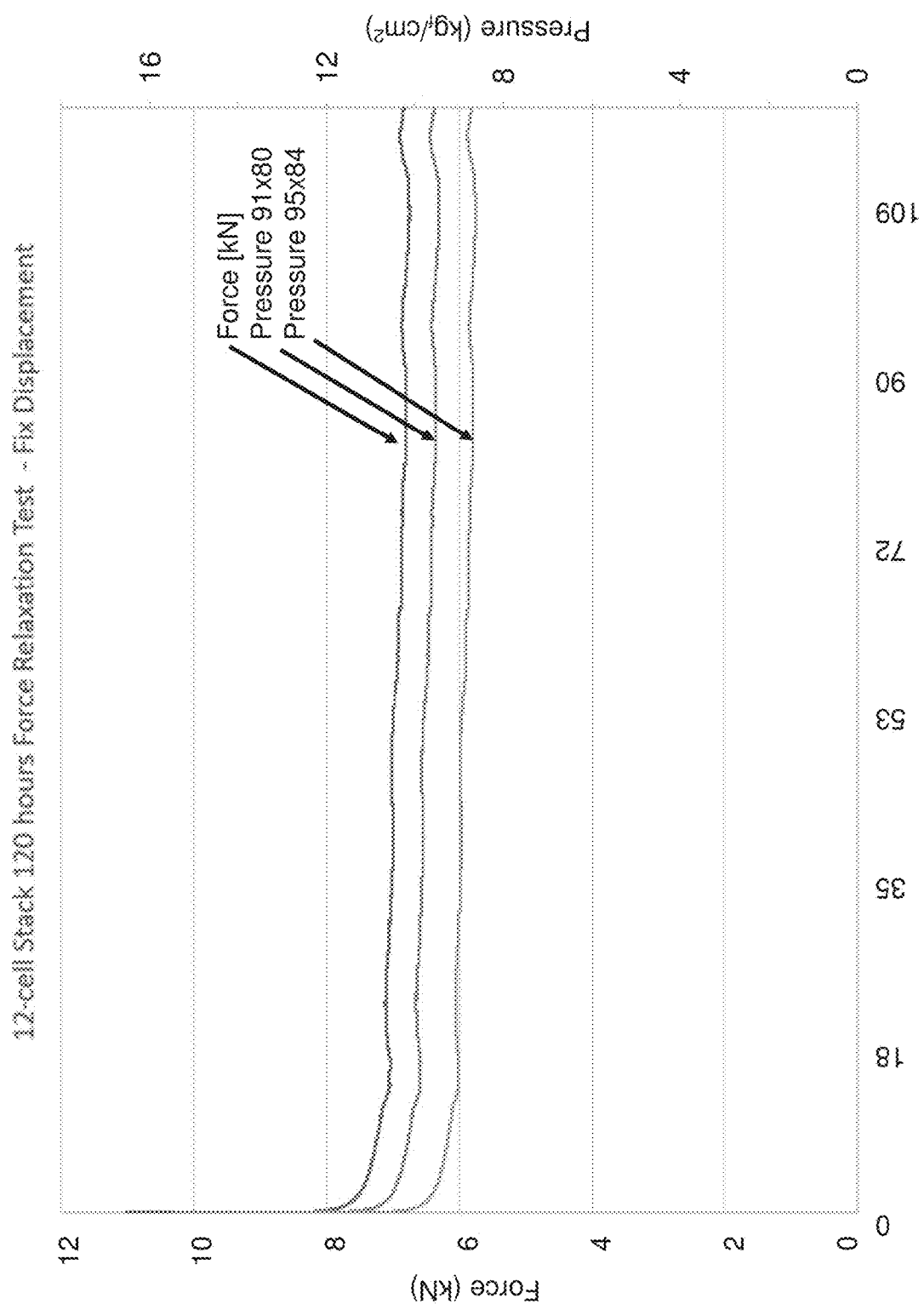
FIG. 56B shows a force-relaxation curve of a thermally insulating compressible solid article portion, according to some embodiments.

As illustrated by previous examples, the incorporation of thermally insulating compressible solid article portions in the form of foam sheets into exemplary batteries may be related to their long-term performance, including their cycle limit, as well as to their pressure distribution. In some cases, these properties could exhibit time dependence, due to the time-dependence of creep and force-relaxation within polymeric foams. To demonstrate this, two experiments were performed. In the first, an exemplary sheet of 5.5 mm-thick (uncompressed) Cellasto® elastomeric microcellular polyurethane foam was placed under a constant compressive load of 12 kgf/cm$^2$ for 96 hours, and the compressive displacement was measured. The results of this experiment are reported in FIG. 56A. In the second, an exemplary 12-cell stack containing 13 sheets of 5.5 mm Cellasto® elastomeric microcellular polyurethane foam was compressed to a fixed thickness of 148.8 mm, and the measured response force was recorded for a period of 120 hours. In addition, the measured response force was converted to units of pressure for different regions of the stack, where the cross-sectional area was either 91 mm×80 mm or 95 mm×84 mm. These pressures are each equal to the measured force divided by their respective cross-sectional area. The results of this experiment are reported in FIG. 56B.

When the sheet of 5.5 mm Cellasto® elastomeric microcellular polyurethane foam was placed under a constant compressive load of 12 kgf/cm$^2$ for 96 hours, it reached an ultimate displacement of 1.96 mm. However, in standard stress-strain compression experiments, identical layers of foam only reach an instantaneous compressive displacement of about 1.75 mm. Consequently, the compression set for this layer of foam as measured by this constant load technique—the difference between the final displacement and the instantaneous displacement under applied load—was approximately 11.4%.

In the 12-cell stack, the response force initially decreased rapidly, then continued to decrease slowly to a final value of 6.83 kN. This substantial decrease may have implications for the pressure distribution of the exemplary 12-cell stack, indicating that rapid changes in applied load or in experienced pressure (due to the rate of charging/discharging) could produce responses from the foam which differ from their behavior in steady state.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:
1. A battery, comprising:
a stack comprising a first electrochemical cell and a second electrochemical cell,
wherein:
the first electrochemical cell comprises a first electrochemical active region having a largest dimension parallel to an exterior surface of the first electrochemical cell, and
the second electrochemical cell comprises a second electrochemical active region having a largest dimension parallel to an exterior surface of the second electrochemical cell; and
a housing at least partially enclosing the stack, the housing comprising a solid plate covering at least a portion of an end of the stack;
wherein:
the housing is configured to apply, via the solid plate and tension in a solid housing component coupled to the solid plate, during at least one period of time during charge and/or discharge of the first electrochemical cell and/or the second electrochemical cell, an anisotropic force with a component normal to a first electrode active surface of the first electrochemical cell and/or a second electrode active surface of the second electrochemical cell defining a pressure of at least 10 kgf/cm$^2$;
the solid housing component comprises a metal, metal alloy, composite, polymeric material, or combination thereof;
the solid housing component comprises a tapered projection, the solid plate comprises a tapered recess complementary in shape to the tapered projection, and the solid housing component and the solid plate are configured to form a joint at least in part via coupling of the tapered projection and the tapered recess; and
a ratio of the largest dimension of the solid plate parallel to an exterior surface of the solid plate to the largest dimension of the first electrochemical active region parallel to an exterior surface of the first electrochemical cell and/or a ratio of the largest dimension of the solid plate parallel to an exterior surface of the solid plate to the largest dimension of the second electrochemical active region parallel to an exterior surface of the second electrochemical cell is less than or equal to 1.5.

2. A battery, comprising:
a stack comprising a first electrochemical cell and a second electrochemical cell,
wherein:
the first electrochemical cell comprises a first electrochemical active region having a largest dimension parallel to an exterior surface of the first electrochemical cell, and
the second electrochemical cell comprises a second electrochemical active region having a largest dimension parallel to an exterior surface of the second electrochemical cell; and
a housing at least partially enclosing the stack, the housing comprising a solid plate covering at least a portion of an end of the stack, wherein the housing has a largest pressure applying dimension parallel to an exterior surface of the housing;
wherein:
the housing is configured to apply, via the solid plate and tension in a solid housing component coupled to the solid plate, during at least one period of time during charge and/or discharge of the first electrochemical cell and/or the second electrochemical cell, an anisotropic force with a component normal to a first electrode active surface of the first electrochemical cell and/or a second electrode active surface of the second electrochemical cell defining a pressure of at least 10 kgf/cm$^2$;

the solid housing component comprises a metal, metal alloy, composite, polymeric material, or combination thereof;

the solid housing component comprises a tapered projection, the solid plate comprises a tapered recess complementary in shape to the tapered projection, and the solid housing component and the solid plate are configured to form a joint at least in part via coupling of the tapered projection and the tapered recess; and a ratio of the largest pressure-applying dimension of the housing parallel to an exterior surface of the housing to the largest dimension of the first electrochemical active region parallel to an exterior surface of the first electrochemical cell and/or a ratio of the largest pressure-applying dimension of the housing parallel to an exterior surface of the housing to the largest dimension of the second electrochemical active region parallel to an exterior surface of the second electrochemical cell is less than or equal to 1.6.

3. The battery of claim 2, wherein a ratio of the largest dimension of the solid plate parallel to an exterior surface of the solid plate to the largest dimension of the first electrochemical active region parallel to an exterior surface of the first electrochemical cell and/or a ratio of the largest dimension of the solid plate parallel to an exterior surface of the solid plate to the largest dimension of the second electrochemical active region parallel to an exterior surface of the second electrochemical cell is less than or equal to 1.5.

4. The battery of claim 1, wherein the end of the stack is a first end of the stack, the stack comprises a second end, and the solid housing component spans from the solid plate to the second end of the stack.

5. The battery of claim 1, wherein the solid housing component comprises a metal and/or metal alloy, and the metal and/or metal alloy comprises aluminum.

6. The battery of claim 1, wherein the solid housing component comprises a composite, and the composite comprises carbon fiber.

7. The battery of claim 1, wherein the end of the stack is a first end of the stack, the solid plate is a first solid plate, the stack further comprises a second solid plate covering at least a portion of a second end of the stack, and the second solid plate is coupled to the solid housing component.

8. The battery of claim 1, wherein the housing has a volume of less than or equal to 15000 cm$^3$.

9. The battery of claim 1, wherein the first electrochemical cell and/or the second electrochemical cell comprises lithium metal and/or a lithium metal alloy as an electrode active material.

10. A method, comprising applying, to the battery of claim 1, an anisotropic force with a component normal to a first electrode active surface of the first electrochemical cell and/or a second electrode active surface of the second electrochemical cell defining a pressure of at least 10 kgf/cm$^2$.

11. The battery of claim 6, wherein solid plate comprises carbon fiber.

12. The battery of claim 7, wherein the tapered projection is a first tapered projection, the tapered recess is a first tapered recess, the solid housing component comprises a second tapered projection, the second solid plate comprises a second tapered recess complementary in shape to the second tapered projection, and the solid housing component and the second solid plate are configured to form a joint at least in part via coupling of the second tapered projection and the second tapered recess.

13. The battery of claim 12, wherein the solid housing component comprises carbon fiber, the first solid plate comprises carbon fiber, and the second solid plate comprises carbon fiber.

14. The battery of claim 13, wherein the first electrochemical cell and/or the second electrochemical cell comprises lithium metal and/or a lithium metal alloy as an electrode active material.

15. A vehicle, comprising the battery of claim 1.

16. The battery of claim 2, wherein the solid housing component and the solid plate each comprises carbon fiber.

17. The battery of claim 2, wherein the end of the stack is a first end of the stack, the solid plate is a first solid plate, the stack further comprises a second solid plate covering at least a portion of a second end of the stack, and the second solid plate is coupled to the solid housing component.

18. The battery of claim 17, wherein the tapered projection is a first tapered projection, the tapered recess is a first tapered recess, the solid housing component comprises a second tapered projection, the second solid plate comprises a second tapered recess complementary in shape to the second tapered projection, and the solid housing component and the second solid plate are configured to form a joint at least in part via coupling of the second tapered projection and the second tapered recess.

19. The battery of claim 18, wherein the solid housing component comprises carbon fiber, the first plate comprises carbon fiber, and the second solid plate comprises carbon fiber.

20. The battery of claim 2, wherein the first electrochemical cell and/or the second electrochemical cell comprises lithium metal and/or a lithium metal alloy as an electrode active material.

21. A vehicle, comprising the battery of claim 2.

* * * * *